US010994569B2

(12) United States Patent
Rosenfield

(10) Patent No.: US 10,994,569 B2
(45) Date of Patent: May 4, 2021

(54) ANGLE TRISECTOR, AS VALIDATED TO PERFORM ACCURATELY OVER A WIDE RANGE OF DEVICE SETTINGS BY A NOVEL GEOMETRIC FORMING PROCESS; ALSO CAPABLE OF PORTRAYING FINITE LENGTHS THAT ONLY COULD BE APPROXIMATED BY MEANS OF OTHERWISE APPLYING A COMPASS AND STRAIGHTEDGE TO A GIVEN LENGTH OF UNITY; THAT FURTHERMORE FUNCTIONS AS A LEVEL WHOSE INHERENT GEOMETRY COULD BE ADAPTED FOR MANY OTHER USES SUCH AS BEING INCORPORATED INTO THE DESIGN OF A HYDRAULIC CAR LIFT

(71) Applicant: Ronald Harvey Rosenfield, San Diego, CA (US)

(72) Inventor: Ronald Harvey Rosenfield, San Diego, CA (US)

( * ) Notice: Subject to any disclaimer, the term of this patent is extended or adjusted under 35 U.S.C. 154(b) by 323 days.

(21) Appl. No.: 15/889,241

(22) Filed: Feb. 6, 2018

(65) Prior Publication Data

US 2018/0201050 A1 Jul. 19, 2018

(51) Int. Cl.

*B43L 13/00* (2006.01)
*G01B 3/16* (2006.01)

(Continued)

(52) U.S. Cl.

CPC .............. *B43L 13/002* (2013.01); *G01B 1/00* (2013.01); *G01B 3/16* (2013.01); *G01B 3/56* (2013.01); *G01B 3/563* (2013.01)

(58) Field of Classification Search

CPC .................................................... B43L 13/002

See application file for complete search history.

(56) References Cited

U.S. PATENT DOCUMENTS

| | | | |
|---|---|---|---|
| 1,010,612 | A | 12/1911 | Garinger |
| 1,093,919 | A | 4/1914 | Dennis |

(Continued)

FOREIGN PATENT DOCUMENTS

| | | | |
|---|---|---|---|
| AU | 533820 B3 | 10/1983 | |
| CA | 2441543 A1 | 3/2005 | |

(Continued)

OTHER PUBLICATIONS

T. L. Heath, The Works of Archimedes,1897, pp. cvi, 309 and 310, First English language speaking Edition, C. J. Clay and Sons, Cambridge Univesity Press Warehouse, London.

(Continued)

*Primary Examiner* — Charlie Y Peng

(57) ABSTRACT

A newly proposed articulating invention, each of whose four constituent embodiments is designed to trisect any of a multitude of suitably described angles by means of becoming properly set to its designated magnitude; thus automatically portraying a motion related solution for the trisection of an angle that discloses complete routing details of a pathway that leads from such designated magnitude all the way back to its trisector; thereby discerning the whereabouts of certain intersection points which evade detection when attempting to otherwise locate them by means of applying only a straightedge and compass to an angle of such designated magnitude; furthermore projecting finite lengths of any trisector that bears cubic irrational trigonometric properties, being those that cannot be duplicated, but only approximated, when applying a straightedge and compass to a given length of unity; and being of a unique design that could be adapted to function as a level.

4 Claims, 49 Drawing Sheets

(51) Int. Cl.
*G01B 1/00* (2006.01)
*G01B 3/56* (2006.01)

(56) References Cited

U.S. PATENT DOCUMENTS

| | | | | |
|---|---|---|---|---|
| 1,109,479 | A | 9/1914 | Steed | |
| 1,145,369 | A | 7/1915 | Kaplan | |
| 1,294,935 | A | 2/1919 | Milliken | |
| 2,222,853 | A | 11/1940 | Neurohr | |
| 2,450,167 | A * | 9/1948 | Robinson | G01B 3/56 33/472 |
| 3,008,236 | A | 11/1961 | Hanson | |
| 3,089,245 | A | 5/1963 | Cromer | |
| 3,224,097 | A | 12/1965 | Izumi | |
| 3,906,638 | A * | 9/1975 | Romano | B43L 13/002 33/1 AP |
| 3,919,777 | A | 11/1975 | Moore | |
| 4,068,380 | A | 1/1978 | Van Spijker | |
| 4,866,848 | A | 9/1989 | Agelidis | |
| 5,210,951 | A * | 5/1993 | Chen | B43L 13/002 33/1 AP |
| 5,383,276 | A | 1/1995 | Izumi | |
| 5,894,671 | A | 4/1999 | Karapetian | |
| 6,823,596 | B1 | 11/2004 | Roberts | |
| 2012/0159797 | A1 | 6/2012 | Roth | |
| 2013/0291392 | A1 | 11/2013 | Swamy | |

FOREIGN PATENT DOCUMENTS

| | | | | | |
|---|---|---|---|---|---|
| CH | 565051 | A5 | | 8/1975 | |
| CN | 2784206 | Y | * | 5/2006 | |
| CN | 202480683 | U | * | 10/2012 | |
| CN | 103600607 | A | * | 2/2014 | |
| CN | 206516139 | U | * | 9/2017 | |
| DE | 823793 | C | | 12/1951 | |
| DE | 2544628 | A1 | | 4/1977 | |
| JP | 57182101 | A | | 11/1982 | |
| SE | 523921 | C2 | | 6/2004 | |
| WO | WO-2012098561 | A2 | * | 7/2012 | G01B 3/002 |
| WO | WO-2019130250 | A1 | * | 7/2019 | B43L 7/005 |

OTHER PUBLICATIONS

Howard Eves, An Introduction to the History of Mathematics, 1969, p. 97-97, third edition, Holt, Rinehart, an Winston, New York, Chicago, San Francisco, London and Sydney.

Howard Eves, A Survey of Geometry, 1963, pp. 185-186, vol. One, Allyn and Bacon, Inc, Boston.

Richard Courant and Herbert Robbins, What is Mathematics, 1947, pp. 126-130, Oxford University Press, London, New York, Toronto.

Vera Sanford, A Short Hisotry of Mathematics, 1930, p. 257, Houghton Mifflin Company at the Riverside Press, Cambridge.

David Eugene Smith, History of Mathematics, 1953, p. 297, vol. II, Dover Publications, Inc., General Publishing Company, Toronto, and Constable and Company, London.

W. Gellert et al. , editors, VNR Concise Encyclopedia of Mathematics, 1977, p. 154, First American edition, Van Nostrand Reinhold, New York.

Underwood Dudley, A Budget of Trisections, 1987, p. xiv, First Edition, Springer-Verlag, New York, Berlin, Heidelberg, London, Paris, Tokyo.

William and T. Alaric Millington,Dictionary of Mathematics, 1966, p. 246, Cassell & Co., London.

Ruel V. Churchill, Complex Variables and Applications, 1960, Second Edition, McGraw-Hill Book Company, New York, Toronto, London.

The Math Forum—Ask Dr. Math, Website address http://mathforum.org/library/drmath/view/72016.html, entitled Constructing the Trisection of an Angle, Jul. 20, 2008.

Wikipedia, Website address https://en.wikipedia.org/wiki/Book_of_Lemmas, entitled Book of Lemmas.

Wikipedia, Website address https://en.wikipedia.org/wiki/Irrational_number#Transcendental_and_algebraicIrrationals, entitled Irrational number.

Wikipedia, Website address https://en.wikipedia.org/wiki/Angle trisection, entitled Angle trisection.

* cited by examiner

| PROCESS | CORRECT RESPONSE |
|---|---|
| Mathematic Limitation Identified | Inability to solve the classical problem of the trisection of an angle |
| Unknown Geometric Property Uncovered | Overlapment point availability |
| Degree of Imposition Delineated | Cannot backtrack upon irreversible conditions |
| Device Primary Function Revealed | Static image regeneration |

FIG. 3.

| NEWLY PROPOSED ARTICULATING TRISECTION INVENTION EMBODIMENT NAME | APPLICABLE FIGURE NUMBER OF CORRESPONDING EUCLIDEAN FORMULATION | APPLICABLE FIGURE NUMBERS OF CORRESPONDING DRAWING PACKAGES |
|---|---|---|
| First | FIG. **5** | FIG. **6** |
| Second | FIG. **7** | FIG. **8** through FIG.**13** |
| Third | FIG. **14** | FIG. **15** through FIG. **20** |
| Fourth | FIG. **21** | FIG. **22** through FIG. **28** and FIG. **29** through FIG. **41** |

FIG. 4.

| APPLICABLE FIGURE NUMBER OF EUCLIDEAN FORMULATION | GIVEN ANGLE(S) | RENDERED ANGLE(S) |
|---|---|---|
| FIG. 5 | ∠VOO'<br>(θ) | Acute ∠VOU'<br>(3θ) |
| FIG. 7 | ∠VOO'<br>(θ)<br><br>∠VOX<br>($60^\circ$- θ) | Acute ∠VOU'<br>(3θ)<br><br>Obtuse ∠VOW<br>($180^\circ$- 3θ) |
| FIG. 14 | ∠VOO'<br>(θ)<br><br>∠VOX<br>($60^\circ$-θ) | Acute ∠VOU'<br>(3θ)<br><br>Obtuse ∠VOW<br>($180^\circ$-3θ) |
| FIG.21 | ∠VOO'<br>(θ)<br><br>$90^\circ$ - ∠O'OU'<br>($90^\circ$- 2θ) | Acute ∠VOU'<br>(3θ)<br><br>Obtuse Angle $90^\circ$ + ∠U'OZ<br>($270^\circ$- 6θ) |

FIG. 42.

| NEWLY PROPOSED ARTICULATING TRISECTION INVENTION EMBODIMENT NAME | DESIGNATED MAGNITUDES THAT CAN BE TRISECTED | |
|---|---|---|
| | ACUTE ANGLE SETTINGS | OBTUSE ANGLE SETTINGS |
| First | 3θ | Not applicable |
| Second | 3θ | 180-3θ |
| Third | 3θ | 180-3θ |
| Fourth | 3θ | 270-6θ |

FIG. 43.

| NEWLY PROPOSED ARTICULATING TRISECTION INVENTION EMBODIMENT NAME | EMBODIMENT ALTERNATE NAME |
|---|---|
| First | Basic configuration |
| Second | Modified configuration |
| Third | Rhombus configuration |
| Fourth | Car jack configuration |

FIG. 44.

| EMBODIMENT NAME AND DEFINING DRAWING NUMBER(S) | ACTIVITIES | |
|---|---|---|
| | METHOD FOR SPECIFICALLY ARRANGING DEVICE | METHOD FOR SETTING DEVICE AND COMPLETING MOTION RELATED TRISECTION SOLUTION |
| First (FIG. **6**)<br><br>Second (FIG.**9**) | Angle TOU' of compass assembly and angle T'OU of counterbalance compass assembly are configured to a size of 90-3θ; then, shoulder screws located at axis T and axis U become secured; | Slide thereafter is translated within groove of member OT until such time that the longitudinal axis of member OU comes into direct view underneath the sight hole afforded at axis U', whereby such device becomes set |
| Third (FIG.**15**) | Such device does not need to be specifically arranged | Slide is translated within groove of member OT in order to set angle VOU' to 3θ reading |
| Fourth *Slotted Linkage Arrangement* (FIG. **22**) | Shoulder screw inserted through axis T becomes secured; | Slide thereafter is translated within groove of member OT in order to set angle VOU' to 3θ reading |
| *Slotted Linkage Arrangement* (FIG. 26) | Shoulder screw inserted through axis U' becomes secured; | Slide thereafter is translated within groove of member OU' in order to set angle VOZ to a 270-6θ reading |
| *Slider Arrangement* (FIG. **29**) | Pin inserted through axis T becomes secured into clutch residing below it; | Adjustment linkage thereafter is translated in order to set angle VOU' to 3θ reading |
| *Slider Arrangement* (FIG. **31**) | Pin inserted through axis U' becomes secured into clutch; | Adjustment linkage thereafter is translated in order to set angle VOZ to 270-6θ reading |

FIG. 45.

| DEFINING EMBODIMENT DRAWINGS | DEPICTED DEVICE SETTINGS | MOTION RELATED SOLUTION |
|---|---|---|
| FIGS. **6**, **9**, **15**, and **22** | *Acute* $\angle VOU'$ ($3\theta = 48^\circ$) | $\angle VOO'$ ($\theta = 16^\circ$) |
| FIG. **29** | ($3\theta = 60^\circ$) | ($\theta = 20^\circ$) |
| FIGS. **9**, and **15** | *Obtuse* $\angle VOW$ ($180^\circ - 3\theta = 132^\circ$) | $\angle VOX$ ($60^\circ - \theta = 44^\circ$) |
| FIG. **26** | *Obtuse Angle* $90^\circ + \angle U'OZ$ ($270^\circ - 6\theta = 174^\circ$) | $90^\circ - \angle O'OU'$ ($90^\circ - 2\theta = 58^\circ$) |
| FIG. **31** | *Obtuse Angle* $90^\circ + \angle U'OZ$ ($270^\circ - 6\theta = 150^\circ$) | $90^\circ - \angle O'OU'$ ($90^\circ - 2\theta = 50^\circ$) |

FIG. 46.

| EMBODIMENT NAME AND FIGURE NUMBER OF CORRESPONDING EUCLIDEAN FORMULATION | FAN PORTION RADIUS LISTINGS | FAN PORTION COMMON INTERSECTION POINT LISTINGS |
|---|---|---|
| First (FIG. 5) | radius OV<br>radius OO'<br>radius OU' | point O |
| Second (FIG. 7) | *For acute angle trisection:*<br>radius OV<br>radius OO'<br>radius OU'<br>*For obtuse angle trisection:*<br>radius OV<br>radius OX<br>radius OW | point O |
| Third (FIG. 14) | *For acute angle trisection:*<br>radius OV<br>radius OO'<br>radius OU'<br>*For obtuse angle trisection:*<br>radius OV<br>radius OX<br>radius OW | point O |
| Fourth (FIG. 21) | *For acute angle trisection:*<br>radius OV<br>radius OO'<br>radius OU'<br>*For obtuse angle trisection:*<br>radius that aligns upon $+x_T$-axis<br>radius OO'<br>radius OZ | point O |

FIG. 47.

| METHOD OF GEOMETRIC DEPICTION | Conventional Euclidean practice | Geometric forming process |
|---|---|---|
| DRAWING PRETEXT | Singular geometric construction pattern | Euclidean formulation |
| COMPATIBLE REAL NUMBER TYPES | Rational<br>Quadratic irrational | Rational<br>Quadratic irrational<br>Cubic irrational |
| COMPATIBLE ALGEBRAIC EQUATION AND ASSOCIATED FUNCTION FORMAT TYPES | Linear<br>Quadratic | Linear<br>Quadratic<br>Cubic |

FIG. 48.

| LEVEL | AXIS | | | | | | |
|---|---|---|---|---|---|---|---|
| | O | O' | T' | U' | T | U | V |
| VI | | | | | 205 | | |
| V | | 213 | 214 | 204 | 205 | 215 | |
| IV | 203 | 211 | 211 | 202 | 202 | 215 | |
| III | 201 | 210 | 212 | 201 | 200 | 212 | |
| II | 200 | 210 | 200 | 204 | 200 | 210 | 200 |
| I | 230 | 230 | 216 | ---- | 200 | 210 | ---- |

FIG. 49.

| LEVEL | AXIS | | | | | | |
|---|---|---|---|---|---|---|---|
| | O | O' | T' | Y' | T | Y'' | Y |
| V | | 50 | 51 | | | | 53 |
| IV | 49 | 46 | 46 | 55 | | | 46 |
| III | 47 | 42 | 48 | 47 | 52 | 56 | 47 |
| II | 41 | 42 | 41 | 42 | 41 | 42 | 54 |
| I | 43 | 43 | 44 | 44 | 45 | 45 | ---- |
| 0 | 40 | 40 | 40 | 40 | 40 | 40 | 40 |

FIG. 50.

| LEVEL | AXIS | | | | | | |
|---|---|---|---|---|---|---|---|
| | O | T | T' | O' | Y | Z | U' |
| VII | | 70 | | | | | |
| VI | 65 | 70 | 67 | | 72 | | |
| V | 59 | 61 | 64 | 71 | 59 | 75 | 59 |
| IV | 66 | 61 | 63 | 63 | 63 | 63 | 59 |
| III | 58 | 61 | 68 | 58 | 73 | 62 | 59 |
| II | 61 | 61 | 61 | 58 | 60 | 62 | 59 |
| I | 62 | 61 | 69 | 58 | 74 | 62 | 59 |
| 0 | 57 | 57 | 57 | 57 | 57 | 57 | 57 |

FIG. 51.

| AXIS | O' | U' | T | Z |
|---|---|---|---|---|
| FIG. 22 VALUE WITH RESPECT TO +X-AXIS | θ | 3θ | 90 | 180-3θ |
| ROTATION VALUE | 90-3θ | 90-3θ | 90-3θ | 90-3θ |
| FIG. 22 OR FIG. 26 VALUE WITH RESPECT TO $+X_T$- AXIS | 90-2θ | 90 | 180-3θ | 270-6θ |

FIG. 52.

| VALUE | $\theta_1$ | $\theta_2$ | $\theta_3$ | $\theta_4$ |
|---|---|---|---|---|
| $\theta$ | 34.37886° | 70.172833° | 110.537505° | 139.7903° |
| $3\theta$ | 103.13658° | 210.51850° | 331.612514° | 419.3711° |
| $\cos\theta$ | 0.8253219 | 0.3391846 | -0.3508204 | -0.763687 |
| $\cos 3\theta$ | -0.227273 | -0.861466 | 0.87975243 | 0.5094745 |
| $\frac{4\cos^3\theta - 6}{20\cos\theta}$ | -0.227273 | -0.861466 | 0.87975243 | 0.5094745 |

FIG. 56.

| n | SUBTENDED ARC MAGNITUDES | |
|---|---|---|
| 1 | 3θ = | 3.0000000 |
| 2 | 3θ - 3θ/2 = | 1.5000000 |
| 3 | 3θ/2 + 3θ/4 = | 2.2500000 |
| 4 | 9θ/4 - 3θ/8 = | 1.8750000 |
| 5 | 15θ/8 + 3θ/16 = | 2.0625000 |
| 6 | 33θ/16 - 3θ/32 = | 1.9687500 |
| 7 | 63θ/32 + 3θ/64 = | 2.0156250 |
| 8 | 129θ/64 - 3θ/128 = | 1.9921880 |
| 9 | 255θ/128 + 3θ/256 = | 2.0039060 |
| 10 | 513θ/256 - 3θ/512 = | 1.9980470 |
| 11 | 1023θ/512 + 3θ/1024 = | 2.0009770 |
| 12 | 2049θ/1024 - 3θ/2048 = | 1.9995120 |
| 13 | 4095θ/2048 + 3θ/4096 = | 2.0002440 |
| 14 | 8193θ/4096 - 3θ/8192 = | 1.9998780 |
| 15 | 16383θ/8192 + 3θ/16384 = | 2.0000610 |
| 16 | 32769 θ /16384 - 3θ/32768 = | 1.9999690 |
| 17 | 65535θ/32768 + 3θ/65536 = | 2.0000150 |
| 18 | 131073θ/65536 - 3θ/131072 = | 1.9999920 |
| 19 | 262143θ/131072 + 3θ/262144 = | 2.0000040 |
| 20 | 524289θ/262144 - 3θ/524288 = | 1.9999980 |
| 21 | 1048575θ/524288 + 3θ/1048576 = | 2.0000010 |
| 22 | 2097153θ/1048576 - 3θ/2097152 = | 2.0000000 |

FIG. 60.

ANGLE TRISECTOR, AS VALIDATED TO PERFORM ACCURATELY OVER A WIDE RANGE OF DEVICE SETTINGS BY A NOVEL GEOMETRIC FORMING PROCESS; ALSO CAPABLE OF PORTRAYING FINITE LENGTHS THAT ONLY COULD BE APPROXIMATED BY MEANS OF OTHERWISE APPLYING A COMPASS AND STRAIGHTEDGE TO A GIVEN LENGTH OF UNITY; THAT FURTHERMORE FUNCTIONS AS A LEVEL WHOSE INHERENT GEOMETRY COULD BE ADAPTED FOR MANY OTHER USES SUCH AS BEING INCORPORATED INTO THE DESIGN OF A HYDRAULIC CAR LIFT

CROSS-REFERENCE TO RELATED APPLICATIONS

NOT APPLICABLE

BACKGROUND OF THE INVENTION

By now, it most certainly should be recognized that a singular angle of virtually any designated size cannot be divided into three parts when acted upon only by a straightedge and a compass.

Such protracted problem is considered to be so famous that herein it formally shall be referred to as the classical problem of the trisection of an angle!

Unfortunately, many other descriptions of such problem also exist, each conflicting in some rather subtle manner, but nevertheless having profound effect upon its interpretation. Leading examples of such differences are presented below where it is found that in certain cases throughout the twentieth century such problem of the trisection of an angle:

is not specified, but its solution nevertheless is posed;
is considered to involve the use of a ruler; and
is algebraically, rather than geometrically resolved.

A looming trisection mystery, steeped in controversy for millennia, persists right up until present day; merely because it never was examined from the proper perspective!

In order to crack such conundrum, not only do correct questions need to asked, but proper answers also need to be supplied.

In this regard, the very first of four fundamental questions is about to be posed.

The first riddle is: How can the classical problem of the trisection of an angle actually be solved?

The answer is: It cannot!

Granted, it is commonly known that such response has been hotly contested by many pundits over the years.

But, to its credit, after bearing the brunt of a constant barrage of brutal assaults by noted protagonists, such contention endures; whereby it appears that to date no solution for the classical problem of the trisection of an angle ever has been solicited that has withstood the test of time!

Because it is far more difficult to prove an impossibility than something that is thought to be possible, fewer proofs exist which attempt to validate that the classical problem of the trisection of an angle truly is unsolvable!

To this effect, page 246 appearing in *A Dictionary of Mathematics* by T. A. Millington, Barnes & Noble; 1966 stated, "The classical problem of trisecting an angle by Euclidean constructions (use of straight lines and circles only) was proved to be insoluble by Wantzel in 1847".

Below, my express intent is to acknowledge Wantzel's outright conclusion as being absolutely correct in such regard, in hopes of thereby identifying some distinct difficulty which prevails that otherwise prevents the classical problem of the trisection of an angle from being solved!

This is to be accomplished by means of delving into what before were considered to be impenetrable depths of a great enigma in order to finally unravel the very mystery that today engulfs trisection.

Such trisection enigma specifically shall state: If the classical problem of the trisection of an angle truly cannot be solved, then geometry, itself, must be the culprit; thereby being imperfect!

This author well understands that if it were learned that geometry actually is limited, marred, or otherwise flawed in some strange, presently unknown fashion, then the very perception of such form of mathematics inevitably would become altered, even to the point where it possibly might become tarnished forevermore!

The second riddle is: What specific, well known thermodynamics limitation now should be considered to furthermore apply to geometry?

The answer is: Irreversibility!

A commentary, as presented below, should settle any doubts, or quell any lingering suspicions, that the classical problem of the trisection of an angle might become solved.

A fair number of rather elaborate proofs that have gained notoriety over the years have done so by means of incorrectly claiming that the classical problem of the trisection of an angle actually can be solved.

Such proofs either are quite faulty in their logic, or else rely upon a basic deception; whereby their geometric solutions, although complying with a primary requirement of applying only a straightedge and compass, achieve trisection instead by having them act upon other than a singular angle of virtually any designated size!

In such manner, geometric solutions actually do achieve trisection, but only to their detriment by means of violating a remaining requirement that the classical problem of the trisection of an angle furthermore imposes!

As such, for any and all geometric solutions which might become specified in the near future claiming to succeed at trisecting an angle, perhaps it is best to offer the rather simple-minded reservation that in order to solve the classical problem of the trisection of an angle, all of its imposed requirements explicitly must be complied with!

In other words, the very reason why any of such actual geometric solutions should not be misinterpreted as a solution for the classical problem of the trisection of an angle is because they violate the second of its requirements, fundamentally specifying that geometric activity must proceed only from a singular angle of virtually any designated size.

Instead of complying with such second requirement, geometric solutions otherwise input extraneous information into such classical problem, thereby serving to corrupt it!

In particular, extraneous information consists of that which is not germane to such classical problem. Hence it consists of any geometric information other than that which can be derived by applying only a straightedge and compass exclusively to a singular angle of designated magnitude which is intended to be trisected.

Moreover, extraneous information is considered to be relevant whenever it independently can be acted upon solely by a straightedge and compass in order to pose an actual solution for some corrupted version of the classical problem of the trisection of an angle; thereby solving an entirely different problem!

Hence, it becomes rather obvious that such very controversy undeniably has been fueled over the years by an unrelenting confusion which has been stirred over nothing more than various cases of mistaken identity!

A rather elementary example of how to administer such overall theory is presented directly below; whereby for the unsolvable classical problem of the trisection of an angle of 135° designated magnitude, it is desired to specify relevant information that enables a geometric solution to be obtained.

For such example, the approach to obtain such relevant information is given as follows:

- extraneous information quite readily can be determined simply by dividing such 135° angle by a factor of three. Such resulting 45° size qualifies as extraneous information because it clearly cannot be derived in any way by means of applying only a compass and straightedge to such 135° designated angle; and
- such calculated 45° magnitude furthermore is relevant because it can be drawn solely by application of a straightedge and compass as one of the diagonals in a square of virtually any size, thereby posing a geometric solution for such corrupted classical trisection problem.

Such types of mishap, assuming the form of mistaken identifies, very easily can be avoided whenever any geometric solution becomes posed in the future that falsely alleges that the classical problem of the trisection of an angle actually can be solved.

Quite simply, such approach consists of determining whether a posed geometric solution is linked to a formally specified problem. If a corresponding problem becomes located, it then should be examined to verify that it:

- is entirely consistent with how such classical problem of the trisection of an angle is specified above, in which case such geometric solution therefore must be in error; or
- incorporates extraneous information that is relevant, thereby otherwise solving some corrupted version of such classical trisection problem instead.

On the other hand, if it is found that such geometric solution is not associated to any formally specified problem, this means that it cannot be ascertained to any certainty what such posed geometric solution even applies to!

Regrettably, such type mishap is well documented, thereby being known to truly have occurred in the past!

As such, for any literature that claims to have solved the classical problem of the trisection of an angle without indicating exactly what particular issue it has remedied, it might be a good idea to examine:

- whether such erroneous claim was met by a great fanfare that credited its author for an outstanding discovery.
- whether a geometric solution for some corrupted version of the classical problem of the trisection of an angle was provided instead, without expressing the exact nature of extraneous information which such solution was based upon; or
- whether some totally unrelated type of trisection solution was identified due to the discovery of some invention; thereby only serving to expand upon the overall scope of aforementioned trisection matters as cited in connection with such attendant trisection mystery.

The third riddle is: What other types of trisection solutions, besides geometric solutions, are there?

The answer is: Motion related solutions!

These consist of various events, as opposed to activities where singular geometric patterns otherwise become drawn, whereby an invention becomes set to a singular angle of virtually any designated size and its associated trisector automatically becomes portrayed forthwith.

Such type of invention cannot solve the classical problem of the trisection of an angle because its features are quite different from a mere straightedge and compass that instead individually must be applied to a single piece of paper without otherwise violating any imposed requirements. Hence, any trisection portrayal of this nature clearly would qualify as a corrupted motion related solution of the classical problem of the trisection of an angle.

The fourth riddle is: Can an iteration process of successive angular bisections, as presented in complete detail later, which clearly complies with all of the requirements imposed by the classical problem of the trisection of an angle actually solve it?

The answer again emphatically is no!

In particular, this is because:

- an infinite number of iterations would have to be performed in order to generate an exact geometric solution; thereby qualifying as a task that could never be fully completed; and
- the resolution of the naked eye to distinguish actual drawing separations would become impaired very shortly after commencing upon such iteration process, whereby successive bisectors then would appear to run over themselves, requiring larger arcs to be drawn in order to avail added viewing relief. Eventually, the very straightedge and compass instruments themselves, along with the paper needed to avail such precision could not be manufactured due to the massive increases in their sizes which would be needed to maintain such viability.

In conclusion, it is impossible to solve the classical problem of the trisection of an angle when explicitly complying with all of its requirements!

Important forerunners of trisection, hereinafter listed chronologically by the dates of their conception include:

- geometric construction, dating all the way back to ancient Babylonian times around the year 3000 BC, in which only a straightedge and compass are permitted for use when describing straight lines, angles, and circular arcs;
- intersection points, as established during the same time period, in which discrete positions become completely distinguishable wherever either straight lines, arcs of circles, or straight lines in combination with the arcs of circles cross one another. Center points of circles also qualify as intersection points because they describe common locations where geometrically constructed perpendicular bisectors of respective chords of such circles meet;
- the Pythagorean Theorem, as developed in or about the year 500 BC, in which the square of the length of the hypotenuse of a right triangle is proven to be equal to the sum of the squares of the lengths of its two sides;
- conventional Euclidean practice, as established prior to the year 265 BC, in which definitions and rules describe the very manner in which geometric construction may be administered, and axioms identify certain geometric relationships which become evident after conducting specific geometric construction operations. Directly below, two principal definitions which further characterize such practice are specified, followed by three distinct examples of its rules:
  - its most basic rule principally states that a given set of previously defined geometric data must be furnished that specifies the locations of initial positions from which geometric construction may be launched. A designated angle of sixty degree magnitude very well could be expressed as such given data. Moreover, such definition furthermore can apply to locations that are not entirely distinguishable solely by geometric construction. For example, given data might specify a twenty degree angle; one whose magnitude only could be approximated by means of geometric construction;

its cardinal rule essentially stipulates that geometric construction must proceed either from a given set of previously defined geometric data, or from other locations which become distinguishable with respect to such positions by means of applying only a straightedge and compass to them;

at least two points must be specified in order to draw a straight line;

at least two points must be specified in order to draw a circle when one of those points designates its center point; and at least three points must be specified in order to draw a circle when none of those points denotes its center point;

conventional Euclidean means, whose terminology became commonplace shortly thereafter, in which geometric construction is to be implemented in strict accordance with the specific definitions and rules stipulated by conventional Euclidean practice;

Euclidean commands, also taking effect during the same time period, in which various instructions describe exactly how various straight lines and circular arcs are to be geometrically constructed with respect to identified positions;

a sequence of Euclidean operations, as conceived during the same timeframe, in which a specific set of Euclidean commands, enumerated as a series of discrete steps become executed in consecutive order with respect to a given set of previously defined geometric data in order to distinguish various rendered positions;

a geometric construction pattern, as introduced during that time, in which the specific features of a given set of previously defined geometric data, in combination with any rendered positions which become established by means of executing an attendant sequence of Euclidean operations with respect to it, as well as any additional straight lines drawn between such established locations or circular extensions made to them become depicted within a single drawing;

an Archimedes proposition, as devised prior to 212 BC, introduced as Proposition 8 in the *Book of Lemmas*, then later translated from Arabic into Latin in 1661, and finally published in the English language in 1897, in which it is stated on page 309 in *The Works of Archimedes* that if AB be any chord of a circle whose centre is 0, and if AB be produced to C so that BC is equal to the radius; if further CO meets the circle in D and be produced to meet the circle a second time in E, the arc AE will be equal to three times the arc BD;

an Archimedes proof for such Proposition 8, as appears on page 310 in *The Works of Archimedes*, in which it is stated:

draw the chord EF parallel to AB, and join radius OB, OF;

$$\angle COF = 2\angle OEF$$

$$= 2\angle BCO, \text{ by parallels,}$$

$$= 2\angle BOD, \text{ since } BC = BO;$$

therefore, ∠BOF=3∠BOD, so that the arc BF is equal to three times the arc BD; and hence the arc AE, which is equal to the arc BF, must be equal to three times the arc BD;

an Archimedes formulation, as evidenced only on a few sporadic occasions in the past, as typically accompanied by only partial documentation, in which a multitude of distinct Archimedes geometric construction patterns, qualifying as such because they conform to all requirements posed in such Archimedes proposition, become represented upon a single drawing. Such representation is made possible by strategically placing a Greek letter either within or alongside what later will be shown to be the given angle of such sole diagram, thereby distinguishing it to be an entire formulation in itself, instead of a mere singular geometric construction pattern. Once ascribing a specific designation, such as θ or φ at such location, it is to mean that such given angle is allowed to vary infinitesimally in size over some prescribed range of values. By means of administering a specific sequence of Euclidean operations to each of such given angles—one whose commands account for all of the individual requirements posed in such aforementioned Archimedes proposition, all of the varying shapes which emerge thereby must qualify as legitimate Archimedes geometric construction patterns; and an Al-Mahani categorization, as derived prior to the year 900 AD, in which square root quantities become classified as quadratic irrational numbers, thereby distinguishing them apart from rational numbers.

Over the years, both mathematicians, as well as inventors alike have been somewhat awed by the spectacle of an incredibly perplexing trisection mystery whose vital secrets evidently have escaped detection.

Nevertheless, both parties are acutely aware that the diminution of an angle to one-third its actual size, although being truly indicative of trisection, cannot be obtained simply by reversing the sequence of Euclidean operations which governs the geometric construction of a pattern that complies with all of the requirements imposed by such Archimedes proposition.

Rabid speculation concerning such unexplainable dichotomy eventually gave rise to contrasting interpretations, reflective of the particular leanings of various involved personages, outlined as follows:

on the one hand, mathematicians even today remain splintered over how to explain trisection in terms of conventional Euclidean practice, whereby their discordant positions concerning such geometrical matters are expressed as follows:

one traditionalist camp contends that trisection solely via conventional Euclidean means is entirely unsolvable; whereby it becomes utterly impossible to divide an angle into three parts solely by means of applying only a straightedge and compass to it; whereas another non-patronizing faction instead advocates that certain angles, in fact, can be trisected solely via straightedge and compass; whereas on the other hand, inventors were the first members in society to demonstrate that trisection could be achieved by imparting certain prescribed motions.

The latter of such two geometrical claims, essentially alleging that certain angles can be trisected solely via straightedge and compass unfortunately has managed to gain widespread notoriety throughout the world today, thereby flourishing in the form of independent airings by a coterie of indulging sources and journalists, as well as being supplemented by a rampant proliferation of publications by self-proclaimed mathematical experts who already have accepted such premise as being generally established fact.

Be that as it may, nothing could be further from the truth!

This becomes evident by paraphrasing such latter stated mathematical claim into its only possible correct interpretation. This is accomplished by means of inserting the following bracketed italicized words to its initial substance, thereby asserting that certain angles, in fact, can be trisected solely via straightedge and compass [so long as the very magnitudes of their respective trisecting angles become disclosed beforehand]—thereby essentially solving a corrupted version of the classical problem of the trisection of an angle.

Such above stated clarification achieves two specific objectives, itemized as follows:

- it completely eliminates the potential for misconstruing such latter stated mathematical claim to mean that in certain cases, trisection solely via conventional Euclidean means is entirely possible Obviously, such faulty presumption might be harmful because it very easily could be considered to refute, or contradict such former factually correct claim, as asserted above by such aforementioned traditionalist camp of mathematicians; and
- it evidences that such latter mathematical clause really has nothing at all to do with trisection solely via conventional Euclidean means; thereby removing the intended stigma out of such statement entirely. As such, its true interpretation with such bracketed input included thereby becomes reduced to the rather insignificant equivalent meaning that all angles which can be described solely via straightedge and compass furthermore constitute respective trisecting angles of other angles whose respective magnitudes amount to exactly three times their size. Such result is of little consequence too considering that it furthermore can be broken down into the mere definition of a trisector, in concert with the understanding that certain angles effectively can be reproduced solely via straightedge and compass once having knowledge of their trigonometric properties.

It should be emphasized that the only way to input outside information which is relevant to the classical problem of the trisection of an angle is by means of violating the cardinal rule of conventional Euclidean practice!

By definition, that is because such input must consist of data that cannot be derived by means of launching geometric construction operations exclusively from a singular angle of designated magnitude which is intended to be trisected. Hence, such corrupting input must constitute that which cannot be distinguished by conventional Euclidean means.

As such, it is concluded that the classical problem of the trisection of an angle cannot be solved by conventional Euclidean practice; thereby exposing its very limitations!

Furthermore, calculating the size of a trisector merely by dividing the designated magnitude of an angle that is intended to be trisected by a factor of three is not permitted because such action cannot be duplicated by a geometric construction process which is governed by Euclidean rules.

Below, a composite history describing the very first important trisecting events recorded in the English speaking language is afforded; whereby trisection was observed to occur on three separate occasions as unique articulating mechanisms became invented.

During such first of such documented incidents, having taken place sometime during the late 1870's, Alfred Kempe discovered that so-called anti-parallelograms could be used for purposes of regulating motion!

One of such Kempe masterful designs, truly considered to be capable of performing trisection, is depicted as prior art in FIG. 1A.

Therein, an overall formation which could have been fashioned to have either rounded or pointed corners is not displayed. Only the longitudinal centerlines of its eight linkages and radial centerlines of its eight interconnecting pivot pins are depicted instead because only these portions of such device govern trisection!

Such Kempe prior art features a basic fan array whose movement is controlled by three independent anti-parallelograms; the complete breakdowns of which are described as follows:

- its fan array portion consists of four separate linkages, modeled as straight lines BA, BD, BE, and BC in FIG. 1A; all of which are hinged together by an interconnecting pivot pin whose shank passes through an end portion of each. In particular, the longitudinal centerlines of such four basic fan array linkages overlap one another along the radial centerline of such interconnecting pivot pin, as illustrated by a very small circle drawn located at their juncture about axis B; and
- its control section features anti-parallelograms BFGH, BGJI, and BJLK, so denoted by identifying their diagonal compositions, rather than by enumerating their respective corners in consecutive order.

Such control section serves to maintain the three angles interposed between adjacent longitudinal centerlines of the four linkages, where they more particularly radiate about the hub of such basic fan array portion, at a constant magnitude; even as such sizes vary during device flexure.

Accordingly, such three interposed angles relate to one another according to the algebraically expressed equality $\angle ABD=\angle DBE=\angle EBC=\theta$.

Whereas all three subtended angles in combination constitute angle ABC, its magnitude must amount to $3\theta$.

In order to trisect angle ABC, such Kempe device first must be set to a designated magnitude. In this particular case, the size of such setting is shown to be that of angle ABC, as it actually appears in FIG. 1A. Considering that a varying magnitude of such angle ABC might have been selected instead, such drawing would have had to assume an entirely different overall shape in order to compensate for such change.

In effect, every time such Kempe device becomes set to a different preselected magnitude, each of such three subtended angles, nonetheless, automatically portray its actual trisector; whereby the very process of portraying an angle whose magnitude amounts to exactly one-third the size of an angle of designated magnitude is indicative of trisection!

In total, such Kempe device is comprised of eight linkages whose longitudinal centerlines are modeled as straight lines in FIG. 1A, in addition to eight interconnecting pivot pins whose radial centerlines are denoted by very small circles therein.

Extensions made to anti-parallelogram linkage members BF and BL therein enable easier access for flexing device arm BC with respect to linkage member BA during articulation; whereas extensions made to anti-parallelogram linkages members BG and BJ enable a better viewing of trisecting members BD and BE.

All told, FIG. 1A depicts longitudinal centerlines of linkages and radial centerlines of interconnecting pivot pins which collectively constitute such Kempe mechanism.

Of note, various other trisecting devices exist which also are contrived of a four linkage and interconnecting pivot pin arrangement which are considered to conform to that of such basic fan array, as described in detail above. However, they each apply control mechanisms that are entirely different than the anti-parallelogram linkage arrangements, as previously developed by Mr. Kempe.

By means of classifying mechanisms such as these into a singular category, it becomes possible to validate the striking geometrical resemblance which exists between them. Once grouped together, their uniqueness thereby can be substantiated by means of describing how their control mechanisms differ from each other.

Such categorization is necessary for the very same reason that it previously has been applied in biology; namely, to suitably characterize the very diversity which exists between living things that exhibit common physical traits.

Likewise, by means of comparing trisecting mechanisms which exhibit similar geometries, proper conclusions can be drawn concerning both how and why they relate to one another, as well as how they fundamentally differ!

What should bond trisecting mechanisms together is a common geometry which they all share.

For example, the geometry of such basic fan array design is perhaps the simplest in all of mathematics to comprehend because it simply consists of a given angle that becomes duplicated twice, such that all three angles become grouped together at a common vertex in order to eventually geometrically construct a rendered angle whose magnitude amounts to exactly three times the size of such given angle.

A singular geometric construction pattern, as represented in FIG. 1A, furthermore could qualify as an entire formulation because the sequence of Euclidean operations from which such distinctive geometric construction pattern stems furthermore could be applied to virtually any sized given angle, as algebraically denoted therein by the Greek letter θ; thereby governing the various positions which the longitudinal centerlines of linkages and radial centerlines of interconnecting pins which collectively constitute such Kempe device thereby would assume as it becomes articulated.

In support of such logic, it is recommended that any articulating trisecting mechanism which exhibits distinctive fan shape features should be classified as a CATEGORY I type device. Its complete inventory shall consist of:

- CATEGORY I, sub-classification A articulating trisection devices which feature four linkages of equal length, hinged together by an interconnecting pivot pin that is passed through one end portion of each, thereby collectively constituting the array of a fan whose two inner linkages become regulated in some fashion so that their longitudinal centerlines divide the angle subtended by the longitudinal centerlines of its two outer linkages into three equal portions throughout device flexure; and
- CATEGORY I, sub-classification B articulating trisection devices which feature three linkages of equal length, hinged together by an interconnecting pivot pin that is passed through one end portion of each, either of whose outer linkages instead could be represented by a straight line that is impressed upon a piece of paper or board, thereby collectively constituting the array of a fan whose single inner linkage becomes regulated in some fashion so that its longitudinal centerline trisects the angle subtended by the longitudinal centerlines of its two outer linkages throughout device flexure.

With particular regard to FIG. 1A, each of the distinct Euclidean commands required to suitably locate straight line BC with respect to given angle ABD therein, solely by Euclidean means, is specified below, thereby together comprising the complete twenty-one steps of its sequence of Euclidean operations:

- step 1—given angle ABD, of arbitrarily selected magnitude θ, is drawn such that its side BA is constructed to be of equal length to its other side BD;
- step 2—point F is arbitrarily selected somewhere along side BA of given angle ABD;
- step 3—a circle is drawn about vertex B whose radius is arbitrarily selected to be less than length BF, whereby a portion of its circumference becomes designated as the FIRST CIRCULAR ARC in FIG. 1A;
- step 4—The intersection between such FIRST CIRCULAR ARC and side BD of given angle ABD becomes designated as point G;
- step 5—a second circle is drawn about point F whose radius is set equal in length to straight line segment BG, a portion of whose circumference is designated as the SECOND CIRCULAR ARC in FIG. 1A;
- step 6—a third circle is drawn about point G whose radius is set equal in length to straight line segment BF, a portion of whose circumference is designated as the THIRD CIRCULAR ARC in FIG. 1A;
- step 7—the intersection point between such SECOND CIRCULAR ARC and THIRD CIRCULAR ARC is designated as point H;
- step 8—diagonal GH and side segment FH of anti-parallelogram BFGH are drawn in order to complete its geometry;
- step 9—an angle whose magnitude is equal to that of angle FBH is geometrically constructed with its vertex placed at point B such that its counterclockwise side becomes aligned along straight line BD, whereby the intersection of its clockwise side with diagonal GH becomes designated as point I;
- step 10—a fourth circle is drawn about point I, whose radius is set equal in length to line segment BG, a portion of whose circumference becomes designated as the FOURTH CIRCULAR ARC in FIG. 1A;
- step 11—a fifth circle is drawn about point B, whose radius is set equal in length to line segment IG, a portion of whose circumference is designated as the FIFTH CIRCULAR ARC in FIG. 1A;
- step 12—the intersection point between such FOURTH CIRCULAR ARC and FIFTH CIRCULAR ARC becomes designated as point J;
- step 13—straight line diagonal IJ and side segment BJ are drawn in order to complete an additional anti-parallelogram BGJI;
- step 14—straight line BE is geometrically constructed to be equal in length to side BA of given angle ABD such that it aligns with side segment BJ of such additional anti-parallelogram BGJI by means of passing through point J, whereby it serves as an extension to it;
- step 15—an angle whose magnitude is equal to that of angle GBI is geometrically constructed with its vertex placed at point B such that its counterclockwise side becomes aligned along straight line BE whereby the intersection of its clockwise side with diagonal JI becomes designated as point K;
- step 16—a sixth circle is drawn about point K, whose radius is set equal in length to line segment BJ, a portion of whose circumference is designated as the SIXTH CIRCULAR ARC in FIG. 1A;
- step 17—a seventh circle is drawn about vertex B of given angle ABD whose radius is set equal in length to line segment KJ, a portion of whose circumference is designated as the SEVENTH CIRCULAR ARC in FIG. 1A;

step 18—the intersection point between such SIXTH CIRCULAR ARC and SEVENTH CIRCULAR ARC is designated as point L;

step 19—straight line diagonal KL and side segment BL are drawn in order to complete the third and last of such anti-parallelograms, being duly notated as BJLK;

step 20—straight line BC is geometrically constructed to be equal in length to side BA of given angle ABD such that it aligns with side segment BL of anti-parallelogram BJLK by means of passing through point L, thereby serving as an extension to it; and step 21—whereas side BA is constructed to be of equal length to side BD of given angle ABD, and straight lines BE and BC are geometrically constructed to be equal in length to such side BA, all four straight lines furthermore represent radii of a circle that all emanate from center point B.

Verification that angle ABC, as depicted in FIG. 1A, is equal to three times the size of given angle ABD is provided in the following twenty-five step proof:

step 1—by construction, straight line HG is equal in length to straight line BF, and straight line GB is equal in length to straight line FH;

step 2—by identity, straight line BH is equal in length to straight line HB;

step 3—then, since the three sides represented in triangle HGB are of equal length to the corresponding sides of triangle BFH, such triangles must be congruent to each other;

step 4—by construction, straight line IJ is equal in length to straight line BG, and straight line JB is equal in length to straight line GI;

step 5—by identity, straight line BI is equal in length to straight line IB;

step 6—then, since the three sides represented in triangle IJB are of equal length to the corresponding sides of triangle BGI, such triangles must be congruent;

step 7—by construction, straight lines KL and LB respectively are equal in length to straight lines BJ and JK, and by identity, straight line BK is equal in length to straight line KB;

step 8—then, since the three sides represented in triangle KLB are of equal length to the corresponding sides of triangle BJK, such triangles must be congruent to each other;

step 9—since triangle BFH is congruent to triangle HGB, each of their corresponding angles must be of equal magnitudes, such that ∠FBH=∠GHB;

step 10—but, by construction ∠GBI=∠FBH;

step 11—then, by substitution ∠GBI=∠GHB;

step 12—by identity, ∠BGI=∠BGH;

step 13—since ∠GBI=∠GHB, in addition to the fact that ∠BGI=∠BGH, triangle BGI and triangle HGB contain two sets of angles whose respective magnitudes are of equal values, whereby such triangles must be similar to one another;

step 14—because triangle IJB is congruent to a triangle BGI which, in turn, is similar to triangle HGB, triangle IJB also must be similar to triangle HGB;

step 15—whereby angle IBJ must be equal to corresponding angle HBG;

step 16—because triangle BGI is congruent to triangle IJB, each of their corresponding angles must be of equal magnitudes, such that ∠GBI=∠JIB;

step 17—but, by construction ∠JBK=∠GBI;

step 18—then, by substitution ∠JBK=∠JIB;

step 19—by identity, ∠BJK=∠BJI;

step 20—since ∠JBK=∠JIB, in addition to the fact that ∠BJK=∠BJI, triangle BJK and triangle IJB contain two sets of angles whose respective magnitudes are of equal values, whereby such triangles must be similar to one another;

step 21—because triangle KLB is congruent to a triangle BJK which, in turn, is similar to triangle IJB, triangle KLB also must be similar to triangle IJB;

step 22—whereby angle KBL must be equal to corresponding angle IBJ;

step 23—since the whole is equal to the sum of its parts, $$\angle HBA+\angle ABD=\angle HBD$$

$$\angle ABD=\angle HBD-\angle HBA$$

$$\angle ABD=\angle HBD-\angle HBF$$

$$\angle ABD=\angle HBD-\angle FBH;$$

step 24—whereby the following expression is obtained by substituting relevant previously determined equalities and identities ∠HBD=∠HBG, ∠IBJ=∠IBE, ∠KBJ=∠KBE, ∠KBL=∠KBC, and ∠IBG=∠IBD, and by reversing the order of the three letter designators of certain angles without influencing the values of their respective magnitudes, such that:

$$\begin{aligned}\angle ABD &= \angle HBD-\angle FBH\\ &= \angle HBG-\angle FBH\\ &= \angle IBJ-\angle GBI\\ &= \angle IBE-\angle IBG\\ &= \angle IBE-\angle IBD=\angle DBE\\ &= \angle IBJ-\angle GBI\\ &= \angle KBL-\angle JBK\\ &= \angle KBC-\angle KBJ\\ &= \angle KBC-\angle KBE=\angle EBC;\end{aligned}$$

and step 25—since angle ABC is comprised of angle ABD, angle DBE, and angle EBC, the following expression demonstrates that angle ABC amounts to exactly three times the size of given angle ABD:

$$\begin{aligned}\angle ABC &= \angle ABD+\angle DBE+\angle EBC\\ &= \angle ABD+\angle ABD+\angle ABD\\ &= 3\ \angle ABD\\ &= 3\theta.\end{aligned}$$

Notice that such above digression applies equally as well to varying magnitudes of given angle ABD since each successive step listed in such sequence of Euclidean operations and accompanying proof acts upon prior information that commences directly from such angle ABD, no matter what its initial size. That is to say, according to such proof, angle ABC still would be of magnitude 3θ, even if given angle ABD were to become varied to some degree in overall size. During such conditions, FIG. 1A would assume reconstituted shapes that depict actual Kempe device reconfigurations after being articulated to different positions.

In other words, by defining the magnitude of given angle ABD algebraically, instead of just assigning a singular value to it, such FIG. 1A thereby describes all of the various attitudes which such invention could assume during articulation. Such multiple number of actual drawings, thereby collectively comprising an entire formulation, essentially consists of an amalgamation of renderings which are generated solely by administering a specific sequence of Euclidean operations to a given angle ABD which is allowed to vary in size while, in each case, ultimately rendering an angle ABC which amounts to exactly three times the size of such given angle ABD.

As such, the three Kempe anti-parallelograms incorporated into such mechanism, as represented in FIG. 1A, thereby serve to regulate, or strictly control the overall movement of such device, whereby trisecting angles thereby become portrayed as angle ABC becomes altered to an infinite variety of angles that are in need of being trisected.

A second significant trisection development also was reported in such 1897 publication entitled *The Works of Archimedes* wherein it was claimed that a marked ruler arrangement placed upon a particular geometric drawing in a prescribed manner could achieve trisection. In order to account for the enormous lapse of time which had preceded such publication, page cvi therein stipulates that some such similar operation might have contributed to the development of the conchoid; a curve considered to have been discovered by Nicomedes somewhere between 200 BC and 70 BC.

Such unusual application is represented as prior art in FIG. 1B such that straight line MR describes the longitudinal centerline of such marked ruler device. The mechanism clearly qualifies as a ruler, as opposed to just a straightedge, simply because it contains a notch etched a specific distance away from one of its tips. This is denoted by the very small circle appearing upon such drawing at point N.

Therein, angle QPS represents an angle that is to become trisected, suitably drawn upon a separate piece of paper and specifically sized to be of algebraically expressed 3θ designed magnitude. Its sides QP and SP both are drawn to be equal in length to the distance which such notch resides away from the left endpoint of such marked ruler device. Thereafter, a circle is drawn whose center point is located at vertex P of angle QPS such that its circumference passes both through point Q and point S. Lastly, side SP is extended a sufficient length to the left, thereby completing such geometric construction pattern.

In order to trisect angle QPS, such marked ruler device thereby becomes indiscriminately jockeyed above such piece of paper until such time that all three of the following listed events occur:

- its longitudinal centerline overlaps point Q;
- its notch aligns upon the circumference of such drawn circle; and
- its left endpoint hovers directly over straight line SP extended.

Therein, point N designates the position where such notch hovers above such previously drawn circle.

As validated below, once such device becomes set in this particular manner, angle RMP constitutes an actual trisector of angle QPS. Its respective sides consist of the longitudinal centerline of such repositioned marked ruler device, as represented by straight line MR in FIG. 1B, along with straight line SP extended, as previously drawn upon a piece of paper that such marked ruler device now rests upon. Therein, trisector RMP is designated to be of magnitude θ, amounting to exactly one-third the size of previously drawn angle QPS.

As depicted in FIG. 1B, angle RMP can be proven to be an actual trisector for angle QPS, by considering that both angles constitute respective given and rendered angles belonging to such famous Archimedes proposition.

The proof that FIG. 1B furthermore constitutes an Archimedes proposition is predicated upon the fact that it meets the description afforded in Proposition 8 in the *Book of Lemmas*, properly rephrased to state that if QN be any chord of a circle whose center is designated as point P, and if QN be produced to M so that NM is equal to the radius; if further MP produced meets the circle at point S, the arc QS will be equal to three times the arc subtended between straight lines PN and PM. The accompanying proof thereby is given as:

$$
\begin{aligned}
\text{ext. } \angle PNQ &= 2\angle NMP, \text{ by isos. } \Delta\ NMP; \\
&= \angle PQN, \text{ by isos. } \angle PQN;
\end{aligned}
$$

$$
\begin{aligned}
\text{ext. } \angle QPS &= \angle QMP + \angle PQM, \text{ by } \Delta\ MPQ; \\
&= \angle NMP + \angle PQN \\
&= \angle NMP + 2\angle NMP \\
&= 3\angle NMP \\
&= 3\angle RMP \\
&= 3\angle NPM, \text{ since } NM = NP;
\end{aligned}
$$

and hence, the arc QS must be equal to three times the arc subtended between straight lines PN and PM.

Since the specific sequence of Euclidean operations which governs such famous Archimedes formulation furthermore distinguishes the very same geometry as now is represented in FIG. 1B, angle RMP and angle QPS, as posed therein, also must describe its respective given and rendered angles.

With particular respect to FIG. 1B, this is demonstrated as follows, wherein each of the seven steps comprising such specific sequence of Euclidean operations is stipulated directly below:

- step 1—given acute ∠RMP, of arbitrarily selected angular size, designated therein as being of magnitude θ, and exhibiting sides of arbitrarily selected lengths, so long as RM is sufficiently longer than MP is first geometrically constructed on a piece of paper, or upon a drawing board;
- step 2—given ∠RMP is duplicated such that its vertex is positioned at point P; whereby straight line PM denotes one of its sides, with its other side geometrically constructed so that it resides upon the same side of straight line PM as does remaining side RM of given angle RMP, such that the duplicated angle faces given angle RMP, or opens up towards it;
- step 3—point N becomes designated as the intersection point between straight line RM and the additional side drawn by such duplicated angle, thereby completing the geometric construction of isosceles triangle MNP;
- step 4—a circle is drawn whose origin is placed at point P which is of radius equal in length to straight line PN;
- step 5—straight line MP is extended to point S lying upon the circumference of such formed circle;
- step 6—the other intersection point which straight line MR makes with the circumference of such formed circle is designated as point Q; and step 7—straight line PQ is drawn.

A three step algebraic proof, serving to verify that such geometrically constructed angle QPS is exactly three times the magnitude of given acute angle RMP, for any and all magnitudes which it otherwise might assume is provided as follows:

step 1—because ∠PNQ is as an exterior angle of isosceles triangle MNP, it must be equal to the sum of such triangle's equally sized included angles, denoted therein as ∠NMP and ∠NPM, which algebraically can be summed to $\theta+\theta=2\theta$;

step 2—since angle NQP and angle PNQ reside opposite the equal length sides of isosceles triangle NPQ, with such sides furthermore representing equal length radii of such drawn circle, they must be of equal magnitude, such that ∠NQP=∠PNQ=2θ; and step 3—because ∠QPS qualifies as an exterior angle of triangle MPQ, it thereby must be equal to the sum of such triangle's included angles QMP and MQP which, by furthermore being related in the two identities ∠QMP=∠NMP and ∠MQP=∠NQP, can be algebraically summed to amount to $\theta+2\theta=3\theta$.

Above, it has just been proven that the magnitude of rendered angle QPS always must amount to exactly three times that of given acute angle RMP, even as such given acute angle becomes varied in size Since the actual value of given acute angle RMP is not specified anywhere in the sequence of Euclidean operations that FIG. 1B is derived from; it can have no bearing, or direct influence upon implementing it. Hence, introducing algebraic nomenclature, as is posed in FIG. 1B, cannot conflict in any way with its administration; thereby enabling such sequence of Euclidean operations to be applied many times over in order to generate a wide range of patterns that result as given acute angle RMP varies in size.

Along with such marked ruler arrangement, other trisection mechanisms whose designs could be arranged into geometric shapes that either are indicative of such famous Archimedes proposition, or particular adjuncts thereof, such as the configuration depicted in FIG. 1B, hereinafter shall constitute CATEGORY II articulating trisection devices.

A third significant evolution took root during the early 1900's when an ample supply of hinged linkage assemblies, replete with interconnecting pivot pins, summarily became incorporated into a broad spectrum of up-and-coming applications. Such design practice, extending all the way up until present day, remains of paramount importance because it enables an innumerable variety of meaningful motions to become portrayed.

As a consequence of such progress, modern day trisection devices came into existence shortly after inventors figured out how to shape the longitudinal centerlines of linkages and radial centerlines of interconnecting pivot pins which collectively constitute their mechanisms into configurations that are indicative of geometric construction patterns of rendered angles whose magnitudes amount to exactly three times the sizes of their respective given angles.

The very process of trisection became more sophisticated thereafter by slotting such linkages, thereby affording added degrees of freedom. This enabled such designs to travel over an ever increasing range of distinct trajectories that otherwise simply couldn't be duplicated by solid linkage designs of comparable shapes, the latter of which proved also to be both heavier and more costly.

A distinct example of such improved design is presented in FIG. 1C, wherein a pair of slotted linkages are featured which can be used to actuate such device by means of rotating linkage MR in either a clockwise or counterclockwise direction relative to member MS about a hinge located at axis M.

FIG. 1C, was chosen to represent a typical example of such slotted linkage design for the principal reason that the very artwork which is expressed in FIG. 1B precisely pinpoints the particular placements of the longitudinal centerlines of linkages and radial centerlines of interconnecting pivot pins which collectively comprise it.

Because of such association, notice that both FIGS. 1B and 1C denote the very same position letters, being a convenience which should permit for their easy comparison.

Whereas a virtually unlimited number of other geometric construction patterns which also serve to constitute such Archimedes proposition, as represented FIG. 1B, exactly describe a series of repositioned placements of the longitudinal centerlines of linkages and radial centerlines of interconnecting pivot pins which collectively comprise such mechanism, as depicted in FIG. 1C as it becomes actuated, the angular notations algebraically denoted as θ and 3θ in FIG. 1B thereby also are shown to carry over into FIG. 1C.

Except for these angular notations, such FIG. 1C merely is a truncated rendition of prior art. Because its overall geometry can be related in such manner directly to that of FIG. 1B, and thereby furthermore can be associated to such famous Archimedes proposition, it is said to qualify as a CATEGORY II articulating trisection device.

This truncated phenomena becomes quite evident once realizing that such basic Archimedes proposition, as featured in FIG. 1B, furthermore could be supplemented, or added to, merely by means of incorporating successive isosceles triangles onto it, each of whose angles of equal size thereby always would amount to the sum of the magnitudes of the non adjacent included angles of the triangle whose perimeter represents the outer envelope of the combined triangles which preceded it, thereby establishing the following progression:

$\theta+\theta=2\theta$;

$\theta+2\theta=3\theta$;

$\theta+3\theta=4\theta$; and $\theta+4\theta=5\theta$; etc.

The manner in which such progression could be introduced into such prior art, as posed in FIG. 1C, is indicated by the addition of the link, as depicted by phantom lines, which extends from axis Q therein.

Aside from such superfluous phantom link, upon viewing FIG. 1C, it becomes obvious that it consists of both solid, as well as slotted linkages, along with interconnecting pivot pins, which can described in greater detail as follows:

solid linkages NP and PQ, each of the same length, have circular holes of the exactly the same size drilled through them located very close to each of their ends along their respective longitudinal centerlines. All four holes are located such that the distance between the respective radial centerlines of the holes drilled through linkage NP is the same as that afforded between the respective radial centerlines of the holes drilled through linkage PQ, thereby describing the same bolt hole footprints;

a pivot pin whose radial centerline is located at axis Q is inserted through one of the holes drilled through linkage PQ and then through the slot afforded by linkage MR which thereby constrains its movement such that axis Q always lies along the longitudinal centerline of linkage MR during device articulation; thereby furthermore conforming to the distinct geometric pattern posed in FIG. 1B wherein point Q is shown to reside upon straight line MR;

the longitudinal centerline of extended slotted linkage SP is aligned with that of linkage MR by means of drilling matching circular shaped holes at axis M, located very close to the respective endpoints of such linkages; whereby a second pivot pin then becomes inserted through such matching circular shaped holes. Hence, such axis M conforms to the location of point M, as represented in FIG. 1B, designated as the intersection point between straight lines MR and SP extended; and another hole is drilled through a portion of linkage MR which does not contain a slot, whose radial centerline both is aligned with the longitudinal centerline of linkage MR, and is offset a fixed distance away from axis M that is equal to the length between the radial centerlines of respective holes which previously were drilled through the respective ends of linkage PQ. A third pivot pin is inserted through one of the holes drilled through linkage NP, and then through the vacant hole drilled through linkage MR. Lastly a fourth pivot pin is inserted through the vacant hole drilled through linkage NP, then through the vacant hole drilled through linkage PQ, and thereafter through the slot of linkage MP.

Based upon such design, lengths MN, NP, and PQ all must be equal; axis N must reside along the longitudinal centerline of linkage MR and upon the circumference of a circle described about axis P of radius PN, and axis P must reside along the longitudinal centerline of slotted linkage MS; thereby conforming to the geometry posed in FIG. 1B, wherein it is shown that corresponding straight lines MN, NP, and PQ again are all of equal length, point N resides along straight line MR and upon the circumference of a circle drawn about point P of radius PN, and point P is situated upon straight line MS.

In conclusion, such device, as represented in FIG. 1C, is considered to be fully capable of portraying angle RMS as a trisector for a wide range of angle QPS designated magnitudes since each discrete setting furthermore could be fully described by a singular geometric construction pattern, such as that which is afforded in such FIG. 1B; as thereby generated by means of imposing a distinct sequence of Euclidean operations that conforms to that which governs such famous Archimedes proposition.

Therefore, once such device becomes set by means of rotating linkage MR with respect to linkage MS so that angle QPS, as posed in FIG. 1C, becomes of particular size 3θ, its associated trisector, represented as an angle RMP that becomes interposed about axis M between the respective longitudinal centerlines of linkages MR and MS, automatically becomes portrayed, being of size θ.

Once a phantom linkage, as depicted in FIG. 1C, becomes incorporated into such prior art, a one-to-four angular amplification thereby becomes realized with respect to angle RMS as forecasted by the progression expressed above.

Due to such design intricacy, such device as depicted in FIG. 1C becomes capable of trisecting angles of various sizes in rapid succession. Such distinct advantage clearly cannot be matched by a marked ruler arrangement that otherwise must perform the repetitious act of reproducing all of the cumbersome motions considered necessary to achieve trisection each and every time an angle of different magnitude becomes slated for trisection.

Mechanisms which fall under the grouping entitled, CATEGORY I, sub-classification B articulating trisection devices feature new designs, and thereby shall be fully described at a later time.

For the particular contingency that other trisection methods yet might become identified in the near future, consisting of different approaches than those which govern such proposed CATEGORY I and CATEGORY II groupings, it is recommended that they too should be classified into suitable categories. For example, one yet to be related method for trisecting angles consists of portraying specific contours that represent a composite of trisecting angles, or aggregate of previously established trisection points for angles whose magnitudes amount to exactly three times their respective size. It would seem only fitting, then, to group together such types of mechanisms into an entirely new CATEGORY III articulating trisection device classification.

All told then, just one final important question still remains largely unaddressed, being that: If a unique motion related solution is required for each and every angle of different designated magnitude that intended to be trisected, then what distinct proofs, or perhaps interrelated set of proofs, would need to be specified in order to substantiate that some newly proposed mechanism could perform trisection accurately throughout its entire range of device settings? As soon will become evident, in order to suitably answer such looming question, a novel methodology, as predicated upon an extension to a limited conventional Euclidean practice that alone is incapable of solving such famous classical problem of the trisection of an angle would need to be established; thereby making what will appear in the following pages revolutionary, rather than merely evolutionary, in nature!

SUMMARY OF THE INVENTION

A newly proposed articulating trisection invention is about to be formally introduced which consists of four distinct embodiments. Before this can occur, however, a comprehensive methodology first needs to be established that identifies specific requirements that each of their constituent designs should conform to.

Whereas such comprehensive methodology, in turn, then would need to rely upon new definitions, these are furnished directly below:

mathematically limited activity, an operation that cannot be performed when complying with all of the mathematical requirements that have been imposed upon it. The classical problem of the trisection of an angle qualifies as a very good example in this regard;

overlapment point, an intersection point that resides within a geometric construction pattern which, although being easily located by conventional Euclidean means with respect to its given set of previously defined geometric data, nevertheless cannot be distinguished in such manner from the lone vantage point of particular rendered information;

reversible geometric construction pattern, a geometric construction pattern that is entirely devoid of overlapment points. Its overall configuration can be completely reconstituted by means of launching a geometric construction activity which commences exclusively from any of its rendered information that is under current review. Reversibility proceeds because contiguous intersection points therein remain distinguishable, even with respect to such rendered information; thereby affording a pathway of return that leads all the way back to its given set of previously defined geometric data;

irreversible geometric construction pattern, a geometric construction pattern that harbors overlapment points. Its overall configuration cannot be completely reconstituted by means of launching a geometric construction activity which commences exclusively from certain rendered data because an availability of intrinsic overlapment points residing directly along such pathway remain impervious to detection solely by conventional Euclidean means;

backtrack, to distinguish intersection points or even a given set of previously defined geometric data within a geometric construction pattern by means of applying only a straightedge and compass exclusively to identified rendered information;

family of geometric construction patterns, an infinite number of geometric construction patterns whose overall shapes vary imperceptibly from one to the next; whereby each drawing is entirely unique due to a slight adjustment which is made to the magnitude of a given angle, denoted as θ, that appears in the very first step of a specific sequence of Euclidean operations from which all of such drawings can be exclusively derived;

representative geometric construction pattern, a distinct drawing which has been selected out of an entire family of geometric construction patterns to suitably characterize one relative positioning of its constituent straight lines, circular arcs, and intersection points;

Euclidean formulation, a practical means for representing an entire family of geometric construction patterns, all upon just a single piece of paper. Such depiction features just a singular representative geometric construction pattern that furthermore has an unmistakable double arrow notated somewhere upon it that distinguishes it apart from a singular geometric construction pattern. Such type of application could be demonstrated very easily merely by means of placing a double arrow notation upon such prior art, as posed in FIG. 1B. For the particular case when such double arrow notation appears just above point N therein and assumes the shape of two circular arcs residing just outside of the circle drawn about point P, such convention would signify that as point N moves about the circumference of such circle, straight line NM of length equal to its radius PN would be geometrically constructed from each of such newly established N points, thereby locating respective M points somewhere along straight line SP extended; whereby corresponding Q points in turn would be geometrically located by means of extending each distinct straight line MN that becomes respectively drawn. Whereas the magnitude of angle RMP already is shown therein to be denoted algebraically by the Greek letter θ, it can assume varying sizes; unlike in the unrelated case wherein such drawing otherwise might constitute a singular geometric construction pattern, thereby requiring that such given angle RMP instead be accorded only a singular numerical magnitude;

animation, as it applies to the motion picture industry, furthermore also pertains to an entire family of geometric construction patterns whose distinct shapes have been organized in consecutive order for purposes of either being filmed, or quite possibly, being flapped through when inserted into a book; thereby projecting the overall illusion of motion;

replication, an accurate simulation of some particular motion which becomes observed as a mechanical device becomes articulated, most generally transacted by means of animating an entire family of consecutively arranged geometric construction patterns;

fundamental architecture, prominent portions of an articulating device which are designed to stand out more than others. Various techniques can be employed to accomplish this which include, but are not limited to, coloring such portions differently, incorporating a distinct declivity such as a groove into them, or perhaps making them more pronounced so that they protrude out beyond other device areas. Unless otherwise specified, the pathway of such fundamental architecture shall map out the longitudinal centerlines of linkages and radial centerlines of interconnecting pivot pins which collectively constitute such articulating device; thereby furthermore possibly being distinguished by the representative geometric construction pattern of a Euclidean formulation;

static image, the projection of a solid body, as it appears at some particular point in time when viewed from a singular vantage point in space;

emulation mechanism, a device which features a fundamental architecture that regenerates a unique static image for each of its finite settings that furthermore can be described by a constituent drawing belonging to a particular family of geometric construction patterns;

trisecting emulation mechanism, a specially designed emulation mechanism in which one particular portion of the unique static image which it portrays actually trisects another portion which corresponds to such device setting;

geometric forming process, a novel method for geometrically describing motion! On the one hand, such newly proposed process is nothing more than an extension of conventional Euclidean practice in that each of its constituent drawings actually is a singular geometric construction pattern in itself. On the other hand, a geometric forming process remains unique in that it furthermore relates such output through a distinct association of Euclidean commands. For the condition of trisection, a particular sequence of Euclidean operations becomes specified that directs how to generate an entire family of geometric construction patterns whose rendered angles amount to exactly three times the size of their respective given angles. The overall complexity that is characteristic of a geometric forming process becomes readily apparent when considering all of the inputs which contribute to its composition, as briefly enumerated below:

trisection rationale, a detailed accounting of how to resolve such previously addressed trisection mystery;

improved drawing pretext, a method which abbreviates the rather outmoded process of otherwise unsuccessfully attempting to generate a virtually unlimited number of geometric construction patterns in order to fully describe a discrete motion which fundamentally is considered to consist of a continuum of unique shapes that instead becomes portrayed over a finite period of time in a rather effortless manner. For purposes of specifically substantiating that any static image which becomes regenerated by means of properly setting a trisecting emulation mechanism automatically portrays a motion related solution for the problem of the trisection of an angle, a corresponding geometric construction pattern whose rendered angle is of a magnitude which amounts to exactly three times its given angle can be selected from a suitable Euclidean formulation which furthermore fully describes its overall shape; thereby demonstrating that the smaller portion of such displayed static image actually trisects the larger portion which is calibrated to such setting;

mathematics demarcation, a natural order that can be attributed to all of mathematics; one that just now becomes recognizable as the result of partitioning conventional Euclidean practice with respect to such newly proposed geometric forming process! In effect, such categorization effort allows for any singular geometric construction pattern, thereby remaining stationary with respect to the very piece of paper it is drawn upon, to be distinguished apart from an entire group of geometric construction patterns which, not only can be related to one another through a common set of Euclidean commands, but in such manner furthermore can describe an overall outline which becomes duly portrayed by an imparted motion at some arbitrarily selected instant during its duration. Such concept actually does have a precedent; one which already was imposed upon the well known field physics years earlier, wherein:

statics applies to bodies which are either at rest or else are found to be moving at a constant speed, thereby signifying a specific condition which results only when forces acting upon such bodies are found to be in equilibrium; whereas dynamics instead is concerned with the motions of accelerating bodies, thereby applying to a particular condition that is experienced only when forces acting upon such bodies are determined not to counterbalance one another;

set of rules, an accounting of how such newly proposed geometric forming process should be governed. Similar to the manner in which the very laws of motion must be interpreted differently when considering statics, as opposed to dynamics real world involvements, so too would the rules which normally apply to the conduct of conventional Euclidean practice need to be interpreted differently when instead considering the administration of such newly proposed geometric forming process. For example, when considering the varying shapes that the fundamental architecture of some particular articulating mechanism might become repositioned to over a finite period of time, design issues might arise concerning whether or not some specific interference might impede such flexure from being fully executed; and probabilistic proof of mathematic limitation, an analysis that provides reasoning for how a motion related solution for the problem of the trisection of an angle can overcome a mathematic limitation which otherwise cannot be mitigated when attempting to solve the classical problem of the trisection of an angle;

rational number, a ratio between two integers; thereby consisting of a numerator (N) and denominator (D) which mathematically combine in order to be algebraically expressed as N/D. For any rational number (R) that furthermore is real, its actual 'magnitude' can be viewed! Its precise value could be obtained by means of geometrically constructing a right triangle whose two sides respectively measure N and D units in length; whereby another right triangle that is similar to it then could be drawn such that its side which corresponds to that which is D units long in such other right triangle would measure one unit in length. Hence, an established proportion N/D=x/1 would represent how the lengths of the corresponding sides of such similar triangles would relate to one another, such that the side of unknown length, x, as corresponding to that whose length is N in such other right triangle, would amount to N/D units in length; thereby being of rational value. Strictly speaking, a rational number cannot be observed, merely because it is a dimensionless fraction. However in its stead, what can be viewed is a length whose magnitude actually equals such value. For example, it reasonably could be stated that a straight line which measures 13/3 units in length is of an overall magnitude that can be expressed as a rational number. In such above given definition, notice that no indication whatsoever is afforded as to what magnitudes N and D might assume. As such, they could consist of as many digits as necessary in order to solve any given algebraic problem. Obviously, without restriction, the greater amount of digits permitted for any evaluation, the greater number of rational numbers would be contained within its overall field. For example, upon accepting numerator and denominator integers of only one digit in length, an entire field of lowest common denominator rational numbers would consist of 1, 2, 3, 4, 5, 6, 7, 8, 9, ½, 3/2, 2, 5/2, 3, 7/2, 4, 9/2, ⅓, ⅔, 4/3, 5/3, 7/3, 8/3, ¼, ¾, 5/4, 7/4, 9/4, ⅕, ⅖, ⅗, ⅘, 6/5, 7/5, 8/5, 9/5, ⅙, ⅚, 7/6, ⅐, 2/7, 3/7, 4/7, 5/7, 6/7, 8/7, 9/7, ⅛, ⅜, ⅝, ⅞, 9/8, ⅑, 2/9, 4/9, 5/9, 7/9, and 8/9, thereby comprising a total group of 58 rational numbers. However, if another rational number field instead were to be established that admits all N and D integers consisting of two or fewer digits, it naturally would consist of many more rational numbers. If such process were to be allowed to continue indefinitely to a point where another rational number field were to be permitted to grow without bounds, so would its very selectivity to a point where the actual capability of such rational number base to estimate numbers which do not belong to it would increase dramatically. Obviously, a limitless rational number grouping of this nature would enable any threshold of accuracy which might become set within an algebraic problem to be met. As a typical example to effectively demonstrate such affinity, the transcendental number π could be estimated accurately, solely as a rational number, down to a significance of two decimal places, by applying the equation $\pi_{EST}=R_1=N_1/D_1=4T/L$ such that $T=R_2=N_2/D_2=773/1{,}000$ and the value $L=R_3=N_3/D_3=985/1{,}000$. Such rational number estimate thereby would amount to a value of $\pi_{EST}=4T/L=4(773/1{,}000)/(985/1{,}000)=4(773)/(985)=3.14$. Such computation indicates that the rational number 3092/985=3.14 would provide an accurate estimate of the actual value of π down to a significance of two decimal places. What should stir a far greater interest, however, is that later it shall be disclosed exactly how to identify a more detailed rational number, as consisting of many more digits, that shall estimate the value of π down to a significance of ten decimal places. For such case, $T=R_2=N_2/D_2=(77{,}346{,}620{,}052)/100{,}000{,}000{,}000)$ and the value $L=R_2=N_2/D_2=(984{,}807{,}753)/(1{,}000{,}000{,}000)$. By solving the very same equation, a value $\pi_{EST}=4T/L=4(77{,}346{,}620{,}052\times10^{-11})/(984{,}807{,}753\times10^{-9})$ would result, simplifying to $\pi_{EST}=4(0.77346620052)/(0.984807753)=4(7.7346620052)/(9.84807753)=3.1415926536$; thereby matching the actual value of π when estimated to a ten decimal place accuracy. Hence, 309386480208/98480775300=(309, 386,480,208)/(98,480,775,300)=3.1415926536 is a rational number that represents an exact value of π down to ten decimal places. Now, further suppose that such significance was not considered to be satisfactory with regard to some particular problem which instead dictated that only a rational number that can estimate the value of π down to eleven significant figures would suffice. Naturally the number determined above would not qualify, amounting to a value of 3.14159265365 down to such eleven place significance; whereby an actual value of π down to eleven decimal places of accuracy amounts to 3.14159265359. Hence, the number above could be adjusted to (309,386,480,202)/(98, 480,775,300)=3.14159265359. As such, by means of continuing to apply such process, improved estimates of the value of π could be realized all the time in order to meet any accuracy requirements which might become imposed by some specific problem which needs to be solved;

quadratic irrational number, as first distinguished by Al-Mahani over one-thousand years ago; now stated to be the magnitude of any length which can be geometrically constructed from a given length of unity other than that which is of a rational value. Because its value cannot be a fraction, it only can be described by a string of decimal numbers that never repeats itself nor terminates, but surprisingly extends indefinitely. When algebraically expressed, a quadratic irrational number must exhibit at least one radical sign. However, it cannot feature any root which is a multiple of three, such as a cube root or even possibly an eighty-first root, because such values cannot be determined by means of applying successive Quadratic Formulas that are permitted to operate only upon either rational numbers and/or quadratic equation root values, as might become determined by such method. All that needs to be known in order to geometrically construct a square root is that upon drawing a right triangle whose sides become algebraically expressed as a and b, the altitude extending to its hypotenuse, c, will divide such base into two segments denoted respectively as s and (c-s). Hence, due to three similar right triangles which thereby become described in such manner, two residing inside of such larger initially drawn right triangle, a trigonometric relationship of the form sin θ=b/c=s/b thereby could be established. In that the proportion b/c therein identifies sides belonging to such larger right triangle, the proportion s/b would apply to corresponding sides belonging to the smaller right triangle whose hypotenuse is of length b. By multiplying each side of such resulting equation by the factor bc, the equality $b^2=cs$ becomes obtained. Then by taking the square root of each side, it becomes apparent that $b=\sqrt{cs}$. As various rational values become substituted for c and s therein, the length of side b of such larger right triangle thereby would assume different square root magnitudes. So, if it were intended to geometrically construct side b so that it amounts to $\sqrt{3}$ units in length, a right triangle could be drawn whose hypotenuse, c, amounts to 3 units in length such that the altitude which lies perpendicular to it would reside a distance away from either of its ends a total of one unit of measurement; thereby setting the value of s to be one unit long. Accordingly, the value of length b would amount to $\sqrt{cs}=\sqrt{3(1)}=\sqrt{3}$ units in length. In such very same manner, a fourth root of 3, as amounting to the square root of $\sqrt{3}$ and algebraically expressed as $$3^{1/4}=(3^{1/2})^{1/2}=\sqrt{3^{1/2}}=\sqrt{\sqrt{3}},$$

thereafter could be geometrically constructed, merely by means of drawing another right triangle which this time instead exhibits dimensions of $c=\sqrt{3}$ and s=1, such that $$b=\sqrt{cs}=\sqrt{\sqrt{3}(1)}=\sqrt{\sqrt{3}}.$$

As another example, suppose there were an interest to geometrically construct a quadratic irrational number whose magnitude amounts to $$\sqrt{m+n\sqrt{q}}.$$

One way to accomplish such activity would be to obtain the square root of two straight line segments whose extremities become attached to form a longer straight line; the first of which amounts to a length that is m times the size of an arbitrarily selected length of unity, whereby such remaining segment thereby would measure $n\sqrt{q}$ times the size of such unit length. For example, take the case when m=2, n=¾, and q=3; whereby such first length, m, would measure 2 units long, with such second length, $n\sqrt{q}$, would amount to $(3/4)\sqrt{3}$ units in length. Yet another way to geometrically construct a length whose value amounts to $$\sqrt{m+n\sqrt{q}}$$

would entail drawing a right triangle whose hypotenuse would be of a length, c, such that its sides, a and b, respectively would amount to lengths $\sqrt{m}$ and $$\sqrt{n\sqrt{q}};$$

thereby relating to one another by virtue of a Pythagorean Theorem, which unconditionally would state, $$c=\sqrt{a^2+b^2}=\sqrt{\sqrt{m}^2+\left(\sqrt{n\sqrt{q}}\right)^2}=\sqrt{m+n\sqrt{q}}.$$

Then, when m=2, n=¾, and q=3, side a thereby would amount to a value of $\sqrt{m}=\sqrt{2}$ with side b being equal to $$\sqrt{n\sqrt{q}}=\sqrt{(3/4)\sqrt{3}}.$$

A length $\sqrt{m}=\sqrt{2}$ very easily could be geometrically constructed, merely by means of drawing a right triangle whose sides each would amount to one unit in length; thereby making its hypotenuse equal to $\sqrt{1^2+1^2}=\sqrt{2}$. Moreover, a length of $\sqrt{(3/4)\sqrt{3}}$.

could be geometrically constructed by means of drawing yet another right triangle whose hypotenuse would be $\sqrt{3}$ units long such that the altitude which lies perpendicular to it would reside a distance away from either of its endpoints a total of ¾ units of measurement, such that s=¾; thereby determining a length equal to $$\sqrt{cs} = \sqrt{sc} = \sqrt{(3/4)\sqrt{3}}$$

units in length. Thereafter, a final right triangle could be geometrically constructed whose sides are of respective lengths $a=\sqrt{2}$ and $$b = \sqrt{(3/4)\sqrt{3}}$$

such that its hypotenuse would amount to a length of $$c = \sqrt{a^2 + b^2} = \sqrt{2 + (3/4)\sqrt{3}}.$$

Lastly, for any number which resides underneath a radical sign whose value is negative, a complex number would result; thereby invalidating any possibility that such value might qualify as a quadratic irrational number, as based upon the reasoning that an imaginary number which cannot exist most certainly could not be geometrically constructed; and cubic irrational number, any number whose value is neither rational nor quadratic irrational. Although such appellation is typical of Al-Mahani terminology, more specifically it is intended to signify that such types of numbers can exist only within root sets of 'cubic', or higher, order algebraic equations, as posed in a single variable, whose coefficients are comprised exclusively of either rational and/or quadratic irrational values. In particular, this means that cubic equations whose coefficients consist of just rational and/or quadratic irrational values can be used to convert such number types into corresponding triads of cubic irrational values. Likewise, three properly associated cubic irrational numbers could be combined mathematically to distinguish a rational or quadratic irrational number. In sharp contrast, the root set of any second order equation, as expressed in a single variable, cannot contain cubic irrational values when its coefficients consist solely of either rational and/or quadratic irrational values. One way to refute such claim would be to identify a pair of cubic irrational values, denoted as $x_1$ and $x_2$, which could satisfy the governing requirements imposed upon such well known parabolic relationship, as algebraically assuming the form $ax^2+bx+c=0=(x-x_1)(x-x_2)=x^2-(x_1+x_2)x+x_1 x_2$, for the specific case when its coefficient 'a' amounts to a value of unity; whereby such coefficient, b, would amount to a value of $-(x_1+x_2)$, and such magnitude, c, would be equal to the product $x_1x_2$. When making such type futile attempt, however, the very difficulty which would be encountered is that whenever a pair of cubic irrational number values become selected so that the resulting magnitude of their product, $x_1x_2$, amounts to some specified rational or quadratic irrational value, such as c=1, the negative of their sums, amounting to $-(x_1+x_2)$, cannot yield yet another value equal to some stipulated rational or quadratic irrational value of b. This is because any two values belonging to a cubic irrational triad which thereafter become reduced into a single cubic irrational value, still could not be mathematically combined with such remaining value in order to calculate such hoped for result; essentially disqualifying the possibility that only two irrational number values, alone could sufficiently allow such conversion activity to take place. In other words, a quadratic equation, as posed in a single variable, cannot possibly exist which exhibits coefficients that solely are of rational value if its root set were intended to be expressed in terms of π However, such result could be easily estimated. For example, when letting $x_1=\pi$, and $x_2=1/\pi$, such specific value of b would amount to $-(x_1+x_2)=-(\pi+1/\pi)$. By means of simply applying the results obtained above, the value of such coefficient, b, could be approximated, as amounting to the particular value −[(309,386,480,202)/(98,480,775,300)+(98,480,775,300)4309,386,480,202)]; whereby the magnitude of its coefficient, c, would be $x_1x_2=(\pi)(1/\pi)=1$. Above, what at face value might seem to be a rather unsupportable or even preposterous contention, when considered in combination with other prevailing claims, as rendered by various esteemed mathematics experts, who jointly concede that any cubic equation, as posed in a single variable, whose coefficients all are of rational values can contain what in their words, are 'constructible' roots only if accompanied by a rational root therein, leads to the extraordinary conclusion, as about to be revealed to the general public for the very first time, that each distinct algebraic equation format type associates rational, quadratic irrational, and/or cubic irrational numbers in a unique manner. That is to say, when certain types of numerical representations become related to each other within a particular problem, they can be expressed only by certain forms of algebraically equations! For example, as claimed above, no matter what rational and/or quadratic irrational values the coefficients of a parabolic equation, as posed in a single variable, might assume, it still cannot contain cubic irrational roots. Moreover, contrary to any myth which falsely might allege that a cubic irrational number cannot be geometrically constructed, it truly can! Unfortunately, a raging controversy over such matter, even today, still continues to persist! To clear this up, all that needs to be said is that it might have been overlooked on past occasions that by simply drawing an angle of arbitrarily selected size, there exists a good chance that it will exhibit trigonometric properties whose values are cubic irrational. Such claim is based merely upon the fact that most angles exhibit properties of this nature, whereby it would become highly likely that any randomly drawn angle would assume such trigonometric proportions. A more properly phrased statement, as substituted in lieu of this prefabrication, would be that a cubic irrational number is not repeatable; essentially meaning that the probability of being able to geometrically construct an angle of intended value approaches zero. Accordingly, a cubic irrational number more properly could be defined as any dimensionless value, except that which represents the very 'magnitude' of any length which could be geometrically constructed with respect to a given length of unity; thereby otherwise qualifying as the magnitude of a particular length which instead could be portrayed as a motion related solution for the problem of the trisection of an angle directly alongside such unit length. One of the most intriguing aspects of trisection concerns its association with any cubic equation that relates a trigonometric property of one angle to that of another whose magnitude amounts to exactly three times its size. An often ignored, but necessary starting point to account for such association would consist of explaining how some trisector actually applies to all three roots belonging to such type of cubic equation! Such perplexing concern can be easily rectified simply by divulging that when attempting to divide an angle whose designated magnitude is denoted as $3\theta$ into three equal parts, not only does an angle, denoted as $\theta_1$, whose magnitude amounts to exactly one-third of its value constitute its trisector, but so would other angles denoted as $\theta_2=\theta_1+120°$, as well as $\theta_3=\theta_1+240°$. This is because when multiplying such other angles, each by a factor of three, equations would result of $3\theta_2=3\theta_1+360°=3\theta$, as well as $3\theta_3=3\theta_1+720°=3\theta$. Hence, when attempting to determine a trisector for a particular angle denoted as $3\theta$, it always should be kept in mind that, not one, but three angles actually meet such description; namely being, $\theta_1$, $\theta_2=\theta_1+120°$, and $\theta_3=\theta_1+240°$. From such knowledge, like trigonometric properties for all three of such angles could be determined whose respective values, such as $\cos\theta_1$, $\cos\theta_2$, and $\cos\theta_3$, collectively would represent roots for any of such cubic equations. Accordingly, a process to obtain solutions of this nature would consist of first verifying that a particular cubic equation which is to be assessed meets such format description. For example, the famous cubic equation $\sin(3\theta)=3\sin\theta-4\sin^3\theta$ does so by being of cubic form, and furthermore relating the sine of an angle, denoted as $\theta$, to that of another angle, denoted as $3\theta$, whose magnitude thereby would amount to exactly three times its size. Secondly, a designated magnitude of $3\theta$ would have to become determined by means of taking the arc sine of the corresponding value which is represented in the particular equation that is to be solved. When a cubic equation of the specific form $3\sin\theta-4\sin^3\theta-\frac{1}{2}=0$ becomes specified, such ½ value could be equated to the $\sin(3\theta)$, thereby determining that $3\theta$ would amount to a value which is equal to the arc sine of ½, being 30° in magnitude. Thirdly, a value of $\theta$ would be calculated, simply by dividing such determined $3\theta$ value by three, yielding $\theta=3\theta/3=30°/3=\theta_1=10°$. Next, the equations cited above would become applied, whereby $\theta_2=\theta_1+120°=10°+120°=130°$, and $\theta_3=\theta_1+240°=10°+240°=250°$. The roots of such given equation would be $\sin\theta_1=\sin 10°$, $\sin\theta_2=\sin 130°$, and $\sin\theta_3=\sin 250°$, any of which could be substituted back into the cubic equation $3\sin\theta-4\sin^3\theta=\frac{1}{2}$ in order to produce the desired result of ½. Furthermore, the equations $\theta_2=\theta_1+120°$ and $\theta_3=\theta_1+240°$, although being analogous to those which previously were determined by De Moivre in connection with his treatment of complex numbers, now have become more restricted in a sense that they furthermore are governed by additional common sense rules, such as 'only three roots can a cubic equation contain'. Based upon such understanding, it becomes thoroughly evident that specific algebraic formulas, as listed below, that can be applied in order to suitably convert triads of cubic irrational values into either rational or quadratic irrational values, and vice versa. Below, such formulas are arranged so that they can be solved when their root set:

products equate to preselected rational and/or quadratic irrational numbers which can be substituted into left-hand portions of such equations:

$$\cos(3\theta_1)/4=\cos\theta_1\cos\theta_2\cos\theta_3;$$

$$-\sin(3\theta_1)/4=\sin\theta_1\sin\theta_2\sin\theta_3;\text{ and}$$

$$-\tan(3\theta_1)=\tan\theta_1\tan\theta_2\tan\theta_3;$$

sums equate to preselected rational and/or quadratic irrational numbers which can be substituted into applicable left-hand portions of such equations:

$$0=\cos\theta_1+\cos\theta_2+\cos\theta_3;$$

$$0=\sin\theta_1+\sin\theta_2+\sin\theta_3;\text{ and}$$

$$3\tan(3\theta_1)=\tan\theta_1+\tan\theta_2+\tan\theta_3;\text{ and}$$

sums of paired products equate to preselected rational and/or quadratic irrational numbers which can be substituted into applicable left-hand portions of such equations:

$$-\tfrac{3}{4}=\cos\theta_1\cos\theta_2+\cos\theta_1\cos\theta_3+\cos\theta_2\cos\theta_3;$$

$$-\tfrac{3}{4}=\sin\theta_1\sin\theta_2+\sin\theta_1\sin\theta_3+\sin\theta_2\sin\theta_3;\text{ and}$$

$$-3=\tan\theta_1\tan\theta_2+\tan\theta_1\tan\theta_3+\tan\theta_2\tan\theta_3.$$

A comprehensive methodology, as presented in FIG. 2, evidences a critical role which new discovery plays in the development of trisecting emulation mechanisms. The main purpose of such flowchart is to provide an overall accounting of tasks that are required in order to suitably substantiate that a newly proposed invention, such as that which is about to be formally introduced herein, can perform trisection accurately over a wide range of device settings.

The reason why FIG. 2 appears, even before four embodiments formally become specified, simply is because their detail designs are predicated upon such input.

As indicated therein, a trisecting emulation mechanism which is deemed to merit the capability to achieve trisection over a wide range of device settings must suitably demonstrate that its proposed design complies with all of the provisions specified in a prepared requirements chart.

Moreover, FIG. 2 specifically itemizes pertinent ramifications which are considered to underlie the very nature of such plaguing trisection mystery.

To expound, by beginning at the oval shaped START symbol therein, notice that four process boxes of rectangular shape are specified in the iterative portion of such diagram just before the upper diamond shaped decision box location.

More specifically, they furthermore appear as entries in the very first very first column of a FIG. 3 Trisection Mystery Iteration Processes Table under the heading entitled, PROCESS.

The second column of such FIG. 3 chart provides correct responses under the heading entitled, CORRECT RESPONSE appearing therein, for each of such four listed processes, as extracted from later discussions.

Within this iteration portion of FIG. 2, the NO arrow departing such upper diamond shaped decision box signifies that a review process is needed in order to assure that for whatever identified mathematic limitation becomes proposed at a particular point in time, sufficient means are specified to overcome it.

Moreover, the oval shaped START symbol presented in FIG. 2 also leads to five inputs that additionally need to be supplied, as indicated by having their names listed within parallelograms.

Based upon a detailed understanding of such five inputs, an overall geometric forming process is to be established from which explicit details can be gleaned in order to furnish correct responses for five rectangular shaped processes itemized to the very right of such FIG. 2 flowchart, all leading to a second decision box cited therein.

The reason for preparing a requirements chart is to identify specific information that, although mostly lacking from prior art which would qualify as CATEGORY I and CATEGORY II articulating trisection devices, is needed nonetheless to suitably substantiate that the design of any newly proposed articulating invention can perform trisection accurately over its wide range of device settings.

Another process box located just to the left of such second decision box in FIG. 2 discloses that an initially proposed invention might have to undergo a series of refinements in order to satisfy all of the provisions imposed by such requirements chart.

Whenever it can be substantiated that a newly proposed invention truly meets all of such stipulated provisions, as imposed in such cited requirements chart, it is said to thereby qualify as a trisecting emulation mechanism; thereby becoming capable of performing trisection merely by means of becoming properly set to some designated size!

In so doing, its constituent fundamental architecture thereby becomes reconfigured; causing the regeneration of a static image that portrays its trisector!

Trisection occurs because such regenerated static image must be describable by a drawing that is part of a distinct family of geometric construction patterns, each rendered angle of which is of a magnitude which amounts to exactly three times the size of its given angle; whereby the portion of such regenerated static image which corresponds to the given angle in such drawing actually portrays a trisector for its rendered angle portion, corresponding to a specific setting which such device initially becomes set to.

In FIG. 4, the four embodiments which collectively constitute such newly proposed invention are individually tabulated, each appearing as a separate line item under the heading entitled, NEWLY PROPOSED ARTICULATING TRISECTION INVENTION EMBODIMENT NAME.

The second column therein, accorded the heading entitled, APPLICABLE FIGURE NUMBER OF CORRESPONDING EUCLIDEAN FORMULATION, identifies a corresponding Euclidean formulation for each of such listed four embodiments, as cited in the first column therein. As indicated, Euclidean formulations assume odd number listings consisting of FIG. 5, FIG. 7, FIG. 14, and FIG. 21.

Each entry listed in the third column of such FIG. 4 Figure Number Table, under a so-called heading entitled, APPLICABLE FIGURE NUMBERS OF CORRESPONDING DRAWING PACKAGES, identify an entire drawing package for each corresponding embodiment cited in the first column therein. Applicable drawing package figure numbers are of even number listings consist FIG. 6, FIGS. 8, 9, 10, 11, 12, and 13, FIGS. 15, 16, 17, 18, 19, and 20, FIGS. 22, 23, 24, 25, 26, 27, and 28, and FIGS. 29, 30, 31, 32, 33, 34, 35, 36, 37, 38, 39, 40, and 41.

A good starting point when referring to such Euclidean itemized formulations is to identify which angles are given and which are rendered therein. In order to expedite such activity, listings of such angles are presented in a FIG. 42 Euclidean Formulation Rendered Angle Relation Table. First column entries cited therein under the heading entitled, APPLICABLE FIGURE NUMBER OF EUCLIDEAN FORMULATION, reiterate those listings appearing in the second column of FIG. 4; thereby identifying odd numbered figures of Euclidean formulations which correspond to each of the four embodiments belonging to such newly proposed articulating trisection invention.

Notice therein that each GIVEN ANGLE(S) entry, as it appears in the second column of such FIG. 42 table, describes a particular given angle, or pair of given angles when both acute as well as obtuse angle trisection fall under consideration. Moreover, the magnitude of each cited given angle is algebraically expressed on a line appearing directly below it.

Clearly, the very same format applies for each entry listed in the third column therein under the heading entitled, RENDERED ANGLE(S).

As an example of this, for the Euclidean formulation presented in FIG. 5, as given angle VOO' of algebraically expressed magnitude θ varies from zero to thirty degrees in size, acute angle VOU' of magnitude 3θ, always amounts to exactly three times its size, thereby varying from zero to ninety degrees.

Since Euclidean formulations are to form the very basis for such four embodiment designs, their depictions precede them in this presentation, thereby requiring that they be discussed first.

In this regard, FIG. 5 represents the very first attempt to describe an entire Euclidean formulation. Its double arrow notation signifies that such improved drawing pretext characterizes an entire family of unrevealed geometric construction patterns, in addition to the lone representative geometric construction pattern that is depicted upon its very face.

Each and every one of such distinct drawings could be geometrically constructed merely by means of executing all of the commands which are specified in its governing fourteen step sequence of Euclidean operations, enumerated as follows:

step 1—given acute angle VOO' of arbitrarily selected magnitude θ ranging anywhere from zero to thirty degrees is geometrically constructed such that its side OO' exhibits the same length as side OV;

step 2—side OV of given acute angle VOO' becomes designated as the +x-axis;

step 3—a +y-axis is generated orthogonally to such +x-axis, represented as a straight line drawn through vertex O of given angle VOO' which is geometrically constructed perpendicular to such designated x-axis;

step 4—a portion of the circumference of a circle denoted as the FIRST CIRCLULAR PORTION is geometrically constructed about center point O whose radius is equal in length to straight line OV, thereby enabling it to pass through points V and O', both of which previously have been designated as respective termination points of angle VOO';

step 5—the intersection between such FIRST CIRCLULAR PORTION and such y-axis becomes designated as point T;

step 6—next, an angle which amounts to exactly three times the magnitude of given angle VOO' becomes geometrically constructed, but in a completely different, yet simplified manner to the way in which it was drawn in FIG. 1B; one which is more in line with the fan shape, as was generated in FIG. 1A. This is to be achieved merely by geometrically duplicating given angle VOO' twice, and thereafter adding such result onto it in order to obtain a new angle of magnitude 3θ such that its vertex is situated at point O, its first side resides along the +x-axis, and its yet undesignated other side is orientated counterclockwise to it;

step 7—the intersection point between such FIRST CIRCLULAR PORTION and the remaining, yet undistinguished, side of such geometrically constructed angle of size 3θ becomes designated as Point U';

step 8—straight line TU' and straight line TO become drawn, thereby completing isosceles triangle TOU';

step 9—a portion of the circumference of a circle denoted as the SECOND CIRCULAR PORTION is drawn about point O' whose radius is set equal in length to straight line OO';

step 10—the yet undistinguished intersection point which such SECOND CIRCLULAR PORTION makes with such previously drawn y-axis becomes designated as point T';

step 11—straight line O'T' becomes drawn;

step 12—a portion of the circumference of a circle denoted as the THIRD CIRCLULAR PORTION is drawn about point T' whose radius is set equal in length to straight line TU';

step 13—the yet undistinguished intersection point which such THIRD CIRCLULAR PORTION makes with such SECOND CIRCULAR PORTION now becomes designated as point U; and step 14—straight lines T'U and O'U become drawn, thereby completing isosceles triangle T'O'U.

Any configuration which could be generated when implementing such sequence of Euclidean operations would exhibit a unique shape based upon the particular magnitude that becomes assigned to given angle VOO' in its step 1.

The configurations that such FIG. 5 Euclidean formulation would assume when given angle VOO' adopts its limiting values are specified in detail as follows:

when given angle VOO' is designated to be of zero degree magnitude:
radii OO', OU' and O'T' all collapse onto the +x-axis;
isosceles triangle OTU' becomes a right triangle whose hypotenuse TU' furthermore can be described as straight line TV;
isosceles triangle 'OT'U becomes a right triangle whose hypotenuse UT' furthermore can be described as straight line UO; and when given angle VOO' is designated to be of thirty degree magnitude:
isosceles triangle O'OT' becomes an equilateral triangle whose vertex T' coincides with vertex T;
isosceles triangle OTU' becomes a straight line which resides upon the +y-axis, such that its side, represented as radius OU' collapses upon its other side, therein represented as radius OT; and
isosceles triangle O'T'U becomes a straight line, such that its side, represented as radius O'U emanating from a center point O' collapses upon its other side, therein represented as radius O'T'.

More particularly, this means:

when given angle VOO' amounts to 0°, such Euclidean formulation assumes the form of three sides of a square along with its diagonals comprised of straight lines TU' and T'U since point T' collapses onto point O, and points U' and O' collapse onto point V; and when given angle VOO' is 30°, such Euclidean formulation assumes the form of an equilateral triangle one of whose sides aligns upon the +y-axis with points T', U, and U' collapsing onto point T.

Algebraically, such determination is verified below:

when given angle VOO', denoted as θ in FIG. 5, amounts to 0°, $\angle TOU' = \angle UO'T' = 90 - 3\theta = 90°;$ $\angle TOO' = \angle UO'O = 90 - \theta = 90°;$ $\angle U'OO' = \angle T'O'O = 2\theta = 0°;$ and when given angle VOO; amounts to 30°, $\angle TOU' = \angle UO'T' = 90 - 3\theta = 0°;$ $\angle TOO' = \angle UO'O = 90 - \theta = 60°;$ $\angle U'OO' = \angle T'O'O = 2\theta = 60°.$ Accordingly, the insertion of such double arrow notation into FIG. 5 signifies that as the magnitude θ of given angle VOO' becomes infinitesimally increased from zero to thirty degrees in the very first step of such sequence of Euclidean operations, the overall shape of such figure will change by means of reconfiguring itself as the result of point T' becoming displaced upwards from point O to point T along the +y-axis. Once a virtually unlimited number of geometric construction renderings which belong to such distinct family of geometric construction patterns eventually become drawn, a complete Euclidean formulation finally would be represented.

The particular placement of such vertical double arrow in FIG. 5 is to signify that point T' can reside only upon such +y-axis. Such geometric alignment easily can be confirmed once realizing that since radius O'T' is of the same length as radius O'O, as angle VOO' becomes varied in size, point T' always must intersect such +y-axis at the juncture of the circumference of a circle of radius O'O which becomes drawn about point O'.

Each unrepresented, but differently shaped geometric construction pattern that also belongs to the family of geometric construction patterns which constitute such Euclidean formulation, as represented in FIG. 5, must be structured from the very same sequence of Euclidean operations whereby:

all unrepresented straight lines corresponding to those which appear as solid straight lines exhibited upon the representative geometric construction pattern of such Euclidean formulation, as posed in FIG. 5, must be equal to their respective lengths; and all unrepresented internal angles that apply to such Euclidean formulation must maintain the same proportions with respect to each other as appear in its representative geometric construction pattern, as actually is posed in such FIG. 5. For example the magnitudes of angle O'OT' and angle O'T' always must remain equal to each other, even when their relative sizes become varied, since they represent angles that reside opposite the equal length sides of isosceles triangle O' T'O.

TU' and T'U are depicted as phantom straight lines therein to indicate that their respective overall lengths are permitted to vary from one drawing to the next within such specific family geometric construction patterns.

Such Euclidean formulation, as posed in FIG. 5, is shown to consist of three principal portions, identified as follows:

isosceles triangle TOU', as denoted by darker shading, along with +x-axis;

isosceles triangle T'O'U, as denoted by lighter texture; and straight line OO' which interconnects the lower vertices of isosceles triangle TOU' and isosceles triangle T'O'U together.

Within FIG. 5, notice that vertex U' belonging to isosceles triangle TOU' aligns with, or superimposes directly upon, side O'U of isosceles triangle T'O'U. This is verified by the following proof:

since the whole is equal to the sum of its parts, $$\angle VOO' + \angle O'OU' = \angle VOU'$$

$$\theta + \angle O'OU' = 3\theta$$

$$\angle O'OU' = 2\theta;$$

$$\angle U'OO' = 2\theta;$$

OT=OU'=OO' because point T, point U' and point O' all reside upon such FIRST CIRCLULAR PORTION;

O'O=O'T'=O'U because point O, point T' and point U all reside upon such SECOND CIRCLULAR PORTION;

since OO' is equal in length to O'O by identity, whereby via substitution OT=O'T' and OU'=O' U;

T'U=TU' by geometric construction;

isosceles triangle TOU' must be congruent to isosceles triangle T'O'U since their three corresponding sides are of equal lengths;

since the magnitudes of angles included in isosceles triangle T'O'U must be of equal respective sizes to corresponding angles featured in its congruent triangle TOU', then it can be said that ∠T'O'U=∠TOU';

since the whole is equal to the sum of its parts, $$\angle VOU' + \angle U'OT = 90$$

$$\angle U'OT = 90 - \angle VOU'$$

$$\angle TOU' = 90 - \angle VOU'$$

$$\angle TOU' = 90 - 3\theta;$$

since the whole is equal to the sum of its parts, and by substitution of the identities $$\angle O'OV = \angle VOO'\theta \text{ and } \angle O'OT = \angle TOO',$$

$$\angle VOO' + \angle O'OT = 90$$

$$\angle O'OV + \angle TOO' = 90$$

$$\angle TOO' = 90 - \angle O'OV$$

$$\angle T'OO' = 90 - \theta;$$

whereby the angles residing opposite the equal sides of isosceles triangle OO'T' must be of equal magnitude, such that ∠O'T'O=∠T'OO';

by substitution, the value of angle O'T'O is equal to 90−θ;

since the sum of the included angles in isosceles triangle OO'T' must be 180 degrees, via substitution, $$\angle O'T'O + \angle T'OO' + \angle OO'T' = 180$$

$$(90-\theta) + (90-\theta) + \angle OO'T' = 180$$

$$\angle OO'T' = 180 - 2(90-\theta)$$

$$\angle OO'T' = 2\theta;$$

since the whole is equal to the sum of its parts and via substitution from above, $$\angle OO'T' + \angle T'O'U = \angle OO'U$$

$$2\theta + \angle TOU' = \angle OO'U$$

$$2\theta + (90-30) = \angle OO'U$$

$$90 - \theta = \angle OO'U;$$

whereas the angles residing opposite the equal sides of isosceles triangle U'OO' must be of equal magnitude, then ∠OO'U'=∠O'U'O;

since the sum of the internal angles of isosceles triangle OO'U' must equal 180 degrees, via substitution, $$\angle OO'U' + \angle O'U'O + \angle U'OO' = 180$$

$$\angle OO'U' + \angle OO'U' + \angle U'OO' = 180$$

$$2(\angle OO'U') + 2\theta = 180$$

$$2(\angle OO'U') = 180 - 2\theta$$

$$\angle OO'U' = 90 - \theta;$$

since both angle OO'U', as well as angle OO'U are equal to a magnitude of 90−θ, they must be equal in size to each other; and hence, point U' must reside on straight line O'U.

For the actual representative geometric construction pattern, as is expressed upon the very face of the Euclidean formulation represented FIG. 5, given acute angle VOO' amounts to exactly 16°. As such, angle VOU' must be exactly three times that size, or 48°, and angle TOU' must be equal to its complement, being 42°.

Accordingly, such algebraic proof further validates that even if such 16° given acute angle VOO', as really is depicted in FIG. 5, were to have been of slightly different size, point U' nevertheless would reside somewhere along straight line O'U. This is because the very same sequence of Euclidean operations would have governed the development of another algebraic proof for such altered case, whereby a distinct drawing of somewhat modified overall shape, but one which nonetheless belongs to the very same family of geometric construction patterns, instead would have replaced the representative geometric construction pattern that presently is depicted upon the very face of such Euclidean formulation.

Moreover, since such argument furthermore applies to any distinct overall shape otherwise contained within such distinct family of geometric construction patterns, such alignment of point U' along straight line O'U thereby must pertain to any and all of such drawings which collectively comprise it.

Since such representative geometric construction pattern, as actually is depicted in FIG. 5, very easily could be appended simply by means of incorporating additional steps onto its sequence of Euclidean operations, it furthermore becomes possible to devise a never-ending assortment of Euclidean formulations which stem directly from it.

Accordingly, a derivative Euclidean formulation, as represented in FIG. 7, whose sequence of Euclidean operations builds upon that which was applied to develop such Euclidean formulation, as represented in FIG. 5, by means of appending another three steps onto it, thereby is said to consist of a lengthened seventeen step sequence of Euclidean operations whose last three steps are provided as follows:

step 15—straight line U'O is extended downwards and to the left to a position where its meets such FIRST CIRCULAR PORTION, whereby such intersection point becomes designated as point W;

step 16—straight line OO' is perpendicularly bisected such that the position where its downward extension intersects such FIRST CIRCULAR PORTION becomes designated as point X; and step 17—straight line OX becomes drawn.

FIG. 14 depicts a second derivative Euclidean formulation, thereby serving as an example of how to create others. Therein, member notations and shadings that are specified upon prior Euclidean formulations have been omitted because they no longer are needed. However, in their absence, a rectangle appears whose upper two corners align with point T' and point U' therein. Such drawing can be geometrically constructed by means of appending the seventeen step sequence of Euclidean operations which such derivative Euclidean formulation, as posed in FIG. 7, was generated from into a somewhat larger twenty-one step sequence of Euclidean operations by incorporating steps 18 through 21 onto it as follows:

step 18—straight line T'U' is drawn;

step 19—a straight line passing through point T' is drawn perpendicular to straight line OO';

step 20—an additional straight line passing through point U' is drawn perpendicular to straight line OO'; and step 21—the intersection between radii OU' and O'T' is designated as point Y.

The proof that such newly drawn straight line T'U' runs parallel to radius OO' for all magnitudes which given angle VOO' could assume, is provided directly below:

since angle OO'T' and angle U'OO', as included in triangle OO'Y, both are equal to a magnitude of 2θ, such triangle must be isosceles, whereby their opposite sides OY and O'Y must be of equal length;

whereas, straight line OO' constitutes a radius belonging to both such FIRST CIRCULAR PORTION and SECOND CIRCULAR PORTION, as posed in FIG. 14, radii OU' and O'T', by being equal in length to it, must be equal in length to each other;

since the whole is equal to the sum of its parts, via substitution from above, $$OU'=O'T'$$

$$OY+YU'=O'Y+YT'$$

$$OY+YU'=OY+YT'$$

$$YU'=YT';$$

hence, triangle T'YU' must be isosceles:

whereas angle OYO' and its vertical angle T'YU' must be of equal magnitude, and the sum of the internal angles of a triangle must equal 180°, it can be stated for isosceles triangles OYO' and T'YU' that, $$\begin{aligned}180° &= \angle T'YU' + 2(\angle YU'T')\\ &= \angle OYO' + 2(\angle YU'T')\\ &= \angle OYO' + 2(\angle YOO');\end{aligned}$$

hence, since ∠YU'T' must be equal in magnitude to ∠YOO', straight line T'U' therefore must be parallel to radius OO' because radius OU', by means of acting as a transversal, distinguishes such angles to be alternate interior angles of equal magnitude with respect to each other.

The double arrow convention, as depicted in such second derivative Euclidean formulation posed in FIG. 14, indicates that point T' intersects the +y-axis upon all drawings which belong to its distinguished family geometric construction patterns. This is because the addition of such rectangle has no bearing whatsoever upon the outcome posed by such derivative Euclidean formulation, as depicted in FIG. 7, because it is represented only by phantom lines which either can grow or shrink in size as the magnitude of given angle VOO' becomes altered in variable size, denoted as θ.

A third derivative Euclidean formulation, as posed in FIG. 21, builds upon such previously described twenty-one step sequence of operations. However, because angle VOU', while still amounting to a magnitude of 3θ therein, nevertheless is to be geometrically constructed in an entirely different manner, the following steps do not apply to FIG. 21:

steps 6-8; and steps 12-21;

Instead, the following additional steps complete the sequence of operations for such third derivative Euclidean formulation:

step 22—straight line OO' is perpendicularly bisected such that the position where its upward extension intersects straight line O'T' becomes designated as point Y;

step 23—a radius is drawn which emanates from center point O, passes through point Y, and terminates at a location upon such FIRST CIRCULAR PORTION which becomes designated as point U';

step 24—straight line O'T' is extended to a position where its intersects such FIRST CIRCULAR PORTION, thereafter designated as point Z;

step 25—straight line OZ is drawn;

step 26—phantom line U'Z becomes drawn; and step 27—orthogonal transformed axes $x_T$ and $y_T$ are geometrically constructed with point O furthermore designating their origin, such that the $+y_T$ axis superimposes upon radius OU', as previously drawn therein.

An accounting of such additional steps is furnished as follows:

step 22 above replaces steps 16 and 21; and step 23 above replaces step 7.

To summarize, the entire sequence of operations from which such third derivative Euclidean formulation, as posed in FIG. 21, was developed consists of the following steps:

steps 1-5;

steps 9-11; and steps 22-27.

A reconciliation of the various angles appearing in FIG. 21 is provided below:

whereas it previously was proven that angle OO'T' is of magnitude 2θ whenever the magnitude of given angle VOO' is algebraically designated to be θ, once furthermore realizing that triangle OO'Y must be isosceles because its vertex Y resides upon the perpendicular bisector of its base OO', it must be that angle VOU' amounts to a magnitude of 3θ because, $$\begin{aligned}\angle VOU' &= \angle VOO' + \angle O'O\ U'\\ &= \angle VOO' + \angle O'O\ Y\\ &= \angle VOO' + \angle O\ O'Y\\ &= \angle VOO' + \angle OO'T'\\ &= \theta + 2\theta\\ &= 3\theta;\end{aligned}$$

moreover, with straight line OZ being geometrically constructed to be of equal length to straight line OO', triangle OO'∠also must be isosceles. Therefore its included angle ∠OO' must be of magnitude 180-4θ by way of the fact that ∠OO'T'=∠OO'Z=∠O'∠O=2θ. Also, since angle VOO' is equal to θ, with the whole being equal to the sum of its parts:

$$\angle VOZ = \angle VOO' + \angle O'OZ$$

$$\begin{aligned}\angle VOZ &= \angle VOO' + \angle ZOO' \\ &= \theta + (180 - 4\theta) \\ &= 180 - 3\theta.\end{aligned}$$

Thus, the angle which is supplementary to obtuse angle VOZ must be equal to 3θ. Once the length of straight line OZ becomes algebraically expressed by the Greek letter ρ, and the sin (3θ) becomes designated by the Greek letter η, point Z thereby must reside a vertical distance of ρη above the x-axis. This same condition naturally applies for point U' since angle VOU' also is of magnitude 3θ with straight line OU' also having been geometrically constructed to be of equal length to straight line OO'.

Hence, phantom line U'Z must remain parallel to the x-axis, even during conditions when such given angle VOO' of designated magnitude θ varies in size, as it is capable of doing in such third derivative Euclidean formulation, as is represented in FIG. 21. This is because the vertical distances both being dropped from point Z and point U' to an x-axis, furthermore represent projections of length ρη. Such projections very easily furthermore could be considered as opposite equal length sides of a rectangle, thereby imposing the requirement that phantom line U'Z must remain parallel to such x-axis at all times.

As such, once the double arrow convention becomes applied to FIG. 21, such illustration may be construed to be the Euclidean formulation of an entire family of geometric construction patterns in which angle VOU' must be of size 3θ and angle VOZ must be of magnitude 180−3θ whenever given angle VOO' is of designated magnitude θ; such that point U' and point Z must reside the same distance above the x-axis as for all geometric construction patterns that belong to such family.

As given angle VOO' varies in size, because each intersection point Y between straight line OU' and straight line O'T' furthermore must reside upon the perpendicular bisector of straight line OO', such complete family of geometric construction patterns, as depicted in FIG. 21, can be filmed in consecutive order for purposes of replicating the motion of a car jack as it otherwise either could be raised or lowered when attempting to change a tire.

Hence, it could be said that a car jack configuration of such design could regulate angle VOU' so that its size always amounts to exactly three times the size of given angle VOO' during conditions when its magnitude becomes varied.

The actual mechanics behind such activity simply is that:

as given angle VOO' of designated magnitude θ becomes adjusted in size, angle OO'T' always must be equal to double its size, amounting to a magnitude of 2θ due to the geometric construction of isosceles triangle OO'T' thereby exhibiting two angles of (90−θ) size; such that once straight line OU' is located so that it emanates from center point O and passes through point Y, being the intersection point between straight line O'T' and the perpendicular bisector of straight line OO', the latter of which furthermore represents the base of isosceles triangle OO'Y, then angle O'OU' which thereby becomes described also must be equal in size to angle OO'T', amounting to a magnitude 2θ; such that angle VOU' must be equal to the sum of the magnitudes of such given angle VOO' plus angle O'OU' which calculates to θ+2θ=3θ.

Moreover, notice that such geometry additionally features anti-parallelogram OU'O'T', as described by the fact that its diagonals OU' and O'T' are of the same length and intersect at point Y, which is located upon a perpendicular bisector of a straight line OO' that connects two of the endpoints of such diagonals together. Proof of this lies in the understanding that such description can occur only when triangle YOT' is congruent to triangle YO'U', such that the other requirement of being an anti-parallelogram, being that its opposite sides OT' and O'U' are of equal length also becomes fulfilled. Such proof relies upon a side-angle-side (SAS) determination wherein:

straight line YO and straight line YO' of isosceles triangle YOO' must be of equal length;

angle T'YO must be equal in magnitude to vertical angle U'YO'; and straight line YT' and straight line YU' must be of equal length because they complete respective straight line O'T; and straight line OU', also being of equal lengths.

The actual motion of such anti-parallelogram OU'O'T', as furthermore replicated by means of animating, in consecutive order, the unique drawings which belong to the distinct family of geometric construction patterns which is represented by such third derivative Euclidean formulation, as posed in FIG. 21, is entirely different from that which otherwise would be portrayed by such articulating such Kempe anti-parallelogram construction, as it appears in the prior art formerly depicted in FIG. 1A; principally because the two opposite sides of such anti-parallelogram OU'O'T', appearing previously as straight line segments OT' and O'U' in FIG. 14, although always remaining of equal length to each other, nonetheless must vary in size during flexure.

This becomes clear by further examining FIG. 21 and noticing that as given angle VOO' varies in magnitude, point T' must move vertically along the y-axis whereby, as straight line segment OT' changes in overall length, the straight line distance between point O' and point U' also must adjust accordingly to be equal to such length.

Accordingly, such car jack arrangement, while preserving the features of a previously described anti-parallelogram, by means of removing is side members enables the distances that become interposed therein to vary while remaining of equal length.

FIGS. 7, 9 and 11 thereby represent just three examples of how the distinct sequence of Euclidean operations which such unique Euclidean formulation was predicated upon, as posed in FIG. 5, furthermore could be appended and/or modified in order to establish additional Euclidean formulations of entirely different overall compositions.

FIGS. 5, 7, 9, and 11 essentially form a network of Euclidean formulations which allows for a wider base of unique embodiments to thereby become prescribed, all of which become capable of trisecting angles in entirely different ways.

Notice that such double arrow convention is notated in all of such Euclidean formulations. In FIG. 21, such notation is indicative of the fact that as given angle VOO' varies in size, phantom straight line U'Z, as well as phantom straight line T'Z (being an extension of straight line O'T') thereby represent adjustable lengths.

In order to provide a motion related solution for the problem of the trisection of an angle, a particular mechanism could be devised to have its fundamental architecture regenerate a static image that automatically portrays a trisector for a singular angle of any designated magnitude which such device could be set to.

In the event that such singular angle turns out to be acute, its magnitude algebraically could be denoted as 3θ by considering θ≤3θ°. Then, for a condition in which such singular angle instead turns out to be obtuse, its size would be expressed as a supplemental value, thereby becoming algebraically denoted as either 180−3θ, or 270−6θ.

By means of choosing a suitable Euclidean formulation from such FIG. 42 Euclidean Formulation Rendered Angle Relation Table that refers directly to such determinable algebraic expression, a drawing could be identified out of its vast family of geometric construction patterns whose rendered angle value matches the very magnitude of such singular designated angle.

Then, in the event that the static image which becomes regenerated furthermore could be fully described by such identified drawing, its portion which corresponds to the given angle of such drawing automatically would portray a bona fide trisector for such device setting.

Serving as an example of such rather cumbersome logic, a particular device of such type is to be set to a designated magnitude of 123.3°.

Since 90°≤123.3°≤180°, such designated angle would qualify as being obtuse whereby:

in one case 180°−3θ=123.3°

60°−θ=41.1°

−θ=41.1°−60°

θ=18.9°;

for the static image that becomes regenerated in such case to automatically portray a trisector of 41.1° magnitude, according to such FIG. 42 Euclidean Formulation Rendered Angle Relation Table, the overall shape of such angle, thereby algebraically expressed therein as being of 60°−θ size, would have to match that which appears within a unique geometric construction pattern that could be drawn by commencing from a given angle of VOO' of 18.9° magnitude, upon which becomes executed all of the remaining commands which are specified in the distinct sequence of Euclidean operations for either of such Euclidean formulations, as posed in FIG. 7 and FIG. 14.

Secondly, for such other case 270°−6θ=123.3°

90°−2θ=41.1°

−2θ=41.1°−90°

2θ=48.9°

θ=24.45°; and for the static image that becomes regenerated in such other case to automatically portray a trisector of 41.1° magnitude, according to such FIG. 42 Euclidean Formulation Rendered Angle Relation Table, the overall shape of such angle, thereby algebraically expressed therein as being of 90°−2θ size, would have to match that which appears within a unique geometric construction pattern that could be drawn by commencing from a given angle of VOO' of 24.45° magnitude upon which becomes executed all of the remaining commands which are specified in the distinct sequence of Euclidean operations for such third derivative Euclidean formulation, as posed in FIG. 21.

A Trisection Capabilities Table, as afforded in FIG. 43, indicates that all four embodiments of such newly proposed invention can trisect acute angles, but only such second, third, and fourth embodiments are capable of trisecting obtuse angles, as well.

Besides the heading entitled NEWLY PROPOSED ARTICULATING TRISECTION INVENTION EMBODIMENT NAME which appears therein, under which the four embodiments of such newly proposed invention again individually are cited, another major heading named DESIGNATED MAGNITUDES THAT CAN BE TRISECTED is provided in FIG. 43 under which two columns are furnished whose respective headings are entitled, ACUTE ANGLE SETTINGS and OBTUSE ANGLE SETTINGS. Entries contained therein algebraically express designated sizes of acute angles, as well as obtuse angles that such four embodiments could be properly set to in order to perform trisection. For example, the second line item listing provided therein indicates that the second embodiment of a newly proposed invention can trisect virtually any acute angle of algebraically expressed 3θ designated magnitude that it possibly could be properly set to, as well as any associated obtuse angle that is algebraically expressed to be of a supplemental 180−3θ magnitude.

Whereas the fundamental architecture of any properly set embodiment is designed to regenerate static images whose overall outlines superimpose directly upon associated drawings belonging to a corresponding Euclidean formulations which can be identified according to such very important FIG. 4 Figure Number Table, for any discrete device setting, as algebraically is expressed in such FIG. 43 Trisection Capabilities Table, a singular solution for the problem of the trisection of such angle must exist!

The very angle which specifies such actual solution can be identified simply by means of referring to such FIG. 42 Euclidean Formulation Rendered Angle Relation Table and obtaining its name in the entry which appears directly under such heading entitled, GIVEN ANGLE(S), that also resides in the same row as the particular Euclidean formulation listing which is being assessed at any particular point in time.

As an illustrative example, consider that such third embodiment is intended to trisect an obtuse angle of 143.67° designated magnitude, whereby:

such FIG. 43 Trisection Capabilities Table indicates that the third embodiment can perform trisection successfully, in this particular case, because such 143.67° obtuse magnitude algebraically can be expressed by the notation 180−3θ;

for such third embodiment, such FIG. 4 Figure Number Table indicates that a solution for its successful trisection exists as one of the geometric construction patterns which belongs to such second derivative Euclidean formulation, as posed in FIG. 14;

then, for such second derivative Euclidean formulation, as posed in FIG. 14, such FIG. 42 Euclidean Formulation Rendered Angle Relation Table specifies that such solution consists of an angle VOX, algebraically denoted therein to be of 60−θ magnitude;

with such FIG. 4 Figure Number Table furthermore indicating that the drawing package for such third embodiment consists of FIG. 15 through FIG. 20; and whereby such FIG. 15 illustrates that when such third embodiment would become set to a value of 3θ=180°−143.67°=36.33°, a supplemental angle VOW amounting to a magnitude of 143.67° could be drawn; whereby its trisecting angle VOX additionally could be geometrically constructed by means of ascertaining where the perpendicular bisector to the longitudinal centerline of linkage OO' intersects the arc of such device's protractor board residing underneath.

Hence, in order to realize such solution, such third embodiment only would need to be set to a designated magnitude of 36.33°.

During such type of event, a static image would be regenerated by such third embodiment whose automatically portrayed overall outline furthermore would be representative of the very shape that its fundamental architecture assumes at such particular point in time, as specifically comprised of longitudinal centerlines of its constituent linkages and radial centerlines of its interconnecting pivot pins that are specifically designed to superimpose directly upon the respective straight lines and associated intersection points contained within the particular geometric construction pattern which just was described above.

Such FIG. 43. Trisection Capabilities Table specifically discloses that all four embodiments can trisect acute angles; but only such second, third and fourth proposed embodiments can trisect obtuse angles of varied magnitudes.

Such second embodiment, although consisting of virtually the same design as the first, features slight modifications to account for its capability to additionally trisect angles of obtuse designated magnitudes.

Naturally, such improved capability comes at a slightly higher price, thereby making two different options available for public consumption, either of which could be chosen for purchase based solely upon personal preference.

In order to better account for such noted design differences, the first embodiment also now may be referred to as the basic configuration, whereas the second embodiment instead has been accorded an alternate name of the modified configuration.

An Embodiment Alternate Names Table, as afforded in FIG. 44 makes it easy to remember such alternate names, wherein the appellations of rhombus configuration and car jack configuration also respectively have been assigned to such third and fourth embodiments; chosen for the reason that they denote distinguishing characteristics evident within each of their inherent designs.

More specifically stated, in the second column of FIG. 44, under the heading entitled, EMBODIMENT ALTERNATE NAME, an alternate name entry is afforded for each of the individual embodiment entries listed in the first column therein, as cited under the recurring heading called NEWLY PROPOSED ARTICULATING TRISECTION INVENTION EMBODIMENT NAME.

By now referring back to the drawing packages for each of such four embodiments, as itemized in the third column of FIG. 4, it should become quite apparent that the principal portions of such first embodiment, or basic configuration, as represented in FIG. 6, consist of:

a compass assembly, as denoted by darker shading, that is comprised of a triangular shaped compass shaped apparatus, whose vertices are defined by axis T, axis O and axis U', respectively, upon which an appendage, positioned in between axis O and axis V is incorporated that extends out from the end of member OT for purposes of reshaping it into an inverted L-shaped member TOV, such that the longitudinal centerlines of its constituent linkages and radial centerlines of its three aforementioned axes can be to superimpose directly upon isosceles triangle TOU' and the +x-axis of virtually any geometric construction pattern which belongs to its corresponding Euclidean formulation, as posed in FIG. 5;

a counterbalance compass assembly, as denoted by lighter texture therein, which is comprised of another triangular shaped compass shaped apparatus, whose vertices are defined by axis T', axis O' and axis U, respectively, to which an individual slide mechanism is adjoined at axis T', such that the longitudinal centerlines of its constituent linkages and radial centerlines of its three aforementioned axes can be reconfigured to superimpose directly upon isosceles triangle T'O'U of any geometric construction pattern which belongs to its corresponding Euclidean formulation, as also is posed in FIG. 5; and an interconnecting linkage, whose ends, by means of terminating at axis O and axis O', are attached to the respective lower hinges of such compass and counterbalance compass assemblies, such that its longitudinal centerline can be aligned directly upon straight line OO' within any of the geometric construction patterns which are represented by such Euclidean formulation, as also is posed in FIG. 5.

Such second embodiment, or modified configuration, expands upon the capabilities of such basic configuration in order to trisect obtuse angles, as well, by way of elongating linkage U'O of the compass assembly of such first embodiment, as previously represented in FIG. 6, in order to form member U'W, as depicted in FIG. 9; and also reshaping its interconnecting linkage into an equilateral triangular arm whose vertices reside at axis O, axis O', and axis X, respectively in such FIG. 9. Moreover, the longitudinal centerlines of added linkages OX and O'X, along with the additional radial centerlines located at axis W and axis X, as posed in such FIG. 9 modified configuration, are designed to superimpose directly upon the added corresponding portions of such derivative Euclidean formulation, as posed in FIG. 7 once such device becomes properly set.

Such third embodiment, or rhombus configuration, consists of an arrangement of slotted linkages in combination with opaque and transparent solid linkages interconnected via pivot pins. Such linkages are designed to exhibit overall outline patterns which are identical to those of respective first embodiment members. The only exceptions to this rule apply to:

member OU', as it appears in FIG. 6, which has been elongated in order to assume the shape of member OY' extended in FIG. 15;

members T'U extended and U'T extended, as posed in FIG. 6, which have been shortened in order to assume the shapes of respective repositioned members T'Y' and TY" in FIG. 15;

linkage O'U pertaining to FIG. 6, which has been repositioned, thereby assuming the form of linkage O'Y" in FIG. 15;

shoulder screws, as depicted at axes T and U in FIG. 6, which have been replaced by less expense dowels situated respectively at axes T and Y" in FIG. 15;

the appendage, positioned between axis O and axis V in FIG. 6, which has been replaced in FIG. 15 by a less expensive straight line which represents the OV segment of the +x-axis of a protractor is imprinted on a thin underlying board; and an additional dowel which has been incorporated at axis Y, as shown in FIG. 15.

Such fourth embodiment, or car jack configuration, consists of two separate arrangements, both of which are completely capable of performing trisection in virtually the very same manner.

The names which they have been accorded are indicative of inherent design attributes which are characteristic to them, as listed below:

a slotted linkage arrangement, as depicted in FIG. 22 thru FIG. 28; and a slider arrangement, as depicted in FIG. 29 thru FIG. 41.

The slider arrangement differs from such slotted linkage arrangement in the following respects:

its solid linkages are thinner because they don't have to account for the extra space which slots occupy, thereby being proportionately stronger, while costing less to fabricate and availing more surface area upon which to display descriptive nomenclature;

its low profile rivets abet device miniaturization by being of very small relative diameter with respect to dowels which otherwise become applied within such slotted linkage arrangement. Hence, they can be located where they don't pose any obstructions to the relative movements of solid linkages which thereby can pass effortlessly through surrounding sliders;

its assembled components become inserted into a toploader which protects it from damage, enables it to be easily transported, and also houses standoffs which maintain the necessary clearances to enable such device to articulate in an unobstructed fashion inside of it;

its adjustment linkage replaces the slide, formerly incorporated into such slotted linkage arrangement, thereby enabling such device to be operated remotely from outside such toploader;

its pair of easels are glued to opposing sides of the rear of such toploader in order to allow the entire device to become erected, thereby allowing for its easy viewing and manipulation;

its axes are ruled to enable exact lengths to be exactly measured whose ratios with respect to a length of unity constitute cubic irrational numbers; thereby representing distances which otherwise only can be approximated by conventional Euclidean means; and its protractor has its lower quarter replaced by operating instructions.

With particular regard to such slider arrangement, some linkages, or portions thereof, as are depicted to be transparent in FIG. 29, otherwise appear as opaque in FIGS. 30 and 31. Such alteration enables a better viewing of how the various linkages are stacked during their assembly, as is to be described in further detail later. Moreover, it suggests that all linkage materials do not have to be transparent. Instead of being fabricated out of polycarbonate, for example, such solid linkages thereby alternately could be comprised of aluminum. The incorporation of transparent members, however, makes it possible to clearly decipher protractor readings which reside directly underneath them.

Ruled lines, or scales, also could have been incorporated onto the axes of such other three configurations as well or, perhaps placed along the axes embedded into the protractor strip, as contained in the slotted linkage arrangement of such car jack configuration; thereby providing additional capabilities to portray actual cubic irrational proportions; such as those transcendental trigonometric properties which become distinguishable when portraying a twenty degree angle.

However, this was not done because it only would have resulted in added complexity. But, with respect to each of such first three embodiments of this invention, the process to have done so would be to notch or appropriately mark either the linkages or protractor board locations which directly align with its respective x-axis and y-axis.

Whereas such rhombus configuration and slotted linkage arrangement also respectively include a protractor board and protractor strip where operating instructions could have been posted, this was not done in order to keep the drawings as simple as possible.

Notice that neither the x-axis, nor the y-axis of such two car jack configuration arrangements are named directly upon such devices. This is because the zero and ninety degree readings etched upon their respective protractor strip and protractor/instructions piece of paper serve that purpose.

Both arrangements of the fourth embodiment also avail distinct leveling capabilities. Such is the case because as either of such devices becomes articulated, longitudinal centerlines of their linkages and radial centerlines running along the axes described in FIGS. 22, 23, and 29 superimpose directly upon respective straight lines and intersection points which constitute each of geometric construction patterns contained in such third derivative Euclidean formulation, as posed in FIG. 21. Accordingly, FIGS. 22, 23, 29 and 30 demonstrate this capability pictorially, wherein phantom line U'Z denoted therein remains level, or completely horizontal during actuation; that is, parallel to a zero degree reading which is etched upon such respective stationary protractor strip and protractor/instructions piece of paper when such fourth embodiment becomes either raised or lowered when acting in such capacity.

Unique device markings that apply to the operation of such newly proposed articulating invention are listed as follows:

for such first embodiment, as shown in FIG. 6:

the term GIVEN ACUTE ANGLE is inscribed upon the upper surface of linkage OU';

the term TRISECTOR is inscribed upon the upper surface of linkage OO';

the term LONGITUDINAL AXIS is inscribed upon the upper surface of linkage O'U, centered both above and below the right-hand portion of a straight line which is etched along its longitudinal centerline; and the term SLIDE is inscribed upon the upper surface of a slide mechanism that is used to set such device;

for such second embodiment posed in FIG. 9:

the terms OBTUSE - - - GIVEN ANGLE and GIVEN ANGLE - - - ACUTE are inscribed upon the upper surface of linkage U' W;

the term ACUTE ANGLE TRISECTOR is inscribed upon the upper surface of member OO' of an equilateral triangular arm whose vertices reside at point O, point O', and point X;

the term OBTUSE ANGLE TRISECTOR is inscribed upon the upper surface of member OX of such equilateral triangular arm;

the term LONGITUDINAL AXIS is inscribed upon the upper surface of linkage O'U, centered both above and below the right-hand portion of a straight line that is etched along its longitudinal centerline; and the term SLIDE is inscribed upon the upper surface of a slide mechanism that is used to set such device;

for such third embodiment, as shown in FIG. 15:

the term TRISECTOR is inscribed upon the upper surface of linkage OO';

the term LONGITUDINAL AXIS is inscribed upon the upper surface of linkage T'Y' both above and below the left-hand portion of a double straight line margin which is etched about its longitudinal centerline; and the term SLIDE is inscribed upon the upper surface of a slide that is used to set such device;

for the slotted linkage arrangement of such fourth embodiment, as depicted in FIG. 22:

the term TRISECTOR is inscribed upon the upper surface of linkage OO'; and the term SLIDE is inscribed upon the upper surface of a slide linkage that is used to set such device; and for the slider arrangement of such fourth embodiment, as displayed in FIG. 29:

the term TRISECTOR is inscribed upon the upper surface of linkage OO'; and the term GIVEN ACUTE ANGLE is inscribed upon the upper surface of linkage OU';

the term GIVEN OBTUSE ANGLE is inscribed upon the upper surface of linkage OZ; and the term ADJUSTMENT LINKAGE is inscribed upon the upper surface of the free ended linkage which is hinged at axis T'.

The matter of proposing a motion related solution for the problem of the trisection of an angle has one major drawback; being that oftentimes such solution consists of more than just the simple one step process of merely setting a trisecting emulation mechanism to a designated magnitude.

This is because many devices of this nature can effectively perform trisection only by means of first being specifically arranged into positions before they can become properly set.

From a design standpoint such difficulty can be explained by the understanding that most fundamental architecture configurations that can be formed by trisecting emulation mechanisms regenerate static images which do not prefer motion related trisection solutions for the trisection of an angle!

Such majority proportion of static images consist of shapes that instead cannot be distinguished by a Euclidean formulation whose representative geometric construction pattern exhibits a rendered angle whose magnitude amounts to exactly three times the size of its given angle; thereby being unable to portray a qualified trisector with respect to such rendered angle!

When substantiating that certain trisecting emulation mechanisms can perform trisection accurately over a wide range of device settings, it is important to differentiate between such two completely different types of static images.

Such complication can be resolved by means of splitting such trisection process into two independent operations. This enables trisecting emulation mechanism designs which first need to be configured and/or secured into specific arrangements before they can be properly set apart from those which can perform trisection in just a single step.

Accordingly, such basic operations hereinafter shall be referred to as:

the method for specifically arranging such device so that it can be trisected; and the method for setting such device and completing a motion related trisection solution, thereby consisting of properly setting a trisecting emulation mechanism to an angle of designated size.

As such, for each of the four constituent embodiments which collectively comprise such newly proposed articulating invention, a particular procedure could be formally introduced and thereby adopted; one whose details, once administered and closely adhered to, would assure that trisection could be performed accurately over a wide range of possible device settings.

In support of such endeavor, FIG. 45 is an Invention Trisection Process Chart that specifically describes each of such two processes in detail.

Entries provided in the first column of FIG. 45, appearing under the heading EMBODIMENT NAME AND DEFINING DRAWING NUMBER(S), identify principal figure numbers which were selected from drawing packages, as specified in the third column of FIG. 4 for each of such four embodiments, as itemized therein. Such drawing selections are considered to represent the very best overall pictorial displays for detailing how each of such devices is to be reconfigured in order to perform trisection in a precise manner. Therein, two completely independent sets of activities, as appearing under the heading entitled, ACTIVITIES, are enumerated, as identified in the second and third columns of such FIG. 45 chart by the headings entitled, METHOD FOR SPECIFICALLY ARRANGING DEVICE and METHOD FOR SETTING DEVICE AND COMPLETING MOTION RELATION TRISECTION SOLUTION.

In order to be entirely complete and accurate, it is important that such FIG. 45 chart:

delineate the two methods, as defined above; and be prepared in complete accordance with the operating instructions specified for such slider arrangement, as depicted in FIGS. 29, 30, and 31.

Within such FIG. 45 chart, note that only the third embodiment does not include a method for specifically arranging such device; meaning that it alone can perform trisection in just a single step operation.

Hence, such other three embodiments first need to be specifically arranged prior to engaging in such activity. Very simply stated, such specific arrangement process consists of positioning such first, second, and fourth embodiments to where each of such devices thereafter can be articulated in one quick, easy motion to a finite setting that is indicative of the magnitude of a designated angle that is intended to be trisected; whereby its associated trisector automatically becomes portrayed.

Such FIG. 45 Invention Trisection Process Chart furthermore indicates that:

the same procedure applies to both such first and second embodiments. This is because for such modified configuration, as posed in FIG. 9, a trisector for an obtuse angle VOW of 180−3θ designated magnitude thereby becomes automatically portrayed any time such device becomes specifically arranged and thereafter properly set in accordance with the procedure which is to be applied to such basic configuration in order to trisect an acute angle of 3θ designated magnitude;

the same procedure applies to acute angles, as well as to obtuse angles for such third embodiment, whereby obtuse angle VOW of 180−3θ magnitude, as posed in FIG. 15, also automatically becomes trisected once angle VOU' becomes set to a 3θ reading; but the procedures for trisecting acute and obtuse angles are different for both the slotted linkage arrangement and the slider arrangements of such fourth embodiment, thereby necessitating that four individual trisection processes become specified.

In particular, for such first and second embodiments, the hinges which reside at the lower joints of such compass assembly about axis O and counterbalance compass assembly about axis O' first need to become accurately configured and then secured. This enables such device to thereafter be set into a position which is indicative of trisection.

With respect to FIGS. 6 and 8A, such activity begins by configuring each of the following two angles to a designated magnitude of 90−3θ:

that which is subtended between the longitudinal centerlines of such compass assembly linkages OT and OU' emanating from axis O; as well as that which is subtended between the longitudinal centerlines of such counterbalance compass assembly linkages emanating from axis O'.

Once suitably configured, such basic and modified configurations can be secured into position by means of tightening setscrews about axes T and U, respectively.

Upon completing such activity, the complement of angle TOU', being computed to amount to 90−(90−3θ)=3θ, thereby represents the angle which has been subtended between the respective longitudinal centerlines of appendage OV and linkage OU', furthermore described as angle VOU' of such compass assembly.

Trisection becomes achieved by means of thereafter setting such device. This process consists of translating its slide mechanism inside of the slot afforded within linkage OT until such time that a portion of the straight line imprinted upon the longitudinal centerline of linkage O'U can be observed when peering directly through a small sighting aperture which is drilled through the vertical centerline of the interconnecting pivot pin of such compass assembly which is located at axis U'.

In sharp contrast, such rhombus configuration immediately could be set merely by means of executing the one step process of translating its slide until the parallel double lines etched upon its linkage T'Y' straddle the circumferential arc embedded onto a protractor board whose corresponding reading at axis U', as posed in FIG. 15, amounts to the designated magnitude of an angle that is intended to be trisected. In so doing, linkage OO' automatically becomes repositioned to where its longitudinal centerline with respect to such +x-axis subtends angle VOO' of magnitude θ; thereby trisecting VOU' of designated size 3θ during such process. The very size of such trisector thereby can be easily verified by the actual protractor reading which appears through the hole located at the center of the dowel which resides at axis O'.

Such procedure furthermore applies to any obtuse angle of designated magnitude 180−3θ which is intended to be trisected by such rhombus configuration, excepting that such selected protractor reading about axis U' instead would become that of the supplement of the magnitude of such obtuse angle that is intended to be trisected. For example, the actual protractor reading needed to set obtuse angle VOW, as represented in FIG. 15, to a particular magnitude of 134.34°, would amount to a supplemental value of exactly 45.66°, as would appear straddled directly in between such two parallel lines positioned upon either side of the longitudinal centerline of member T'Y'; thereby enabling trisecting angle VOX to become distinguished by means of geometrically constructing a perpendicular bisector to such longitudinal centerline OO' which locates axis X upon the such protractor board circumferential arc.

Any angle of unknown designated magnitude which is in need of being trisected first needs to be transferred directly onto such rhombus configuration as angle VOU' in order to identify its corresponding angle VOO' trisector value.

Such protractor board could be applied to measure the reading of such unknown designated magnitude in order to thereby set such third embodiment to that particular size.

During such event, such protractor wouldn't actually become involved with the trisection process itself since it is featured as an integral part of such third embodiment exclusively for purposes of:

setting the magnitudes of known designated angles that are intended to be trisected, and thereby automatically portray them;

verifying that trisector readings amount to exactly one-third the magnitudes of respective angles selected for trisection; and measuring the true sizes of angles of unknown designated magnitude which become set into such device.

As specified in such FIG. 45 Invention Trisection Process Chart, the tasks needed to perform trisection for the fourth embodiment are somewhat involved. This is because the configuration for trisecting acute angles is different than that required to trisect obtuse angles for each of its individually designed slotted linkage and slider arrangements. Hence, only when switching from one of such angular types to the other, does a device reconfiguration actually become necessary. In particular, such reconfiguration consists merely of clocking by a magnitude of 90−3θ either the configuration represented in:

FIG. 22 with respect to FIG. 26; or

FIG. 29 with respect to FIG. 31.

above clocking consists of rotating either the entire:

slotted linkage arrangement with respect to its underlying protractor strip; or slider arrangement with respect to its underlying protractor/instructions piece of paper and outlying toploader.

To account for such disparity between acute angle and obtuse angle specific arrangements, the entire representative geometric construction pattern, as shown upon the very face of such third derivative Euclidean formulation posed, as posed in FIG. 21, needs to be rotated a total of 90−3θ degrees, or radians, in the counterclockwise direction about its origin located at point O. Since there is not an underlying protractor, or outlying toploader appearing in such drawing, such activity involves rotating the entire drawing, as shown, including its +x-axis, its +y-axis, and also its orthogonal transformed $+x_T$-axis and $+y_T$-axis, as well; thereby realigning such transposed axis $x_T$ and $y_T$ so that they then respectively run horizontally and vertically, no matter what actual size such given angle θ amounts to, as is shown to occur in both FIGS. 26 and 31. Naturally indications posted therein are denoted only as references since they do not actually appear upon such mechanisms, whereby only the zero and ninety degree markings upon such respective protractor strip and protractor/instructions piece of paper actually are designed into such devices.

A detailed explanation of such approach is furnished below for the express condition when either of such arrangements needs to be adapted from a configuration that can trisect only acute angles to one which instead becomes capable of performing obtuse angle trisection:

for such slotted linkage arrangement, as represented in FIG. 22, the shoulder screw positioned at axis T first needs to be removed; thereby enabling the entire portion of such slotted linkage arrangement which lies upon its protractor strip to be rotated in a counterclockwise direction with respect to it until such time that axis U' of linkage OU' appears at its ninety degree reading;

whereupon such screw thereafter could be reinserted into such linkage at axis U' and thereby secured into such protractor strip. After such activity, the slotted linkage arrangement then would assume the specific arrangement represented in FIG. 26, whereby it successfully could perform obtuse angle trisection by means of thereafter becoming properly set; and for such slider arrangement, as represented in FIG. 29, linkage OU' first becomes rotated to the seventy degree reading upon its protractor/instructions piece of paper by means of maneuvering its adjustment linkage from outside of the toploader; next, the pin positioned at axis T is to be removed; thereafter, the entire portion of such slider arrangement which lies upon its protractor/instructions piece of paper can be rotated in a counter-clockwise direction with respect to it until such time that axis U' of linkage OU' appears at its ninety degree reading; whereupon such pin thereafter could be reinserted into such rotated linkage at axis U' and thereby secured into a clutch which resides underneath such device. After such activity, the slider arrangement then would assume the configuration presented in FIG. 31 whereby it successfully could perform obtuse angle trisection upon thereafter becoming properly set.

The reason for first setting linkage OU' to seventy degrees is to allow sufficient room for the rivet located at axis T in FIG. 29, to be rotated underneath the adjustment linkage to a new position which can accommodate the trisection of obtuse angles. As described in further detail later, such rivet which passes through axis T had its stem removed after pull-up operations in order to allow such pin either to be inserted through it, or else to be entirely removed from it. Such positioning to seventy degrees moves the slider which resides along linkage OT very close to axis T. Such placement overcomes the overall height limitation experienced at axis T where there is a necking down closer to the toploader edges. Such action works in combination with the adjustment linkage pad, located at the very top of such toploader, in order to avail adequate clearance.

In order to thereafter properly set such car jack configuration to perform:

acute angle trisection, either the slide linkage shown in FIG. 22 or the adjustment linkage shown in FIG. 29 needs to be maneuvered in order to set the longitudinal centerline of linkage OU' to a designated magnitude of 3θ with respect to the +x-axis. In so doing, an associated trisector then can be confirmed to emerge that is exactly one-third of its value by means of viewing a reading of magnitude θ which thereby would appear at the juncture where the longitudinal centerline of linkage OO' crosses the circle etched onto either such protractor strip or protractor/instructions piece of paper; and obtuse angle trisection, either the slide linkage shown in FIG. 26 or the adjustment linkage shown in FIG. 31 needs to be translated until such time that the longitudinal centerline of linkage OZ becomes set to a designated size amounting to 270−6θ with respect to the $+x_T$-axis. In so doing, an associated trisector then could be confirmed to amount to precisely one-third of its value since a reading of size 90−2θ would appear, as subtended between centerline of linkage OO' and such previously noted $+x_T$-axis.

Defining embodiment drawings, consisting of FIGS. 6, 9, 15, 22, 26, 29 and 31, as listed in the first column of FIG. 45, are significant because each is entirely representative of the particular device configuration which is cited directly above it, but only such device becomes properly set to a designated magnitude which matches the magnitude of the rendered angle that is depicted upon the very face of the representative geometric construction pattern that appears upon its corresponding Euclidean formulation, as cited in such FIG. 4 Figure Number Table. As an example of such direct correspondence, when considering the slotted linkage arrangement of such fourth embodiment and thereby viewing FIG. 22, it readily can be observed that the actual 48° designated magnitude which is indicated to have been set into such device, as evidenced by the very reading which appears upon its protractor strip at axis U', is the same as the magnitude of rendered angle VOU', as it appears directly upon the face of such FIG. 21 third derivative Euclidean formulation, whose identity was obtained by means of referring to FIG. 4.

The advantage of each defining embodiment drawing is that the static image which becomes regenerated at such distinct device setting thereby automatically must portray an overall outline that can be described by such corresponding representative geometric construction pattern, thereby posing a motion related solution for the problem of the trisection of an angle, as summarized in an all inclusive chart which is presented in FIG. 46.

Entries provided in the first column therein, under the heading entitled, DEFINING EMBODIMENT DRAWINGS are the same as those which are tabulated in FIG. 45; whereby corresponding listings of specific device settings which appear in each of such cited defining embodiment drawings are specified in the second column therein, appearing under the heading entitled, DEPICTED DEVICE SETTINGS. The third column of FIG. 46 thereby identifies an associated trisector for each of such specified settings under another heading entitled MOTION RELATED SOLUTION appearing therein.

Such FIG. 46 chart indicates that when viewing FIG. 26, an angle of 90°+∠U'OZ size, as algebraically expressed to be of 270°−6θ magnitude therein, actually represents a 174° obtuse designated magnitude that is shown to have been properly set into such slotted linkage arrangement of such fourth embodiment, as further evidenced according to the reading appearing upon its protractor strip at axis Z; thereby regenerating a static image whose 90°−∠O'OU' portion, algebraically expressed as being of 90°−2θ size therein, amounts to a 58° magnitude which poses a motion related solution for such setting. Moreover, such singular solution can be verified by acknowledging that the overall outline which becomes automatically portrayed by such regenerated static image furthermore fully can be described by the representative geometric construction pattern which appears upon the very face of such FIG. 21 third derivative Euclidean formulation, as is listed alongside of such car jack configuration defining embodiment drawing FIG. 26 appearing in such FIG. 4 Figure Number Table.

As another example of the type of association which could be drawn by means of referring to such FIG. 46 chart, upon considering an obtuse angle of 270°−6θ=150° that becomes set into such slider arrangement, as depicted in FIG. 31, as amounting to the very reading which appears therein at axis Z, another unique geometric construction pattern which belongs to its corresponding FIG. 21 third derivative Euclidean formulation, but whose given angle VOO' this time amounts to twenty degrees, could be used to verify that a motion related solution for the problem of the trisection of an angle indeed could become automatically portrayed; by thereby neglecting use of its distinguishing representative geometric construction pattern whose given angle VOO' amounts to only sixteen degrees.

Although featuring unique control mechanisms, CATEGORY I sub-classification B articulating trisection devices nevertheless can be grouped together because they all features similar fan array designs. This can be verified merely by means comparing their individual designs to one another. The results of such activity are presented in FIG. 47.

Therein, first column entries, as cited under the heading entitled, EMBODIMENT NAME AND FIGURE NUMBER OF CORRESPONDING EUCLIDEAN FORMULATION, summarize listings that appear in the first two columns of FIG. 4. Radii listings, appearing in groups of three, as cited in the second column of such FIG. 47 Category I Sub-classification B Conforming Aspect Chart, under the heading entitled, FAN PORTION RADIUS LISTINGS, align upon the longitudinal centerlines of linkages that comprise the spokes of such fan arrays. The third column therein, as headed by the words FAN PORTION COMMON INTERSECTION POINT LISTINGS, is devoted to identifying common intersection points which align upon the radial centerlines of interconnecting pivot pins that are located at the respective hubs of such fan arrays.

For CATEGORY I, expanded sub-classifications definitions are provided below, as are premised upon new terminology which previously was furnished at the outset of this section:

a CATEGORY I, sub-classification A device hereinafter shall regarded to be any articulating trisection device which features four linkages of equal length, excepting that lengths of double that size also are permissible, all hinged together about their longitudinal centerlines by an interconnecting pivot pin that is passed through one end portion of each such that its radial centerline aligns upon the common meeting point of such linkage longitudinal centerlines, or instead is passed through the center portion of a linkage which is twice such length; thereby collectively constituting the array of a fan which, in combination with the longitudinal centerlines of linkages and radial centerlines of interconnecting pivot pins which collectively comprise its incorporated unique control mechanism, features a fundamental architecture that is capable of regenerating a multitude of static images over a wide range of device settings; whereby such automatically portrayed overall outlines furthermore can be described by an entire Euclidean formulation which can distinguish a central angle that amounts to the size of any designated angle which can be set into such device, as subtended between two radii of a circle which thereby becomes divided into three equal angular portions by two other radii; and a CATEGORY I, sub-classification B device hereinafter shall be regarded to be any articulating trisection device which features three linkages of equal length, excepting that lengths of double that size also are permissible, all hinged together about their longitudinal centerlines by an interconnecting pivot pin that is passed through one end portion of each such that its radial centerline aligns upon the common meeting point of such linkage longitudinal centerlines, or instead is passed through the center portion of a linkage which is twice such length, thereby collectively constituting the array of a fan which, in combination with the longitudinal centerlines of linkages and radial centerlines of interconnecting pivot pins which collectively comprise its incorporated unique control mechanism, features a fundamental architecture that is capable of regenerating a multitude of static images over a wide range of device settings; whereby such automatically portrayed overall outlines furthermore can be described by an entire Euclidean formulation which can distinguish a central angle that amounts to the size of any designated angle which can be set into such device, as subtended between two radii of a circle which thereby becomes trisected by another radius.

Next, CATEGORY I, sub-classification B device similarities are presented, whereby:

for the first embodiment of such newly proposed articulating trisection invention, three equal length linkages are featured in FIG. 6 that consist of linkage segment OV, as belonging to an inverted L-shaped member VOT, and furthermore belonging to its compass assembly, interconnecting linkage OO', and linkage OU' also belonging to its compass assembly, all hinged together about their longitudinal centerlines by an interconnecting pivot pin, whose radial centerline aligns with axis O, that passes through an end portion of linkage OU', then through the vertex of inverted L-shaped member VOT, and thereafter into interconnecting linkage OO', thereby collectively constituting the array of a fan which, in combination with its incorporated unique control mechanism, features a fundamental architecture that is capable of regenerating a multitude of static images over a wide range of device settings; whereby such automatically portrayed overall outlines furthermore can be described by such Euclidean formulation, as posed in FIG. 5 herein, whose central angle VOU', as subtended between radius OV and radius OU', and amounting to the size of any designated angle which such device can be set to, as algebraically denoted to be of overall magnitude 3θ therein, is trisected by angle VOO' shown therein to be of variable magnitude θ;

for the second embodiment of such newly proposed articulating trisection invention, three linkages are featured in FIG. 9 that consist of linkage segment OV of inverted L-shaped member VOT, as belonging to its compass assembly, either linkage segment OO' of equilateral triangular arm OO'X, used for performing acute angle trisection, or its linkage segment OX used for trisecting obtuse angles, both of the same length as linkage segment OV of inverted L-shaped member VOT, as well as elongated linkage WU' of double their length, also belonging to its compass assembly, all hinged together about their longitudinal centerlines by an interconnecting pivot pin, whose radial centerline aligns with axis O, that passes through the center portion of such linkage WU', then through the vertex of inverted L-shaped member VOT, and thereafter into the vertex of such equilateral triangular arm OO'X which resides between its linkage segments OO' and OX, thereby collectively constituting the array of a fan which, in combination with its incorporated unique control mechanism, features a fundamental architecture that is capable of regenerating a multitude of static images over a wide range of device settings; whereby such automatically portrayed overall outlines furthermore can be described by such derivative Euclidean formulation, as posed in FIG. 7 herein, whose central angle VOU', as subtended between radius OV and radius OU', and amounting to the size of any designated angle which such device can be set to, as algebraically denoted to be of overall magnitude 3θ therein, is trisected by angle VOO' shown therein to be of variable magnitude θ, such that angle VOW, by virtue of being supplementary to such central angle VOU', as subtended between radius OV and radius OW, and algebraically denoted to be of overall size 180−3θ therein, is trisected by angle VOX shown therein to be of variable magnitude 60−θ;

for the third embodiment of such newly proposed articulating trisection invention, two straight lines and a linkage are featured in FIG. 15 that consist of protractor horizontal line segment OV, linkage OO', and straightedge segment WU' of double their length which passes through both the origin of such protractor board located at axis O, as well as through a specific protractor circumferential arc reading which appears between parallel lines that straddle the longitudinal centerline of linkage T'Y', thereby locating axis U', all hinged together about their longitudinal centerlines by an interconnecting pivot pin, whose radial centerline aligns with axis O, that passes through an end portion of linkage OO', and then into such protractor board at a location where its radial centerline additionally passes through the intersection point between an end portion of its horizontal line segment OV and the midpoint of such straightedge segment WU', thereby collectively constituting the array of a fan which, in combination with its incorporated unique control mechanism, features a fundamental architecture that is capable of regenerating a multitude of static images over a wide range of device settings; whereby such automatically portrayed overall outlines furthermore can be described by such second derivative Euclidean formulation, as posed in FIG. 14 herein, whose central angle VOU', as subtended between radius OV and radius OU', and amounting to the size of any designated angle which such device can be set to, and is algebraically denoted as being of overall magnitude 3θ therein, is trisected by angle VOO' shown therein to be of variable magnitude θ, such that angle VOW, by virtue of being supplementary to such central angle VOU', as subtended between radius OV and radius OW, and is algebraically denoted as being of overall magnitude 180−3θ therein, is trisected by angle VOX shown therein to be of variable size 60−θ;

for the fourth embodiment of such newly proposed articulating trisection invention:

one straight line and two linkages of the same length are featured in FIGS. 22, 23, and 29 herein, as comprising its specifically arranged acute angle slotted linkage and slider arrangements, that consist of protractor horizontal line segment OV, linkage OO', and linkage OU', all hinged together about their longitudinal centerlines by an interconnecting pivot pin, whose radial centerline aligns with axis O, that passes through an end portion linkage OU', then through an end portion of linkage OO', and thereafter into either a protractor strip or protractor/instructions piece of paper at its origin located at an end portion of its horizontal line segment OV as well, thereby collectively constituting the array of a fan which, in combination with its incorporated unique control mechanism, features a fundamental architecture that is capable of regenerating a multitude of static images over a wide range of device settings; whereby such automatically portrayed overall outlines furthermore can be described by such third derivative Euclidean formulation, as posed in FIG. 21 herein, whose central angle VOU', as subtended between radius OV and radius OU', and amounting to the size of any designated acute angle which can be set into such device, and algebraically amounts to 90−(90−3θ) overall magnitude, thereby totaling 3θ therein, is trisected by angle VOO' being of 90−(90−3θ)—2θ overall magnitude, thereby totaling variable magnitude θ therein; and one straight line and two linkages of the same length are featured in FIGS. 29 and 31 herein, as comprising its specifically arranged obtuse angle slotted linkage and slider arrangements, that consist of a straight line segment which extends between the radial centerline of axis O and the juncture of the zero degree reading and the circular arc which appears upon either its protractor strip or protractor/instructions piece of paper, linkage OO', and linkage OZ, all hinged together about their longitudinal centerlines by an interconnecting pivot pin, whose radial centerline aligns with axis O, that passes through an end portion of linkage OZ, then through an end portion of linkage OO', and into the very origin of such protractor strip or protractor/instructions piece of paper as well, thereby collectively constituting the array of a fan which, in combination with its incorporated unique control mechanism, features a fundamental architecture that is capable of regenerating a multitude of static images over a wide range of device settings; whereby such automatically portrayed overall outlines furthermore can be described by such third derivative Euclidean formulation, as posed in FIG. 21 herein, in which the central angle that is subtended between its transposed $+x_T$-axis and radius OZ, and amounting to the size of any designated obtuse angle which can be set into such device, as algebraically is denoted as being of 90+2(90−3θ) overall magnitude, thereby totaling 270−6θ therein, is trisected by the angle that is subtended between its transposed $+x_T$-axis and radius OO', shown therein to be of variable magnitude 90−2θ.

Whereas all CATEGORY I, sub-classification A articulating trisection devices can perform trisection in just one easy step, consisting of properly setting them, on most occasions CATEGORY I, sub-classification B articulating trisection devices first need to be specifically arranged before such trisection process can be satisfactorily completed.

Dissimilarities which exist between CATEGORY I, articulating trisection devices become apparent, once accounting for how their innovative control mechanisms differ from one another, thereby each being distinctively unique in its own particular way!

Those which exist between newly proposed CATEGORY I, sub-classification B articulating trisection devices can be made validated by means of comparing the different controlled motions which take effect during phases in which the four embodiments of such newly proposed invention become set in accordance with the governing provisions afforded in such FIG. 45 Invention Trisection Process Chart.

Wherein such ensuing one step trisection setting operation thereby involves just translating either a slide mechanism, slide, slide linkage, or adjustment linkage inside of the slot afforded by linkage OT or along it, as depicted in any of such defining embodiment drawings, effected motions thereby becomes constrained as follows:

for such first and second embodiments, a compass assembly assures that the longitudinal centerline of either its OU' linkage, as posed in FIG. 6, or its WU' linkage, as expressed in FIG. 9, forms an angle of designated 3θ magnitude about axis O with respect to the longitudinal centerline of linkage segment OV of its inverted L-shaped member TOV. Since axis U' resides a fixed distance away from axis O upon the longitudinal centerline of either such OU' linkage, or such WU' linkage, it thereby must be positioned at some stationary point in space, enabling a counterbalance assembly, whose members are not included in any fan array, by means of communicating with such compass assembly, to assume a position such that some portion of the straight line that is imprinted upon the upper face of its linkage O'U, located along its longitudinal centerline, appears in full view within the sight hole bored through the center of the interconnecting pivot pin which is located at axis U'; hence, indicating that the longitudinal centerline of either interconnecting linkage OO' or segment OO' of equilateral triangular arm OO'X forms a trisecting angle of designated θ magnitude about axis O with respect to the longitudinal centerline of linkage OV of such compass assembly inverted L-shaped member TOV;

for such third embodiment, as posed in FIG. 15, the motion of a completely different linkage T'Y', whose members are not included in any fan array, governs trisection instead, wherein any reading which can be observed at axis U' automatically is trisected by angle VOO'; and for such fourth embodiment, as posed in FIGS. 22, 26, 29, and 31, the motion of a linkage whose longitudinal centerline always perpendicularly bisects that of linkage OO', which is not included in any fan array, regulates motion instead, whereby such linkage T'Y', as previously was afforded in such third embodiment, is omitted from such design.

All in all, a total of five individual requirements, as belonging to the chart posed in the lower right hand portion of FIG. 2, need to be satisfied before the design of a proposed articulating invention actually can qualify as a trisecting emulation mechanism. Listed below, these consist of:

RQMT 1—identifying which particular settings, or range(s) thereof, such device is supposed to trisect. Providing such details should disclose whether acute, as well as obtuse angles apply;

RQMT 2—stating the reason the classical problem of the trisection of an angle cannot be solved. Providing such details should unmask a Euclidean limitation that needs to be mitigated;

RQMT 3—indicating how such device is to be operated. Providing such details should disclose whether such proposed articulating invention needs to be specifically arranged. If it does, an accompanying remark should be included for purposes of clarity stipulating that a motion related solution for the problem of the trisection of an angle can be obtained only by means of properly setting such device;

RQMT 4—revealing the primary function such device is supposed to perform. Providing such details should disclose whether such proposed articulating invention actually is sufficiently equipped to overcome the Euclidean deficiency of being unable to fully backtrack upon any irreversible geometric construction pattern whose rendered angle is of a magnitude which amounts to exactly three times the size of its given angle; and RQMT 5—explaining why each device setting automatically portrays a unique motion related solution for the problem of the trisection of an angle. Providing such details should disclose whether all proposed articulating invention device settings were substantiated individually, or incorrectly validated by means of instead applying a particular, singular solution for all cases.

When a proposed articulating invention fails to meet any, or even all, of such five above itemized requirements, it is important to note that it still might be fully capable of performing trisection. However, it would become virtually impossible to substantiate that such device could perform trisection accurately throughout its entire range of device settings!

The detailed repercussions which would be expected to accompany such type of mishaps are delineated below. Therein, references are made to the short term notations for each of such five requirements. Accordingly, if a proposed articulating invention fails to meet:

RQMT 1, then a claim as to which designated magnitudes such device actually would be capable of trisecting could not be made, other than those as specifically cited within its specification or expressly depicted upon its accompanying drawing package;

RQMT 2, then a detailed accounting as to very manner in which such device might overcome such impediment could not be furnished; as otherwise should have been reported as a capability to fully backtrack upon any irreversible geometric construction pattern, including that of a rendered angle whose magnitude amounts to exactly three times the size of its given angle; thereby throwing serious doubt as to whether such design contains provisions that actually enable it to surpass Euclidean capabilities;

RQMT 3, then it could become rather difficult to decipher how to operate such device;

RQMT 4, then it could become incredibly difficult to logically deduce that by means of properly setting such device to a designated magnitude, a static image would become regenerated wherein overlapment points furthermore would become discernable that enable such designated magnitude to be fully backtracked upon, all the way back to its associated trisector; in effect, mitigating a Euclidean irreversibility limitation that otherwise would prevent the classical problem of the trisection of an angle from being solved and, by overcoming such difficulty, thereby automatically portray a motion related solution for the problem of the trisection of an angle; and RQMT 5, then it could become quite difficult to fathom that substantiating every unique motion related solution for the problem of the trisection of an angle that possibly could be automatically portrayed by such device would entail the generation of an entire family of geometric construction patterns, all belonging to a specific Euclidean formulation.

Fulfilling all five requirements, as stated above, naturally would lead to a proper understanding of trisection. Such knowledge would become attained only after realizing that such listings actually work in tandem with one another.

For example, by acknowledging RQMT 5 to be a true statement, it would be expected that any newly proposed articulating trisection invention appropriately would account for, not just one, but many individual motion related solutions for the problem of the trisection of an angle. Hence, for any drawing which could become generated by means of executing some particular Archimedes proposition, it should be recognized that it could serve to substantiate only one motion related solution for the problem of the trisection of an angle. With regard to the representative geometric construction pattern, as expressed in FIG. 1B, it readily should become apparent that such singular drawing could be used to substantiate only one particular solution thereof. However, if such drawing instead were to become construed to be a full blown Archimedes formulation, in itself denoted by a sufficiency of Greek letter notations, along with what should be an included double arrow located around the outside of circular arc QS, it then would describe an entire family of geometric construction patterns, each of which individually would substantiate a unique motion related solution for the problem of the trisection of an angle.

Obviously, such solutions would apply to different acute and/or obtuse designated magnitudes, in complete accordance with those which previously must have been specified in order to satisfy the provisions of RQMT 1.

Moreover, an operating procedure, as specified in order to meet the provisions stipulated in RQMT 3, thereafter could be thoroughly reviewed in order to verify that no considerable obstruction would preclude the suitable trisection of an entire range of angles, as formerly indicated in RQMT 1.

A follow-on analysis very easily could have been conducted, thereby compiling information on just how well any prior art considered to belong to CATEGORY I, sub-classification A and CATEGORY II might stack up against such newly proposed invention.

It would not be necessary to include such Kempe mechanism and marked ruler device in such analysis because they previously were substantiated to perform trisection accurately over a wide range of device settings herein.

The criteria applied in the selection process would consist of identifying only prior art whose specifications would be considered to be the most complete. Such selection process would consider inventions dating all the back to the very first devices that ever were accredited; and thereby account for any design evolutions that might have occurred.

Since RQMT 2 and RQMT 4, as stated above, are considered to be breakthroughs, as first suitably accounted for herein, it is suspected that the results of such proposed study would not be very good, indeed.

In sharp contrast, the results actually obtained by means of having conducted such study instead with regard to such invention, as newly proposed herein, revealed that out of a total of twenty-five possibilities, as consisting of five requirements for each of its first, second and third embodiments and two arrangements of its fourth embodiment, all were successfully met. Breakdowns for such CATEGORY I sub-classification B devices are supplied directly below:

- RQMT 1 is fully met, as indicated in such FIG. 43 Trisection Capabilities Table, wherein such first embodiment is capable of trisecting only acute angle settings, but such shortcoming is compensated for by modifications made to it which have been incorporated into such second embodiment, which thereby can trisect any acute, as well as obtuse angle that such device can be properly set to; as also is the case for such third and fourth embodiments. Such stated capability applies, except where embodiment members begin to encroach upon one another, such as becomes evident when viewing FIG. 15 and recognizing that as linkage OO' of such rhombus configuration begins to approach ninety degrees, an interference occurs about axis T;
- RQMT 2 is fully met, as indicated in such FIG. 3 Trisection Mystery Iteration Process Table wherein the degree of imposition upon conventional Euclidean practice is that it cannot backtrack from the rendered angle of any geometric construction drawing pattern all the way back to a given angle which amounts to exactly one-third of its size. As shall be discussed in greater detail later, such mishap results because all drawings of this type harbor overlapment points which, by definition, thereby cause their inevitable irreversibility. More specifically stated, their very presence prohibits pathways from being drawn that otherwise naturally would extend from rendered angles within such types of drawings all the way back to their respective given angles. In other words, such availability of overlapment points thereby makes it impossible to divide an angle into three equal parts by means of applying only a straightedge and compass to it; and, in so doing, represents the very cause for such Euclidean limitation;
- RQMT 3 is fully met, as indicated in such FIG. 45 Invention Trisection Process Chart wherein the procedures for specifically arranging and thereafter setting each of such four embodiments is provided;
- RQMT 4 is fully met, as indicated in such FIG. 3 Trisection Mystery Iteration Process Table which furthermore reveals that the primary function that each of such four embodiments performs is static image regeneration, thereby enabling motion related solutions for the problem of the trisection of an angle to become automatically portrayed whenever any of such four embodiments becomes properly set; and
- RQMT 5 is fully met, as indicated in such FIG. 4 Figure Number Table wherein Euclidean formulations are identified for each of such four embodiments, thereby predisposing entire families of geometric construction patterns which could used to substantiate trisection by means of describing overall outlines which align upon all static images which possibly could be regenerated when any of such devices becomes properly set to a wide range of designated magnitudes for the express purpose of automatically portraying a virtually unlimited number of motion related solutions for the problem of the trisection of an angle.

In summary, substantiating that a motion related solution for the problem of the trisection of an angle occurs whenever one of such four distinct embodiments becomes specifically arranged and thereafter properly set in complete accordance with the provisions set forth in such FIG. 45 Invention Trisection Process Chart that requires the following tasks be successfully conducted:

- identifying the particular Euclidean formulation which such selected embodiment refers to in such FIG. 4 Figure Number Table. For example, when it is desired to trisect a 26.4° acute angle by making use of such first embodiment, such FIG. 4 Figure Number Table lists FIG. 5 as a corresponding Euclidean formulation which thereby applies to it;
- drawing a geometric construction pattern by means of applying the particular sequence of Euclidean operations which governs such identified Euclidean formulation to a given angle whose magnitude amounts to exactly one-third the size of the designated magnitude that such selected embodiment is intended to be set to. For such above example, it thereby becomes necessary to geometrically construct a pattern which commences from a given angle of 26.4°/3=8.8° upon which a specific fourteen step sequence of Euclidean operations is to be administered, as previously specified, in order to generate the substantiating shape which belongs to such Euclidean formulation; and
- verifying that such drawn geometric construction pattern completely describes the overall outline of the static image which becomes regenerated after properly setting such selected device to that particular designated magnitude. For such above example, the designated magnitude of such device setting then is to be compared to the very size of the rendered angle of such drawn geometric construction pattern, whereby the trisector which automatically becomes portrayed by the regenerated static image of such device next becomes compared to the given angle of such drawn geometric construction pattern; thereby validating, by observation, that such portion of the static image portrays an actual trisector for such setting.

In essence, trisection in all instances becomes accomplished because each of such four embodiments is designed so that any static image which could be regenerated by means of properly setting it in accordance with the provisions specified in such FIG. 45 Invention Trisection Process Chart would automatically portray an overall shape which furthermore fully could be described by a geometric construction pattern which belongs to a corresponding Euclidean formulation, as listed in such FIG. 4 Figure Number Table.

To conclude, when any of such four embodiments becomes properly set in full accordance with the provisions set forth in such FIG. 45 Invention Trisection Process Chart, its fundamental architecture thereby becomes configured so that some portion of the static image which it regenerates automatically portrays a trisector for such device setting.

Therefore, such four distinct embodiments duly qualify as trisecting emulation mechanisms; such that each is entirely capable of accurately trisecting an angle of virtually any designated magnitude which such device can be set to, merely by means of properly administering an applicable trisection procedure, as outlined in such FIG. 45 Invention Trisection Process Chart.

It is true that Wantzel and Galois, generally are credited as being instrumental in proving that an angle of designated magnitude cannot be trisected when acted upon only by a straightedge and compass.

However, what is quite intriguing about such work is that, while on the one hand relying rather heavily upon an analysis of various prognosticated algebraic equations, on the other hand there doesn't appear to be any tangible correlation as to how such determination, as posed in one branch of mathematics, relates to the geometric finding presented herein that the classical problem of the trisection of an angle cannot be solved due to an availability of overlapment points; thereby cause irreversibility to occur within geometric construction patterns, and making it impossible to completely backtrack from rendered angles all the way back to given angles whose respective magnitudes amount to exactly one-third their size. Inasmuch as the classical problem of the trisection of an angle requires a Euclidean solution, accounting for why it cannot be achieved requires a geometric explanation!

By interjecting non-geometric explanations, certain attributes that accompany trisection difficulties most certainly can be identified, but only at the risk of possibly perpetuating undesirable myths which surround such great trisection mystery; thereby preventing it from being unlocked!

For example, consider the rather far fetched notion that the classical problem of the trisection of an angle actually might become solved by way of obtaining a cube root, solely by conventional Euclidean means!

Naturally, such hypothesis would discount any possibility that unity, by posing a cube root of itself, might play a key role in any of such attempts. Nor should such cube root be confused in any way with a cubic root that, if being a real number, instead would identify the exact location where a third order curve crosses the x-axis, as displayed upon a Cartesian coordinate system.

Within any right triangle drawing, since the length of its hypotenuse amounts to the square root of the sum of the squares of its two sides, according to the Pythagorean Theorem, then such geometric construction pattern would be a byproduct of addition, multiplication and square root mathematical operations; which turned out to be the very basis of pursuit in Wantzel's work. In connection with such premise, as concerning the possible Euclidean extraction of a cube root, naturally a leading question which should be asked is what about cube root lengths whose ratios with respect to a given length of unity are either rational or quadratic irrational?

For example, the length of a straight line that is 3 inches long represents the cube root of another straight line that amounts to 27 inches in overall length; whereby such longer straight line very easily could be geometrically constructed simply by adding together nine of such 3 inch long straight lines.

A much needed logic that seemingly appears to be grossly lacking in such above stated scenario is that if it incorrectly were to be acceded that cube roots cannot be obtained solely by conventional Euclidean means, then it would have to follow that any geometric construction pattern whose rendered information, even when amounting to just a rendered length, is of a magnitude that amounts to the cube of any portion of its given data would have to be irreversible, not that it would present a solution of the classical problem of the trisection of an angle! This shall be further demonstrated later by means of geometrically constructing rendered lengths of cubed magnitudes.

In effect, Wantzel algebraically proved that addition, subtraction, multiplication, and division, as representing the various fundamental operations defined within number theory, could not be suitably applied by a straightedge and compass in any combination that could solve the classical problem of the trisection of an angle. Quite understandably such consideration would not apply to a geometric solution for the problem of the trisection of an angle! For example, the mathematical operation of performing division by a factor of four could be achieved by conventional Euclidean means merely by bisecting a straight line, and then bisecting each of its then separated portions again. As such, by means of performing such division upon the tangent of an angle whose value is $4/\sqrt{11}$, a new length could be obtained of $1/\sqrt{11}$ which would be indicative of the tangent of its trisector. Obviously, Wantzel's non-geometric accounting, as briefly outlined above, couldn't possibly be expected to explain what is considered to be a Euclidean limitation; one which now, for the very first time, is to be described as an inability to fully backtrack upon any rendered angle whose magnitude amounts to exactly three times the size of its given angle due to an availability of overlapment points!

Whereas taking the cube root of a complex number also later on shall be shown to be synonymous with obtaining its trisector, such symbiosis represents yet another outstanding definition which could be attributed to trisection; but one which most certainly shouldn't be confused with any plausible explanation as to why trisection cannot be performed solely by conventional Euclidean means!

BRIEF DESCRIPTION OF THE DRAWINGS

FIG. 3 is a Trisection Mystery Iteration Processes Table which itemizes pertinent ramifications which are considered to underlie the very nature of a plaguing trisection mystery that has persisted for millennia.

FIG. 4 is a Figure Number Table that cites figure numbers of Euclidean formulations and drawing packages that apply to each of the four embodiments which collective comprise such newly proposed articulating invention.

FIG. 42 is a Euclidean Formulation Rendered Angle Relation Table that identifies acute rendered angles which appears in each of such Euclidean formulations, as cited in FIG. 4; furthermore algebraically expressing each of their magnitudes, as shown therein to amount to exactly three times the size of their respective given angles.

FIG. 43 is a Trisection Capabilities Table that identifies which of such four newly proposed embodiments can trisect acute, as well as obtuse angles.

FIG. 44 is an Embodiment Alternate Names Table that furnishes alternate names for each of such four newly proposed embodiments.

FIG. 45 is an Invention Trisection Process Chart that explains how to specifically arrange and/or properly set each of such four newly proposed embodiments.

FIG. 46 is a Motion Related Solutions for the Problem of the Trisection of an Angle Chart that identifies trisector portions of motion related solutions for the problem of the trisection of an angle which become automatically portrayed when each of such four newly proposed embodiments becomes set to various designated magnitudes, as actually are algebraically expressed within each cited defining drawing.

FIG. 47 is a CATEGORY 1, sub-classification B Conforming Aspects Chart which identifies similarities evident within the four constituent embodiments of such newly proposed invention, as tabulated in FIG. 4.

FIG. 48 is a Mathematics Demarcation Chart, so arranged to divulge exactly which areas of mathematics can be represented only by a newly proposed geometric forming process; thereby exposing where conventional Euclidean practice actually is limited.

FIG. 49 is a First Embodiment Stacking Chart.

FIG. 50 is a Third Embodiment Stacking Chart.

FIG. 51 is a Slotted Linkage Arrangement Stacking Chart.

FIG. 52 is an Angular Magnitude Transformation Chart which distinguishes how to calculate the angular dispositions of slotted linkage arrangement members which become specifically arranged to trisect angles of obtuse designated magnitudes from respective locations they otherwise would assume if instead being specifically arranged to trisect angles of acute designated magnitudes.

FIG. 56 is a table of roots for the quartic equation $80 \cos^4 \theta - 4 \cos^3 \theta - 60 \cos^2 \theta + 6 = 0$, along with other supporting data, as obtained by relating the top and bottom functions denoted in such FIG. 55 legend in order to establish the equality $(4 \cos^3 \theta - 6)/(20 \cos \theta) = 4 \cos^3 \theta - 3 \cos \theta$.

FIG. 58 is a geometric solution for the problem of the trisection of an angle whose designated magnitude is algebraically expressed as 3θ and whose tangent, denoted as ζ, is assigned a value of $\sqrt{5}/7$. Although not representing a bona fide solution for the classical problem of the trisection of an angle, which cannot be solved, such geometric solution does succeed at resolving a quadratic equation that assumes the algebraic form $z_R^2+b'z_R+c'=0$, as obtained by means of applying a particular abbreviated version of the Quadratic Formula $z_R=(½)(-b'\sqrt{b'^2-4c'})$ to it for the particular case when $b'=(3+\gamma)/(3\zeta+\beta)$ and $c'=(\delta-\zeta)/3\zeta+\beta)$, thus amounting to $b'=-(105+49\sqrt{5})/(4\sqrt{5}+49)$ and $c'=(85\sqrt{\mathbf{5}})/(49+4\sqrt{5})$ for the particular quadratic equation which results when two cubic equations of a singular variable known to share a common root expressed, $z_R=\tan\theta$, become simultaneously reduced, solely in algebraic fashion, when each is represented as:

$$\zeta=\tan(3\theta)=\sqrt{5}/7=(3z_R-z_R^3)/(1-3\,z_R^2);\text{ and}$$

$$z_R^3+\beta z_R^2+\gamma z_R+\delta=0\text{ when }\beta=-(\sqrt{5}+7),\gamma=7\textcircled{5}+12,\text{ and }\delta=-12\sqrt{5}.$$

Figure 59:
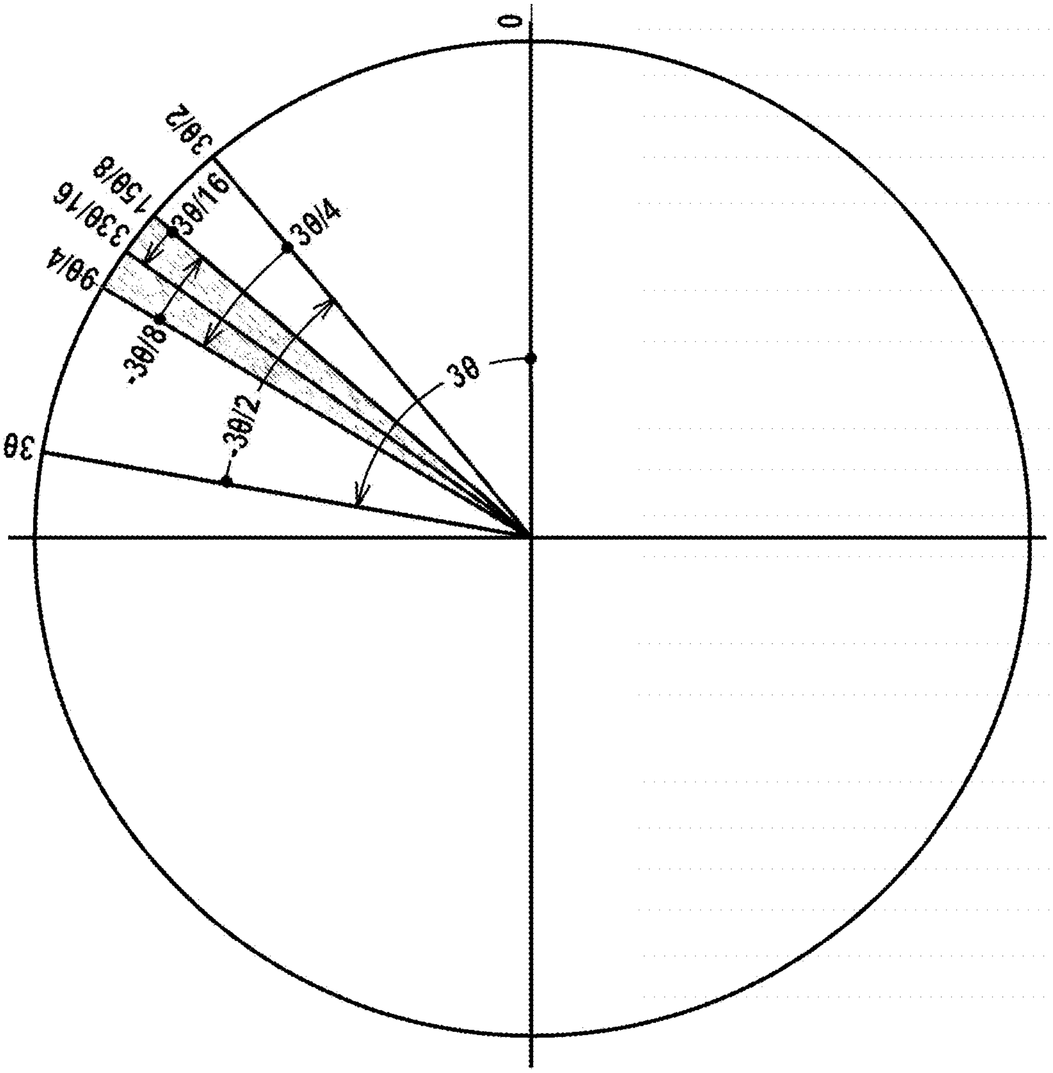

FIG. 59 is a diagram that indicates how an angle of arbitrarily selected designated magnitude, denoted algebraically as 3θ therein, can be trisected by means of geometrically constructing a series of properly arranged successive Euclidean bisections.

FIG. 60 is a Successive Bisection Convergence Chart that discloses the measure of trisection accuracy which could be obtained by means of increasing the number of properly arranged successive Euclidean bisections that take place within a particular geometric construction process; thereby indicating that just after twenty-one iterations, as indicated in the line item in which n=22 therein, trisection would be performed to an accuracy of six decimal places if the human eye were capable of detecting such activity.

Figure 61:
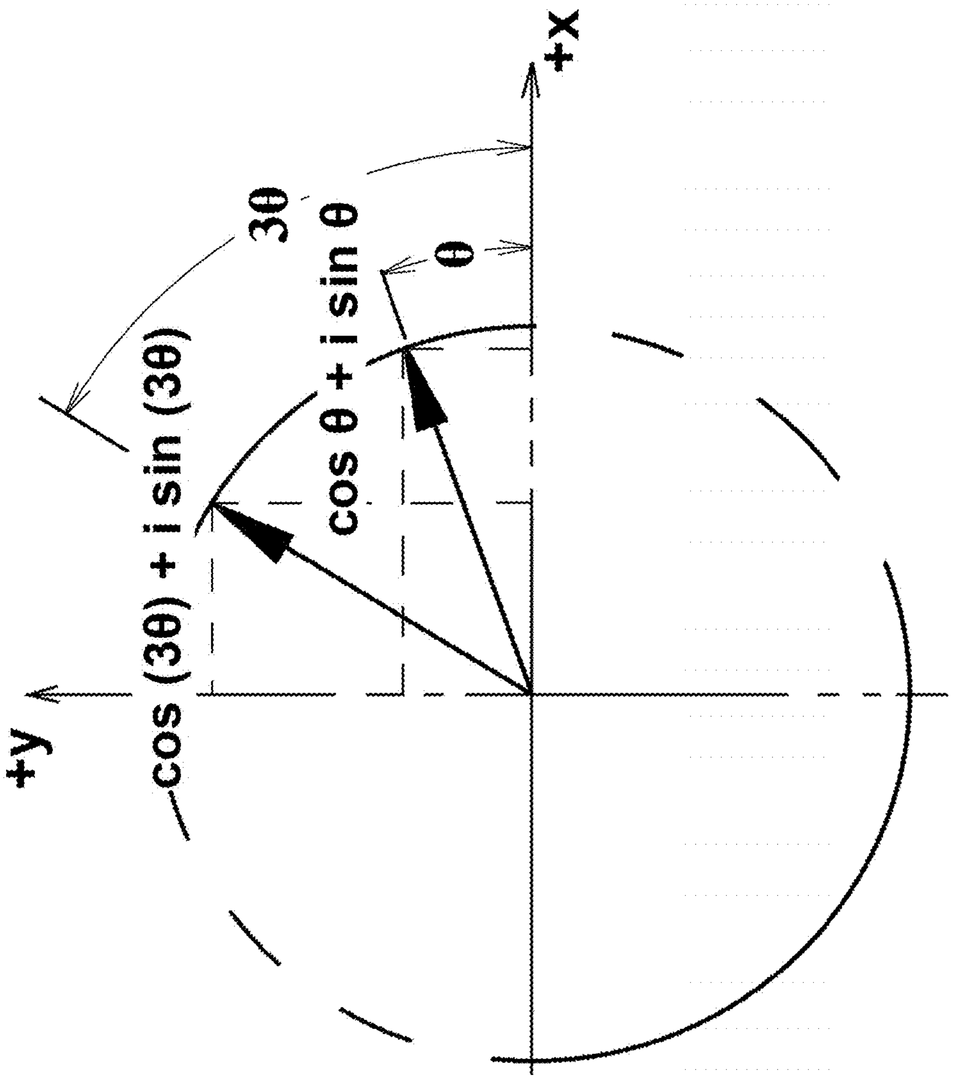

FIG. 61 is a diagram of a complex number whose arbitrarily selected angular magnitude, algebraically denoted as θ therein, serves both as a trisector for, as well as a cube root of another complex number that becomes geometrically constructed with respect to it such that its magnitude amounts to exactly three times its size, thereby being algebraically designated as 3θ therein.

Figure 62:
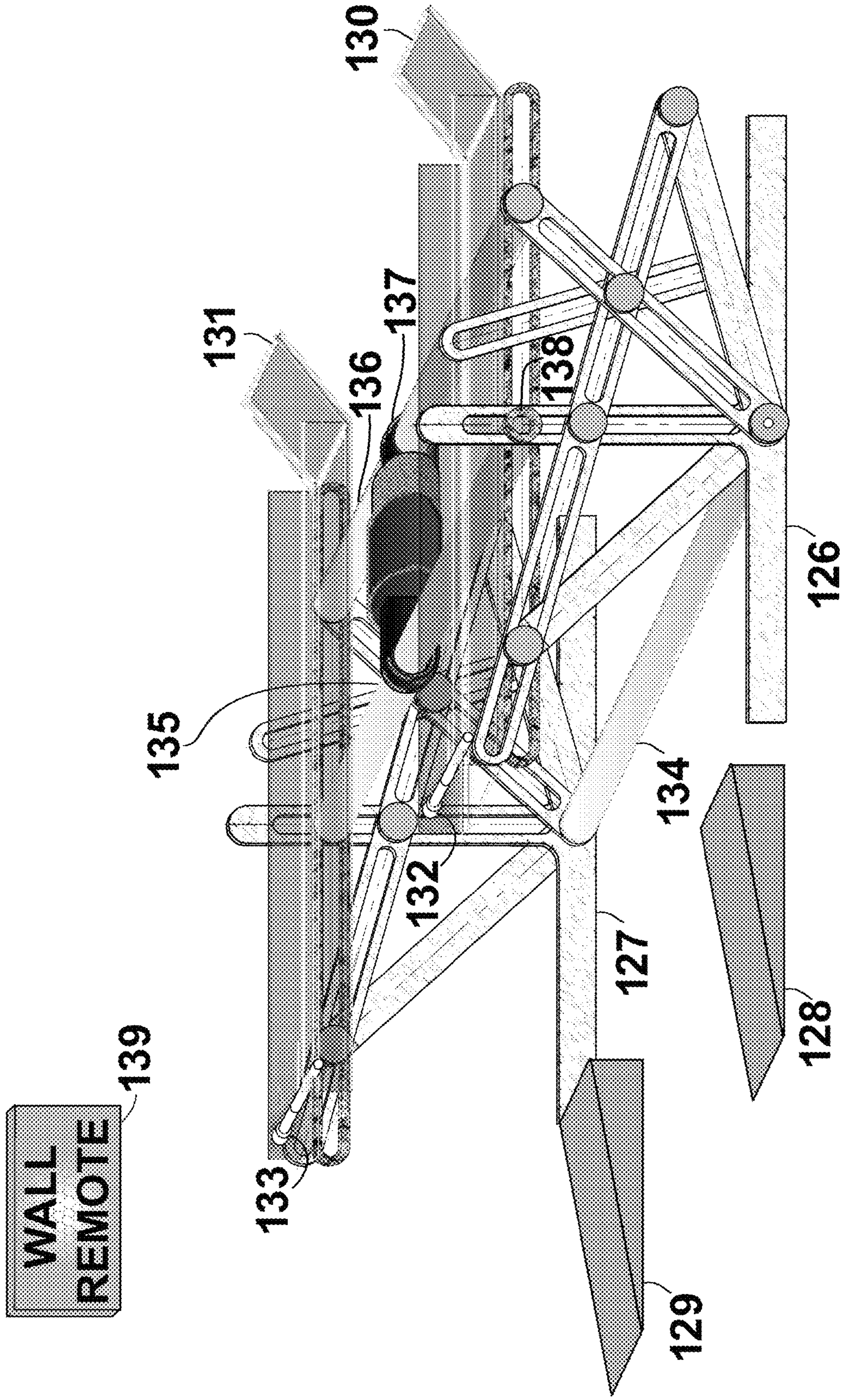

FIG. 62 is a sketch showing how the overall geometry of such slotted linkage arrangement could be applied to the design of a hydraulically actuated car lift that maintains objects that are mounted upon it level during lifting operations.

DETAILED DESCRIPTION

Certainly by now it should have been made quite clear that in order to unlock vital secrets, highly suspected to be hidden deep within the very recesses of a perplexing trisection mystery, a paradigm shift most definitely is warranted; one that expressly should recommend some fundamental change in overall approach concerning how to properly account for difficulties encountered when trying to solve the classical problem of the trisection of an angle.

Figure 2:
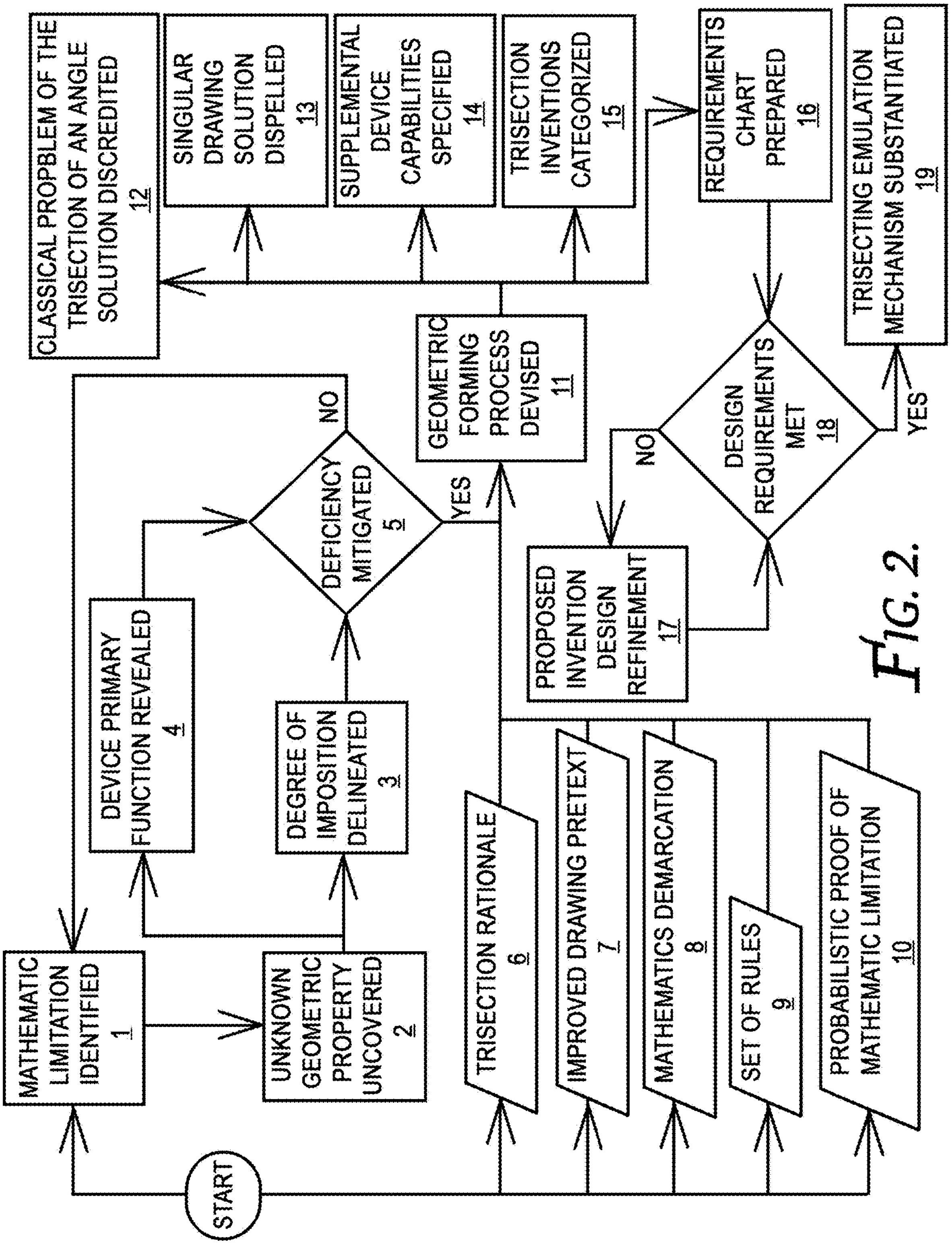
FIG. 2 is a flowchart which identifies the various elements of a comprehensive trisection methodology.

Only by means of exposing such closely held secrets could the basic objective of a comprehensive trisection methodology become realized, as presented in the flowchart appearing in FIG. 2; essentially being to validate that the design of some proposed invention could perform trisection accurately throughout a wide range of device settings and, in so doing, qualify as a legitimate trisecting emulation mechanism that can automatically portray various motion related solutions for the trisection of an angle.

Accordingly, a detailed discussion of such flowchart should precede the introduction of such newly proposed invention. In this way, any requirements posed relating to the design of its four constituent embodiments would be presented well before explaining exactly how they are to complied with. Such accounting begins with a process box entitled MATHEMATIC LIMITATION IDENTIFIED 1 therein, representing the task within such flowchart where some unknown mathematical limitation is identified that supposedly prevents the classical problem of the trisection of an angle from being solved. Obviously, since such solution must depend solely upon the communication of a straightedge and compass with respect to an angle of designated magnitude, any mathematic limitation alluded to therein must be some pronounced difficulty having to do with conventional Euclidean practice!

The process box referred to as UNKNOWN GEOMETRIC PROPERTY UNCOVERED 2 is where, in the course of such FIG. 2 flowchart, an entirely new geometric property is to be uncovered which furthermore is considered to be the cause of such identified mathematic limitation. Although presently being unknown, any newly defined geometric property naturally would have to be as basic a shape as a well known straight line or circle; thereby making such trisection mystery that much more intriguing.

The third process box, entitled DEGREE OF IMPOSITION DELINEATED 3 is reserved for describing the extent of difficulty that such newly uncovered geometric property is anticipated to impose upon conventional Euclidean practice.

The process box referred to as DEVICE PRIMARY FUNCTION REVEALED 4 is where an as yet unknown capability thereby becomes revealed which assumes the form of some specially added equipment that articulating mechanisms can be fitted with that enables them to overcome, correct, or compensate for such undermining influence, as now suspected to be a mathematic limitation.

Next, the decision box entitled DEFICIENCY MITIGATED 5 within such FIG. 2 flowchart serves to verify that certain equipment featured in such proposed articulating devices that are supposed to avail such suspected primary function actually are deemed to be of sufficient designs to suitably mitigate such adverse influence. If it turns out that they are not adequate to perform such identified primary function, then they require redesign. If, instead, it turns out that they perform such primary function, but do not trisect, then such suspected mathematic limitation must be an incorrect selection, and another response thereby needs to be chosen. The recourse for such noted action is indicated by the NO pathway which is shown to exit such decision box.

The input box entitled TRISECTION RATIONALE 6, as shown in FIG. 2, is where a discussion is presented that accounts for how the correct responses, as indicated in such FIG. 3 Trisection Mystery Iteration Processes Table, were chosen in the very first place.

Such trisection rationale discussion specifically directs attention to the first four processes listed in such FIG. 2 flowchart, and proceeds by conjecturing that overlapment points residing within an irreversible geometric construction pattern elude detection from any and all Euclidean interrogations which possibly could be launched exclusively from the sole vantage point of its rendered information.

The very fact that overlapment points remain entirely inconspicuous in this manner furthermore evidences that it is impossible to specify a distinct set of Euclidean commands which can identify their whereabouts solely with respect to such rendered information.

Without such vital input, a specific sequence of Euclidean operations furthermore could not be developed that instructs how to apply a straightedge and compass in order to trace out a pathway which begins at such rendered information and leads all the way back to a given set of previously defined geometric data; whereby the very presence of overlapment points serves to circumvent reversibility!

Figure 1A:
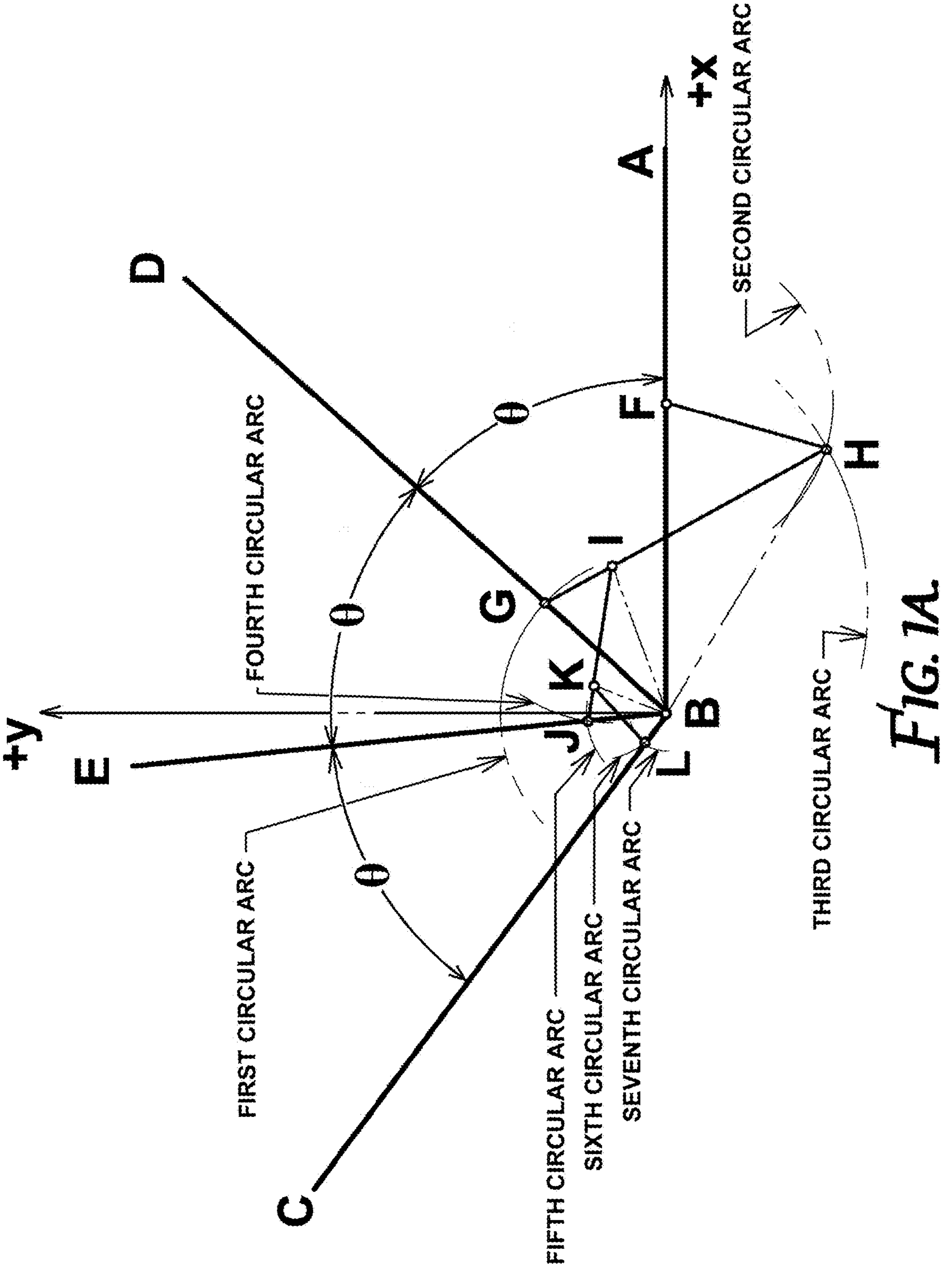
FIG. 1A is a depiction of the fundamental architecture of a famous Kempe trisecting device, as shown in this particular case to be set to a designated magnitude of 143¼°; thereby divulging the whereabouts of only the longitudinal centerlines of linkages and radial centerlines of interconnecting pivot pins which collectively comprise such prior art, including those which are featured in its three strategically emplaced anti-parallelogram shaped control mechanisms used to strictly regulate the manner in which it such device is permitted to articulate.
Figure 1B:
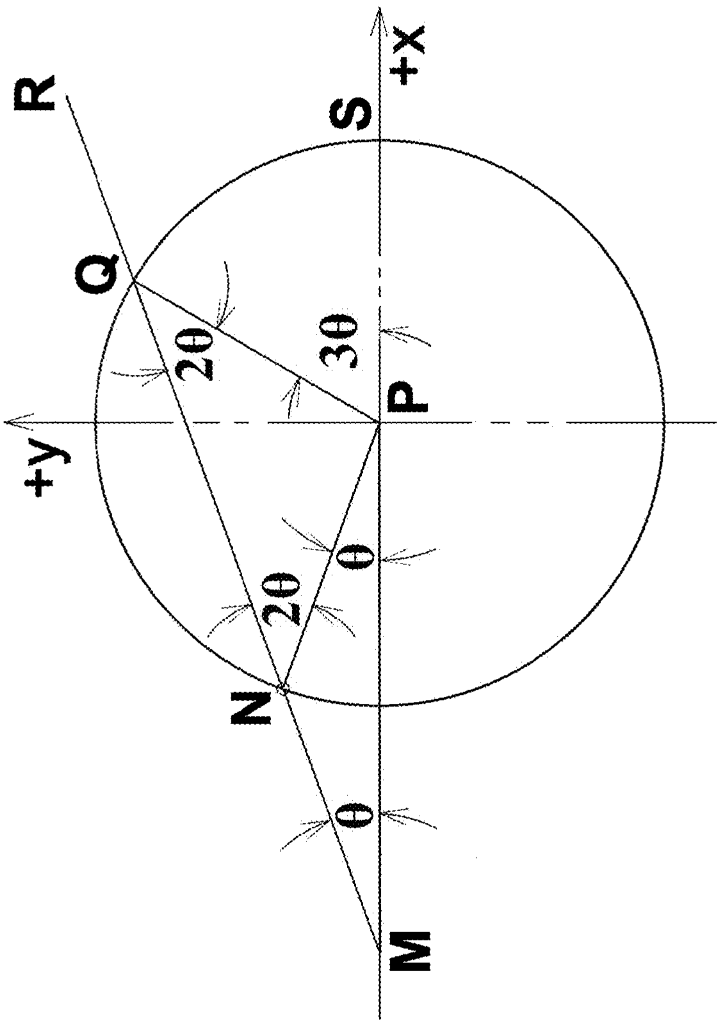
FIG. 1B is a prior art method for determining the trisection of an angle; except for the fact that all of the intersection points appearing therein now are denoted by different letters. It furthermore is representative of prior art, famously known as a marked ruler arrangement, in which the longitudinal centerline of a marked ruler, as denoted therein by straight line MR includes a notch at point N, being located any suitable arbitrary distance away from its tip, as located at point M along such longitudinal centerline; which furthermore sits atop a drawing of angle QPS, as algebraically expressed therein to be of 3θ designated magnitude, an added circle which is drawn about such point P at a radius which is equal in length to that of straight line segment MN, and shows its straight line SP to be extended in such a manner that the longitudinal centerline of such ruler is jockeyed about so that it passes through point Q, has its tip, M, rest somewhere upon straight line SP extended, while its notch additionally becomes located somewhere along the circumference of such drawn circle.

Since the very concept of reversibility is entirely new with regards to conventional Euclidean practice, a validation that isosceles triangle MNP, as posed in FIG. 1B, is a reversible geometric construction pattern is afforded directly below:

whereas the first three steps of a previously stipulated sequence of Euclidean operations already has accounted for how to geometrically construct isosceles triangle MNP directly from given acute angle RMP, all that is needed in order to demonstrate reversibility is to thereby geometric construct isosceles triangle MNP with respect to its rendered angle PNM instead, as is outlined in the three step sequence of Euclidean operations which follows:

- step 1—from rendered ∠PNM, an arbitrary length NM is marked off along one of the sides with point M becoming assigned to its newly described end;
- step 2—a circular arc is swung about point N whose radius is of length NM; and
- step 3—point P becomes designated at the newly determined intersection of such circular arc with the other side of ∠PNM, whereby straight lines NP and PM become drawn to complete isosceles triangle MNP.

In order to demonstrate the actual difficulty which an intrusion of overlapment points causes, notice in FIG. 1B that it is impossible to geometrically construct isosceles triangle MNP solely with respect to rendered angle QPS.

Taking any of the specific geometric construction patterns which collectively constitute such Archimedes formulation into account, this becomes evident upon realizing that overlapment points M and N, as represented in such FIG. 1B, never could be located solely with respect to rendered angle QPS by conventional Euclidean means. The reason for such impossibility is furnished below:

- even though it is known that overlapment point M must reside somewhere along straight line SP extended, it cannot be determined solely via straightedge and compass exactly which of the infinite number of possible locations which resides upon it applies when commencing exclusively from rendered angle QPS; and
- the same argument holds true for overlapment point N which is known to reside somewhere along a circle that is drawn about point P that is of radius PQ, but whose exact location cannot be precisely pinpointed exclusively with respect to rendered angle QPS solely via straightedge and compass.

For the particular hypothetical case when QPS amounts to exactly ninety degrees, such thirty degree trisector very easily could be geometrically constructed, simply by bisecting any angle or side of an equilateral triangle. However, the computation of dividing such ninety degree angle by a factor of three in order to arrive at the magnitude of such thirty degree trisector unfortunately cannot be duplicated solely by conventional Euclidean means. Hence, to do so only would create a corrupted version of the classical problem of the trisection of an angle; thereby solving an entirely different problem!

Hence, in such capacity, overlapment points function as obstructions serving to confound attempts to redefine an entire geometric construction pattern solely with respect to its rendered information.

Consequently, any pathway consisting of previously distinguished intersection points which originally led from given angle RMP all the way to rendered angle QPS, as depicted in FIG. 1B, could not be retraced in complete reverse order by means of attempting to apply only a straightedge and compass with respect to such rendered angle QPS.

In that such discussion particularly should account for difficulties experienced when attempting to solve the classical problem of the trisection of an angle, it thereby becomes formally stipulated that it is impossible to fully backtrack upon any geometric construction pattern whose rendered angle is of a magnitude that amounts to exactly three times the size of its given angle; simply because such drawing would harbor overlapment points!

As such, a presence of overlapment points within such specific types of geometric construction patterns entirely thwarts attempts to generate such overall pathways in complete reverse order, solely by conventional Euclidean means; thereby preventing the classical problem of the trisection of an angle from being solved!

In summary, overlapment points have an affinity to impede the completion of geometric construction patterns that are replete with them for the mere reason that they cannot be entirely reconstituted solely via straightedge and compass in complete reverse order.

For the benefit of any remaining skeptics, it furthermore should be added that only when the magnitude of a trisected angle becomes furnished beforehand can a geometric construction pattern which specifies such trisector, in the very the form of its given angle, become fully reversible; thereby enabling some corrupted version of the classical problem of the trisection of an angle to be solved.

During such condition, overlapment points, by definition, then would become distinguishable intersection points with respect to such given trisecting angle; thereby making such geometric construction pattern fully reversible. However, to attempt such activity would defeat the purpose of trying to trisect an angle solely by conventional Euclidean means in the very first place; simply because the very information being sought after already has been furnished. In other words, it would be entirely senseless to generate geometric quantities such as straight lines, circles, and angles aforehand exclusively for purposes of then determining them solely via straightedge and compass. Nevertheless, a notable history of this exists which mostly has been directed towards improper attempts to trisect angles solely via straightedge and compass.

Such foolish endeavors stand is sharp contrast to most, if not all, other standard Euclidean procedures, such as bisection; whereby a bisector remains totally unknown until such time that it actually becomes geometrically constructed from an angle of given magnitude.

When only the magnitude of an angle that is intended to be trisected becomes designated, its associated geometric construction pattern remains completely unspecified. This presents a heightened problem because there virtually are a countless number of other geometric construction patterns, besides those represented in FIGS. 1A and 1B, that also render angles whose magnitudes amount to exactly three times the size of respective given angles. Without being informed as to which particular geometric construction pattern applies in the very first place, resident overlapment points no longer become limited to specific intersection point locations upon a specific pattern.

Even when a specific geometric construction pattern becomes selected as a vehicle for attempting to perform trisection, such as in the case of the rendition of the Archimedes formulation, as posed in FIG. 1B, its given angle NMP or RMP, even when designated to be of a specified size that can be duplicated solely by means of applying a straightedge and compass, still cannot be determined when launching Euclidean operations just with respect to its rendered angle QPS; principally because its resident overlapment points cannot be distinguished.

Such pronounced geometric construction limitation of not being able to encroach upon overlapment points when being launched from a particular direction can, in fact, be rectified rather simply; merely by affording a means for discerning overlapment points that reside within irreversible geometric construction patterns, and thereby making them entirely distinguishable with respect to rendered angles which otherwise cannot be backtracked upon!

Such elementary recommendation, despite its rather unsuspecting and seemingly outlandish nature, nevertheless describes exactly how a trisecting emulation mechanism can trisect virtually any designated angle which it can be set to; thereby portraying a of motion related solution for the problem of the trisection of an angle.

Such strange phenomena perhaps most easily can be described with respect to the motion of any CATEGORY I sub-classification A articulating trisection device because such types of devices do not first have to be specifically arranged before displaying their settings. As any of such devices becomes cycled, eventually reaching all of the settings within its entire operating range, its fundamental architecture sweeps out, or regenerates, a multitude of static images, each representing a still shot cameo of two angles, the larger of which not only amounts to exactly three times the size of the other, but furthermore is calibrated to a specific device setting.

The beauty of such design concept is that once any of such types of devices becomes set to a preselected designated angle, the portion of the smaller angle contained within the static image which becomes regenerated thereby automatically portrays its associated trisector.

In other words, by means of properly setting any trisecting emulation mechanism, its fundamental architecture becomes rearranged to a particular position such that the static image which becomes regenerated automatically portrays a motion related solution for the problem of the trisection of an angle!

In effect, such motion related solution distinguishes overlapment points whose availability otherwise would prevent the classical problem of the trisection of an angle from being solved!

Accordingly, instead of attempting to perform that which is impossible; essentially consisting of retracing a distinguishable pathway within an irreversible geometric construction pattern in complete reverse order solely by conventional Euclidean means, a trisecting emulation mechanism otherwise functions like the Dewey decimal system in a library wherein the exact name of a document that is being searched for becomes either input into a computer, or otherwise looked up in some card deck, whereby an alpha-numeric code that provides an indication of its whereabouts, thereby allows such information to forthwith become retrieved. The only glaring difference in the case of a trisecting emulation mechanism is that the magnitude of a designated angle which is slated for trisection becomes set into such device, thereby causing the regeneration of a particular static image that automatically portrays its associated trisector!

Accordingly, a fundamental architecture might be thought of as a mechanical means for conveniently storing a multitude of static images within the very memory of some particularly designed trisecting emulation mechanism; thereby enabling a motion related solution for the problem of the trisection of an angle of designated magnitude to be automatically portrayed at will.

To conclude, a unique pathway which leads from one angle all the way to another that amounts to exactly three times its size automatically becomes portrayed each and every time a static image become regenerated by means of configuring a trisecting emulation mechanism to any of its discrete device settings; thereby disclosing the actual whereabouts of nuisance overlapment points which reside along the way; simply by means of exposing them to be nothing more than commonly known intersection points. In so doing, any obstructions that otherwise normally would be encountered when attempting to solve the classical problem of the trisection of an angle, would be overcome merely by means of properly setting a trisecting emulating mechanism.

A basic tenet of conventional Euclidean practice is that all activity must proceed exclusively from a given set of previously defined geometric data, or else from intersection points which become located with respect to it.

It may well be that a purposeful adherence to such rule might explain why any serious attempt to completely retrace a geometric construction pattern exclusively from its rendered information all the way back to its given set of previously defined geometric data, solely by application of a straightedge and compass, entirely might have been overlooked in the past.

Moreover, only on very rare occasions, such as in the particular case of attempting to solve the classical problem of the trisection of an angle, could the prospect of possibly even engaging upon such activity arise, thereafter culminating in an avid interest to solve such classical problem without considering that a pathway leading from a rendered angle within any geometric construction pattern all the way back to a given angle whose magnitude amounts to exactly one-third of its size lies at the very heart of such difficulty!

Remarkably, only by means of analyzing conventional Euclidean practice from this other seldom viewed perspective could irreversibility be identified as being caused by an intrusion of overlapment points.

By otherwise neglecting such critical information, it would become virtually impossible to substantiate that any qualifying CATEGORY I sub-classification A or CATEGORY II articulating trisection mechanism could perform trisection accurately throughout a wide range of device settings.

The input box entitled IMPROVED DRAWING PRETEXT 7, as posed FIG. 2, is where a new truncated drawing format is to be introduced that can represent an entire family of geometric construction patterns, all upon just a single piece of paper.

Whereas such FIG. 2 flowchart is meant to apply exclusively to trisection, such improved drawing pretext, as alluded to therein, preferably should be identified as any Euclidean formulation each of whose constituent geometric construction patterns depicts a rendered angle whose magnitude amounts to exactly three times the size of its given angle. By means of suitably designing a trisecting emulation mechanism so that virtually any static image which would become regenerated as the result of its being properly set thereby would automatically portray an overall outline that furthermore could be fully described by a particular geometric construction pattern which belongs to such Euclidean formulation, then it could be substantiated that a motion related solution for the problem of the trisection of a angle could be achieved, merely by means of backtracking upon an irreversible condition that instead would have prevented the classical problem of the trisection of an angle from being solved!

Accordingly, the rather seemingly antiquated idea of generating singular, but unrelated geometric construction patterns thereby very easily could become dwarfed simply by means of considering the prospect that they furthermore might become linked to one another in some particular fashion through the use of an improved drawing pretext for the express purpose of geometrically describing motion!

The wording above is intended to infer that improved drawing pretexts, other than that of the Euclidean formulation could be devised, thereby associating their constituent drawing patterns in some distinct manner other than through specified sequences of Euclidean operations; and, upon becoming replicated might thereby describe important motions which are known to be of service to mankind!

Such discussion is building to the proposition that by means of properly partitioning all observed phenomena which can be described geometrically, including that of certain motions, it thereby becomes possible to envision a certain order that becomes evident within a farther reaching mathematics.

Such is the very purpose of the input box entitled MATHEMATICS DEMARCATION 8, as posed in FIG. 2 herein. Its key artifact consists of a Mathematics Demarcation Chart, as posed in FIG. 48, which discloses a particular partitioning which should be imposed universally in order to suitably distinguish between geometries which describe stationary patterns, as opposed to those which can quantify disparate motion related geometries.

As it pertains to trisection matters, the drawing pretext entry appearing in the third column of such FIG. 48 chart, as listed directly under the cell entitled Geometric forming process, quite expectedly, turns out to be that of a Euclidean formulation; hence, limiting overall scope therein to matters in which geometric construction patterns can be associated to one another only through particular sequences of Euclidean operations.

Headings appearing in FIG. 48, are shown to run along the left side of such chart. Such arrangement enables the two principal listings appearing at the top of the second and third columns therein to serve as minor headings in themselves; thereby making it easy to differentiate between conventional Euclidean practice and a geometric forming process merely by means of comparing such two columns to one another.

Moreover, inasmuch as the field of geometry concerns itself with mathematically quantified depictions, algebra, on the other hand, by representing the overall language of mathematics, instead bears the biggest brunt of responsibility in validating that such alleged order truly exists; doing so by associating algebraic format types through some newly proposed equation sub-element theory!

One principal reference, standing as a harbinger of a newly proposed equation sub-element theory, is a relatively unknown treatise that was published in 1684; as written by one Thomas Baker and entitled, *The Geometrical Key or the Gate of Equations Unlocked*. After a close affiliation with Oxford University, Mr. Baker successfully provided a solution set pertaining to biquadratic equations, perhaps more commonly referred to today as either quartic, or fourth order equations. However, it seems quite plausible that because of a serious competition among rival institutions going all the way back to that time period, Gerolamo Cardano's preceding work of 1545, as it appeared in *Ars Magna*, nevertheless, still managed to eclipse his later contributions. In brief, Cardano applied a transform to remove the second, or squared, term from cubic equations in order to modify them into an overall format that very easily could be resolved. However, because of such gross simplification, the all important fact that each algebraic equation is unique, in its own right, was largely ignored; hence, failing to attribute deliberate meaning to the various equation types that actually govern third order algebraic equation formats. The very stigma which such abbreviated process instilled unfortunately served to direct attention away from developing an all purpose solution that applies to all cubic equation formats, as posed in a single variable; one which obviously would lie at the very heart of any newly proposed sub-element theory; thereby not requiring that cubic equations which express second terms first become transformed in order to solve them! In retrospect, it now appears very likely, indeed, that a hit-and-miss mathematics approach of such nature most probably delayed the actual debut of a newly proposed equation sub-element theory by some four hundred years!

To conclude, by means of now introducing an all-purpose cubic equation solution, as presently has remained absent for all these years, the very relevancy of each format type can remain preserved so that further comparisons could be made in order to avail a more comprehensive understanding of an overall order that actually prevails within all of mathematics.

In such FIG. 48 Mathematics Demarcation Chart, notice that cubic irrational numbers are listed only under the heading referred to as geometric forming process. Therein, such partitioning assignment is entirely consistent with the proposed finding that although angular portions within a regenerated static image can become automatically portrayed, even when they consist of cubic irrational trigonometric properties, nevertheless such angles cannot be geometric constructed just from a given length of unity or from another angle whose trigonometric properties are either rational or quadratic irrational!

That is to say, whenever the angular portion within a regenerated static image that has been calibrated to a particular device setting bears cubic irrational trigonometric properties, so must the angular portion therein which serves as its trisector. Accordingly, there is no way to relate either rational or quadratic irrational trigonometric properties of a trisector to an angle which amounts to exactly three times its size that bears cubic irrational trigonometric properties.

In other words, it requires, not one, but three angles that all exhibit cubic irrational trigonometric properties in order to geometrically construct an angle which exhibits either rational or quadratic irrational trigonometric properties. Such angle very well could be geometrically constructed in a manner which is analogous, or consistent with virtually any of the nine the arrangements of such products, sums, and sums of paired products, as posed in the algebraic equations previously expressed in such definition of a cubic irrational number.

Accordingly, any geometric construction pattern that belongs to a Euclidean formulation which furthermore is known to replicate the articulated motion of the fundamental architecture of any CATEGORY I sub-classification A trisecting emulation mechanism which thereby becomes reset every time it becomes articulated only can be approximated in size if it is meant to depict a static image either of whose two included angular portions portrays cubic irrational trigonometric properties!

An elementary, but nonetheless very revealing example of this concerns attempts to trisect a sixty degree angle solely by conventional Euclidean means!

Although such sixty angle can be distinguished merely by geometrically constructing an equilateral triangle, its associated twenty degree trisector, on the other hand, is known to exhibit transcendental trigonometric properties that cannot be geometrically constructed, when proceeding either exclusively from a given length of unity, or solely from any angle whose trigonometric properties exhibit either rational or quadratic irrational values.

Such explicitly stated impossibility is what actually distinguishes the realm between where angles can be portrayed which bear cubic irrational trigonometric property values, and other angles that do not which thereby can be expressed solely by conventional Euclidean means!

Further note in such FIG. 48 chart that linear, as well as quadratic algebraic equation and associated function format type entries appear under both conventional Euclidean practice, as well as geometric forming process cells. This is because linear straight lines and/or second order circular arcs which remain stationary over time amidst an agitated motion would assume the very same shapes within each and every geometric construction pattern which belongs to any Euclidean formulation that furthermore could be animated in order to replicate such articulation event; thereby applying to both sides of such partitioned FIG. 48 chart.

The fact that cubic equations appear only under the heading referred to as geometric forming process therein is a little more difficult to explain; having to do with the fact that by depicting actual motions, Euclidean formulations moreover can be expressed algebraically as continuums.

The most commonly known algebraic continuum is an infinite series whose terms become summed over some specific predetermined range of performance.

It naturally follows then that their integral counterparts, as realized within the field of calculus, also could apply, as well, to certain relative motions which furthermore can be geometrically described by Euclidean formulations. Quite obviously, this presumption moreover assumes that such motions actually do appear as complete continuums to any would be observer, wherein the time interval pertaining to such integral sign would approach zero; thereby confirming the very validity of yet another rather intrusive mathematical involvement.

Furthermore, other types of algebraic equations are considered to be continuous, beginning with that of a straight line whose linear equation of $y=mx+b$ validates that for each and every real number x which becomes specified, a corresponding value of y truly exists.

With particular regard to a motion related solution for the problem of the trisection of an angle, algebraically expressed continuums relate to Euclidean formulations by well known cubic equations of a single variable in which trigonometric values of an angle of size 3θ become associated to those of an angle of size θ.

The key factor pertaining to such relationships is that no matter what values might be applied to either of such angles, a three-to-one correspondence nevertheless would hold between their respective angular amplitudes!

As an example of this, consider various motion related solutions for the problem of the trisection of an angle which could be portrayed when cycling such famous Kempe prior art from a 20 degree setting to one of 120 degrees.

In such case, not only would an entire Euclidean formulation with representative geometric construction pattern as fully described by FIG. 1A geometrically describe such three-to-one angular correspondence during device flexure, but so too would the well known algebraic cubic function which assumes the form $\cos(3\theta)=4\cos^3\theta-3\cos\theta$.

That is to say, within such Euclidean formulation, angle ABC, when amounting to virtually any designated magnitude 3θ within the limits of 20°≤∠ABC≤120°, furthermore would algebraically relate to an angle ABD therein, of resulting size θ, by such aforementioned famous algebraic cubic function.

Algebraically, such relationship could be confirmed for virtually any angle within such postulated range. For example, below such functional relationship is confirmed algebraically for the particular condition when angle ABC amounts to exactly 60°:

$$\angle ABC=3\theta=60^\circ$$

$$\theta=60^\circ/3=20^\circ=\angle ABD;$$

$$\cos(\angle ABC)=\cos(3\theta)=\cos 60^\circ=0.5;$$

$$\cos(\angle ABD)=\cos\theta=\cos 20^\circ=0.93969262\ldots;$$

$$4\cos^3\theta-3\cos\theta=4(0.93969262\ldots)^3-3(0.93969262\ldots)$$

$$=3.319077862-2.819077862$$

$$=0.5.$$

Additionally, a specific nature that is found to be evident within algebraic continuums furthermore shall become addressed, wherein:

a Euclidean formulation, each of whose constituent geometric construction patterns exhibits a rendered angle whose magnitude amounts to exactly three times the size of its given angle, is to become obtained by means of having the value of its sine described by a length of $3\sin\theta-4\sin^3\theta$; thereby conforming to the famous cubic function $3\sin\theta-4\sin^3\theta=\sin(3\theta)$; and a graph is to become developed that distinguishes between the continuity of such well known cubic function $4\cos^3\theta-3\cos\theta=\cos(3\theta)$ and the discontinuity that clearly is evident within a function that otherwise assumes the form $(4\cos^3\theta-6)/(20\cos\theta)=\cos(3\theta)$.

Note that in this presentation such issue is addressed even before a more important detailed discussion that shall describe the very designs of such four newly proposed embodiments.

One method of algebraically relating a quadratic equation to two independent cubic functions that share a common root, wherein each function is limited only to a singular variable, is to link their respective coefficients together by means of what commonly is referred to as a simultaneous reduction process.

Since such common root, as denoted as $z_R$ below, occurs only when the value y in such functions equals zero, the following second order parabolic equation, thereby assuming the well known form $ax^2+bx+c=0$, can be derived from the following two given cubic equations:

$$y_1=0=z_R^3+\beta_1 z_R^2+\gamma_1 z_R+\delta_1;$$

$$y_2=0=z_R^3+\beta_2 z_R^2+\gamma_2 z_R+\delta_2;$$

$$z_R^3+\beta_1 z_R^2+\gamma_1 z_R+\delta_1=0=z_R^3+\beta_2 z_R^2+\gamma_2 z_R+\delta_2;$$

$$\beta_1 z_R^2+\gamma_1 z_R+\delta_1=0=\beta_2 z_R^2+\gamma_2 z_R+\delta_2;$$

$$0=(\beta_2-\beta_1)z_R^2+(\gamma_2-\gamma_1)z_R+(\beta_2-\beta_1);\text{ and}$$

$$0=az_R+bz_R+c.$$

Therein, whenever coefficients a, b, and c become specified, a straight line of length equal to such common root $z_R$ can be determined solely by conventional Euclidean means, simply by developing a geometric construction pattern that is representative of the famous Quadratic Formula $z_R=(-b\pm\sqrt{b^2-4ac})/2a$. Since such approach is not germane just to trisection, but nevertheless is relevant to a proper understanding of the dichotomy which exists between cubic functions of a single variable and an algebraically related famous parabolic equation, such geometric construction approach is to be described later on; after the four embodiments of such newly proposed invention first become formally introduced. Moreover, such particular resolution shall pertain to the specific circumstance when the coefficients in such well known parabolic equation, assuming the particular form $az_R^2+bz_R+c=0=ax^2+bx+c$ become assigned the respective values of a=−2, b=0.4, and c=0.75, thereby later being described by the second order equation of a single variable of the particular form $-0.2x^2+0.4x+0.75=0$.

In such FIG. 48 Mathematics Demarcation Chart, algebraic equations and their associated functions are addressed interchangeably. Such association between them easily can be recognized when considering that by reformatting the function stipulated above into equation format, its overall content in no way changes, but only becomes perceived from a completely different perspective, such that:

$$z^3+\beta z^2+\gamma z+\delta=y;\text{ and}$$

$$z^3+\beta 3z^2+\gamma z+(\delta-y)=0$$

In such first case, the variable z can change in value, thereby promoting a new corresponding value for y.

However, in such second case, generally a specific value of z is being sought after based upon the particular values which are assigned to its second order coefficient β, its linear coefficient γ, and its scalar coefficient δ−y. Notice that in such particular later reformatting, no attention whatsoever is directed to the fact that such value y also signifies a particular height above an x-axis within an orthogonal coordinate system at which a horizontal line passes through the curve that can be algebraically expressed as $z^3+\beta z^2+\gamma z+\delta=y$ at three specific locations whose corresponding values away from the y-axis amount to the respective magnitudes of z. Such perceived distinctions also suitably should be accounted for; in order to serve as yet another rudimentary elements, as contained within an all-encompassing newly proposed equation sub-element theory.

In such FIG. 48 chart, it further is indicated that only certain real numbers can reside within specific algebraic equations types, as well as their associated functions; thereby even further evidencing an overall order that exists within a farther reaching mathematics!

Such relationships are further addressed in section 9.3, as entitled Cubic Equation Uniqueness Theorem, also appearing within such above cited treatise; wherein it is stated that with respect to equation formats of singular variable, "Only cubic equations allow solely rational and quadratic irrational numerical coefficients to co-exist with root sets comprised of cubic irrational numbers".

Such technical position doesn't address higher order equations merely because they represent byproducts of cubic relationships which are fashioned in a singular variable.

Neither does such contention dispute, nor contradict the fact that cubic irrational root pairs can, and do exist within quadratic equations of singular unknown quantity.

An example of this follows with respect to the parabolic equation presented below, followed by an associated abbreviated form of the Quadratic Formula:

$$ax^2+bx+c=0$$

$$x^2+\frac{b}{a}x+\frac{c}{a}=0$$

$$x^2+b'x+c'=0;\text{ and}$$

$$\begin{aligned}x&=\frac{-b\pm\sqrt{b^2-4ac}}{2a}\\&=\frac{-b/a\pm(1/a)\sqrt{b^2-4ac}}{2a/a}\\&=\frac{-b/a\pm\sqrt{b^2/a^2-4ac/a^2}}{2}\\&=\frac{-b/a\pm\sqrt{(b/a)^2-4c/a}}{2}\\&=\frac{-b'\pm\sqrt{b'^2-4c'}}{2}.\end{aligned}$$

After examining such abbreviated Quadratic Formula, it becomes obvious that the only way in which such roots can be of cubic irrational value is when either coefficient b' and/or c' also turns out to be cubic irrational.

As such, a corollary furthermore states, "Cubic irrational root pairs which appear in parabolic equations or their associated functions require supporting cubic irrational coefficients".

Just as in the general case of conventional Euclidean practice where stringent rules apply, so to should they be specified in support of a geometric forming process. With respect to such flowchart, as posed in FIG. 2, such entries pertain to the input box entitled SET OF RULES 9.

Figure 1C:
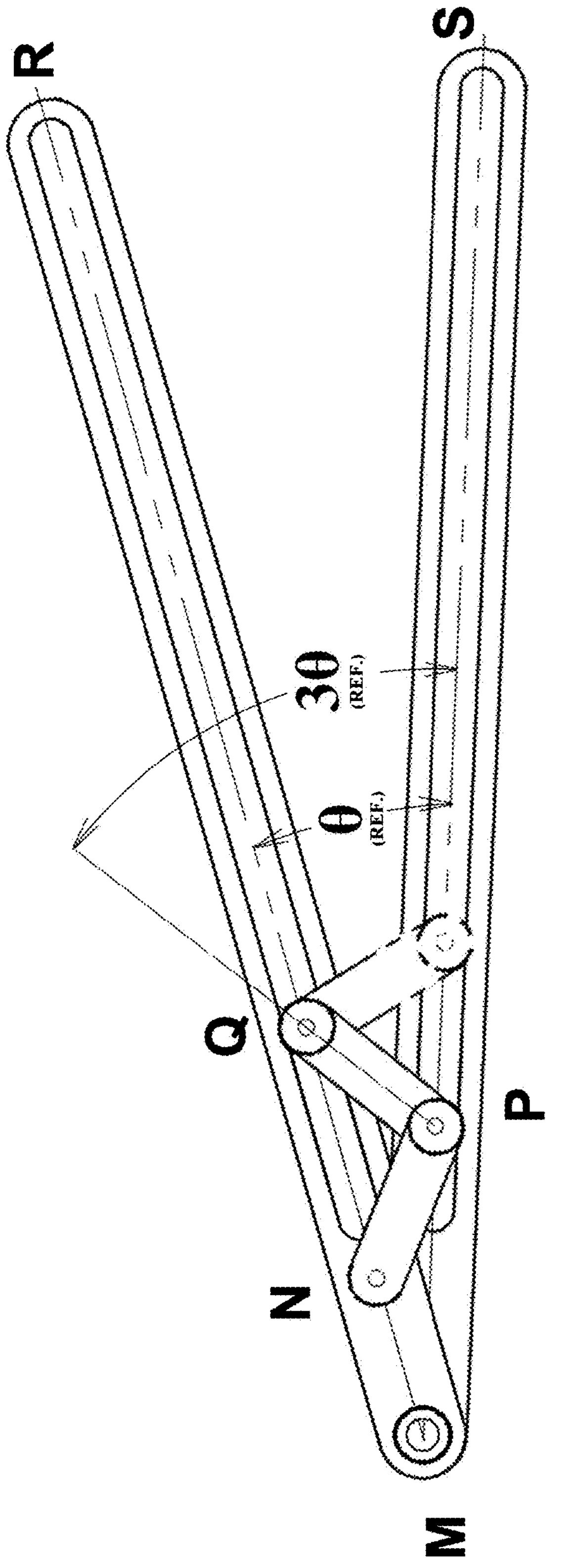
FIG. 1C is yet another illustration of prior art; shown to have been truncated in order to apply specifically to trisection, as indicated by having its unused linkage depicted in phantom therein; which also expresses the same letter designations which appear on FIG. 1B, thereby making it easier to compare such two drawings in order to recognize that the fundamental architecture of such device, as represented in FIG. 1C, could be reconfigured so that it assumes the very same overall shape as that which is depicted in FIG. 1B, thereby substantiating that, in such particular arrangement, such device would automatically portray a motion related solution for the problem of the trisection of an angle; and which additionally displays θ and 3θ algebraic angular notations for the express purpose of making it perfectly clear that such device is fully capable of trisecting, not only a specific angle of 55° designated magnitude, as actually is depicted therein, but a wide range of other device settings as well.

A few of the very simple rules which apply to geometric forming are elicited directly below. Their intent is to simplify the overall administration of such process by means of requiring fewer lines in any attendant substantiation. As duly furnished below, some of them might appear to be rather straightforward, even to the point where they may be considered as being somewhat obvious such that:

one principal rule is that the overall length of a linkage which belongs to any trisecting emulation mechanism is considered to remain constant throughout device flexure. Naturally, such rule applies so long as the linkage under consideration remains totally inelastic and intact during device flexure. From such rule, a wide variety of relationships thereby can be obtained, a small portion of which are listed as follows:

when two straight solid linkages of equal length become attached along their longitudinal centerlines at a common end by an interconnecting pivot pin which situated orthogonal to it, such three piece assembly thereby shall function as an integral hinged unit, even during conditions when one of such linkages becomes rotated respect to the other about the radial centerline of such interconnecting pivot pin; and whenever one free end of such integral three piece unit thereby becomes attached along its longitudinal centerline to the solid end of another straight slotted linkage along its longitudinal centerline by means of inserting an second interconnecting pivot pin through a common axis which is orthogonal to such longitudinal centerlines, and thereafter the remaining unattached end of such initial integral three piece hinged unit has a third interconnecting pivot pin inserted orthogonally through its longitudinal axis whose radial centerline lies equidistant away from the radial centerline of its hinge as does the radial centerline of such added second interconnecting pivot pin, whereby such third interconnecting pivot pin furthermore passes through the slot of such slotted linkage, the longitudinal centerlines of such three linkages, together with the radial centerlines of such three interconnecting pivot pins collectively shall describe an isosceles triangle shape in space, even during device flexure. For example, when viewing prior art, as posed in FIG. 1C, notice that the triangle whose vertices are described by axis M, axis N, and axis P must remain isosceles no matter what magnitude becomes applied to angle RMS. Such is the case because the constant distance between axis N and axis M always must be equal to that which lies between axis N and axis P therein;

a second rule which more particularly pertains to trisection is that the various shapes that collectively comprise an entire family of geometric construction patterns all bear a distinct geometric relationship to one another based upon the fact that they all stem from the very same sequence of Euclidean operations. A few examples of how such rule can be administered are presented below:

the radial centerlines of interconnecting pivot pins which become constrained within trisecting emulation mechanism linkage slots must remain aligned along the straight line, or even curved paths of their respective longitudinal centerlines during device flexure; as based upon the design principle that the constant width of such slot, whose longitudinal centerline also remains coincidental with that of such slotted linkage, is just slightly larger than the diameter of the shanks of the interconnecting pins which are constrained within it;

static images which become regenerated whenever a CATEGORY I sub-classification A trisecting emulation mechanism becomes cycled over its wide range of device settings automatically portray a virtually unlimited number of unique overall shapes which furthermore fully can be fully described by a Euclidean formulation; more particularly meaning that for any discrete device setting, the longitudinal centerlines of linkages and radial centerlines of interconnecting pivot pins which constitute its fundamental architecture furthermore can be described by the respective straight lines and intersection points of a geometric construction pattern which belongs to such Euclidean formulation; and as a CATEGORY I sub-classification A trisecting emulation mechanism becomes cycled over a wide range of device settings, any change which can be observed in the magnitude of the intrinsic angles of its fundamental architecture furthermore fully can be described by those which become exhibited between corresponding straight lines within a Euclidean formulation which describes the overall shapes of its portrayed static images;

another rule is that both rational, as well as quadratic irrational numbers can be algebraically equated to specific sets of cubic irrational numbers. The procedure for accomplishing this consists of first selecting a specific rational or quadratic irrational number that is to be characterized and then setting it equal to the left-hand side of one of nine equations presented in the preceding definition of a cubic irrational number, wherein:

for the particular case when a rational number of ⅛ is to be further characterized, the first of such nine equations can be applied in order to determine a value for $3\theta_1$ as follows wherein each concluding three dot notation indicates that such number extends an infinite number of decimal places to the right, thereby being indicative of an actual cubic irrational number:

$$\cos(3\theta_1)/4 = 1/8 = \cos\theta_1 \cos\theta_2 \cos\theta_3;$$

$$\begin{aligned}
\cos(3\theta_1) &= 1/2 \\
3\theta_1 &= \text{arc cosine } 1/2 \\
&= 60^\circ; \\
\theta_1 &= 60^\circ/3 \\
&= 20^\circ \\
\cos\theta_1 &= \cos 20^\circ \\
&= 0.93969262\ldots;
\end{aligned}$$

$$\begin{aligned}
\theta_2 &= \theta_1 + 120^\circ \\
&= 20^\circ + 120^\circ \\
&= 140^\circ; \\
\cos\theta_2 &= \cos 140^\circ \\
&= -0.766044443\ldots;
\end{aligned}$$

$$\begin{aligned}
\theta_3 &= \theta_1 + 240^\circ; \\
&= 20^\circ + 240^\circ \\
&= 260^\circ \\
\cos\theta_3 &= \cos 260^\circ \\
&= -0.173648177\ldots; \text{ and}
\end{aligned}$$

$$\begin{aligned}
\cos(3\theta_1)/4 &= \cos\theta_1 \cos\theta_2 \cos\theta_3 \\
&= (\cos\theta_1 \cos\theta_2)\cos\theta_3 \\
&= (-0.71984631\ldots)(-0.173648177\ldots) \\
&= 1/8;
\end{aligned}$$

when a rational number of magnitude θ, −¾, or −3 is to be further characterized, then the fourth, fifth, seventh, eighth, and ninth of such nine equations would apply; whereby those that pertain to the sin θ are validated for the particular case when a value of 34.3° becomes assigned to $\theta_1$ as follows:

$$\begin{aligned}
\sin\theta_1 &= \sin 34.3^\circ \\
&= 0.563526048\ldots;
\end{aligned}$$

$$\begin{aligned}
\theta_2 &= \theta_1 + 120^\circ \\
&= 34.3^\circ + 120 + \\
&= 154.3^\circ;
\end{aligned}$$

-continued $$\sin\theta_2 = \sin 154.3° = 0.433659084\ldots;$$

$$\theta_3 = \theta_1 + 240°; = 34.3° + 240° = 274.3°; \text{ and}$$

$$\sin\theta_3 = \sin 274.3° = -0.997185133\ldots;$$

$$\begin{aligned}0 &= \sin\theta_1 + \sin\theta_2 + \sin\theta_3\\ &= 0.563526048\ldots + 0.4336590\ldots + \sin\theta_3\\ &= 0.997185133\ldots + \sin\theta_3\\ &= 0.997185133) - 0.997185133\ldots\\ &= 0;\end{aligned}$$

$$\begin{aligned}-3/4 &= \sin\theta_1\sin\theta_2 + \sin\theta_1\sin\theta_3 + \sin\theta_2\sin\theta_3\\ &= \sin\theta_1\sin\theta_2 + (\sin\theta_1 + \sin\theta_2)\sin\theta_3\\ &= \sin\theta_1\sin\theta_2 + (-\sin\theta_3)\sin\theta_3\\ &= \sin\theta_1\sin\theta_2 - \sin^2\theta_3\\ &= 0.24437819\ldots - (-0.997185133\ldots)^2\\ &= 0.24437819\ldots - (0.99437819)\ldots\\ &= 0.24437819\ldots - (0.24437819 + 3/4)\\ &= -3/4; \text{ and as a check}\end{aligned}$$

$$\begin{aligned}-\sin(3\theta_1)/4 &= \sin\theta_1\ \sin\theta_2\ \sin\theta_3\\ \sin(3\theta_1) &= -4\sin\theta_1\ \sin\theta_2\ \sin\theta_3\\ &= +0.974761184\ldots\\ 3\theta_1 &= \text{arc sin } (0.974761194\ldots)\\ &= 77.1°, \text{ or } 102.9°\\ \theta_1 &= 77.1°/3, \text{ or } 102.9°/3\\ &= 25.7°, \text{ or } 34.3°;\end{aligned}$$

and lastly, an example is afforded for the particular case when a quadratic irrational number is to be further characterized, such that when:

$$\begin{aligned}\tan(3\theta_1) &= -\sqrt{3};\\ 3\theta_1 &= \arctan(-\sqrt{3});\\ 3\theta_1 &= -60°\\ \theta_1 &= -20°;\\ \tan\theta_1 &= \tan(-20°)\\ &= -0.363970234\ldots;\end{aligned}$$

$$\begin{aligned}\theta_2 &= \theta_1 + 120°\\ &= -20° + 120°\\ &= 100°;\\ \tan\theta_2 &= \tan 100°\\ &= -5.67128182\ldots;\\ \theta_3 &= \theta_1 + 240°;\\ &= -20° + 240°\\ &= 220°\\ \tan\theta_3 &= \tan 220°\\ &= 0.839099631\ldots; \text{ and}\end{aligned}$$

$$\begin{aligned}-\tan(3\theta_1) &= \tan\theta_1\ \tan\theta_2\ \tan\theta_3.\\ &= (\tan\theta_1\ \tan\theta_2)\ \tan\theta_3\\ &= (2.0641777\ldots)(0.8390996\ldots)\\ &= 1.732050808\ldots\\ &= \sqrt{3};\end{aligned}$$

and conversely, whenever trigonometric values of triads $\theta_1$, $\theta_2$, and $\theta_3$ become afforded as given quantities, geometric construction patterns can be approximated which are analogous to the above equations. For example, a unit circle can be drawn which exhibits three radii that emanate from its origin describing angles of θ°, (θ+120°), and (θ+240°) with respect to its x-axis and terminate upon its circumference. Accordingly, from the equation below, the sum of their three ordinate values always must be equal to zero, verified algebraically as follows:

$$\begin{aligned}0 &= \sin\theta_1 + \sin\theta_2 + \sin\theta_3\\ &= \sin\theta_1 + \sin(\theta_1 + 120) + \sin(\theta_1 + 240)\\ &= \sin\theta_1 + (\sin\theta_1\ \cos 120 + \cos\theta_1\ \sin 120) + (\sin\theta_1\ \cos 240 + \cos\theta_1\ \sin 240)\\ &= \sin\theta + \sin\theta(-1/2) + \cos\theta(\sqrt{3}/2) + \sin\theta(-1/2) + \cos\theta(\sqrt{3}/2); \text{ such that}\end{aligned}$$

$$\begin{aligned}0 &= \sin\theta(1 - 1/2 - 1/2) + \cos\theta(\sqrt{3}/2 - \sqrt{3}/2)\\ &= \sin\theta(0) + \cos\theta(0)\\ &= 0.\end{aligned}$$

Before even trying to solve the classical problem of the trisection of an angle, either the designated magnitude of an angle which is intended to be trisected or some geometric construction pattern which fully describes it first needs to be furnished!

To the contrary, if such information instead were to be withheld, then the exact size of an angle which is intended to be trisected would not be known; thereby making it virtually impossible to fulfill the task of dividing into three equal parts.

In effect, such provision of an a priori condition performs the very important role of identifying exactly which classical problem of the trisection of an angle is to be solved out of a virtually infinite number of possible forms it otherwise could assume depending upon which designated magnitude comes under scrutiny!

For example, attempting to trisect a sixty degree angle solely by conventional Euclidean means poses an entirely different problem than trying to trisect a seventeen degree angle by means of applying the very same process.

From an entirely different point of view, whenever a motion related solution for the problem of the trisection of an angle becomes portrayed, it signifies that an actual event has taken place. Such is the case because some period of time must elapse in order to reposition a trisecting emulation mechanism to a designated setting.

If this were not the case, specifically meaning that an element of time would not be needed in order to effect trisection, then a motion related solution for the problem of the trisection of an angle thereby could not occur; simply because without time, there can be no motion!

In support of such straightforward line of reasoning, however, it surprisingly turns out that a trisecting emulation mechanism furthermore can portray a stationary solution for the problem of the trisection of an angle, as well; not as an event, but by sheer coincidence; meaning that such portrayed solution materializes before time can expire!

The only way this could occur is by having such solution be portrayed before an a priori condition becomes specified; thereby suggesting that such solution becomes posed even before defining the full extent problem which it already has solved.

Essentially, such stationary solution for the problem of the trisection of an angle consists of a condition in which the designated magnitude of an angle which is intended to be trisected just so happens to match the particular reading that a trisecting emulation mechanism turns out to be prematurely set to before such activity even commences.

The only problem with such stationary solution scenario is that its probability of occurrence approaches zero; thereby negating its practical application. Such determination is computed as such singular reading selection divided by the number all possible readings which such device could be set to, generally comprised of a virtually unlimited number of distinct possibilities, and thereby amounting to a ratio which equates to $1/\infty \rightarrow 0$.

The input box appearing in such FIG. 2 flowchart, entitled PROBABILISTIC PROOF OF MATHEMATIC LIMITATION 10, refers to the specific results which can be obtained by realizing that a given angle within a geometric construction pattern furthermore must serve the dual role of also being a trisector for any rendered angle therein whose magnitude amounts to exactly three times its size; thereby signifying that a trisection event successfully has been performed solely by conventional Euclidean means!

Unfortunately although posing a legitimate solution for the classical problem of the trisection of an angle, such rather elementary approach also proves to be entirely impractical; simply because there is no way of assuring that such generated rendered angle matches the designated magnitude of an angle which is intended to be trisected; as had to be specified as an a priori condition even before attempting to generate such solution!

Since such a priori condition might have specified any of an infinite number of possible designated magnitudes, the probability of such geometric construction activity proving successful approaches zero, as again calculated by the ratio $1/\infty \rightarrow 0$.

Therefore, the practicality of actually attempting to solve such classical problem of the trisection of an angle solely by conventional Euclidean means now easily can be evaluated; whereby any singular geometric construction pattern which could be generated in such manner that the magnitude of its rendered angle amounts to exactly three times the size of a given angle, as well as turns out to be equal to a designated magnitude which previously was identified, because it bears a probability that approaches zero percent of posing a legitimate solution for such classical trisection problem, pretty much should be considered to be an impossible avenue for obtaining such solution!

Another interpretation is that an angle could be divided into three equal parts by means of applying only a straightedge and compass to it, but only under the highly unusual condition that an unlimited number of opportunities become extended, thereby assuring success. Unfortunately, such alternate approach also should be viewed to be quite unacceptable because it would take forever to complete.

To follow through with such discussion, it should be mentioned, however, that an approach to solve such classical problem of the trisection of an angle in this very manner already was discovered. As copyrighted in chapter six of my never before published 1976 treatise entitled, *Trisection, an Exact Solution*, as filed under copyright registration number TXu 636-519, such infinite point solution can trisect in a precise manner by means of performing a multitude of consecutive angular bisections, all geometrically constructed upon just a single piece of paper. Since such solution was authored more than forty years ago, it is included herein for purposes of being shared with the general public for the very first time, but only after formally introducing the four embodiments of such newly proposed articulating trisection invention first.

In FIG. 2, notice that all five of such parallelogram shaped listed input boxes, along with the non-iterative, or YES output portion of such DEFICIENCY MITIGATED 5 decision box, all funnel into a downstream process box which is entitled GEOMETRIC FORMING PROCESS DEVISED 11.

Within such flowchart, although such process box is limited basically to trisection matters, a geometric forming process nevertheless is indicative of a whole gamut of improved drawing pretexts, besides that Euclidean formulations, which could be developed in order to chart certain other distinct motions which lie outside of its presently discussed purview, or very narrow scope which hereinafter is to be addressed in this presentation. Accordingly, it is important to note that such overall process, at some future date, furthermore could prove to be the source of countless other discoveries which would require either a motion related geometric substantiation, and/or an analogous higher order algebraic solution; thereby evidencing the enormity of a geometric forming capability with regard to its profound influence upon other forms of mathematics.

In 1893, Thomas Alva Edison at long last showcased his kinetoscope. Obviously, such discovery spurred on the development of a cinematic projector by the Lumière brothers shortly afterwards. Unfortunately, many instances can be cited in human history in which follow-up inventions of far larger practical importance succeed earlier landmark cases. Ironically, such type of mishap befell Edison on another occasion, as well; being when he developed a direct current capability which thereafter became improved upon by Tesla during such time that he introduced alternating current. Accordingly, one fitting way to suitably address such above described disparity would be to unequivocally state that due to a series of ongoing technical developments, an entire motion picture industry eventually became ushered in; whereby a great fanfare finally arose, as caused by a rather unsuspecting audience who became more and more accustomed to witnessing the actual footages of world events at the cinema, as opposed to just reading about them in the newspapers. Over time, the general public began to welcome viewing news in a more fashionable setting. In retrospect, Kempe's attempts to disclose how to articulate an anti-parallelogram linkage assembly for the express purpose of performing trisection most certainly appeared to receive far less critical attention. Whether or not there existed a large interest in such subject matter is hard to fathom, for just consider: A full fifteen years prior to Lumière's actual cinematic projector debut, dating back all the way to the late 1880's, it obviously would have been very difficult, if not impossible, to reveal in sufficient detail to any awaiting crowd, and that much less to one that might have been gathered some distance way, just how to articulate an anti-parallelogram linkage device in order to satisfactorily perform trisection. Moreover, consider: Had a presentation to this effect successfully been pulled off at that very time period, it more fittingly might have been mistaken for some sort of magic act! Be that as it may, had there also been a considerable demand levied beforehand, for example by some predisposed mathematics party who might have expressed an interest in viewing such purported trisection capability, it evidently would have had very little effect in the overall scheme of things. As it were, way back in the 1880's, with such industrial community seriously lagging behind in development, as least in comparison to what actually had become accomplished just ten to fifteen years later, fewer news organizations would have been available to disseminate important technical information of that kind. In sharp contrast, only rather recently has it truly become possible to pictorially describe just how a Kempe anti-parallelogram trisection device actually functions. In today's technology, a presentation very easily could be made, merely by means of simulating the relative movement of such Kempe anti-parallelogram device within a modern day computer. However, without being predisposed to such type of information, or even to a lesser extent, thoroughly apprised of such professed trisection capabilities, it most certainly would be very difficult, indeed, to foresee that the overall technique used to create the very illusion of motion all those prior years, merely by means of animating some ragtag assortment of pictures, or possibly even some collection of photographs whose overall shapes would have been known to differ imperceptibly from one to the next, furthermore could have been applied to replicate an observed motion by means of instead animating an entire family of related geometric construction patterns! Hover, had such association truly been made those many years before, it well might have contributed to substantiating that some articulating prior art mechanism actually could perform trisection effectively throughout its wide range of device settings.

Another possible reason for such noticeable omission could be a reticence, or complacency stemming from the fact that, not only had conventional Euclidean practice proved entirely satisfactory for use on most prior occasions, but moreover that, up until now, generating a singular drawing pattern was the preferred way to pictorially display various aspects of mathematics.

Unfortunately, as it just so happens to turn out, one of the very few instances in which a singular conventional Euclidean practice approach should not be applied, just for the very reasons expressed above, is when attempting to provide the solution for the classical problem of the trisection of an angle!

As such, it might well be that a recommendation never before was raised, thereby proposing to extend conventional Euclidean practice into a geometric forming process that is fully capable of describing certain motions, simply because such aforementioned complacency very well by now actually might have escalated into a full blown reluctance on the part of a seemingly silent majority of mathematical authoritarians to overcome the crippling Euclidean limitation of not being able to backtrack upon irreversible geometric construction patterns!

With regard to the particular damage levied upon trisection matters over the years by not otherwise adopting a formal geometric forming process, consider the very first English language trisection involvement, tracing all the way back to a particular drawing which appears on page 309 of such 1897 *The Works of Archimedes*. Inasmuch as such drawing is accompanied by a complete accounting of such previously referred to Archimedes proposition, as well as a suitable algebraic proof needed to substantiate it, the apparent problem is that such drawing only is a singular geometric construction pattern, thereby applying only to the specific chord length which appears within its depicted circle. In order for such drawing depiction to be fully consistent with such Archimedes proposition and supporting algebraic proof, it should be represented by an entire Euclidean formulation, replete with an infinite number of other chord lengths which furthermore could be described within such circle, and which such Archimedes proposition and supporting algebraic proof also apply to. Without such incorporation, such drawing remains quite adequate for substantiating the arbitrarily selected chord pattern which is illustrated therein, but nonetheless remains grossly impractical because it cannot represent such infinite number of other chord shapes and attendant sizes with its circle, and thereby also remain subject to the very requirements posed by such included proposition. Whereas such drawing evidently was presented as a convention of the time, it must be presumed that it was provided merely as an example of all of the other possible geometric construction patterns which also could have been drawn while still satisfying all of the requirements of such proposition. Unfortunately, the key element that never was stated therein is that all of such other possible geometric construction patterns furthermore must stem from the very same sequence of Euclidean operations that governs such singular drawing, as is represented therein.

Based upon such prior trisection rationale discussion, it becomes apparent that a singular geometric construction pattern can depict only one event which takes place during an entire articulation process, thereby representing only a momentary viewing which neither can provide an indication of where a particular motion might have originated from, nor where it might have ended up.

Accordingly, such singular drawing format remains somewhat deficient from the standpoint that it cannot even define all of the various geometries needed to characterize an entire articulated motion!

As such, a singular geometric construction pattern can be likened to a still photograph. Whereas the latter gave birth to the motion picture industry, it seems only appropriate that the former should serve as the basis for an improved geometric approach that becomes capable of characterizing motion!

Such newly proposed geometric forming process capitalizes upon the novel prospect that it requires an entire family of geometric construction patterns to adequately represent all of the unique shapes needed to represent a complete articulation event.

Accordingly, Euclidean formulations can be of service in motion related problems which cannot be fully interpreted by a singular geometric construction pattern.

With particular regard to trisection matters, the magnitude of at least one rendered angle exhibited within any constituent geometric construction pattern that belongs to a substantiating Euclidean formulation, quite obviously would need to amount to exactly three times the size of its given angle.

Hence, by means of verifying that its outline matches the overall shape of a corresponding regenerated static image that becomes automatically portrayed once a trisecting emulation mechanism becomes properly set, its smaller static image portion thereby could be substantiated to qualify as an associated trisector for such device setting.

As such, a Euclidean formulation, recognizable by its double arrow notation, could dramatically simplify the overall process needed to substantiate that some proposed invention has been designed so that it can perform trisection accurately over a wide range of device settings and, in so doing, thereby become referred to as a bona fide trisecting emulation mechanism; as duly is depicted in the lower right hand portion of such FIG. 2 flowchart.

Hence, applying such novel geometric forming process in this respect thereby validates that overlapment points, normally considered to be detrimental because they remain inconspicuous, can be supplanted with intersection points that become fully distinguishable as regenerated static images become automatically portrayed by means of properly setting trisecting emulating mechanisms In closing, it should be mentioned that when imposing a controlled motion, it becomes possible to discern overlapment points; whereby such Euclidean limitation of otherwise not being able to distinguish them by means of backtracking exclusively from a rendered angle within an irreversible geometric construction becomes rectified!

Recapping, an overall explanation just has been afforded for the very first time which maintains that a discernment of overlapment points leads to trisection. Hence, it couldn't possibly have been referred to in any prior art.

Moreover, since such explanation alone accounts for how a motion related solution for the problem of the trisection of an angle can be portrayed, prior art couldn't possibly have rendered a differing substantiation that actually accounts for such professed capabilities.

Any further discussion concerning specific amounts of time which may be needed to arrange trisecting emulation mechanisms to particular device settings are omitted herein because such input is irrelevant when attempting to substantiate a motion related solution for the problem of the trisection of an angle; especially when considering that such times obviously would vary depending upon a user's dexterity, as well as the varying distances encountered when going from where such device might be temporarily positioned to a particular device setting.

In conclusion, if the logic proposed in such FIG. 3 Trisection Mystery Iteration Processes Table turns out to be entirely true, meaning that an inability to solve the classical problem of the trisection of an angle results because it impossible to backtrack upon any irreversible geometric construction pattern, then it would be utterly senseless to attempt drawing any type of singular geometric construction pattern whatsoever, solely by conventional Euclidean means, in an effort to achieve such ends!

Moreover, when considering that it is necessary to exert a motion in order to properly set any trisecting emulation mechanism, such warranted flexure could not, in any way, be fully described solely by a singular geometric construction pattern!

The process box entitled CLASSICAL PROBLEM OF THE TRISECTION OF AN ANGLE SOLUTION DISCREDITED 12 is to serve as the principal focal point within such flowchart, as represented in FIG. 2, where two distinct, independent Euclidean trisection approaches are to be discredited. Below, it should become rather obvious that such second listed approach is an entire reversal of the first:

not only is it impossible to fully backtrack upon any rendered angle within a geometric construction pattern whose magnitude amounts to exactly three times the size of its given angle, thereby explaining why the classical problem of the trisection of an angle cannot be solved; but conversely, the probability that the magnitude of a rendered angle matches the designated magnitude of an angle that is intended to be trisected approaches zero whenever such rendered angle becomes geometrically constructed such that its magnitude amounts to exactly three times the arbitrarily selected size of a given angle.

The fact that a duration of time is needed in order to effect a motion related solution for the problem of the trisection of an angle eliminates the possibility that such form of solution potentially might double as a solution for the classical problem of the trisection of an angle. This is because any geometric construction pattern, once drawn, cannot be modified just by applying time to it; thereby affording a probability that still approaches zero that its overall outline just might happen to superimpose upon that which otherwise could be automatically portrayed whenever a static image becomes regenerated by means of properly setting any trisecting emulation mechanism.

Moreover, when investigating whether a geometric solution furthermore might qualify as a solution for the classical problem of the trisection of an angle, it should be remembered that if extraneous information were to become introduced into such problem that turns out to be relevant to determining its solution, then only a solution for some corrupted version of the classical problem of the trisection of an angle could be obtained; thereby solving an entirely different problem and, in so doing, discrediting any potential claims that might incorrectly allege that the classical problem of the trisection of an angle has been solved.

Lastly, for those remaining skeptics who otherwise would prefer to believe that a solution for the classical problem of the trisection of an angle might yet be specified, all they need to do is disprove that an availability of overlapment points actually prevents backtracking upon a rendered angle within any geometric construction pattern all the way back to a given angle whose magnitude amounts to exactly one-third of its size!

In other words, to dispute the new theory that is presented herein, it is now up to them to identify some as yet unidentified geometric construction pattern which would enable an angle of virtually any designated magnitude they might decide upon to be trisected; when neither violating the rules which pertain to conventional Euclidean practice, not introducing any extraneous information which could be considered to be relevant to its solution!

Over time, as such ascribed overlapment attribution finally becomes acknowledged to be the real cause for being unable to solve the classical problem of the trisection of an angle, ongoing analysis thereby could be performed in order to confirm, beyond any shadow of doubt, that trisection of an angle of any magnitude cannot be performed solely by means of applying only a straightedge and compass to it!

The process box entitled SINGULAR DRAWING SOLUTION DISPELLED 13 is included in such FIG. 2 flowchart to address the fact that although a singular drawing solution can be described for any regenerated static image that automatically becomes portrayed once a trisecting emulation mechanism becomes properly set, designing a device of that type which has only one discrete setting would be entirely impractical!

Conversely, any proposed articulating trisection invention that only specifies a singular motion related solution for the trisection of angle couldn't possibly substantiate a trisection capability for its remaining wide range of settings!

The process box described as SUPPLEMENTAL DEVICE CAPABILITIES SPECIFIED 14 is the principal location in such FIG. 2 flowchart where information pertaining to such MATHEMATICS DEMARCATION 8 input box contributes to an understanding that trisecting emulation mechanisms additionally have the affinity to portray exact lengths that only could be approximated when performing geometric construction upon a given length of unity.

Such fact is duly reflected in such FIG. 48 Mathematics Demarcation Chart wherein cubic irrational real number types appear only in its third column, as headed by the geometric forming process cell; thereby indicating that deliberate motions must be imparted in order portray them. They can appear either as the ratios of portrayed lengths with respect to a given length of unity, or as trigonometric properties inherent within trisecting angles which become portrayed during certain trisection events.

For the particular case of the fourth embodiment of such newly proposed invention, a supplemental device leveling capability also is to be thoroughly described.

Within a right triangle, if the ratio between the length of one of its sides to that of its hypotenuse is cubic irrational, so must be the other. In other words, if one trigonometric property of a right triangle is cubic irrational, so must be all of its trigonometric properties!

It then logically would follow that for any right triangle that exhibits cubic irrational trigonometric properties whose hypotenuse amounts to one unit in length, the lengths of its constituent sides each would have to be of a cubic irrational value.

Such association enables the lengths of the sides of such right triangle to compensate for each other. With regard to the Pythagorean Theorem, this means that only the sum of the squares of two cubic irrational values can equal a value of one; thereby avoiding the common pitfall of otherwise attempting to equate such rational unitary value to the square of a cubic irrational value added to the square of either a rational or quadratic irrational value!

The reason that a right triangle which exhibits cubic irrational trigonometric properties truly can be geometrically constructed is because of the large number of geometric construction patterns which exist, all meeting such criteria; whereby the probability of drawing just one of them out of sheer coincidence increases dramatically.

Attempting to reproduce any one of them just be conventional Euclidean means, however, nevertheless would prove fruitless, resulting only in a mere approximation thereof; one which might prove suitable when being considered as a duplicate rendering, but not when taking into account differences between them which possibly only would become discernable well beyond what the capabilities of the human eye could detect.

By finally acknowledging that angles which exhibit cubic irrational trigonometric properties actually can be portrayed, their exact measurements would become revealed for the very first time, despite the fact that their real values can be described only by decimal patterns that are never-ending. Perhaps such new found capability very well might become perceived as an uncharted gateway that unfortunately was overlooked time and time again in the past!

FIG. 1B presents a very good example of such capability to portray angles which exhibit cubic irrational trigonometric properties. Therein, angle QPS amounts to exactly sixty degrees. Such sixty degree angle QPS was chosen because, as stated earlier, its magnitude can be represented exactly by any of the included angles within an equilateral triangle, and thereby can be drawn solely by conventional Euclidean means.

Its associated trisector ∠NMP=∠QMP=∠RMP must be equal to exactly one-third of its size, amounting to a value which computes to 60°/3=20°.

Upon interpreting FIG. 1B to be representative of a famous as a marked ruler arrangement, angle NMP would be twenty degrees in magnitude.

Moreover consider that the notch appearing in its ruler resides away from its endpoint, M, one unit of measurement.

In isosceles triangle NMP, since length MN=length NP=1, it logically follows that twice the cosine of angle NMP would amount to the ratio between length MP length MN, whereby the following relationship thereby could be obtained:

$$\overline{MP}/\overline{MN} = 2\cos(\angle NMP)$$

$$\overline{MP}/1 = 2\cos 20^\circ;\text{ and}$$

$$\overline{MP} = 2(0.93969262\ldots)$$

$$= 1.879385242\ldots$$

Hence, a cubic irrational value 1.879385242 . . . must be the exact length of base MP of isosceles triangle NMP; whereby the three dots notated after such number indicates that such decimal pattern extends on indefinitely.

Since the cosine of twenty degrees furthermore is a transcendental, number, the above procedure also could distinguish such number types, thereby constituting a subset of cubic irrational numbers.

Once having devised a suitable geometric forming process, it thereby becomes possible to verify that device candidates which wish to qualify as trisecting emulation mechanisms conform to the various elements which funnel into such process box. For example, all devices must be shown to be fully capable of performing the primary function of regenerating static images, or be bound by the same set of rules. Devices which meet such criteria, but thereafter are found to share common design traits, should be categorized as such in order to assure that each item appearing within any particular group features some fundamental performance difference which qualifies it as being individually unique. The TRISECTION INVENTIONS CLASSIFIED 15 process box represents the location within such FIG. 2 flowchart where associations of this nature are to be carried out.

The process box therein entitled REQUIREMENTS CHART PREPARED 16 is intended to distinguish that, although CATEGORY I and CATEGORY II prior art devices actually can perform trisection over a wide range of device settings, certain aspects of such capability never before were completely substantiated. The remainder of such FIG. 2 flowchart, including the decision box entitled DESIGN REQUIREMENTS MET 18, have been added for the express purpose of specifying that all of such posed requirements must be satisfied in order for a proposed design, as described by the process box entitled PROPOSED INVENTION DESIGN REFINEMENT 17, to fully qualify as a trisection emulation mechanism, as itemized in the TRISECTING EMULATION MECHANISM SUBSTANTIATED 19 process box described therein.

In closing, a novel geometric forming process just has been proposed which suitably explains how to rectify a major Euclidean limitation, essentially consisting of an incapability to distinguish overlapment points; as achieved simply by means of imposing a controlled motion which makes it possible to discern them!

Although trisection today can be performed because of such identified motion related compensation, were such deleterious behavior otherwise to remain unchecked, then trisection, as sought after by countless futile attempts to solve the famous classical problem of the trisection of an angle still would remain a very illusive problem!

Accordingly it is concluded that a geometric forming process thereby eclipses a rather limited conventional Euclidean practice that has been in vogue for millennia!

Having just concluded the prerequisite discussion pertaining to such flowchart, as posed in FIG. 2, it finally is due time to direct full attention to the formal introduction of a newly proposed articulating trisection invention!

Figure 5:
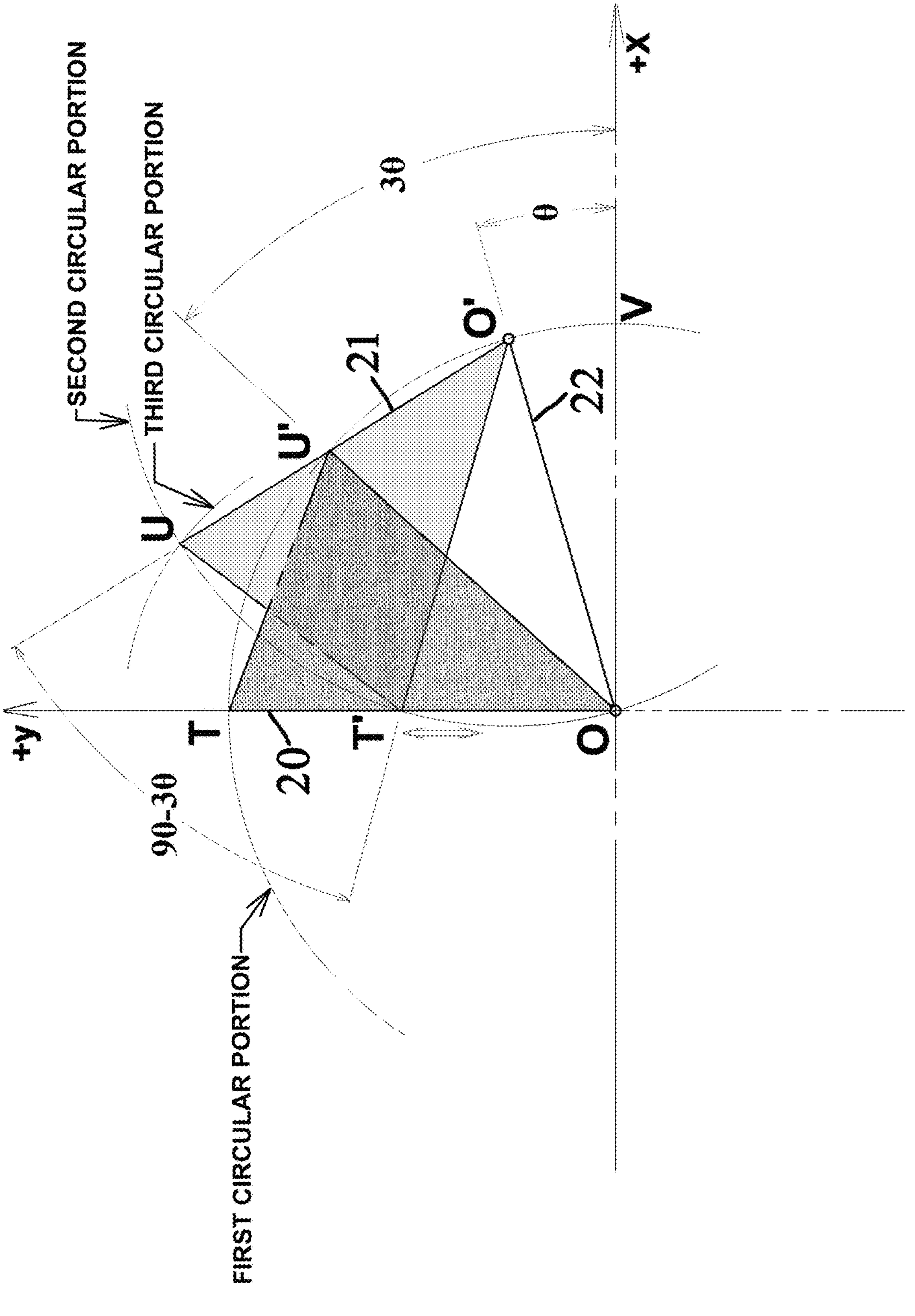
FIG. 5 is a Euclidean formulation, easily identified as such because it brandishes a double arrow, as well as bears algebraic angular notations upon it.
Figure 6:
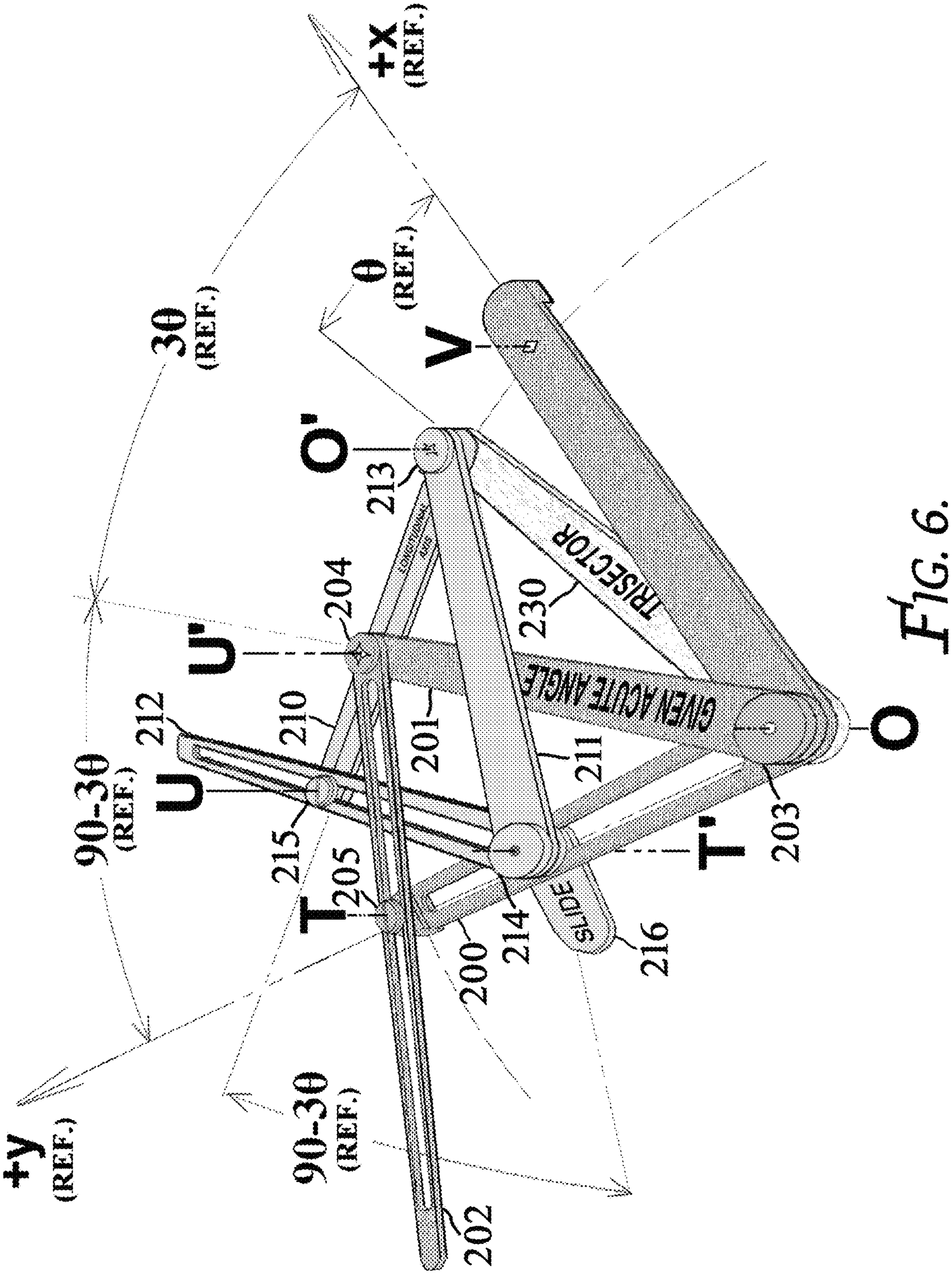
FIG. 6 is a perspective drawing of the first embodiment of such newly proposed articulating invention, otherwise referred to as its basic configuration.

Its first embodiment, as represented in FIG. 6, should be fabricated either out of a light weight metal such as aluminum, or a durable plastic such as polycarbonate throughout. It consists of:

- a compass assembly, as depicted in darker shading in FIG. 6, which can be related directly to a darker shaded member 20, as posed in FIG. 5, that is comprised of:
  - positioning linkage 200;
  - reference linkage 201;
  - adjustment linkage 202;
  - main dowel 203;
  - intermediate dowel 204; and
  - shoulder screw 205;
- a counterbalance compass assembly, as depicted in lighter texture in FIG. 6, so as to properly identify its components and relate it to the lighter textured member 21, as posed in FIG. 5, that is comprised of:
  - opposing positioning linkage 210;
  - opposing reference linkage 211;
  - opposing adjustment linkage 212;
  - opposing main dowel 213;
  - opposing intermediate dowel 214;
  - opposing shoulder screw 215; and
  - slide mechanism 216; and
- interconnecting linkage 230, as depicted without shading in FIG. 6 in order to denote that it belongs to neither of such above listed compass and counterbalance compass assemblies, but instead relates directly to member 22, as posed in FIG. 5, whose primary role is to interconnect them.

In order to properly reconcile the above listed components with the various elements which constitute the representative geometric construction pattern of such Euclidean formulation, as posed in FIG. 5, the following details are provided below:

- member OV, constituting only a portion of positioning linkage 200 should be construed merely to be an appendage of such compass assembly whose inclusion in no way interferes with the various patterns described within such Euclidean formulation, as posed in FIG. 5, but whose contributing fundamental architecture nonetheless always aligns upon its x-axis; and
- slide mechanism 216, constituting an auxiliary member of such counterbalance compass assembly, whose contributing fundamental architecture always intersects the y-axis of such Euclidean formulation, as posed in FIG. 5, at point T'.

A more detailed description of the various components which comprise the first embodiment of such newly proposed invention is provided below:

- main dowel 203, whose shank is chamfered about its lower end, and also bears a very small white colored circle inscribed upon its upper face whose center point coincides with its vertically positioned radial centerline;
- intermediate dowel 204, whose envelope dimensions (including that of its chamfer) are identical to those respectively projected by main dowel 203, except that its shank only amounts to two-thirds of such length; additionally having a small sight hole of circular shape bored completely through it about its vertical centerline which is circumscribed by a large four pointed star imprinted around its upper face whose center point also resides upon such vertical centerline;
- shoulder screw 205, whose shoulder is of the same diameter, but only one-third as long as the overall shank length of main dowel 203; with its remaining threaded portion being of a slightly smaller maximum outer diameter and double the length of its shoulder;
- reference linkage 201, whose uniform cross section consists of two convexly opposed half circles of equal size with a rectangle interposed in between them two of whose opposing sides each superimpose directly upon the outside diameters of half circles; thereby collectively projecting the envelope of a rectangular bar that is rounded in an outwardly fashion about two ends whose semicircular shaped contours radiate about respective vertical centerlines that, by construction, must pass through each of the center points of the two half circles resident in each uniform cross section within such component; whose thickness throughout measures exactly one-third the shank length of main dowel 203; which has two circular shaped holes bored through it located so that their respective vertical centerlines coincide with those which its two circular shaped ends radiate about, thereby placing the outer half sections of each of its two holes into concentricity with the respective semicircular shaped contours of its two ends; with its circular shaped hole of slightly larger proportion, being suitably sized to fit comfortably inside of reference linkage 201 without breeching its outer wall in any manner, or considerably degrading its overall structural integrity, while furthermore being capable of fitting snugly around the shank of main dowel 203 without presenting a noticeable gap, but not to the degree where any clamping becomes apparent that otherwise could cause an appreciable buildup in frictional resistance to occur, thereby otherwise possibly thwarting relative rotation attempts; with such hole also being positioned to precede the appearance of the words GIVEN ACUTE ANGLE inscribed along the longitudinal centerline of the upper face of its midsection; with its circular shaped hole of slightly smaller proportion positioned beyond the imprinted slogan GIVEN ACUTE ANGLE located such that its vertical centerline coincides with that which its neighboring circular end radiates about, appropriately sized to form an interference fit with the shank of intermediate dowel 204, but not to the degree where reference linkage 201 could become seriously overstressed over time, consequently limiting its useful service life;

adjustment linkage 202, whose envelope dimensions are the same sizes as those respectively projected by reference linkage 201, including its identically sized, opposite facing semicircular shaped extremities, excepting that its midsection is sized to be about one and one-half times longer; furthermore which exhibits a circular hole that is of identical size to the larger circular hole bored through reference linkage 201 whose vertical centerline is positioned to coincide with that which either of its semicircular shaped extremities radiates about; which additionally features a slot that extends along the longitudinal centerline of its entire remaining inner portion, whose cutout width is equal to the diameter of the circular hole bored through it and whose two internal extremities, being of identically shaped, but convexly opposed semicircular contours, represent mere extensions of its slot, carefully located so that they neither communicate with, nor encroach upon, either the circular hole bored through it or its neighboring outer extremity;

positioning linkage 200, which contains two members radiating from a central hub at ninety degrees to one another, thereby constituting a rigid right angled framework; with its member which resides in a direction that is ninety degrees counterclockwise from its other member, when looking down upon such device, consisting of a midsection onto whose free end is attached an integral end piece that consists of an extremity that is sandwiched in between two feet, all three portions being of identical uniform cross section and precisely aligned with respect to one another, whereby only the extremity portion of such integral end piece is precisely fitted to such midsection, thereby forming a natural extension to it which is its same width and thickness where they join; with its remaining clockwise member consisting of another midsection whose envelope is identical in size to the midsection featured by its counterclockwise member, onto whose free end is attached an extended integral end piece that consists of a singular extremity which has a lower foot affixed onto it, both portions of which are of identical uniform cross section and precisely aligned with respect to each other, whereby only the extremity portion of such extended integral end piece is precisely fitted to the midsection of such clockwise member, thereby forming a natural extension to it which is its same width and thickness where they join; such that its two midsections, hub, integral end piece extremities and adjoining three feet all are of the same thickness as the constant overall depth featured by reference linkage 201, with the widths of its two midsections being equal to the constant width of the midsection of reference linkage 201; with its two integral end pieces bearing the same overall cross section as either of the two ends of reference linkage 201, with the only exception being that the constant width portion of the singular extremity of such extended integral end piece is longitudinally extended by an additional length that is either equal to or larger than the radius of the head of shoulder screw 205; with the vertex of said rigid right angled framework represented as a vertical centerline that runs directly through the intersection point of two imaginary longitudinal centerlines which respectively run across the upper faces of its two midsections; whose hub features an inner ninety degree circular contour and a diametrically opposed larger outer ninety degree circular contour, oriented in the same direction, the later of which is formed a common distance away from its vertex which amounts to one-half the width of its midsections in order to transition seamlessly into their respective neighboring portions; with its counterclockwise member being sized to a length such that the distance from the very tip of its integral end piece to the outer periphery of its hub, when measured directly along the extended imaginary longitudinal centerline which runs across the upper face of its midsection, is equal to the length of the imaginary longitudinal centerline which extends across the upper face of reference linkage 201 beginning at the very tip of one of its ends and terminating at that of its other end; with positioning linkage 200 further featuring a hole of circular shape bored through it whose size is identical to that of the circular hole of slightly larger proportion bored through reference linkage 201 whose vertical centerline is positioned to coincide with that of its vertex; whereby another circular hole that thereafter is tapped with threads is made through the upper foot and adjoining singular extremity of its integral end piece, without penetrating into its neighboring lower foot, such that their common vertical centerline is positioned to coincide directly with that which its semicircular shaped contour radiates about, sized so that the threads tapped into such bored hole mate effortlessly with the threads of shoulder screw 205; additionally featuring a slot that runs along the longitudinal centerline of the entire midsection of its counterclockwise member whose cutout width over its length is equal to the diameter of the circular hole drilled through its vertex, and whose internal extremities also assume the shape of semicircular shaped contours, carefully located so that they neither communicate with, nor encroach upon, either the tapped circular hole machined into it or the circular hole drilled through its vertex; which furthermore bears a small diamond shape inscribed upon its clockwise member whose center point is located along the imaginary longitudinal centerline that runs across the upper face of its midsection at a position which resides the same distance away from its vertex as does the common vertical centerline of the tapped circular hole machined into its counterclockwise member; wherefore each of the two spans that extend from its vertex and terminate respectively at the center point of the small diamond shape inscribed upon the upper face of its clockwise member, as well as at the vertical centerline of the tapped circular hole machined into its clockwise member, are of equal length to the span which extends between the respective vertical centerlines of the two circular holes of slightly different sizes bored through reference linkage 201;

opposing main dowel 213, whose envelope dimensions, including that of its chamfer, are the same as those respectively projected by main dowel 203, except that its shank is one-third longer, and it additionally features a small four pointed star imprinted upon its upper face whose center point coincides with its vertical oriented, radial centerline;

opposing intermediate dowel 214, which is identical in every respect to said opposing main dowel 213, except that instead of a small four pointed star, it bears a small dark grey circle inscribed upon its upper face whose center point coincides with its vertically positioned radial centerline;

opposing shoulder screw 215, which is an exact duplicate of shoulder screw 205 in every respect;

opposing reference linkage 211, whose envelope dimensions are the same sizes as those respectively projected by reference linkage 201, including its identically sized, opposite facing semicircular shaped ends; which has two circular holes of identical size to the larger circular hole bored through reference linkage 201 bored through it, positioned so that their vertical centerlines coincide with those which its respective two ends are generated about; wherefore the span between the respective vertical centerlines of the two circular holes of identical size bored through opposing reference linkage 211 must be equal to that which bridges between the respective vertical centerlines of the two circular holes of slightly different sizes bored through reference linkage 201;

opposing adjustment linkage 212; which is an exact duplicate of adjustment linkage 202 in every respect;

opposing positioning linkage 210, whose midsection, along with both extremity portions of two integral end pieces which it is precisely fitted to, thereby forming natural extensions to such midsection, in tandem exhibit envelope dimensions which are the very same sizes as those projected by reference linkage 201, including its semicircular shaped ends; whose rightmost endowed integral end piece, as located about axis O', is fitted with a foot above its extremity portion, and whose leftmost endowed integral end piece, as located about axis U, is fitted with a foot below its extremity portion, with each of such two feet furthermore being of the same shape as the three identically shaped feet incorporated into positioning linkage 200, whose bounding semicircular shaped foot contours become directly aligned with the corresponding shapes of their respective adjoining extremity portions; whereby a circular hole, whose diameter is equal to that of the larger circular hole bored through reference linkage 201, also is bored entirely through its rightmost endowed integral end piece about a common vertical centerline which is positioned to coincide with the vertical centerline about which its circular contour is generated; whereupon yet another circular hole which thereafter is tapped with threads, whose respective dimensions are identical to that of the tapped circular hole machined through the counterclockwise member of positioning linkage 200 in every respect, is machined entirely through such leftmost endowed integral end piece about a common vertical centerline which is positioned to coincide with the vertical centerline about which its circular contour radiates; such that the span which lies between the respective vertical centerlines of the circular hole and the tapped circular hole which engage opposing positioning linkage 210 is equal to the span which exists between the respective vertical centerlines of the two circular holes of slightly different sizes bored through reference linkage 201; furthermore which features the term LONGITUDINAL AXIS imprinted somewhere along its upper face, accompanied by a straight line marking that is inscribed along its imaginary upper longitudinal centerline;

slide mechanism 216, whose envelope dimensions are identical to those projected by such reference linkage 201, except that its midsection is of an abbreviated, or lesser, overall length; which contains the term SLIDE imprinted longitudinally along the left side of its upper face, after which a circular hole is bored through it that is identical in all respects to the circular hole of smaller size bored through such reference linkage 201, and whose vertical centerline coincides with that which its contoured surrounding end has been fashioned about; and interconnecting linkage 230, whose respective envelope dimensions are the very same sizes as those projected by reference linkage 201, including its semicircular shaped ends; whereupon the term TRISECTOR is imprinted longitudinally along the midsection of its upper face; in which two circular holes, identical in all respects to the circular hole of smaller proportion bored through reference linkage 201, also are bored through it whose respective vertical centerlines align with those which its respective semicircular ends were designed about; such that the span between the respective vertical centerlines of the two circular holes bored through such interconnecting linkage 230 is equal to that which lies between the respective vertical centerlines of the two circular holes of slightly different sizes bored through reference linkage 201.

The description of reference linkage 201 should not be construed to mean that such design is frozen to just that specific configuration, whereby it furthermore could exhibit an assorted variety of alternate configurations so long as any modifications do not degrade its overall fit and function. Acceptable alterations could involve realigning its inscription, or even a possible abridging its words, such as just GIVEN ANGLE. Also, the overall envelope of reference linkage 201 could be changed so long as no additional material becomes introduced which would obstruct its uninhibited overall motion pattern; whereby such possible changes could include adjusting the overall shape of its uniform cross section, or possibly even introducing a shape which is not of uniform cross section.

Naturally, such refinements furthermore could apply to other device linkages, as well; whereby their envelope patterns, as previously distinguished with respect to that of reference linkage 201, also would be permitted to change accordingly.

Moreover, modifications which do not adversely affect device form, fit, or function always could be unilaterally applied without reservation.

For example, without degrading the overall performance of such first embodiment in any manner, straight line markings very easily could be added to indicate the exact positioning of the longitudinal centerlines which run along the upper surfaces of reference linkage 201 and opposing reference linkage 211. Such refinements might better be used to demarcate the fundamental architectures of such compass and counterbalance compass assemblies, especially with respect to the appendage OV of positioning linkage 200; thereby serving to abet the currently pictured way of distinguishing them which consists of:

- a white colored circle, as inscribed upon the upper face of main dowel 203;
- a small dark grey circle, as inscribed upon the upper face of opposing intermediate dowel 214;
- a large four pointed star, as imprinted around the upper face of intermediate dowel 204;
- a small four pointed star, as imprinted upon the upper face of opposing main dowel 213;
- the straight line which runs along the upper face of opposing positioning linkage 210 which is indicative of its longitudinal centerline; and
- a small diamond shape inscribed upon the clockwise member of positioning linkage 200.

Whereas both angle TOU' and angle T'O'U, as represented in FIG. 5, are 90−3θ in magnitude, such condition also must carry over to the basic configuration, as posed in FIG. 6, validated as follows:

- since slotted member OT and appendage OV of positioning linkage 200 are designed to be ninety degrees opposed to one another, angle TOV must form a right angle, stated algebraically as ∠TOV=90°;
- but, since the whole is equal to the sum of it parts, it furthermore can be stated that $$\begin{aligned}\angle TOV &= \angle VOU' + \angle U'OT\\ &= \angle VOU' + \angle TOU'\\ &= \angle VOU' + (90-3\theta);\end{aligned}$$

whereby, via substitution from above, $$90=\angle VOU'+(90-3\theta)$$

$$0=\angle VOU'-3\theta$$

$$3\theta=\angle VOU'.$$

Trisection is achieved merely by specifically arranging and thereafter setting such device in the following manner:

- laying the basic configuration of this invention down upon a table top or flat surface;
- loosening shoulder screw 205;
- applying slight finger pressure upon such clockwise member of positioning linkage 200;
- rotating reference linkage 201 about axis O until such time that its longitudinal centerline resides at an angle of 3θ with respect to the longitudinal centerline of clockwise member of positioning linkage 200. Once configured in this fashion, an imaginary straight line which runs from the white colored circle inscribed upon the upper face of main dowel 203 to the large four pointed star imprinted around the upper face of intermediate dowel 204 would reside exactly 3θ counterclockwise of another imaginary straight line which runs between such white colored circle inscribed upon the upper face of main dowel 203 and the small diamond shape inscribed upon the clockwise member of positioning linkage 200 with respect to axis O; thereby placing into position the GIVEN ACUTE ANGLE magnitude of such compass assembly, as duly notated upon its reference linkage 201;
- tightening shoulder screw 205 such that the magnitude of vertex angle TOU' of such compass assembly, as viewed about axis O and depicted in FIG. 6, becomes specifically arranged to a magnitude of 90−3θ;
- loosening opposing shoulder screw 215;
- applying slight finger pressure upon opposing intermediate dowel 214;
- rotating opposing positioning linkage 210 about axis O' until such time that its longitudinal centerline resides at an angle of 90−3θ with respect to the longitudinal centerline of opposing reference linkage 211. Once configured in this particular fashion, an imaginary straight line which runs from the small four pointed star imprinted upon the upper face of opposing main dowel 213 to the small dark grey circle inscribed upon the upper face of opposing intermediate dowel 214 would reside a magnitude that is exactly 90−3θ counterclockwise of the straight line which was etched into the upper face and runs along the longitudinal centerline of opposing positioning linkage 210 with respect to axis O'; thereby properly positioning such counterbalance compass assembly;
- tightening opposing shoulder screw 215 such that the magnitude of vertex angle T'O'U of such counterbalance compass assembly, as viewed about axis O' and depicted in FIG. 6, also becomes specifically arranged to a magnitude of 90−3θ;
- placing finger pressure upon such clockwise member of positioning linkage 200 such that by means of maintaining it in a fixed position relative to such table, an arbitrarily selected x-axis thereby becomes established; and
- translating slide mechanism 216 within the slot of positioning linkage 200 with the other hand until such time that some portion of the straight line marking along the longitudinal centerline of opposing positioning linkage 210, as centered in between the words LONGITUDINAL and AXIS, becomes positioned directly underneath the sight hole bored into intermediate dowel 204, thereby precipitating its exact alignment with axis U'. Such alignment becomes easily observable because the very location of such axis U' resides along the vertical centerline of such sight hole; thereby enabling such proper setting of the first embodiment to be confirmed.

Whenever a designated angle VOU' of such first embodiment, as posed in FIG. 6, becomes set in this very manner, angle VOO' becomes automatically portrayed as its associated trisector.

During such types of events, both designated angle VOU', as well as trisected angle VOO', as measured about axis O, become identified in the following manner:

- angle VOU' of magnitude 3θ becomes subtended between two imaginary lines, both of which emanate from the white colored circle inscribed upon the upper face of main dowel 203 and run, respectively, to the small diamond shape which is inscribed upon the clockwise member of positioning linkage 200 and to the large four pointed star imprinted around the upper face of intermediate dowel 204; and
- angle VOO' of size θ becomes subtended between two imaginary lines, both of which emanate from the white colored circle inscribed upon the upper face of main dowel 203 and run, respectively, to the small diamond shape inscribed upon the clockwise member of positioning linkage 200 and to the small four pointed star which is imprinted upon the upper face of opposing main dowel 213.

Accordingly, arc VO', as it extends from such small diamond shape to such small four pointed star, amounts to exactly one-third the size of arc VU', as it extends from such small diamond shape to such large four pointed star. In other words, such small star trisects the very angle which is established by such large star.

During such time that such first embodiment becomes properly set in this manner, such counterbalance compass assembly translates relative to such compass assembly in a practically frictionless manner. This enables such compass assembly to remain stationary with respect to the table top which it has been placed upon.

FIG. 6 depicts such basic configuration only after an exact trisection position has been attained. That is to say, such device could assume a virtually unlimited number of other positions which are not shown, whereby slide mechanism 216 then would occupy a different location within the slot afforded by the counterclockwise member of positioning linkage 200 and no portion of such longitudinal centerline marking, as etched upon the upper face of opposing positioning linkage 210, would align with axis U'; whereby in such instances trisection would not be performed.

By means of implementing the above cited trisection procedure, the basic configuration of such newly proposed invention can trisect angles which cannot otherwise be determined when otherwise unsuccessfully attempting to solve such classical problem of the trisection of an angle; thereby surpassing Euclidean capabilities.

Such trisection approach enables both the compass assembly and counterbalance compass assembly to meet the previous stipulated rule that their respective fundamental architectures perform as isosceles triangles for all possible configurations which they might assume. Accordingly, once specifically arranged in accordance with such FIG. 45 Invention Trisection Process Chart, the fundamental architecture of:

- such compass assembly fully could be described by member 20 of the particular geometric construction pattern which belongs to such Euclidean formulation, as posed in FIG. 5, whose included angle TOU' amounts to a specific magnitude of 90−3θ; and
- such counterbalance compass fully could be described by member 21 of the very same geometric construction pattern which belongs to such Euclidean formulation, as posed in FIG. 5, whose included angle TOU' thereby also amounts to such magnitude of 90−3θ.

In such above scenario such magnitude is calculated by subtracting any acute designated magnitude of 3θ value from ninety degrees.

Furthermore, by means of thereafter properly setting such device, as described above, such chosen geometric construction pattern then furthermore would fully describe the overall outline of a static image which the first embodiment would regenerate at such time; thereby substantiating that a motion related solution for the trisection of an angle was automatically portrayed.

The major difference between the fundamental architecture of such basic configuration, as represented in FIG. 6, and its corresponding Euclidean formulation, as posed in FIG. 5, is that its components have substance and feature actual thicknesses, as opposed to instead consisting of information that only needs to be as thick as the penciled depth atop a single piece of paper, or perhaps even less when considered as a virtual reality thickness within a computer.

Because of this outstanding difference, the overall height of such first embodiment additionally needs to be assessed from the standpoint that the concentricity and tolerance stack-ups at device interconnections permits constituent linkages to move only within particularly designated elevations, whereby they can be assured to perform parallel to one another at all times. Without invoking such design requirement, each particular trisection could not be validated as being precise!

In order to provide such substantiation, a First Embodiment Stacking Chart, as presented in FIG. 49, identifies particular device components which occupy various elevations at the seven axes represented in FIG. 6, each of which corresponds to an intersection point represented in the Euclidean formulation, as posed in FIG. 5.

Later, it also will be validated that the components of such first embodiment actually can be assembled to perform properly in such prescribed manner.

More specifically stated, the design of such first embodiment, as presented in FIG. 6, expands upon the geometry posed by such new, unique Euclidean formulation, as posed in FIG. 5, by introducing various levels within which linkages are permitted to articulate. Such levels represent specific elevations which always remain parallel to a table or flat surface upon which the device is to be laid. Such parallelism enables a precise trisection to be portrayed once such device has been properly set.

Such perspective drawing, as posed in FIG. 6, accounts for the various levels, or elevations, which such first embodiment linkages and interconnecting pivot pins pass through.

FIG. 49 substantiates the accuracy of the first embodiment of such newly proposed invention by verifying that its respective linkages remain parallel during actuation. Therein, levels I through VI, as listed in the first column under the heading entitled LEVEL denote consecutive spans of equal length heights that extend in a upwards direction away from any flat surface upon which first embodiment is laid.

The second major heading expressed in FIG. 49, entitled AXIS, contains seven subheadings consisting of the letters O, O', T', U', T, U, and V, thereby accounting for all of the axes represented in FIG. 6.

Such FIG. 49 chart, as well as any others which become specified with respect to other embodiments, are to be interpreted as follows:

- when a specific number repeats in any row, it indicates that a distinct linkage, as denoted by such number, articulates only within such finite level, or at that exclusive elevation;
- when such identified number also repeats in a specific column, it indicates that such distinct linkage contains feet which reside at the level(s) delineated; and
- when other specific numbers appear only in one specific column, it applies either to slide mechanism 216, or else to the head of a pivot pin.

As such, dowel and shoulder screw notations cited in such FIG. 49 stacking chart denote only levels in which their heads (rather than their shanks) reside. These consist of dowel heads 203, 204, 213, 214, and shoulder screw heads 205, and 215.

Whereby such pivot pins appear only as level IV, V, and level VI entries, it indicates that they are suitably placed at the very top of respective FIG. 49 chart columns because they reside at locations which are higher than any other device members which occupy the same respective axes.

Such FIG. 49 First Embodiment Stacking Chart furthermore indicates the following level I components come into contact with a table top or flat surface upon which such first embodiment is laid during operation:

- interconnecting linkage 230 along its entire bottom surface;
- slide mechanism 216 along its bottom surface;
- positioning linkage 200 along its two lower feet; and
- opposing positioning linkage 210 at its foot located about axis U.

As indicated in FIG. 49, positioning linkage 200 and opposing positioning linkage 210 incorporate additional feet above them located at axis T and axis O', respectively, both appearing at level III.

All embedded feet serve to maintain linkages at level positions throughout their swings. Those depicted in FIG. 6 are fabricated as an integral portion of first embodiment linkages whereby it is reiterated that each exhibits a thickness which is equal to that of any linkage.

Hence, fewer working parts are needed. Such type of design eliminates the need for added washers, functioning as shims, which could easily be lost, especially at location T where shoulder screw 205 becomes unscrewed, and thereby could be easily removed. The idea is only to loosen screws, thereby allowing different given angles to be configured, without actual disengagement. This approach assures that such screws remain attached to the device at all times so that they don't get lost.

Alternatively, feet could be machined separately and thereafter bonded onto resident linkages; thereby enabling all such elements to be manufactured from a single stock which exhibits a common thickness throughout.

Based upon such FIG. 49 stacking chart, it has been determined that linkages, discounting their included feet, operate only within the following levels during device articulation:

- adjustment linkage 202 flexes only within level IV;
- opposing reference linkage 211 flexes only within level IV;
- reference linkage 201 flexes only within level III;
- opposing adjustment linkage 212 flexes only within level III;
- positioning linkage 200 flexes only within level II;
- opposing positioning linkage 210 flexes only within level II; and
- interconnecting linkage 230 flexes only within level I;

Adjustment linkage 202 and opposing adjustment linkage 212, shown to be physically longer than the other linkages which appear in FIG. 5, are on the order of $\sqrt{1^2+1^2}=\sqrt{2}=1.4$ times their respective lengths, as computed by Pythagorean Theorem.

Such elongation makes it possible to specifically arrange the vertex angles of such compass and counterbalance compass assemblies from approximately zero to almost 90 degrees; also allowing for their shoulder screws to be properly tightened thereafter. Since each of such magnitudes amounts to 90−3θ, this indicates that angle VOU', as represented in FIG. 6, being of size 3θ respectively can be varied over a corresponding range which extends from almost zero to approximately ninety degrees.

Such estimate accounts for the fact that various components contained within such first embodiment restrict such angles from being set over the entire ninety degree range; whereby it is concluded that all acute angles can become trisected by such device, except for those which approach:

- ninety degrees because reference linkage 201, operating at level III according to such FIG. 49 chart, then would begin to encroach upon the upper foot of positioning linkage 200 which surrounds axis T; and
- zero degrees because reference linkage 201 about axis U', operating within level III, then would begin to encroach upon the upper foot of positioning linkage 210 about axis O'

Moreover, whereas the lengths of opposing reference linkage 211, interconnecting linkage 230, and the slot cut through such counterclockwise member of positioning linkage 200 are almost the same length, angle OO'T' as determined before to be of size 2θ, can be varied from magnitudes of near zero degrees to almost sixty degrees during flexure. Hence, the maximum trisector size, θ, is almost thirty degrees, amounting to one-third of ninety degrees.

Such first embodiment is assembled by means of piecing together, interlocking, and thereafter anchoring its constituent compass and compass counterbalance assemblies in the following manner:

- such compass assembly becomes pieced together by means of first inserting the shank of main dowel 203 through the circular hole of slightly larger proportion bored through reference linkage 201, and thereafter through the circular hole drilled through the vertex of positioning linkage 200, making sure that at such time both the foot fitted onto its extended integral end piece is facing in a downwards direction, and reference linkage 201 has been rotated about main dowel 203 so that it is repositioned about halfway in between the rigid right angled framework featured by positioning linkage 200; such that the shank of intermediate dowel 204 then becomes inserted through the circular hole bored through adjustment linkage 202, and then becomes press fit until it reaches the very bottom of the vacant circular hole of slightly smaller proportion bored through reference linkage 201 in a manner in which the two extended tips of the large four pointed star imprinted upon its upper face become aligned with the longitudinal centerline of reference linkage 201, wherefore after its shank becomes firmly seated, the cavity created between its chamfer and surrounding hole becomes filled with glue; whereby adjustment linkage 202 becomes rotated about intermediate dowel 204 until some portion of its slot becomes positioned directly over the threaded hole of circular proportions that is machined into the integral end piece of positioning linkage 200 and shoulder screw 205 thereafter becomes tightened into such threaded hole;
- likewise, such counterbalance compass assembly becomes pieced together by means of inserting the shank of opposing intermediate dowel 214 through either of the circular holes bored through opposing reference linkage 211, then through the circular hole bored through opposing adjustment linkage 212; and thereafter by means of inserting the shank of opposing main dowel 213 through the vacant circular hole bored through opposing reference linkage 211, and then into the circular hole bored through the rightmost endowed integral end piece of opposing positioning linkage 210, being sure that its foot is facing in an upwards direction;
- after which such compass assembly and such counterbalance compass assembly furthermore become interlocked by means of first laying such compass assembly upon a flat surface or table top and then tilting such counterbalance compass assembly in a fashion such that its constituent opposing reference linkage 211 remains above any compass assembly components, but such that a portion of the slot cut into its constituent opposing adjustment linkage 212 is positioned underneath that of adjustment linkage 202; then rotating opposing positioning linkage 210 about opposing main dowel 213 until some portion of the straight line inscribed along the longitudinal centerline upon its upper face becomes observed directly underneath the sight hole bored through intermediate dowel 204; whereupon opposing intermediate dowel 214 then becomes translated so that it resides directly above some portion of the slot that runs along the longitudinal centerline of the entire midsection of the counterclockwise member of positioning linkage 200, thereby enabling the exposed shank portion of opposing intermediate dowel 214 which already was passed through the far end of opposing reference linkage 211 and the circular hole bored through opposing adjustment linkage 212 to become inserted through such positioning linkage 200 slot so that the remaining portion of its shank finally can be press fit through the hole bored into slide mechanism 216, until such time that it bottoms out in such hole, enabling it to be glued into position about its chamfer, thereby enabling slide mechanism 216 to be rotated until the word SLIDE imprinted upon its upper face becomes aligned with the longitudinal centerline running along the upper face of the clockwise member of positioning linkage 200; whereby opposing adjustment linkage 212 thereafter becomes rotated about opposing intermediate dowel 214 until some portion of its slotted midsection aligns directly over the tapped circular hole machined through the leftmost endowed integral end piece of opposing positioning linkage 210 so that opposing shoulder screw 215 thereafter can be tightened into such threaded hole; and after which such compass assembly and counterbalance compass assembly thereafter become anchored by means of press fitting the exposed shank portion of main dowel 203 which extends beyond the lower surface of positioning linkage 200 through the circular hole bored through interconnecting linkage 230 which precedes the term TRISECTOR imprinted upon its upper face, whereby glue is applied to the intervening space afforded about the chamfer of main dowel 203 and the exposed rim of such circular hole bored through interconnecting linkage 230 preceding the words TRISECTOR, thereby permanently attaching them together; after which interconnecting linkage 230 is rotated about main dowel 203 until the vertical centerline of the vacant circular hole bored through interconnecting linkage 230 coincides with that of opposing main dowel 213, whereupon the exposed shank portion of opposing main dowel 213 becomes press fit through the vacant circular hole bored through interconnecting linkage 230 in a manner such that the two extended tips of the small four pointed star imprinted upon its upper face thereby become aligned along the imaginary longitudinal centerline running along the upper face of interconnecting linkage 230, whereby glue thereafter becomes applied to the intervening space afforded about the chamfer of opposing main dowel 213 and the exposed rim of the vacant circular hole bored through interconnecting linkage 230, thus permanently attaching them together. During such process, extreme care should be exercised to make sure that both main dowel 203 and opposing main dowel 213 bottom out in interconnecting linkage 230.

Figure 9:
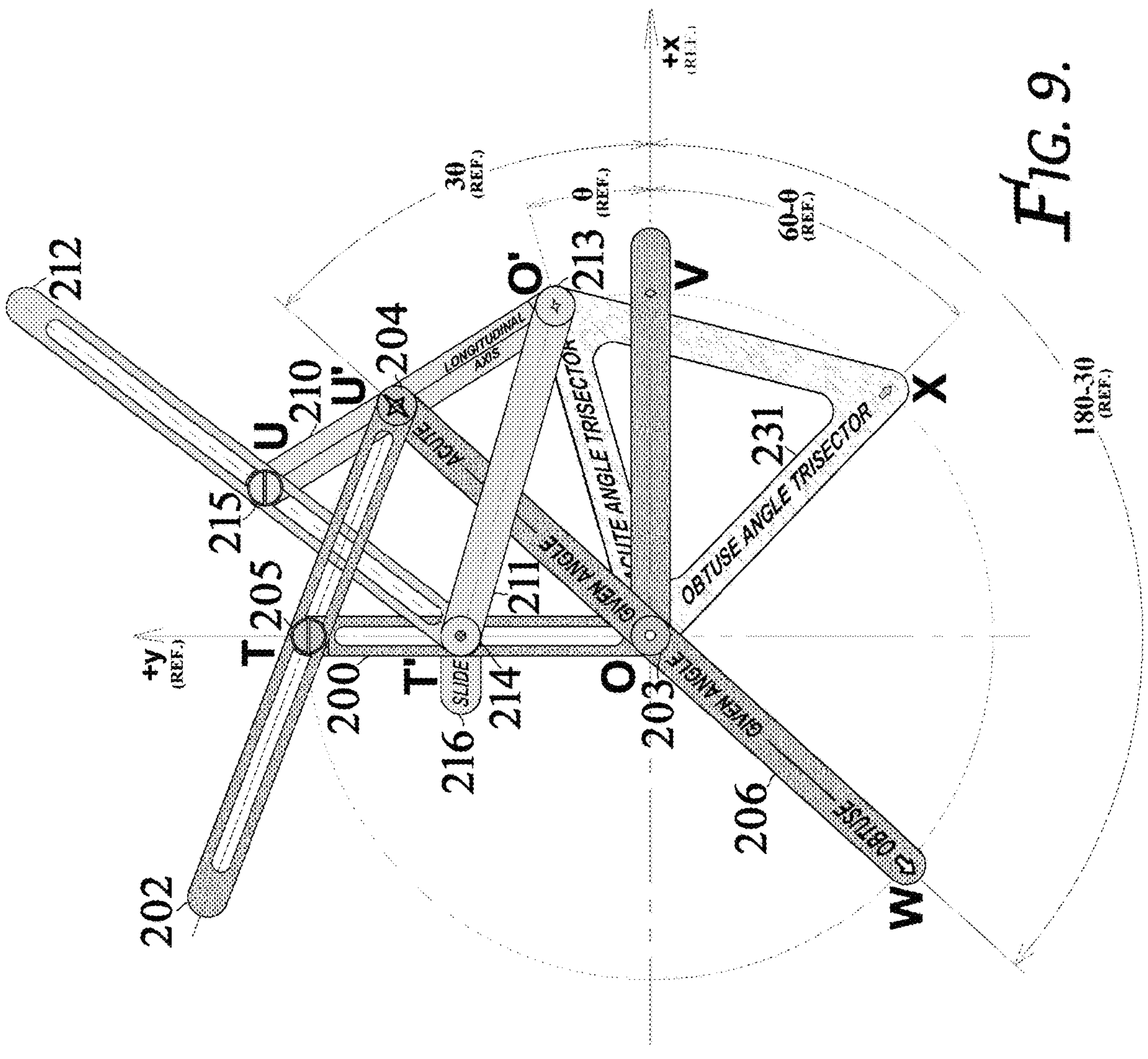
FIG. 9 is a plan view of the second embodiment of such newly proposed invention.

The second embodiment, as represented in FIGS. 8, 9, 10, 11, 12, and 13, differs from such first embodiment as follows:

it features elongated linkage 206 which replaces reference linkage 201 of such basic configuration, as illustrated in FIG. 6. The width and depth of elongated linkage 206 are of equal dimensions to those featured in reference linkage 201, but double its length; whereby it furthermore contains a lower foot that is fitted directly below its extremity which surrounds axis W in FIG. 9, that, while featuring its same overall contour, is fabricated to be double its depth. A large arrow also is inscribed upon the upper face of elongated linkage 206 directly above such added foot facing outwardly. Moreover, the term OBTUSE—GIVEN ANGLE followed directly by the words GIVEN ANGLE—ACUTE is imprinted along the longitudinal centerline upon its upper face, in a fashion where they straddle it midpoint located at axis O; and it also features equilateral template 231 which replaces interconnecting linkage 230 of such basic configuration. Equilateral template 231 is comprised of three distinct portions that abut at sixty degree angles to one another, thereby featuring a fundamental architecture that assumes the shape of an equilateral triangle, wherein each of such three portions exhibits respective overall envelope dimensions that are identical in size to those exhibited by interconnecting linkage 230. The term ACUTE ANGLE TRISECTOR is marked upon its upper face, as represented in FIG. 9, and replaces the word TRISECTOR appearing upon the upper face of interconnecting linkage 230, as indicated in FIG. 6. Moreover, the term OBTUSE ANGLE TRISECTOR also is imprinted longitudinally along the upper face of the other portion of equilateral template 231 which also communicates with axis O; whereby a small arrow furthermore is inscribed at its added vertex, facing outwardly and aligned along the imaginary longitudinal centerline of such portion which contains the term OBTUSE ANGLE TRISECTOR imprinted upon its upper face.

Figure 7:
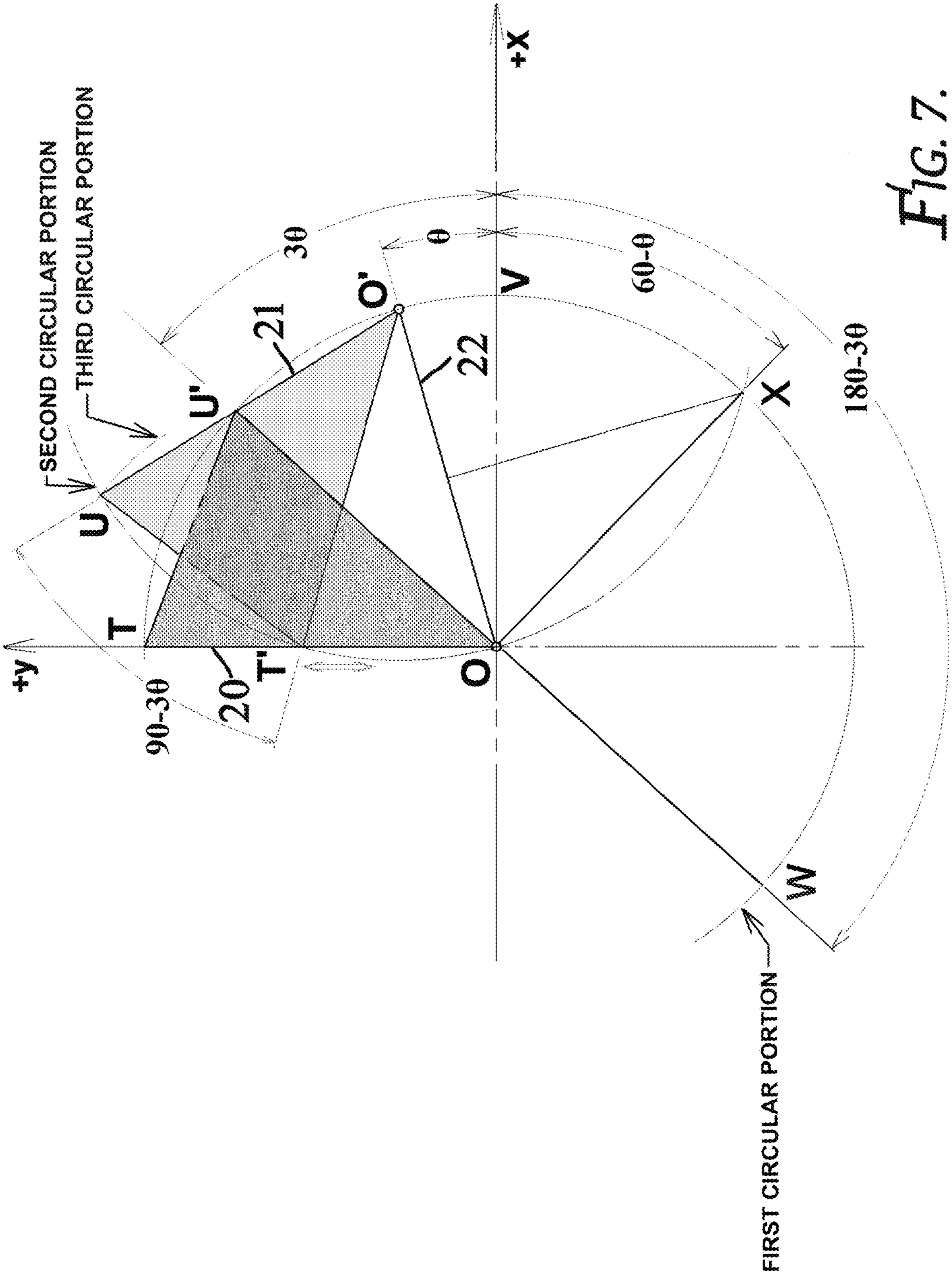
FIG. 7 is a derivative Euclidean formulation, as representing a geometrically constructed extension of FIG. 5.

In such Euclidean formulation, as posed in FIG. 5, notice that the straight lines and intersection points which constitute member 20, consisting of isosceles triangle TOU', as well as those which comprise member 21, consisting of congruent isosceles triangle T'O'U, furthermore appear without modification in such derivative Euclidean formulation, as represented in FIG. 7; meaning, that the overall function of the compass and counterbalance compass assemblies of such basic configuration, as depicted in FIG. 6, essentially being that of performing as compasses that have been laid upon their sides, has been preserved by means of furthermore being incorporated into such modified configuration, as displayed in FIG. 9. Obviously, the addition of straight line OW, as appearing in such derivative Euclidean formulation, as shown in FIG. 7, does not alter the function of member 20, as it appears in FIG. 5, in any manner at all.

Nor has the geometrical function of straight line member 22 of such Euclidean formulation, as illustrated in FIG. 5, been violated in the least by adding the two straight lines which intersect at point X in such derivative Euclidean formulation, as evidenced in FIG. 7; whereby the design of equilateral template 231, as depicted in FIG. 9 assures that axis O' and axis X remain at a fixed equidistance away from axis O at all times during device flexure.

Figure 8:
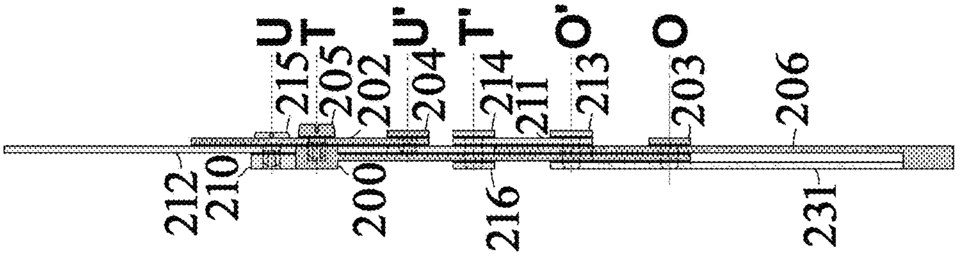
FIG. 8 is a side elevation view of the second embodiment of such newly proposed invention, otherwise referred to as its modified configuration.

The plan view and associated side elevation views of such second embodiment, as furnished in FIGS. 8 and 9, are presented side-by-side to give a clear understanding of exactly how the various linkages which comprise both such first and second embodiments of this newly proposed invention maintain flexure within prescribed elevations over their entire operational profiles without becoming entangled upon one another.

The second embodiment of such newly proposed invention, as posed in FIG. 9, applies the very same principal in order to perform trisection as does such first embodiment, except for the fact that each and every time such modified configuration becomes set, two readings, instead of one, appear in tandem as follows:

by means of properly setting acute angle VOU' to some designated magnitude, algebraically denoted to be of size 3θ therein, a static image becomes regenerated which thereby automatically portrays trisecting angle VOO', algebraically denoted therein to be of size that θ; whereby obtuse angle VOW, being of supplemental size, algebraically denoted to be of size 180−3θ therein, also becomes properly set by such prior operation, whereby such regenerated static image also automatically portrays trisecting angle VOX also, algebraically denoted to be of size that 60−θ therein.

Upon thorough review, it can be confirmed that such above stated operation for performing trisection is entirely consistent with the procedure which is postulated in such FIG. 45 Invention Trisection Process Chart.

Accordingly, an obtuse angle which is algebraically expressed to be of size 180−3θ can be trisected merely by setting such second embodiment to a designated magnitude which is algebraically denoted to be of size 3θ!

Such result can be easily verified for the particular setting which actually is exhibited in FIG. 9 whereby if it were intended to trisect an obtuse angle VOW of designated 132° magnitude, such second embodiment then would be set to its supplement value amounting to 3θ=180°−132°=48°, as is duly reflected in such FIG. 46 Motion Related Solutions for the Problem of the Trisection of an Angle Chart for acute angle VOU'.

A further detailed logic serving to verify that such second embodiment furthermore is capable of trisecting obtuse angle VOW, as algebraically expressed to be of size 180−3θ in FIG. 9, is presented directly below:

since angle VOW is supplementary to angle VOU', whose magnitude is algebraically expressed as 3θ, it must be of size 180−3θ. Such angle VOW is shown to be subtended between the longitudinal centerline of the clockwise member of positioning linkage 200 and the longitudinal centerline of the elongated portion of elongated linkage 206; and since angle VOO' is of magnitude θ, angle VOX must be of magnitude 60−θ; thereby constituting an exact trisector with respect to obtuse angle VOW, considered to be of magnitude 180−3θ. Such angle VOX is shown to be formed between the longitudinal centerline of the clockwise member of positioning linkage 200 and the longitudinal centerline of the portion of equilateral template 231 which bears the term OBTUSE ANGLE TRISECTOR inscribed upon its upper face.

Figure 21:
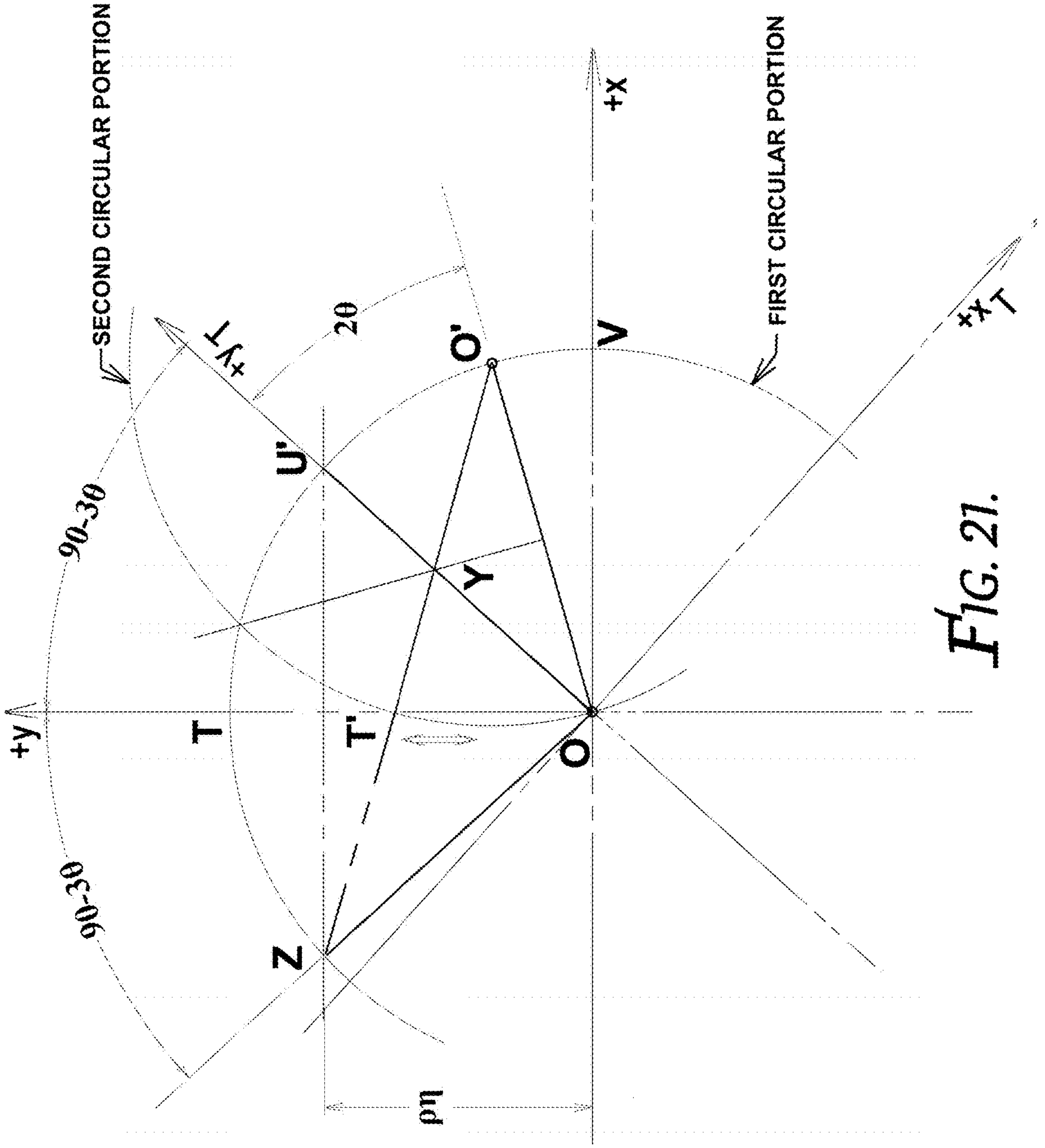
FIG. 21 is a third derivative Euclidean formulation, thereby representing a geometrically constructed extension of FIG. 14.

In FIG. 9, notice that equilateral template 231 can move freely during device flexure, in an unobstructed fashion underneath the clockwise member of positioning linkage 200 due to the longer overall length which it affords.

Wherein the side elevation view of FIG. 8 distinguishes which levels the various linkages of second embodiment reside in, it can be used to append such FIG. 21 First Embodiment Stacking Chart, as previously furnished above, such that:

equilateral template 231, in its replacement of interconnecting linkage 230, obviously would occupy level I in such FIG. 21 chart and, by being placed directly upon the table top requires no feet of its own; and elongated linkage 206, in its replacement of reference linkage 201, would occupy level III in such FIG. 21 chart, whereby the two-level foot incorporated onto its elongated end thereby must reside in level I and level II.

Figure 10:
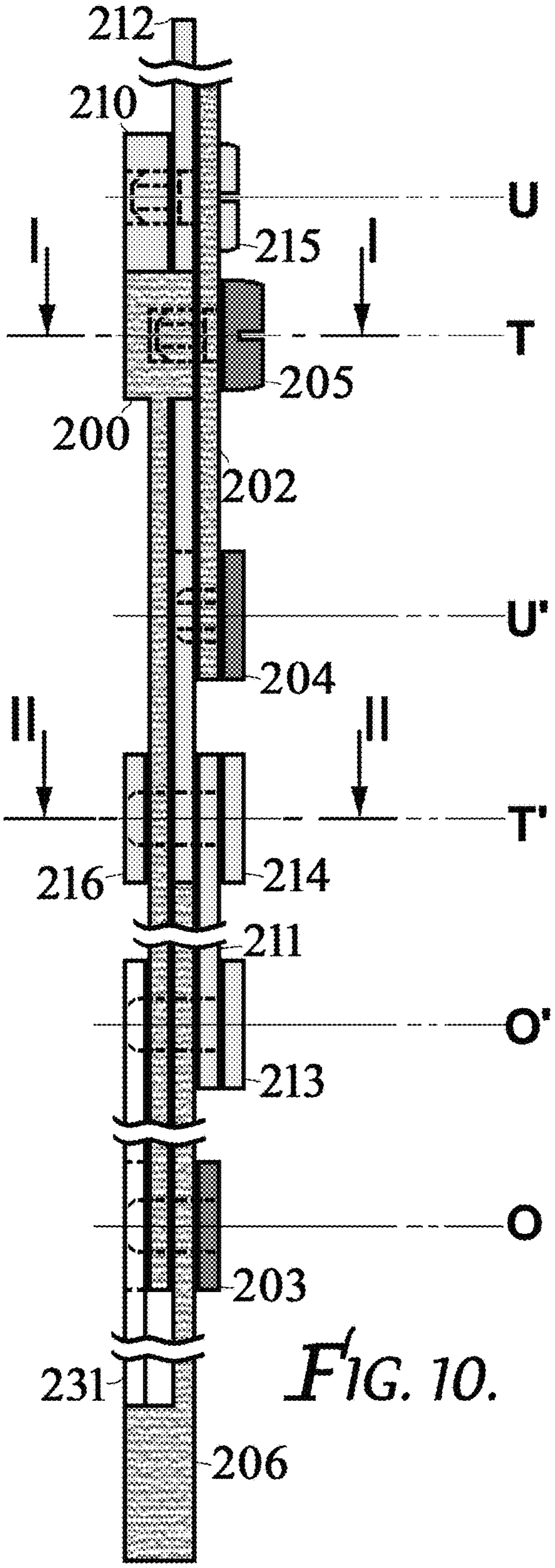
FIG. 10 is an enlargement of FIG. 8.

FIG. 10, by being an enlargement of the side elevation view of such second embodiment, as afforded in FIG. 8, avails details on the manner in which linkages interconnect with various dowels and shoulder screws belonging to such basic and modified configurations. It can be used as a further substantiation of such FIG. 21 First Embodiment Stacking Chart.

For example, FIG. 10 confirms that the heads of intermediate dowel 204, opposing main dowel 213, opposing intermediate dowel 214, the lower portion of shoulder screw 205, and the upper portion of opposing shoulder screw 215 all reside within level V; whereas the upper portion of shoulder screw 205 alone occupies level VI.

Figure 11:
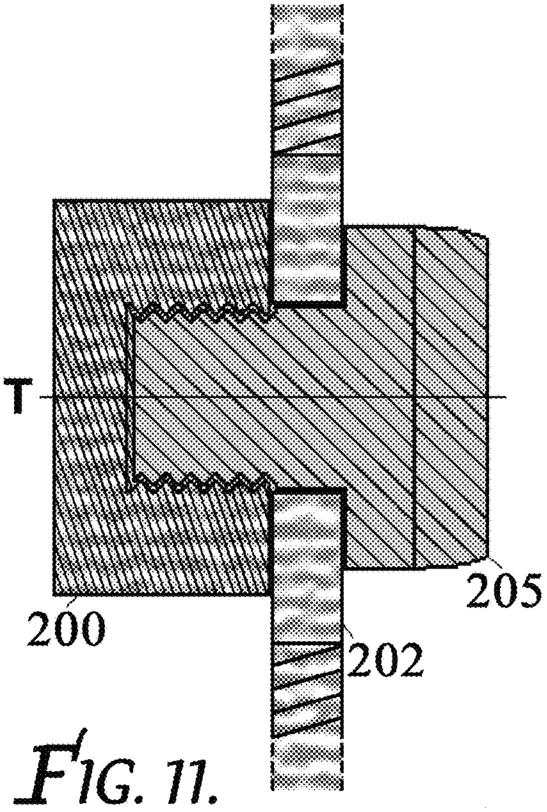
FIG. 11 is an enlarged partial view of the section on line I-I of FIG. 10.

In FIG. 11, shoulder screw 205 is depicted only after it has been fully threaded into positioning linkage 200, thereby sandwiching adjustment linkage 202 into place and properly specifically arranged such aforementioned first compass assembly.

Therein, diagonal hatching depicted upon adjustment linkage 202 indicates where it has been cut by such sectioning process, as posed in FIG. 10. Hatching doesn't appear on the back side of the slot simply because it has not been cut by such sectioning process.

Such FIG. 11 is a typical view; meaning that it also applies to the manner in which opposing adjustment linkage 212 is clamped down upon when opposing shoulder screw 215 becomes threaded into opposing positioning linkage 210.

As indicated in FIG. 10, shoulder screw 205 and opposing shoulder screw 215 are identical in virtually every respect. Therein, the shank of shoulder screw 205 is shown to sandwich adjustment linkage 202, and also to occupy two out of three elevation levels inside positioning linkage 200. Likewise, the shank of opposing shoulder screw 215 is shown to clamp down upon opposing adjustment linkage 212, and then to occupy both elevation levels inside opposing positioning linkage 210.

With respect to FIG. 11, both opposing positioning linkage 210 and opposing adjustment linkage 212 are omitted from view simply because they do not contribute in any way to a typical shoulder screw seating arrangement which serves as the focal point for such drawing.

Figure 12:
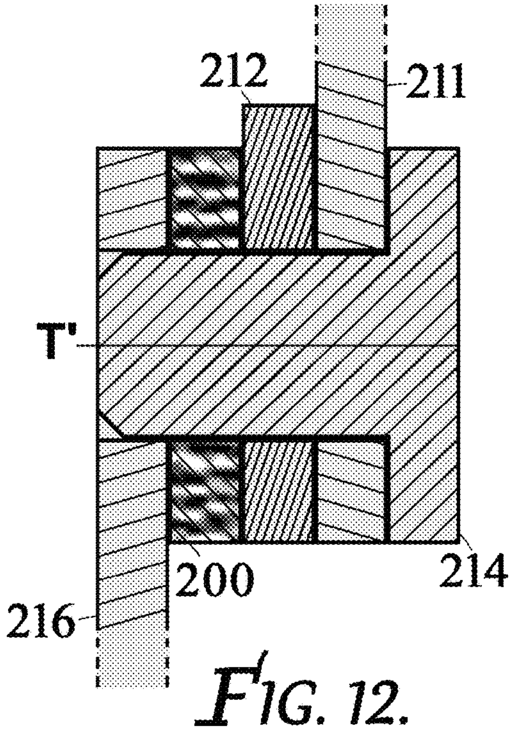
FIG. 12 is an enlarged partial view of the section on line II-II of FIG. 10.

In FIG. 12, opposing intermediate dowel 214 is depicted only after it has been inserted through opposing reference linkage 211, opposing adjustment linkage 212, positioning linkage 200, and thereafter press fit into the mating hole cut through slide mechanism 216. Such three linkages are shown to be held captive between the head of opposing intermediate dowel 214 and slide mechanism 216. Opposing reference linkage 211 and opposing adjustment linkage 212 can rotate freely about the shank of opposing intermediate dowel 214 which, in turn, remains constrained within the slot afforded by positioning linkage 200.

According to FIG. 12, once opposing intermediate dowel 214 has been properly inserted to a position where it bottoms out in slide mechanism 216, the recess formed between the chamfer of such dowel and the hole cutout of such slide mechanism 27 then becomes filled with glue. After it hardens, opposing intermediate dowel 214 becomes firmly secured into position. Based upon the specified length of the dowel's shank, a very small clearance becomes afforded between the entrapped linkages in order to enable their articulation with respect to one another in a practically frictionless manner.

Such insertion process, as exemplified in FIG. 12, is typical of those which also occur about axes O, O' and U', as represented in FIG. 10. This becomes possible because main dowel 203, intermediate dowel 204, and opposing main dowel 213 also exhibit beveled ends which conform to that which is featured by opposing intermediate dowel 214.

The four dowels featured in such first and second embodiments also exhibit the very same head and bore diameters. Only their shank lengths vary in size. Whereas the shank of intermediate dowel 204 extends through two respective linkages; the shank of main dowel 203 permeates three elevation levels, and the shanks of opposing main dowel 213 and opposing intermediate dowel 214 travel through four levels of thickness.

Moreover, the shank diameters of the four dowels featured in such first and second embodiments also are equal in size to the diameters of the shoulders of the screws also included in such designs.

The head thicknesses of such shoulder screw 205 and opposing shoulder screw 215, as posed in FIG. 10, are shown to be double the size of such four featured dowels.

With respect to FIG. 12, elongated linkage 206 and opposing positioning linkage 210 have been omitted for the same reasons as provided above.

Figure 13:
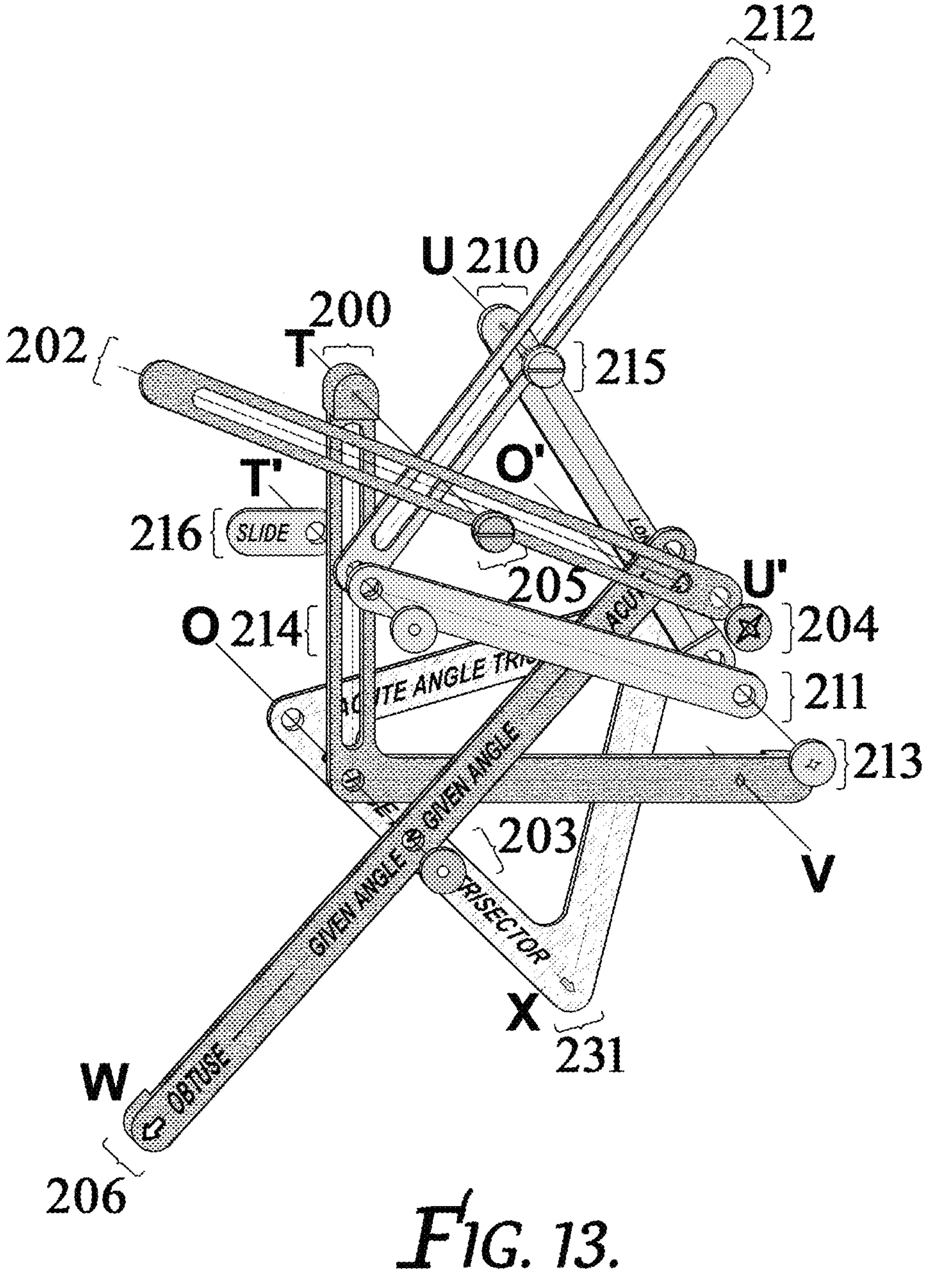
FIG. 13 is an exploded view of the such second embodiment.

In the exploded view shown in FIG. 13, the various levels, as described earlier, which such basic and modified configuration components operate within become more apparent. The straight lines passing through each axis depict the routing of hidden dowel and shoulder screw shanks as they navigate through various linkages in order to finally arrive at their final attachment destinations.

The third embodiment of such newly proposed articulating trisection invention. As represented in FIGS. 15, 16, 17, 18, 19 and 20, is comprised of the following components:

protractor board 40;
left linkage 41;
right linkage 42;
lower linkage 43;
middle linkage 44;
upper linkage 45;
cross linkage 46;
stabilizer linkage 47;
slide 48;
lower left dowel 49;
lower right dowel 50;
middle left dowel 51;
upper left dowel 52;
cross dowel 53;
retaining ring 54;
middle right dowel 55; and
upper right dowel 56.

Such rhombus configuration has no need for feet, with the exception of right linkage 42 about axis O' (as further discussed below); thereby greatly simplifying its overall design. Out of the seven linkages itemized above, only stabilizer linkage 47 is of a different overall span which amounts to approximately double such length.

Protractor board 40 has been added to such design wherein the radius of the large circle, which readings are imprinted about, is equal to the spans of such other six linkages. Two circular holes of sizes equal to the smaller hole bored through reference linkage 201 also are bored through it whereby their vertical axes pass through axis O and axis T, respectively, as appearing in FIG. 15.

The third embodiment actually represents little more than a repositioning of the components contained in such basic configuration, thereby becoming derived from it. Shoulder screw 205 and opposing shoulder screw 215, as represented in such basic and modified configurations, become removed, and thereafter replaced by less expensive upper left dowel 52 and upper right dowel 56. Such dowels all conform to the previous design standard, as specified in the first and second embodiments of such newly proposed invention, with the only exception being that the overall length of the shank of upper right dowel 56 has been modified from three times the thickness of reference linkage 201 to two times its thickness.

Figure 15:
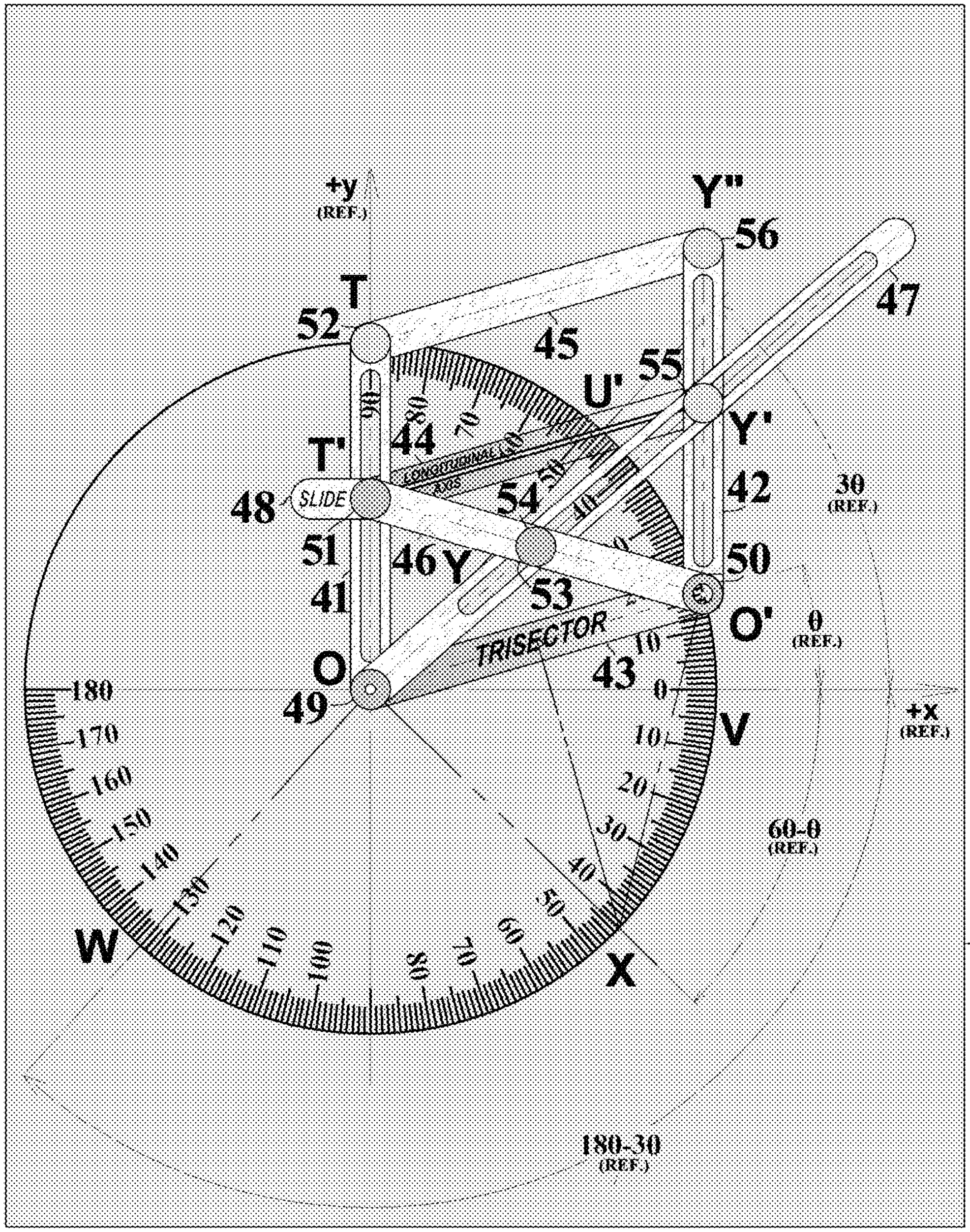
FIG. 15 is a plan view of the third embodiment of such newly proposed invention, otherwise referred to as its rhombus configuration.

A detailed accounting of the repositioning of such third embodiment components is provided below:

- the clockwise member of positioning linkage 200 appearing in FIG. 6 now becomes replaced by a horizontal straight line imprint which extends from axis O through axis V on protractor board 40, as detailed in FIG. 15;
- the circular hole which is vacated in the integral end piece of positioning linkage 200 about axis T becomes slightly enlarged to amount to a size which equal to the larger hole bored through reference linkage 201 and, of course as mentioned above, its remaining upper and lower feet become removed; thereby transforming such member into left linkage 41, as represented in FIG. 15;
- the circular hole which is vacated in the leftmost endowed integral end piece of opposing positioning linkage 210 about axis U then also becomes slightly enlarged to amount to a size which equal to the larger hole bored through reference linkage 201 and, of course as mentioned above, its remaining lower foot is removed. Moreover, the LONGITUDINAL AXIS and centerline markings appearing on opposing positioning linkage 210 become removed. Thereafter, opposing positioning linkage 210 becomes slotted so that its width equals that which is featured in positioning linkage 200, being sure that its extremities do not encroach upon either of the two holes bored through its ends, whereby it then becomes rotated about axis O' in the clockwise direction until it becomes parallel to positioning linkage 200, thereby also becoming parallel to left linkage 41, as represented in the plan view of FIG. 15, and consequently forming right linkage 42 therein. As such, the upper foot fitted onto such rightmost endowed integral end piece of opposing positioning linkage 210 remains intact, thereby also carrying over into right linkage 42;
- interconnecting linkage 230 appearing in FIG. 6 is transformed into lower linkage 43, as shown in FIG. 15 by means of making it somewhat transparent, as well as having the hole which precedes the term TRISECTOR appearing upon its upper face enlarged so that it amounts to the size of the larger hole bored through reference linkage 201;
- opposing intermediate dowel 214 appearing in FIG. 6 becomes removed and thereafter redefined as middle left dowel 51;
- opposing adjustment linkage 212 thereafter becomes shortened to be of the same span as left linkage 41, has its slot filled-in, has the circular hole that is bored though it made smaller so that it amounts to the size of the smaller hole bored through reference linkage 201, has another circular hole bored through its other end whose circumference is to be concentric with the contour of such bordering extremity and whose size is to match that of its now resized other hole, has LONGITUDINAL AXIS and a longitudinal centerline strip etched upon its upper face, and becomes modified so that it becomes completely transparent, thereby becoming transformed into middle linkage 44, as represented in the plan view of FIG. 15;

slide mechanism 216, as posed in FIG. 6, has its circular hole slightly enlarged so that it amounts to the size of the larger hole bored through reference linkage 201, thereby becoming transformed into slide 48 in FIG. 15;

opposing reference linkage 211 appearing in FIG. 6 has a new circular hole bored through its midpoint that it amounts to the size of the larger hole bored through reference linkage 201 in order to form cross linkage 46, as posed in FIG. 15;

middle left dowel 51 now becomes inserted about axis T' in FIG. 15 through the vacated hole located at one end of cross linkage 46, then through the resized circular hole afforded by slide 48; whereby it then passes through a portion of the slot of left linkage 41 and finally becomes press fit into the hole preceding the term LONGITUDINAL AXIS inscribed upon the upper face of middle linkage 44. At such time that it bottoms out, middle left dowel 51 becomes summarily glued into position about its chamfer in exactly the same manner as previously described with regard to such first and second embodiments. Middle linkage 44 then becomes rotated in a clockwise manner about axis T' until it becomes parallel to lower linkage 43;

reference linkage 201 appearing in FIG. 6 has its GIVEN ACUTE ANGLE designation removed. Thereafter it becomes extended suitably in length and slotted so that its width equals that which is featured in positioning linkage 200, thereby becoming transformed into stabilizer linkage 47, as depicted in FIG. 15;

opposing main dowel 213 shown in FIG. 6 has a hole bored through it that is concentric to its outer head circumference, thereby forming lower right dowel 50, as designated in FIG. 15;

a new cross dowel 53, as illustrated in FIG. 15, which is of identical size to upper left dowel 52 now becomes inserted about axis Y, first through the circular hole recently made midway along cross linkage 46, then through some portion of the slot afforded by stabilizer linkage 47, whereby its remaining exposed shank finally becomes press fit into retaining ring 54 and thereafter glued into place;

intermediate dowel 204, as posed in FIG. 6, now becomes removed and has its sight hole filled-in in order to form middle right dowel 55, as represented in FIG. 15. Thereafter, it becomes inserted first through the slot of stabilizer linkage 47 and then through the slot of right linkage 42 where it ultimately becomes press fit and thereafter glued, after bottoming out in the vacant circular hole of middle linkage 44;

adjustment linkage 202 next becomes shortened so that its overall span matches that of left linkage 41, has its slot filled in, has another circular hole bored through its now solid end whose size is equal to that of the smaller hole bored through reference linkage 201 such that its circumference remains concentric with the contour of such bordering extremity, thereby becoming transformed into upper linkage 45, as represented in the plan view of FIG. 15 except that it remains unattached at both ends;

upper right dowel 56 thereafter becomes inserted about axis Y", as posed in FIG. 15, through the enlarged unoccupied circular hole of right linkage 42 whereupon it becomes press fit into the smaller hole afforded by upper linkage 45, as achieved by means of first turning such linkage around, only thereafter to become glued into position after bottoming out;

upper left dowel 52 then becomes inserted about axis T, as shown in the plan view of FIG. 15; first through such vacated hole of left linkage 41, then through the larger circular afforded by upper linkage 45, but only after being rotated about axis Y" to properly align its vacant hole, whereupon it finally becomes press fit into the hole bored through the ninety degree reading of protractor board 40. At such time that it bottoms out, upper left dowel 52 thereafter becomes glued into position about its chamfer in exactly the same manner as previously described with regard to such first and second embodiments; and main dowel 203, as posed in FIG. 6 lastly becomes removed, thereafter to be represented as lower left dowel 49 in FIG. 15, where it becomes inserted through the circular hole of stabilizer linkage 47, then through the circular hole located at axis O of left linkage 41, then through the vacant enlarged hole of lower linkage 43, where it finally becomes press fit and thereby glued into position in the same manner as previously discussed.

In the Third Embodiment Stacking Chart, as presented in FIG. 50, the first column entitled LEVEL is reserved for listing various spans that rise vertically above a table top. Therein, level 0 designates the vertical span which is occupied by protractor board 40 of such third embodiment. Likewise, levels I through V denote various consecutive vertical spans of equal height that extend upwardly above the top surface of such protractor board 40.

The second major heading expressed in FIG. 50, entitled AXIS, contains seven subheadings consisting of the letters O, O', T', Y', T, Y", and Y, thereby accounting for all of the axes represented in defining FIG. 15.

Again, dowel notations, as cited in such FIG. 50 Third Embodiment Stacking Chart, denote only levels in which their heads (rather than their shanks) reside. In particular, this applies to lower left dowel 49, lower right dowel 50, middle left dowel 51, upper left dowel 52, cross dowel 53, middle right dowel 55 and upper right dowel 56, all of which appear within level III, level IV and level V entries.

As further indicated therein, dowel entries are listed at the very top of respective FIG. 50 chart columns, thereby signifying that they are located above all other device members which they respectively are shown to be vertically aligned with.

An interpretation of FIG. 50 Third Embodiment Stacking Chart with respect to the components which communicate with axis Y is that the lower portion of the head of cross dowel 53 and the upper portion of retaining ring 54 sandwich cross linkage 46 and stabilizer linkage 47 in between them. Moreover, such retaining ring 54 performs without drag since it is raised above protractor board 40 during device flexure, as indicated by the dashed lines occupying level I in such FIG. 50 chart.

Such FIG. 50 chart also indicates that the bottom portions of lower linkage 43, middle linkage 44, and upper linkage

45, as located within level II, come into direct contact with the upper surface of protractor board 40; thereby serving to dissipate the overall frictional load which is experienced during device operations by means of affording a relatively large surface area upon which to distribute it; and consequently promoting a longer device service life.

Such FIG. 50 Third Embodiment Stacking Chart validates that right linkage 42 incorporates an additional foot at its end which resides about axis O'. As indicated, the function of such foot is to maintain cross linkage 46 parallel throughout its entire span which extends from axis O' to axis T'

Figure 16:
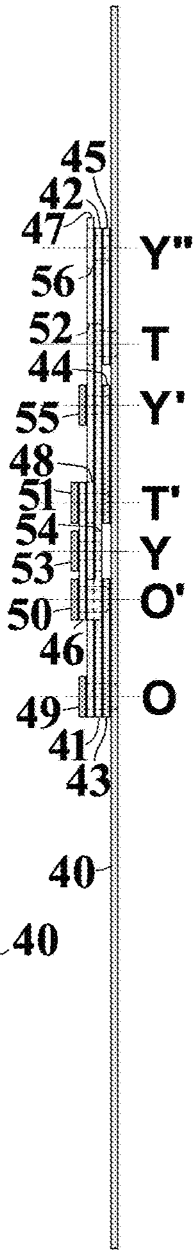
FIG. 16 is a side elevation view of the third embodiment of such newly proposed invention.

The principal purpose of the side elevation view afforded FIG. 16 is to illustrate how various linkages and their interconnecting attachments articulate without becoming entangled upon one another. Therein, entire linkage spans are shown to occupy specific levels which they remain confined within during device flexure.

Figure 14:
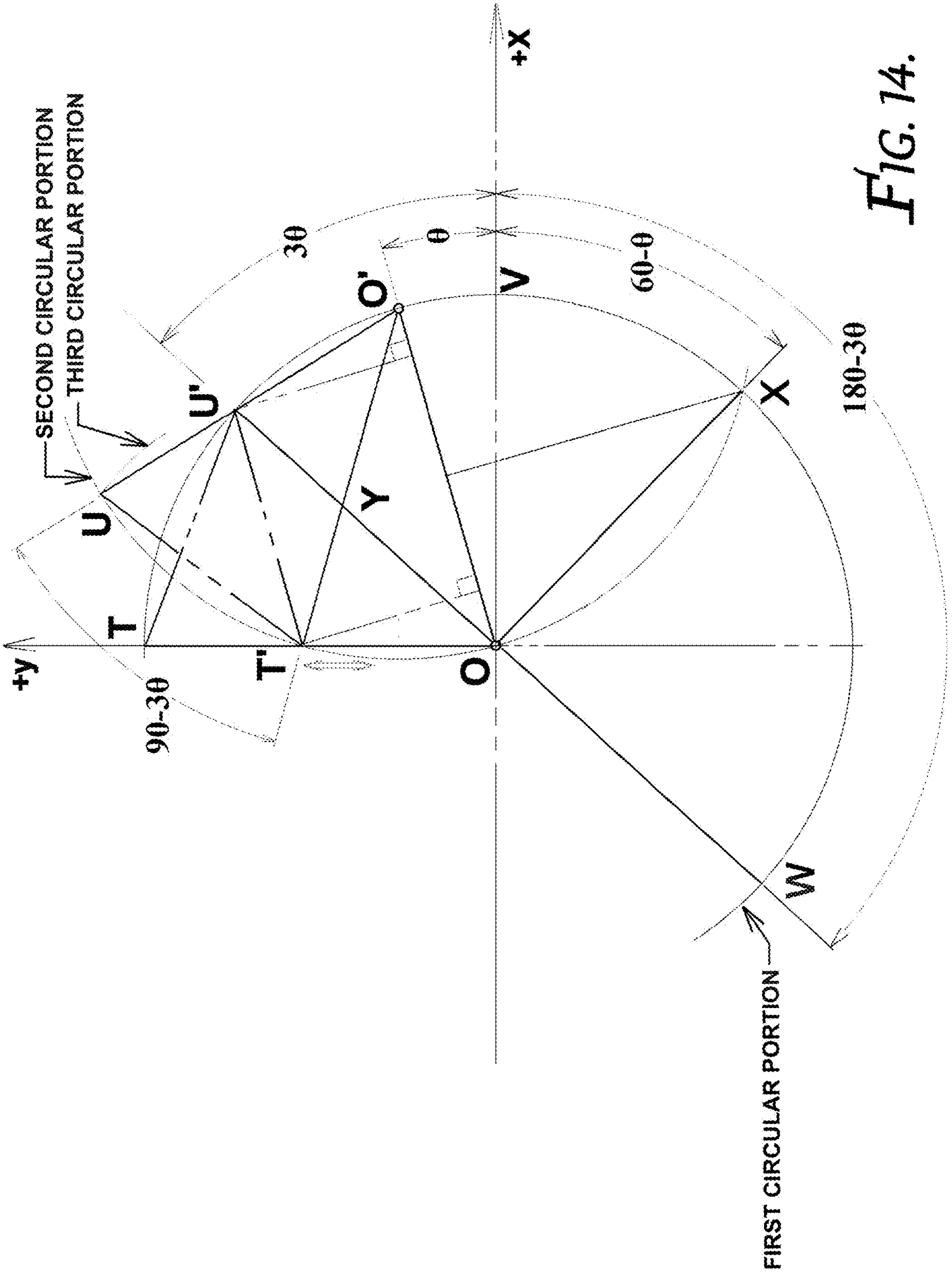
FIG. 14 is a second derivative Euclidean formulation, thereby representing a geometrically constructed extension of FIG. 7.

Such third embodiment, as represented in FIG. 15, has been designed so that its articulation throughout a wide range of device settings can be suitably replicated by means of animating of an entire family of geometric construction patterns, all belonging to such second derivative Euclidean formulation, as represented in FIG. 14; thereby enabling such third embodiment to qualify as a legitimate trisecting emulation mechanism.

To substantiate that such rhombus configuration can, in fact, trisect any and all angles which it might become properly set to require that:

- opposite sides of a rhombus, as described by the longitudinal centerlines of left linkage 41, right linkage 42, lower linkage 43, and upper linkage 45 therein, respectively remain parallel throughout device flexure;
- the longitudinal centerline of middle linkage 44 furthermore remains parallel to lower linkage 43, as well as upper linkage 45 throughout device flexure; and
- a trisector for any setting which axis U' could assume thereby would become automatically portrayed by the longitudinal centerline of lower linkage 43.

Figure 17:
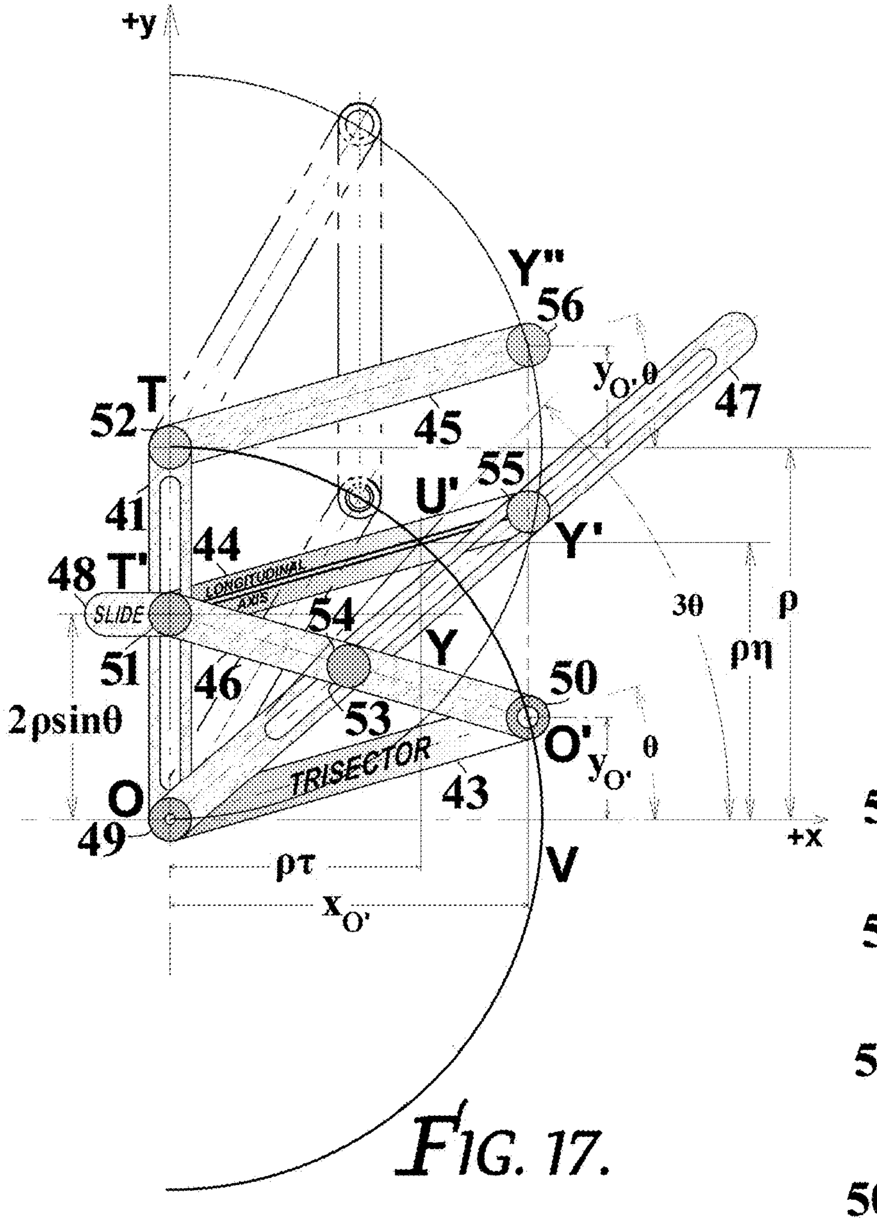
FIG. 17 is a drawing used to prove that for any axis U' setting of such third embodiment, an angular reading which amounts to one-third of that size automatically appears at its axis O'.

For such validation, the four centerlines which comprise such rhombus are denoted in FIG. 17 as equal length straight line segments OT, OO', and TY", along with phantom straight line segment O'Y", all being of a span p, as measured between the radial centerlines of any two adjacent dowels which reside along the four corners of such device.

Whereas both the lower left dowel 49 and upper left dowel 52 are permanently affixed to such underlying protractor board 40, as posed in FIG. 15, the longitudinal centerline of left linkage 41, as represented in FIG. 17, thereby must reside in a stationary position that aligns upon such specified +y-axis.

Accordingly, lower linkage 43 can be rotated about lower left dowel 49 in a completely unobstructed manner; whereas, upper linkage 45 also is free to be rotated about upper left dowel 52 in much the same manner.

Two solutions for a quadratic equation, as arrived at below, algebraically indicate two possible locations where axis Y" could reside in such rhombus configuration, with one of such solutions being ignored because it is located at axis O, therein recognized as the origin of such FIG. 17 diagram wherein an x-axis and y-axis are shown to intersect.

In effect, such determination consists of:

designating and thereby identifying coordinate values with respect to axis O for each of the following listed axes:

for U'—$(x_{U'}; y_{U'})=(\rho \cos 3\theta; \rho \sin 3\theta)$;
for axis T—$(x_T; y_T)=(0; \varphi$;
for axis O'—$(x_{O'}; y_{O'})=(\rho \cos \theta; \rho \sin \theta)$;
for axis T'—$(x_{T'}; y_{T'})=(0; 2\rho \sin \theta)'$;
for axis Y'—$(x_{Y'}; y_{Y'})$;
for axis Y"—$(x_{Y''}; y_{Y''})$;

since axis Y" must exist somewhere upon the circumference of a circle of radius ρ whose center is situated at axis O' its coordinates would satisfy the equation $(x-x_{O'})^2+(y-y_{O'})^2=\rho^2$;

since axis Y" also must exist somewhere upon the circumference of a circle of radius ρ whose center is situated at axis T, its coordinates furthermore would satisfy the second order equation $x^2+(y-y_T)^2=\rho^2$:

equating such two mathematical relationships avails a determination of their respective intersection points, thereby identifying exactly where axis Y" is located. This is accomplished by means of substituting $x_{Y''}$ for the x designations and $y_{Y'}$ for the y designations in such above two equations, whereby:

$$(x_{Y''}-x_{O'})^2+(y_{Y''}-y_{O'})^2=x_{Y''}^2+(y_{Y''}-y_T)^2$$

$$(x_{Y''}-x_{O'})^2+(y_{Y''}-y_{O'})^2=x_{Y''}^2+(y_{Y''}-\rho)^2$$

$$(x_{O'}^2+y_{O'}^2)-2(x_{Y''}x_{O'}+y_{Y''}y_{O'})=-2y_{Y''}\rho+\rho^2$$

$$\rho^2-2(x_{Y''}x_{O'}+y_{Y''}y_{O'})=-2y_{Y''}\rho+\rho^2$$

$$-2(x_{Y''}x_{O'}+y_{Y''}y_{O'})=-2y_{Y''}\rho$$

$$x_{Y''}x_{O'}+y_{Y''}y_{O'}=y_{Y''}\rho$$

$$x_{Y''}x_{O'}=y_{Y''}(\rho-y_{O'});$$

but since $x_{O'}^2+y_{O'}^2=\rho^2$ $$x_{O'}^2=\rho^2-y_{O'}^2$$

$$x_{O'}x_{O'}=(\rho+y_{O'})(\rho-y_{O'}):$$

by means of comparing the respective terms of such above two results, it turns out that when $x_{Y''}=x_{O'}$, $y_{Y''}=\rho+y_{O'}$:

Checking such two above cited second order equations for correctness renders:

$$(x_{Y''}-x_{O'})^2+(y_{Y''}-y_{O'})^2=\rho^2;$$

$$(x_{O'}-x_{O'})^2+(\rho+y_{O'}-y_{O'})^2=\rho^2$$

$\rho^2=\rho^2$; and $$x_{Y''}^2+(y_{Y''}-y_T)^2=\rho^2;$$

$$x_{O'}^2+(\rho+y_{O'}-\rho)^2=\rho^2;$$

$$x_{O'}^2+y_{O'}^2=\rho^2.$$

Above, since $x_{Y''}=x_{O'}$, it indicates that phantom straight line segment O'Y" must remain parallel to straight line segment O'T for all possible positions that axis O' might assume; thereby indicating that right linkage 42 remains parallel to left linkage 41, as well as the +y-axis, for all possible third embodiment configuration engagements.

Secondly, by means of fabricating middle linkage 44 so that its longitudinal centerline also is of span p, it thereby also must remain parallel to the longitudinal centerlines of lower linkage 43 and upper linkage 45 throughout device flexure. This is because such straight line segments OO', T'Y', and TY", as posed in FIG. 17, by being of equal length to one another furthermore describe respective hypotenuses of right triangles that must be congruent because they all maintain respective sides of equal length $x_0$'; whereby their corresponding angles must be of equal magnitude.

By means of arranging upper linkage 45 parallel to lower linkage 43, as can be accomplished when rotating them properly with respect to stationary left linkage 41, as posed in FIG. 17, right linkage 42, as it appears in FIG. 15, thereafter could be inserted therein in order to exactly fill this void expressed by such phantom line segment O'Y". In effect, it does so by possessing a longitudinal centerline which is of span p and, by means of being perfectly vertical at all times; thereby remaining parallel to the longitudinal centerline of left linkage 41 and, in so doing, completing such overall rhombus configuration.

Otherwise, if right linkage 42 were not situated in a perfectly vertical attitude, by nevertheless being bound to terminate somewhere along the circumference of a circle of radius p produced about axis T, it thereby would terminate at some location other than at axis Y". However, in order to do so, right linkage 42 then would have to be either shorter or longer; consequently violating the requirements of being a rhombus in the very first place!

Lastly, an additional proof thereby relies upon the fact that since such straight line segment T'Y' remains parallel to straight line segment OO' throughout device flexure, it thereby must subtend an angle with respect to straight line segment OT that amounts to a magnitude of 90+θ. Hence, by the Law of Sines, it can be determined that:

$$\frac{\sin(\angle T'U'O)}{T'O} = \frac{\sin(\angle OT'U)}{OU'}$$

$$\frac{\sin(\angle T'U'O)}{2\rho\sin\theta} = \frac{\sin(90+\theta)}{\rho}$$

$$\frac{\sin(\angle T'U'O)}{2\sin\theta} = \frac{\cos\theta}{1}$$

$$\sin(\angle T'U'O) = 2\sin\theta\cos\theta$$

$$\sin(\angle T'U'O) = \sin(2\theta)$$

$$\angle T'U'O) = 2\theta;\text{ and}$$

$$\angle T'U'O + \angle O\ T'U' + \angle U'O\ T' = 180^\circ$$

$$2\theta + (90+\theta) + \angle U'O\ T' = 180^\circ$$

$$2\theta + \theta + \angle U'O\ T' = 90^\circ$$

$$\angle U'O\ T' = 90^\circ - 3\theta$$

$$90^\circ - \angle VOU' = 90^\circ - 3\theta$$

$$-\angle VOU' = -3\theta$$

$$\angle VOU' = 3\theta.$$

For the above analysis to be valid, angle OT'U' therein, being algebraically expressed to be of size 90+θ, with its straight line segment OT' furthermore residing upon the +y-axis, as posed in FIG. 17, would have its other straight line segment T'U reside at an attitude of θ counterclockwise with respect to the +x-axis at all times; thereby remaining parallel to straight line segments OO' and TY" which represent respective longitudinal centerlines of lower linkage 43 and upper linkage 45.

Such observation is to be confirmed based upon the understanding that the reading upon the circumference of protractor board 40 which just so happens to appear within the longitudinal centerline strip imprinted on either side of the longitudinal centerline of middle linkage 44 actually defines the very location of axis U'; thereby furthermore specifying a particular designated magnitude of 3θ which such third embodiment, at such very moment, trisects.

As such, the following identity can be derived wherein sin (3θ) is to be denoted by η and cos(3θ) is to be designated as τ:

$$2\theta = 3\theta - \theta;$$

$$\sin(2\theta) = \sin(3\theta - \theta)$$

$$2\sin\theta\cos\theta = \sin(3\theta)\cos\theta - \cos(3\theta)\sin\theta$$

$$2\sin\theta\cos\theta = \eta\cos\theta - \tau\sin\theta;\text{ and}$$

$$\rho(2\sin\theta\cos\theta) = \rho(\eta\cos\theta - \tau\sin\theta)$$

$$2\rho\sin\theta\cos\theta = \rho\eta\cos\theta - \rho\tau\sin\theta$$

$$2\rho\sin\theta = \rho\eta - \rho\tau\tan\theta$$

$$\rho\tau\tan\theta = \rho\eta - 2\rho\sin\theta$$

$$\tan\theta = (\rho\eta - 2\rho\sin\theta)/\rho\tau.$$

Such result easily can be confirmed by means of referring to FIG. 17 and locating the terms itemized in such resulting equation, once considering that axis U', with assigned coordinate values of $(x_{U'};\ y_{U'}) = (\rho\tau;\ \rho\eta)$, always must reside along straight line segment T'Y', representing the longitudinal centerline of middle linkage 44, at a particular location in which the circumference of protractor board 40 intersects it, no matter what magnitude θ might assume!

As axis U' approaches ninety degrees with respect to the +x-axis, such third embodiment reaches its design limit; thereby enabling lower linkage 43 to operate only between 0 and 3θ degrees.

As such, the remaining phantom lines shown in FIG. 17 detail one of a virtually unlimited number of overall shapes which such device otherwise might assume once it becomes articulated.

As such, it just has been proven that the longitudinal centerline of lower linkage 43, as represented in the plan view of FIG. 15 by the distinctive marking TRISECTOR, thereby can trisect any designated protractor board 40 reading which such rhombus configuration can be properly set to, merely by means of maneuvering such slide 48 inside of the slot afforded within left linkage 41 until such time that the magnitude of a designated angle that is intended to be trisected appears as a reading that is straddled in between the longitudinal centerline markings of such middle linkage 44.

Hence such designated reading, as algebraically is expressed as 3θ and represented by angle VOU' therein, is shown to be trisected by angle VOO', thereby amounting to a magnitude θ.

Therefore, the overall outline of any static image that becomes regenerated by means of properly setting such third embodiment, because it furthermore could be fully described by a geometric construction pattern which belongs to such second derivative Euclidean formulation, as represented in FIG. 14, thereby can be substantiated as having automatically portrayed a motion related solution for the problem of the trisection of an angle.

The purpose of stabilizer linkage 47, as represented in plan view in FIG. 15, is to assure smooth transition during device articulation.

Such rhombus configuration is strictly regulated during device flexure by an expanse of stabilizer linkage 47 which extends from axis O to axis Y'; thereby furthermore describing a diagonal of a parallelogram whose respective sides, as posed in FIG. 17, consist of straight line segments OT' and O'Y', as respectively belonging to left linkage 41 and right linkage 42, along with straight line segments OO' and T'Y', as respectively belonging to lower linkage 43, and middle linkage 44.

Since the midpoints of diagonals of a rhombus must cross each other, cross dowel 53 which resides midway along cross linkage 46 must translate through the slot afforded in stabilizer linkage 47 to a location such that span OY always is equal to span YY'.

Accordingly, axis Y' becomes located, not by one, but by two simultaneous, independent movements which serve to reinforce one another, and thereby increase device accuracy, described as follows:

- the first motion is that of such parallelogram OO'Y'T', as formed by aforementioned portions of left linkage 41 and right linkage 42, along with the entire spans of lower linkage 43, and middle linkage 44, which thereby describes the positioning of axis Y' during device articulation; and
- the second motion is that of middle right dowel 55 whose center point, not only describes axis Y', but also must reside inside of the slot afforded by right linkage 42, no matter what angle it becomes rotated to with respect to the x-axis during the entire articulation process.

The reason that both lower linkage 43 and middle linkage 44 are of transparent design is so that angle VOU' and angle VOO' readings can be accurately deciphered upon a protractor board 40 which resides underneath them.

In order to trisect given obtuse angle VOW of magnitude 180−3θ, the following procedure shall become administered:

- given obtuse angle VOW of magnitude 180−3θ first is to be superimposed upon protractor board 40, as represented in the plan view of FIG. 15;
- straight line WO is extended, thereby locating axis U' on the circumference of protractor board 40;
- slide 48 is moved vertically until such time that it becomes observed that the longitudinal centerline strip imprint appearing between the inscriptions LONGITUDINAL and AXIS on middle linkage 44 straddles such axis U'; and
- either a perpendicular bisector with respect to lower linkage 43, or a straight line radiating at an angle of sixty degrees below its longitudinal centerline is established. Such distinctions are represented by phantom lines in FIG. 15. The intersection of either of such lines with the circumference embedded into protractor board 40 locates axis X, and thereby identifies the exact trisector of given obtuse angle VOW. Its magnitude is calculated as $(180-3\theta)/3=60-\theta=\angle VOX$.

Figure 18:
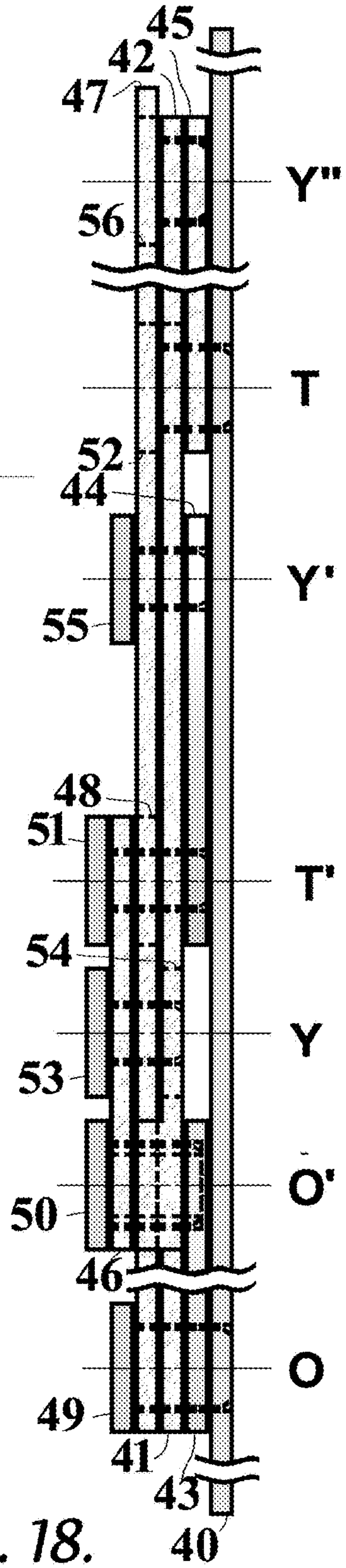
FIG. 18 is an enlargement of FIG. 16.

FIG. 18 magnifies such side elevation view representation appearing in FIG. 16 for purposes of detailing exactly how such third embodiment components interface with one another in order to form an integral, working assembly.

FIG. 18 validates such FIG. 50 Third Embodiment Stacking Chart by demonstrating that the heads of lower right dowel 50, middle left dowel 51, and cross dowel 53 all occupy level V; whereas, the heads of lower left dowel 49 and middle right dowel 55 occupy level IV, and the heads of upper left dowel 52 and upper right dowel 56 occupy level III. As such, FIG. 18 describes the overall height profile of such rhombus configuration.

As also is indicated in FIG. 18, the shanks of lower left dowel 49, lower right dowel 50, upper left dowel 52 and upper right dowel 56, placed at the respective corners of such rhombus configuration, feature enlarged diameters since they do not need to travel through slots. Accordingly they avail a larger circumference and associated bearing surface in order to avail increased strength. Moreover, such modification allows the sight hole bored through lower right dowel 50 to be somewhat larger, thereby giving a more panoramic view of the protractor board 40 readings which reside underneath.

Figure 19:
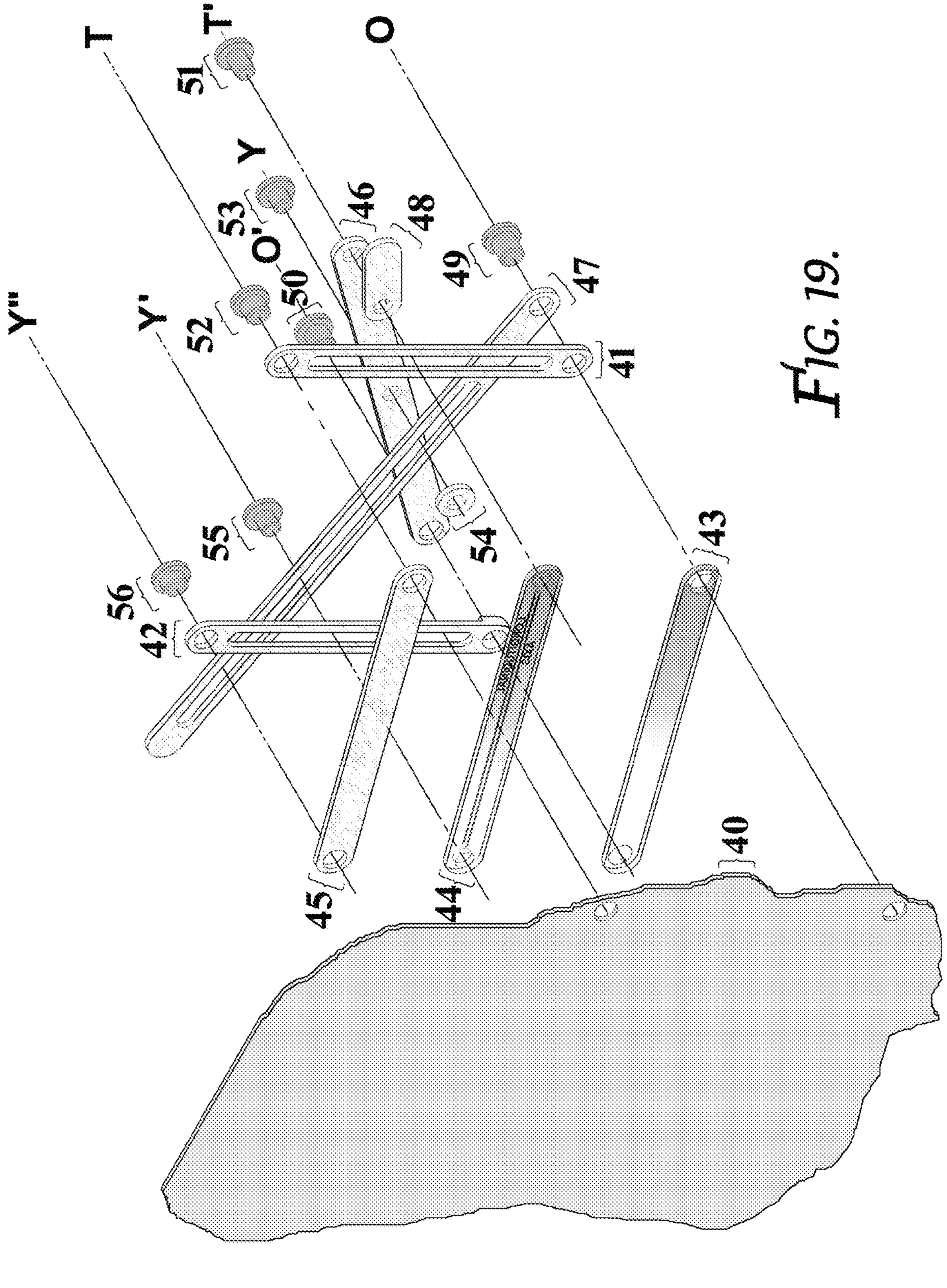
FIG. 19 is an exploded view of such rhombus configuration, as viewed from its underside in order to permit visible exposure of such third embodiment's dowel shanks.

FIG. 19 is an exploded view of the rhombus configuration depicted in FIG. 15 as viewed from its underside. By showing only the attachment portion of protractor board 40, such view exposes all respective dowel shanks. Such view confirms the component compilation specified in such FIG. 50 Third Embodiment Stacking Chart, consisting of (from left to right):

- level 0—protractor board 40;
- level I—lower linkage 43, middle linkage 44, and upper linkage 45;
- level II—left linkage 41, right linkage 42 and retaining ring 54;
- level III—the incorporated foot of right linkage 42, stabilizer linkage 47, slide 48, upper left dowel 52 and upper right dowel 56;
- level IV—cross linkage 46, lower left dowel 49 and middle right dowel 55; and
- level V—lower right dowel 50, middle left dowel 51, and cross dowel 53.

Figure 20:
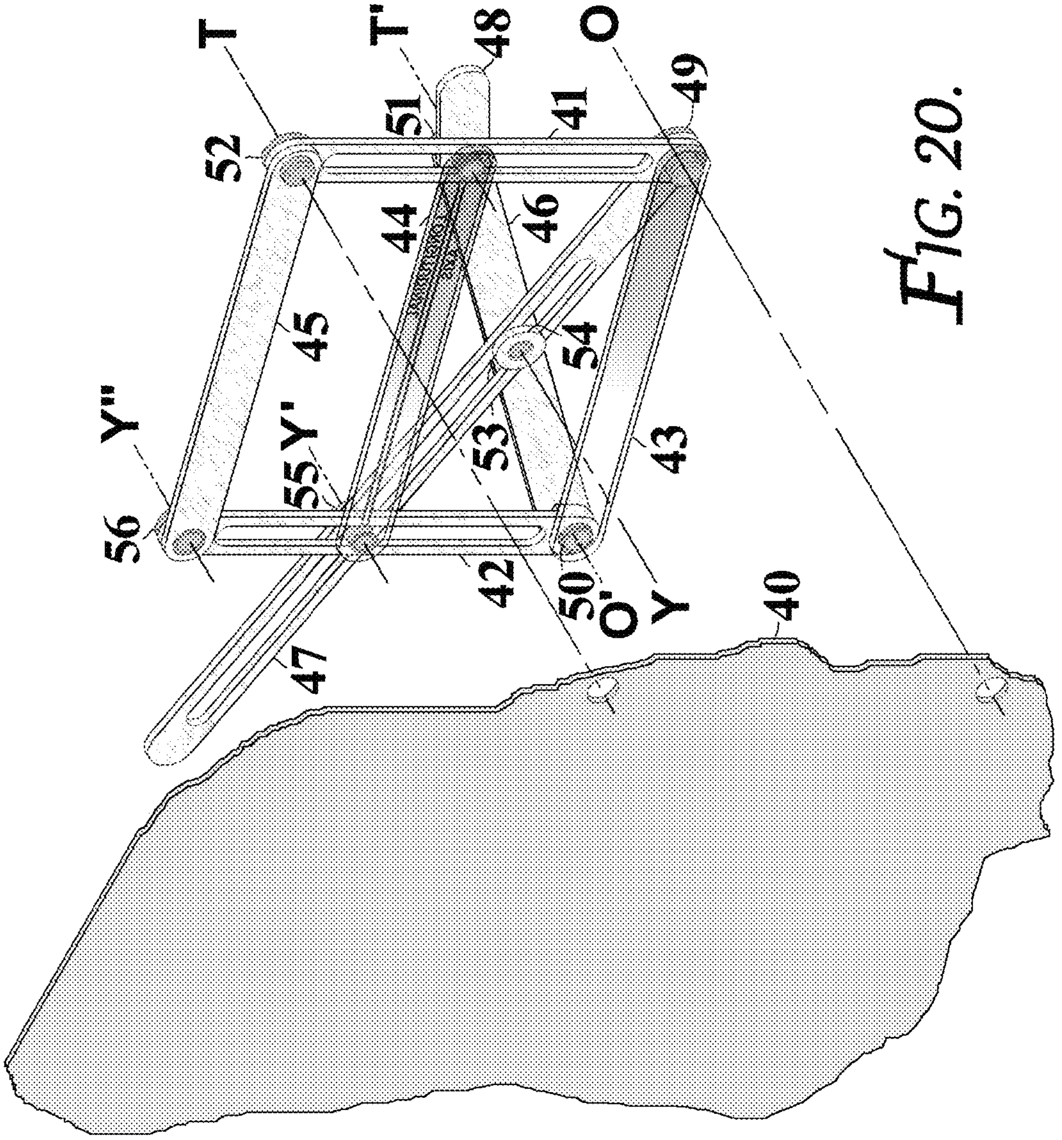
FIG. 20 is a rendering of such exploded view presented in FIG. 19 where various members of such third embodiment are depicted in their collapsed positions; that is, displayed as an assembled unit that becomes attached to such embodiment's underlying protractor board via two dowels which pass through axis O and axis T, respectively.

FIG. 20 shows the components of the third embodiment, as presented in FIG. 19, but instead collapsed into their assembled positions, whereby protractor board 40 remains backed off for better exposure. As indicated:

- lower right dowel 50, middle left dowel 51, middle right dowel 55, and upper right dowel 56 after insertion through linkages as specified in such FIG. 50 Third Embodiment Stacking Chart, ultimately become press fit into respective circular holes bored through lower linkage 43, middle linkage 44 and upper linkage 45, and thereafter glued into final position;
- cross dowel 53 after insertion through cross linkage 46 and stabilizer linkage 47 becomes press fit into retaining ring 54 and then glued into final position; and
- lower left dowel 49 and upper left dowel 52 after insertion through linkages specified in such FIG. 50 Third Embodiment Stacking Chart, become press fit into respective circular holes bored through protractor board 40, and thereafter glued into final position. Chamfers formed at the ends of such dowels enable an easy, and efficient final gluing operation; one that becomes applied only within recesses afforded after lower left dowel 49 and upper left dowel 52 have been properly seated within respective circular cutouts made in protractor board 40. Such design assures that the articulating portion of such rhombus configuration is not mistakenly secured to protractor board 40 during final gluing of such device.

The fourth embodiment of such newly proposed articulating trisection invention, is comprised of a slotted linkage arrangement, as well as a slider arrangement.

Because detail discussions on such arrangements are rather lengthy, each is presented separately, one after the other.

The overall layout of components which comprise such slotted linkage arrangement is clearly delineated in FIGS. 22, 23, 24, 25, 26, 27, and 28. Therein, device parts consist of:

- protractor strip 57;
- trisector solid linkage 58;
- given acute angle slotted linkage 59;
- bisector slotted linkage 60;
- control slotted linkage 61;

given obtuse angle solid linkage 62;
transverse slotted linkage 63;
slide linkage 64;
dowel at axis O 65;
spacer at axis O 66;
dowel at axis T' 67;
spacer at axis T' 68;
retaining ring at axis T' 69;
shoulder screw 70;
dowel at axis O' 71;
dowel at axis Y 72;
spacer at axis Y 73;
retaining ring at axis Y 74; and
dowel at axis Z 75;

The protocol of designing linkages which exhibit constant cross-sections, as was applied to such first, second, and third embodiments, carries over into such slotted linkage arrangement. Therefore, every cross-section is to consist a rectangle of the same size, each of whose who shorter opposing sides furthermore serves as the diameter of a half circle appended onto it whose remaining periphery faces away from such rectangle, thereby residing outside of its periphery. Just as before, each linkage is to be of the very same thickness and assumes the overall shape of a bar with rounded extremities.

Figure 22:
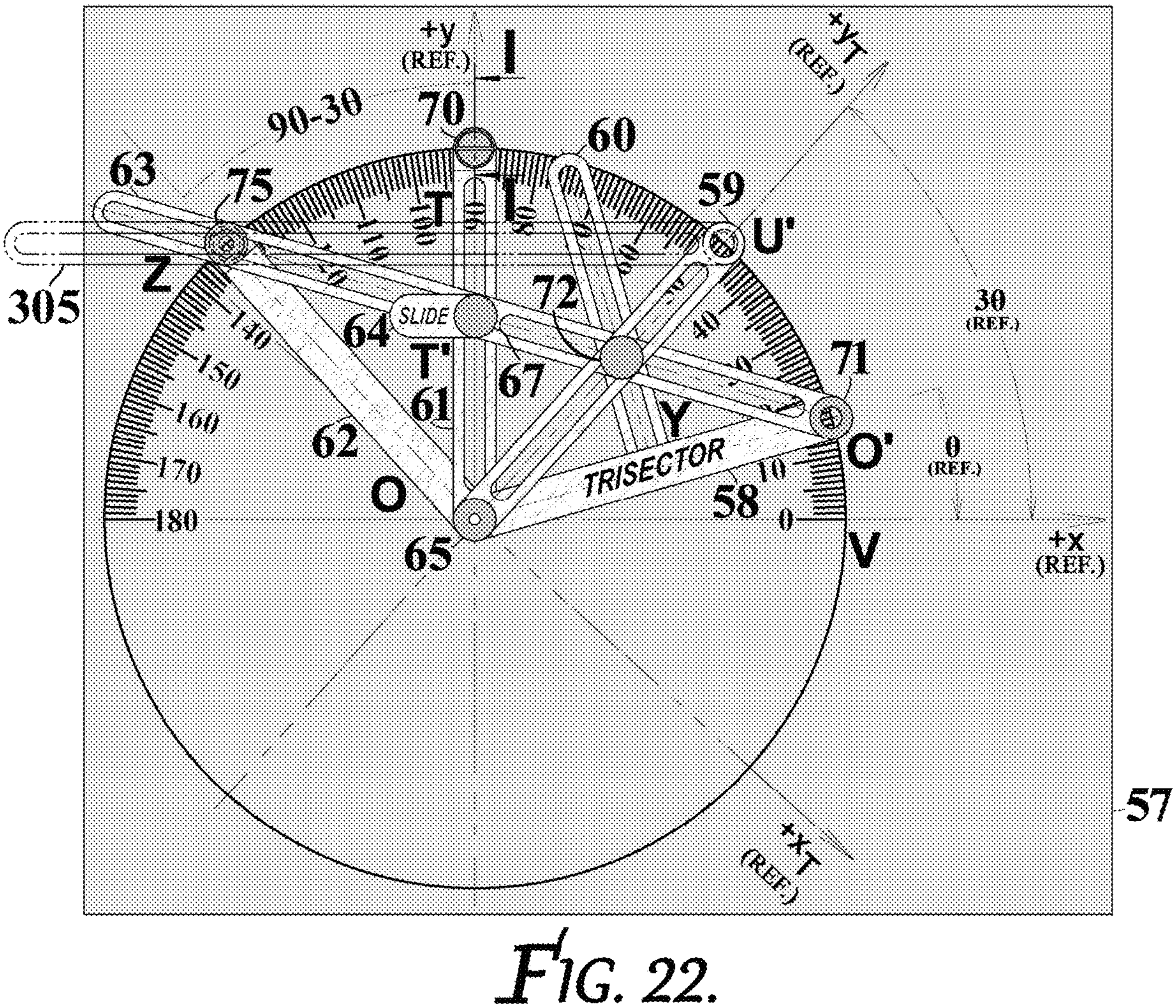
FIG. 22 is a plan view of a slotted linkage arrangement of the fourth embodiment, otherwise known as the car jack configuration of such newly proposed invention.

The cutout patterns and spans of such linkages are to be in accordance with those depicted in the plan view of FIG. 22, whereby four linkages emanating from axis O, consisting of trisector solid linkage 58, given acute angle slotted linkage 59, control slotted linkage 61, and given obtuse angle solid linkage 62, all exhibit the same outer envelope profiles.

Figure 23:
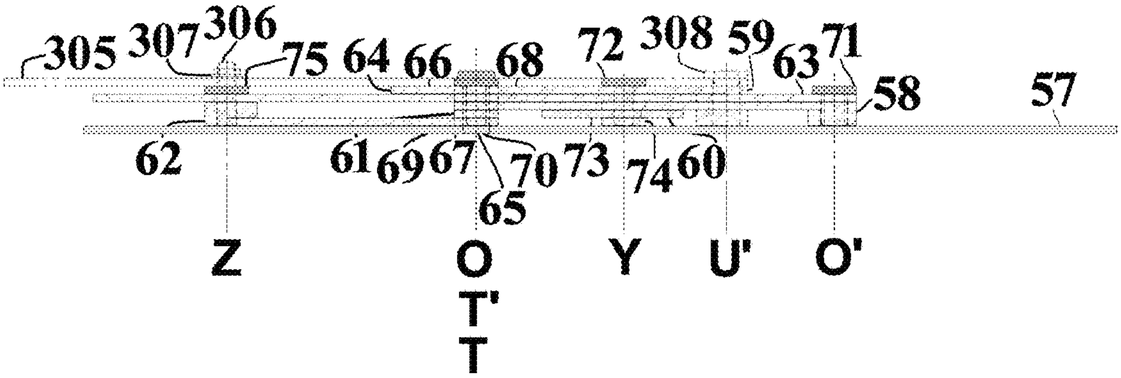
FIG. 23 is a front elevation view of the slotted linkage arrangement of the fourth embodiment, otherwise known as the car jack configuration of such newly proposed invention.

Notice that some of the find numbers represented in the front elevation view of FIG. 23 are not listed in plan view. This approach assures that both such front and plan view do not become too cluttered.

Figure 24:
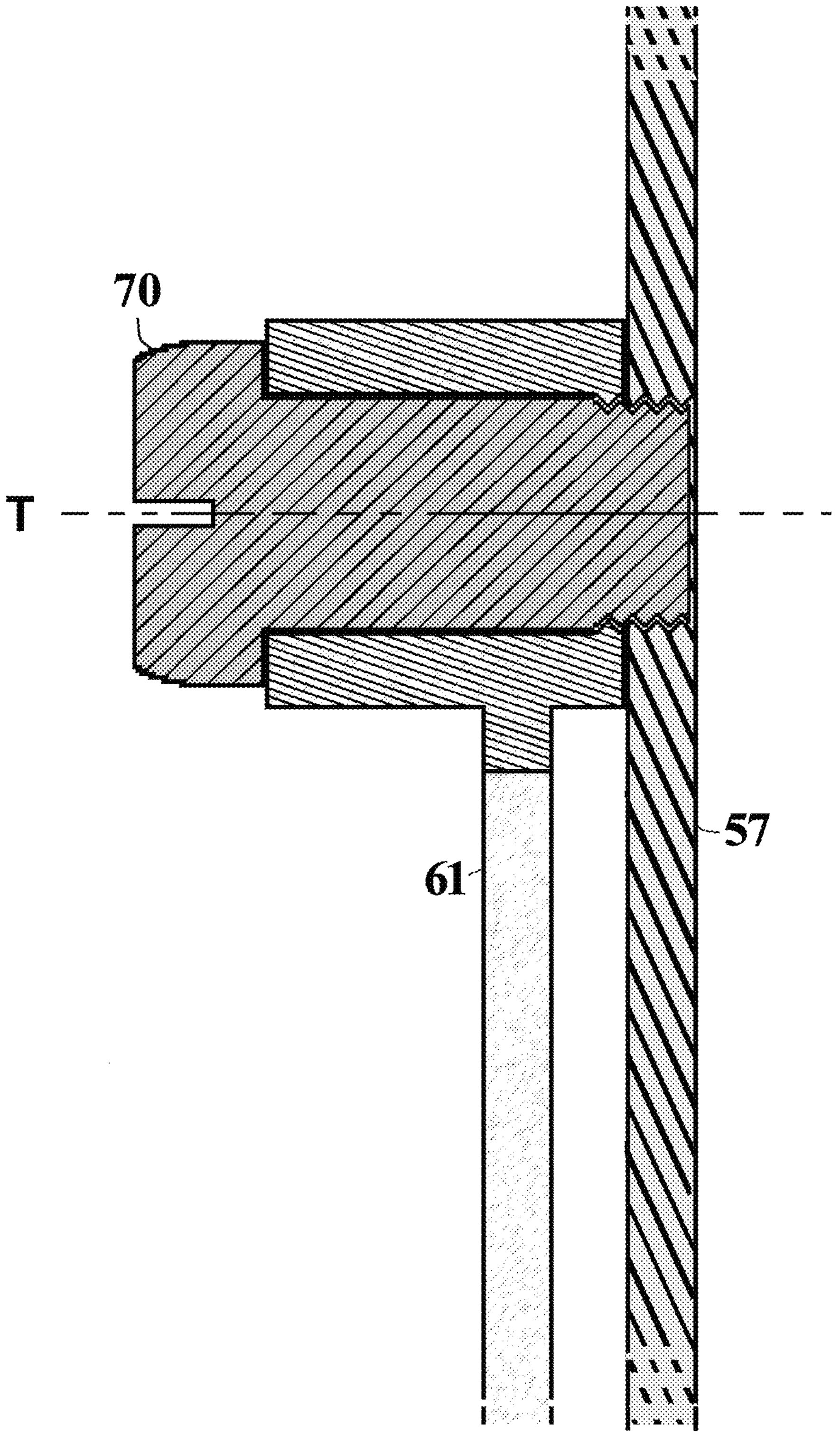
FIG. 24 is an enlarged view of the section on line I-I of FIG. 22.

FIG. 24 reveals how shoulder screw 70, once inserted through the foot fitted onto control slotted linkage 61 at axis T, secures it by means of being threaded into protractor strip 57.

Therein, the depth of the lower portion of foot fitted onto control slotted linkage 61 is to be equal to the thickness given obtuse angle solid linkage 62 (not shown), thereby maintaining a separation at axis T which is the same as that afforded between the lower face of control slotted linkage 61 and the upper surface of protractor strip 57 about axis O, as depicted in FIGS. 22, and 23 due to the intervention of given obtuse angle solid linkage 62, as appearing in between them at such location.

Figure 25:
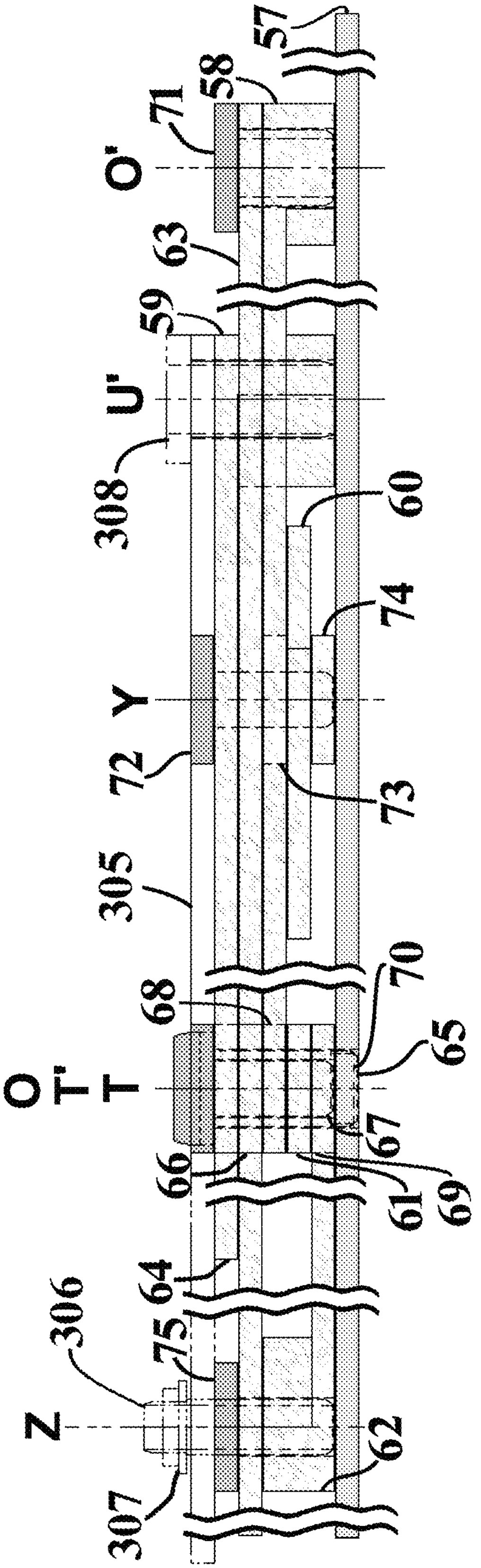
FIG. 25 is an enlargement FIG. 23.

FIG. 25, being an enlargement of the front elevation view of FIG. 23, clearly indicates how the various components interface with one another. Therein, shoulder screw 70, whose radial centerline aligns directly upon axis T, doesn't bottom out in protractor strip 57 as does dowel at axis O 65, which resides about axis O. Hence, therein the lower horizontal line of shoulder screw 70 appears a little higher up than the lower horizontal line of dowel at axis O 65. Such clearance also can be verified by referring again to FIG. 24 wherein shoulder screw 70 is shown to be seated a small distance above the lowest portion of protractor strip 57.

Whereas dowel at axis Z 75 is shown in FIG. 22 to be inserted through the slot of transverse slotted linkage 63, notice that its sight hole is sizably smaller than that which is bored through dowel at axis O' 71. This is because the shank of dowel at axis O' 71 can be larger than that of dowel at axis Z 75, as evidenced in FIG. 25, since it does not have to pass through such slot of transverse slotted linkage 63, being of smaller width. The convention of having dowels which pass through slots of linkages feature thinner shanks than those which do not, as previously established in such rhombus design, thereby carries over into the slotted linkage arrangement of the fourth embodiment of such newly proposed articulating invention.

The overall design of the device is such that during its articulation, all linkage portions are to remain confined within specific elevations; that is, they are permitted to translate only at designated vertical distances above the upper surface of protractor strip 57.

Such approach assures that all linkage spans remain entirely parallel to one another during device flexure; thus confirming that they do not pose any potential for introducing an obstruction that, if otherwise permitted, very well might impede acceptable trisection performance.

As such, each specific portion of any constituent linkage, consisting of its overall span, as well as any incorporated foot it might feature is duly accounted for in the Slotted Linkage Arrangement Stacking Chart, as presented in FIG. 51.

Just as before, the first column therein, under the heading entitled LEVEL, is reserved for itemizing levels in chronological order away from a table top that such device can be laid upon. The second major heading expressed in FIG. 51, entitled AXIS, contains seven subheadings represented by the letters O, T, T', O', Y, Z, and U', thereby accounting for all of the axes represented in defining FIG. 22 and FIG. 23.

Such FIG. 51 chart confirms that the span portions of six linkages which belong to such slotted linkage arrangement remain confined within distinct levels; thereby flexing only within restricted elevations which are specified as follows:

trisector solid linkage 58 translates only within level III;
given acute angle slotted linkage 59 translates only within level V;
bisector slotted linkage 60 translates only within level II;
control slotted linkage 61 translates only within level II;
given obtuse angle solid linkage 62 translates only within level I; and
transverse slotted linkage 63 translates only within level IV.

As such, bisector slotted linkage 60 and control slotted linkage 61 both articulate within the same level. This does not pose a problem because trisector solid linkage 58 can rotate about axis O only from approximately zero to thirty degrees relative to the +x-axis.

Moreover, the following determination has been made regarding the location of linkage feet:

trisector solid linkage 58 incorporates a foot which occupies levels I and II at axis O';
given acute angle slotted linkage 59 incorporates a foot which occupies levels I, II, III and IV at axis U';
bisector slotted linkage 60 incorporates no feet, whereby it sits atop retaining ring at axis Y 74 and supports spacer at axis Y 73 about axis Y;
control slotted linkage 61 incorporates a lower foot which occupies level I at axis T, and an upper foot which occupies levels III, IV and V at axis T;
given obtuse angle solid linkage 62 incorporates a foot which resides both in levels II and III at axis Z; and
transverse slotted linkage 63 has no feet, whereby it is perched atop spacer at axis T' 68 at axis T', atop trisector solid linkage 58 at axis O', atop spacer at axis Y 73 at axis Y; and atop of the foot incorporated into given obtuse angle solid linkage 62 at axis Z, as can be easily verified by means of referring to FIG. 25.

As indicated in such FIG. 51 chart, the lower portions of the following components come into direct contact with the upper surface of protractor strip 57:

given obtuse angle solid linkage 62 throughout its entire span;

the lower foot of control slotted linkage 61 at axis T;

retaining ring at axis T' 69 about axis T';

the foot of trisector solid linkage 58 about axis O';

retaining ring at axis Y 74 about axis Y; and the foot of given acute angle slotted linkage 59 about axis U'.

For any particular axis that is depicted in FIG. 25, such FIG. 51 Slotted Linkage Arrangement Stacking Chart details the sequence of insertion for its corresponding interconnecting pivot pin as follows:

about axis O, dowel at axis O 65 is inserted through given acute angle slotted linkage 59, spacer at axis O 66, trisector solid linkage 58, control slotted linkage 61, given obtuse angle solid linkage 62, and then is press fit into a mating hole drilled through protractor strip 57 until it bottoms out, and thereafter becomes glued around its chamfer;

about axis T, shoulder screw 70 passes through control slotted linkage 61, and then is screwed into a mating hole threaded into protractor strip 57;

about axis T', dowel at axis T' 67 is inserted through slide linkage 64, transverse slotted linkage 63, spacer at axis T' 68, control slotted linkage 61, and then is press fit into retaining ring at axis T' 69 until it bottoms out, and thereafter becomes glued around its chamfer;

about axis O', dowel at axis O' 71 is inserted through transverse slotted linkage 63, and then is press fit into a mating hole drilled through trisector solid linkage 58 until it bottoms out, and thereafter becomes glued around its chamfer;

about axis Y, dowel at axis Y 72 is inserted through given acute angle slotted linkage 59, transverse slotted linkage 63, spacer at axis Y 73, bisector slotted linkage 60, and then is press fit into retaining ring at axis Y 74 until it bottoms out, and thereafter becomes glued around its chamfer;

about axis Z, dowel at axis Z 75 is inserted through transverse slotted linkage 63, and then press fit into a mating hole drilled through given obtuse angle solid linkage 62 until it bottoms out, and thereafter becomes glued around its chamfer; and about axis U', given acute angle slotted linkage 59 remains unsecured.

for dowels which become captive within other components which retain them, due to such gluing operations, they must rotate along with them; whereby the following list enumerates device parts which cannot change in their relative positioning:

dowel at axis T' 67 with respect to retaining ring at axis T' 69;

dowel at axis O' 71 with respect to trisector solid linkage 58;

dowel at axis Y 72 with respect to retaining ring at axis Y 74; and dowel at axis Z 75 with respect to given obtuse angle solid linkage 62.

By adopting the same convention as formerly was applied to the previous stacking charts, dowel at axis O 65, dowel at axis T' 67, shoulder screw 70, dowel at axis O' 71, dowel at axis Y 72, and dowel at axis Z 75 notations enumerated in such FIG. 51 chart designate specific locations where only their respective heads reside. As such, all six pivot pin heads appear at the very top of the respective columns presented in such FIG. 51 chart. Accordingly, they all must be entirely visible when being viewed with respect to the plan view afforded in FIG. 22.

In particular, such FIG. 51 Slotted Linkage Arrangement Stacking Chart confirms the positioning of control slotted linkage 61, as posed in FIG. 24, by disclosing that, while spanning from axis O to axis T within level II, it furthermore comes into contact with axis T' along the way.

The functions of the spacers and retaining rings listed in such FIG. 51 Slotted Linkage Arrangement Stacking Chart, are as follows:

spacer at axis O 66 located about axis O at level IV maintains given acute angle slotted linkage 59 parallel to the stationary upper surface of protractor strip 57 during device flexure;

spacer at axis T' 68 located about axis T' at level III maintains transverse slotted linkage 63 parallel to the stationary upper surface of protractor strip 57 during device flexure;

retaining ring at axis T' 69 located about axis T' at level I secures dowel at axis T' 67 and skims along the surface of protractor strip 57 during device flexure;

spacer at axis Y 73 located about axis Y at level III also maintains transverse slotted linkage 63 parallel to the stationary upper surface of protractor strip 57 during device flexure; and retaining ring at axis Y 74 located about axis Y at level I secures dowel at axis Y 72 and skims along the surface of protractor strip 57 during device flexure.

As further indicated in such FIG. 51 chart, the portion of upper foot fitted onto control slotted linkage 61 about axis T, as depicted FIG. 24, being of a depth which is equal to three times that of its lower portion of foot or, for that matter, that of its principal span, thereby locates the lower portion of the head of shoulder screw 70 five levels above the upper surface of protractor strip 57. Moreover, the head of shoulder screw 70, because it is two levels thick, thereby occupies level VI, as well as level VII.

Whereas bisector slotted linkage 60 doesn't repeat itself in any row in such FIG. 51 chart, it very easily could be mistaken as being an actual linkage. The reason for such disparity is because bisector slotted linkage 60 comes into contact only with one axis, that being axis Y; whereas all other linkages communicate with at least two axes. It is important to note that such singular accounting in no way prohibits bisector slotted linkage 60 from operating exclusively within level II at all times during device articulation. This is because bisector slotted linkage 60 furthermore is bonded directly onto the underside of the spanning portion of trisector solid linkage 58. Such design practice assures that a ninety degree angle always is maintained between such two linkages throughout device flexure. In order to achieve this, the width of such trisector solid linkage 58 must be appropriately sized to avail a sufficient bonding surface which can resist the small frictional loads which become encountered during device flexure.

Hence, such FIG. 51 chart discloses that trisector solid linkage 58 bridges the gap between axis O and axis O' at an elevated level III.

Next, an explanation is to be furnished pursuant to such FIG. 45 Invention Trisection Process Chart that accounts for just how such slotted linkage arrangement is to be specifically arranged and thereafter properly set in order to trisect acute angles; broken down as follows:

such device is to be specifically arranged by means of aligning axis T of control slotted linkage 61 so that its hole becomes situated directly above the threaded hole bored through the ninety degree marking of protractor strip 57, thereby enabling shoulder screw 70 to be inserted completely through such upper hole and then secured into such threaded hole residing beneath it, as indicated in FIGS. 22, 23, and 24; and such device thereafter is to be properly set by means of translating slide linkage 64 inside of the slot afforded within control slotted linkage 61, as depicted in FIG. 12 FIG. 22, until either:

the particular reading upon protractor strip 57 which axis U' just so happens to coincide with indicates the designated magnitude of an angle that actually is intended to be trisected; or the angle that actually is intended to be trisected instead becomes automatically portrayed about axis O, as subtended between the +x-axis and the longitudinal centerline of given acute angle slotted linkage 59.

In such above described scenario, trisection thereby mechanically becomes achieved because as slide linkage 64 becomes translated either upwards or downwards inside of the slot afforded within control slotted linkage 61, as depicted in FIG. 22:

it causes trisector solid linkage 58 to rotate about axis O such that the magnitude of any angle which might extend from the +x-axis to its longitudinal centerline furthermore could be algebraically expressed by the Greek letter θ, thereby signifying that such angle might assume a virtually infinite number of discrete values;

during such process, the longitudinal centerlines of trisector solid linkage 58, transverse slotted linkage 63 between axis O' and axis T', and control slotted linkage 61 between axis T' and axis O always would describe the three sides of an isosceles triangle whose two included angles of equal size each would amount to a magnitude of 90−θ, such that its remaining angle thereby would be of 2θ size; and the longitudinal centerlines of trisector solid linkage 58, transverse slotted linkage 63 between axis O' and axis Y, and given acute angle slotted linkage 59 between axis Y and axis O furthermore always would describe the three sides of yet another isosceles triangle whose two included angles of equal size each, by being algebraically expressed to be of 2θ size, would amount to twice the magnitude of any angle which simultaneously could be swept out about axis O between such +x-axis and the longitudinal centerline of trisector solid linkage 58.

Whereas the magnitude of virtually any angle which could be swept out about axis O in this prescribed manner, as extending from the +x-axis to the longitudinal centerline of given acute angle slotted linkage 59 furthermore would have to amount to the sum of the magnitudes of the angles simultaneously extending from such +x-axis to the longitudinal centerline of trisector solid linkage 58, and then from the longitudinal centerline of trisector solid linkage 58 to that of given acute angle slotted linkage 59, it would have to be of a size algebraically calculated to amount to as θ+2θ=3θ; meaning that for any reading which appears at axis U', a corresponding reading which appears at axis O' would have to amount to one-third of its size, thereby representing its trisector.

It thereby can be concluded that the slotted linkage arrangement of the car jack configuration of such newly proposed invention, as duly depicted in plan view in FIG. 22, could be used to trisect virtually any angle of acute designated magnitude which it properly could be properly set to, in full accordance with the provisions set forth in such FIG. 45 Invention Trisection Process Chart, merely by means of translating slide linkage 64 either upwards or downwards until such time that a protractor strip 57 reading at axis U' amounts to the designated magnitude of an angle that is intended to be trisected.

Substantiating such capability would consist merely of demonstrating that virtually any static image which could be regenerated by means of properly setting such slotted linkage arrangement would automatically portray an overall shape that furthermore fully could be described by a geometric construction pattern in which the magnitude of its rendered angle amounts to exactly three times the size of its given angle.

In certain circumstances it can be shown that such rather cumbersome trisection substantiation process, as described above, could be dramatically reduced by means of taking advantage of the understanding that the fundamental architecture of each defining embodiment drawing, as cited in FIG. 46, would have to superimpose upon the representative geometric construction pattern of its corresponding Euclidean formulation.

Such disclosure becomes quite apparent when referring to FIG. 4, wherein it is indicated that such third derivative Euclidean formulation, as posed in FIG. 21, should be used to substantiate the slotted linkage arrangement of such fourth embodiment. This means that the overall configuration of straight lines OU', OO' and OV as they actually do appear in such depicted representative geometric construction pattern, furthermore respectively can be shown to overlay directly upon the longitudinal centerline of given acute angle slotted linkage 59, the longitudinal centerline of trisector solid linkage 58, and the +x-axis, as they are configured with respect to one another in FIG. 22; thereby substantiating that upon properly setting such slotted linkage arrangement to a designated magnitude of 48°, as duly specified in FIG. 46, and furthermore indicated as the very reading which appears at axis U' in FIG. 22, trisector solid linkage 58 would be rotated about axis O to a position, as duly specified in FIG. 46, and furthermore indicated as being the very 16° reading which appears at axis O' in FIG. 22, that would automatically portray a motion related solution for the problem of the trisection of an angle.

Figure 26:
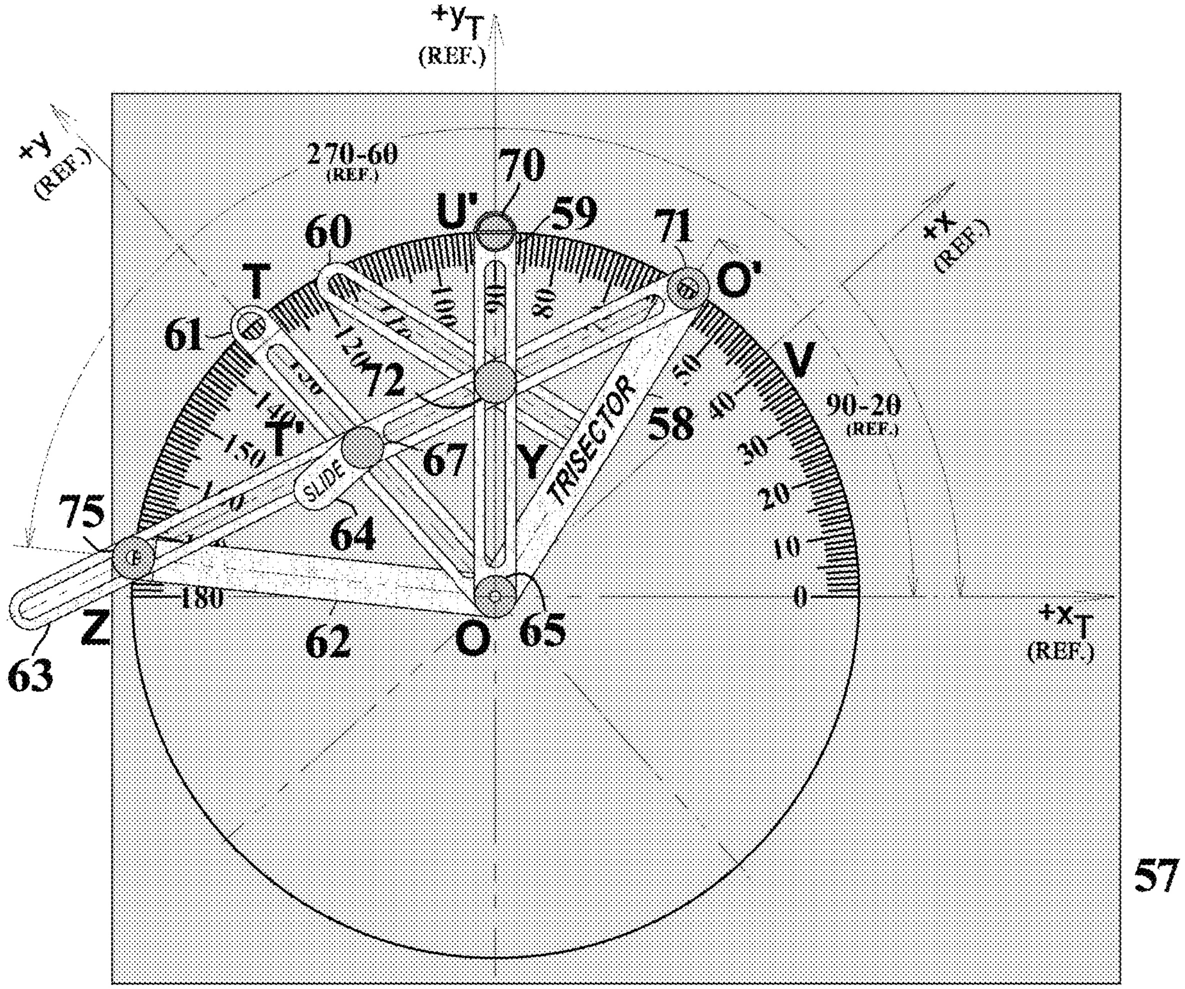
FIG. 26 is a rendering of the plan view of such slotted linkage arrangement, as depicted in FIG. 22, except that its upper members, along with noted +x, +y, $+x_T$, $+y_T$ axes are shown to be rotated about its lower underlying protractor strip, a total magnitude of 90−3θ in the counterclockwise direction about axis O.

Next, an explanation is to be furnished pursuant to such FIG. 45 Invention Trisection Process Chart that accounts for just how such slotted linkage arrangement is to be specifically arranged and thereafter properly set in order to trisect obtuse angles; broken down as follows:

such device is to be specifically arranged by means of:

removing shoulder screw 70, as depicted in FIG. 24, by means of unthreading it away from protractor strip 57, and then pulling it clearly out of the hole bored through control slotted linkage 61 which surrounds axis T, as posed in FIG. 22;

rotating slotted linkage arrangement components depicted in FIG. 22 about axis O in a counterclockwise direction with respect to its protractor strip 57 until such time that the circular hole bored through the unbounded end of given acute angle slotted linkage 59 at axis U' becomes aligned directly over the evacuated threaded hole appearing the ninety degree marking of its protractor strip 57, whereby such counterclockwise rotation algebraically would be expressed as amounting to a total of 90−3θ;

reinserting shoulder screw 70 through such vacant hole of given acute angle slotted linkage 59 and thereafter screwing it back into the empty threaded hole of protractor strip 57; whereby according to FIG. 26, such above described activity would place axis U' directly atop the ninety degree marking of such protractor strip 57; being a position that formally was occupied by an extremity of control slotted linkage 61 that resides about axis T, as indicated in FIG. 22;

such device thereafter is to be properly set by means of translating slide linkage 64 inside of the slot afforded within control slotted linkage 61, as depicted in FIG. 26, until either:

the particular reading upon protractor strip 57 which axis Z just so happens to coincide with indicates the designated magnitude of an angle that actually is intended to be trisected; or the angle that actually is intended to be trisected instead becomes automatically portrayed about axis O, as subtended between the +x-axis and the longitudinal centerline of given obtuse angle solid linkage 62.

Such slotted linkage arrangement can be specifically arranged in such manner because both given acute angle slotted linkage 59 and control slotted linkage 61 exhibit hole cutouts of the same size, Hence, shoulder screw 70 could be inserted through the hole featured by either linkage at will.

Moreover, since such FIG. 51 Slotted Linkage Arrangement Stacking Chart indicates that the portion of upper foot fitted onto slotted control slotted linkage 61 about axis T extends upwards through level V, as does the uppermost portion of given acute angle slotted linkage 59 about axis U', shoulder screw 70 can be of a singular length that threads into protractor strip 57 to the very same depth, regardless of whether it secures control slotted linkage 61 or given acute angle slotted linkage 59.

In such above described scenario, trisection thereby mechanically becomes achieved because as slide linkage 64 becomes translated inside of the slot afforded within control slotted linkage 61, as depicted in FIG. 26:

it causes trisector solid linkage 58 to rotate about axis O such that the magnitude of any angle which might extend from the +x-axis to its longitudinal centerline furthermore could be algebraically expressed by the Greek letter θ, thereby signifying that such angle might assume a virtually infinite number of discrete values, whereas any angle which instead might extend from the $+x_T$-axis to its longitudinal centerline furthermore could be algebraically calculated to amount to $\theta+(90-3\theta)=90-2\theta$;

during such process, the longitudinal centerlines of trisector solid linkage 58, transverse slotted linkage 63 between axis O' and axis T', and control slotted linkage 61 between axis T' and axis O always would describe the three sides of an isosceles triangle whose two included angles of equal size each would amount to a magnitude of $90-\theta$, such that its remaining angle thereby would be of $2\theta$ size; and the longitudinal centerlines of trisector solid linkage 58, transverse slotted linkage 63 between axis O' and axis Z, and given obtuse angle solid linkage 62 furthermore always would describe the three sides of yet another isosceles triangle whose two included angles of equal size each, by being algebraically expressed to be of $2\theta$ size, would amount to twice the magnitude of any angle which simultaneously could be swept out about axis O between such +x-axis and the longitudinal centerline of trisector solid linkage 58.

Whereas the magnitude of virtually any angle which could be swept out about axis O in this prescribed manner, as extending from the $+x_T$-axis to the longitudinal centerline of given obtuse angle solid linkage 62 furthermore would have to amount to the sum of the magnitudes of the angles simultaneously extending from such $+x_T$-axis to the longitudinal centerline of trisector solid linkage 58, and then from the longitudinal centerline of trisector solid linkage 58 to that of given obtuse angle solid linkage 62, it would have to be of a size of $(90-2\theta)+(180-4\theta)=270-6\theta$; meaning that for any reading which appears at axis Z, a corresponding reading which appears at axis O' would have to amount to one-third of its size, thereby representing its trisector.

It thereby can be concluded that the slotted linkage arrangement of the car jack configuration of such newly proposed invention, as duly depicted in plan view in FIG. 26, could be used to trisect virtually any angle of obtuse designated magnitude which it properly could be properly set to, in full accordance with the provisions set forth in such FIG. 45 Invention Trisection Process Chart, merely by means of translating slide linkage 64 until such time that a protractor strip 57 reading at axis Z amounts to the designated magnitude of an angle that is intended to be trisected.

Substantiating such capability would consist merely of demonstrating that virtually any static image which could be regenerated by means of properly setting such slotted linkage arrangement would automatically portray an overall shape that furthermore fully could be described by a geometric construction pattern in which the magnitude of its rendered angle amounts to exactly three times the size of its given angle.

In much the same manner as described previously, substantiating such capability could be very much simplified for the particular case posed in FIG. 46, wherein the overall configuration of straight lines OZ, OO' and the $+x_T$-axis, as they actually do appear in the representative geometric construction pattern of the third derivative Euclidean formulation, as posed in FIG. 21, after each becomes rotated a magnitude of $90-3\theta$ in the counterclockwise direction, furthermore respectively can be shown to overlay directly upon the longitudinal centerline of given obtuse angle solid linkage 62, the longitudinal centerline of trisector solid linkage 58, and the $+x_T$-axis, as they are configured with respect to one another in FIG. 26; thereby substantiating that upon properly setting such slotted linkage arrangement to a designated magnitude of 174°, as duly specified in FIG. 46, and furthermore indicated as the very reading which appears at axis Z in FIG. 26, trisector solid linkage 58 would be rotated about axis O to a position, as duly specified in FIG. 46, and furthermore indicated as being the very 58° reading which appears at axis O' in FIG. 26, that would automatically portray a motion related solution for the problem of the trisection of an angle.

Notice that the first column of FIG. 52, from top to bottom, is reserved for specifying the names of four distinct headings; thereby again making it necessary to read particular values for each in a horizontal direction, as opposed to vertically. As displayed therein, such headings are entitled, AXIS, FIG. 22 VALUE WITH RESPECT TO +X-AXIS, ROTATION VALUE, AND FIG. 22 OR FIG. 26 VALUE WITH RESPECT TO $+X_T$ AXIS, respectively.

FIG. 52 indicates that as such slotted linkage arrangement becomes specifically arranged from a configuration that can trisect angles of acute designated magnitudes to one that can trisect angles of obtuse designated magnitudes, vertical axis O' becomes repositioned from a value of θ with respect to the zero degree reading appearing upon such protractor strip 57, shown therein to align with the +x-axis in FIG. 22, to a value of 90−2θ with respect to the very same zero degree reading of such protractor strip 57, shown to now align with the $+x_T$-axis in FIG. 26. Of course the axis transformation which takes place along the zero degree reading appearing upon such protractor strip 57 as such device reconfiguration process takes place becomes much easier to understand when recognizing that as such entire slotted linkage arrangement becomes rotated, so do the +x-axis, as well as the $+x_T$-axis by the same amount.

Figure 27:
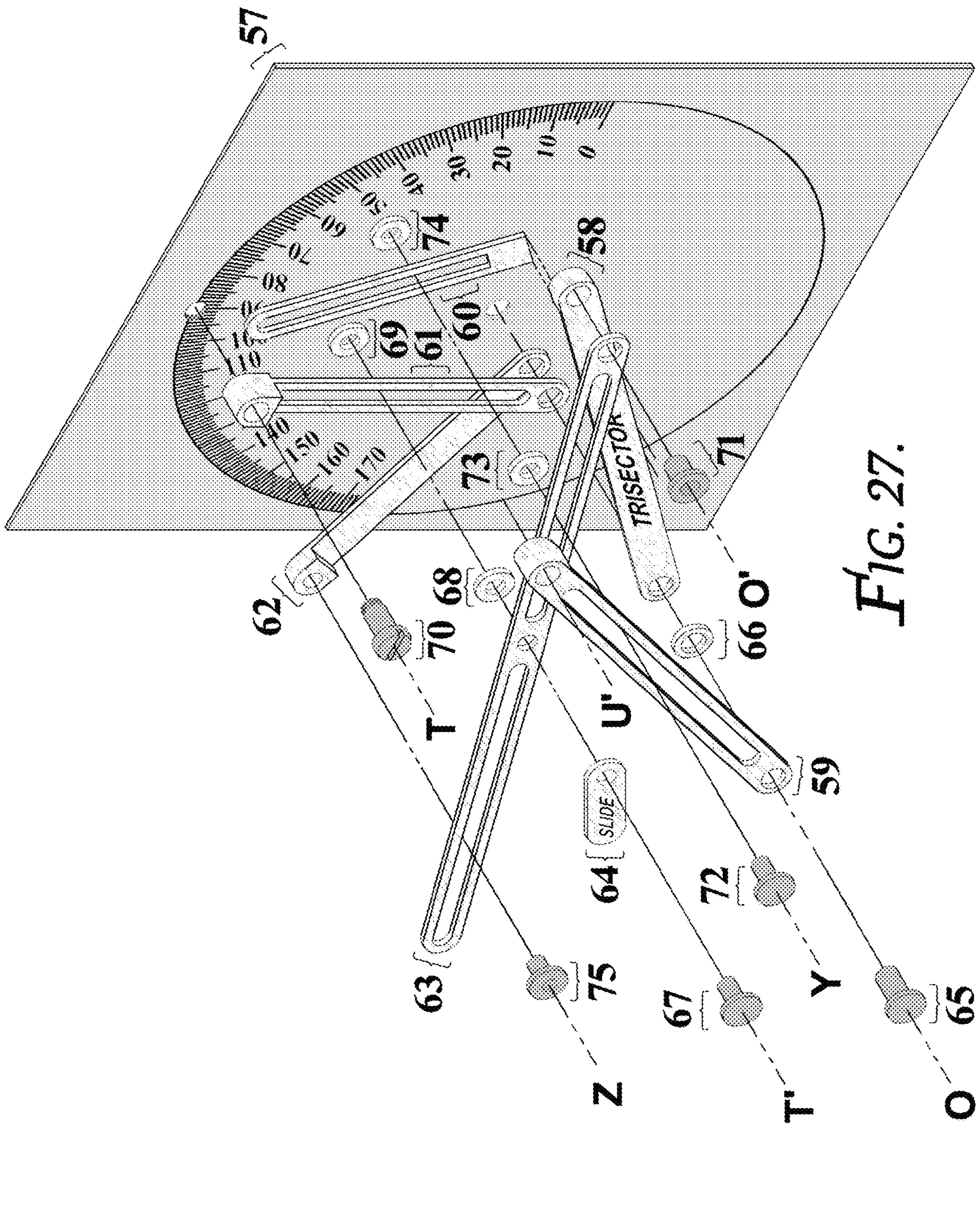
FIG. 27 is an exploded view of the slotted linkage arrangement of the fourth embodiment of such newly proposed invention.

The exploded view of such slotted linkage arrangement, as depicted in FIG. 27 when specifically arranged to trisect angles of acute designated magnitudes, as depicted in FIG. 22, confirms the component compilation, as specified in such FIG. 51 Slotted Linkage Arrangement Stacking Chart, thereby consisting of (from right to left):

level 0—protractor strip 57;

level I—given obtuse angle solid linkage 62 spanning from axis O to axis Z, the fitted lower foot of control slotted linkage 61 about axis T, retaining ring at axis T' 69 about axis T', the foot of trisector solid linkage 58 residing about axis O', retaining ring at axis Y 74 about axis Y, and the incorporated foot of given acute angle slotted linkage 59 about axis U';

level II—control slotted linkage 61 spanning from axis O, to axis T, which includes axis T', the incorporated foot of trisector solid linkage 58 about axis O', bisector slotted linkage 60 about axis Y, the incorporated foot of given obtuse angle solid linkage 62 about axis Z, and the incorporated foot of given acute angle slotted linkage 59 about axis U';

level III—trisector solid linkage 58 spanning from axis O to axis O', the incorporated upper foot of control slotted linkage 61 about axis T, spacer at axis T' 68 about axis T', spacer at axis Y 73, the incorporated foot of given obtuse angle solid linkage 62 about axis Z, and the incorporated foot of given acute angle slotted linkage 59 about axis U';

level IV—transverse slotted linkage 63 spanning from axis O' to axis Z, which includes axis Y and axis T', spacer at axis O 66, the incorporated upper foot of control slotted linkage 61 at axis T, and the incorporated foot of given acute angle slotted linkage 59 about axis U';

level V—given acute angle slotted linkage 59 spanning from axis O to axis U', which includes axis Y, incorporated upper foot of control slotted linkage 61 about axis T, slide linkage 64 about axis T', the head of dowel at axis O' 71, and the head of dowel at axis Z 75;

level VI—the head of dowel at axis O 65, the lower portion of the head of shoulder screw 70 about axis T, the head of dowel at axis T' 67, and the head of dowel at axis Y 72; and level VII—the upper portion of the head of shoulder screw 70 about axis T.

FIG. 27 shows that dowel at axis O' 71 is inserted through a circular hole bored through the end of transverse slotted linkage 63 about axis O' whose diameter is clearly larger than its slot width, thereby exhibiting a wider shank than that afforded by dowel at axis Z 75 which must travel through such slot about axis Z. Moreover the circular hole bored through transverse slotted linkage 63 about axis T' is smaller than the other hole bored through it because it accepts the thinner shank of a dowel at axis T' 67 that furthermore must pass through the slot afforded in control slotted linkage 61. The shank of dowel at axis Y 72 also must be thinner in order to successfully pass through all of the slots afforded in given acute angle slotted linkage 59, transverse slotted linkage 63, and bisector slotted linkage 60 when inserted at axis Y. Such dimensions can be validated by referring to the front view of FIG. 22, as well as its enlarged view, as represented in FIG. 25.

Figure 28:
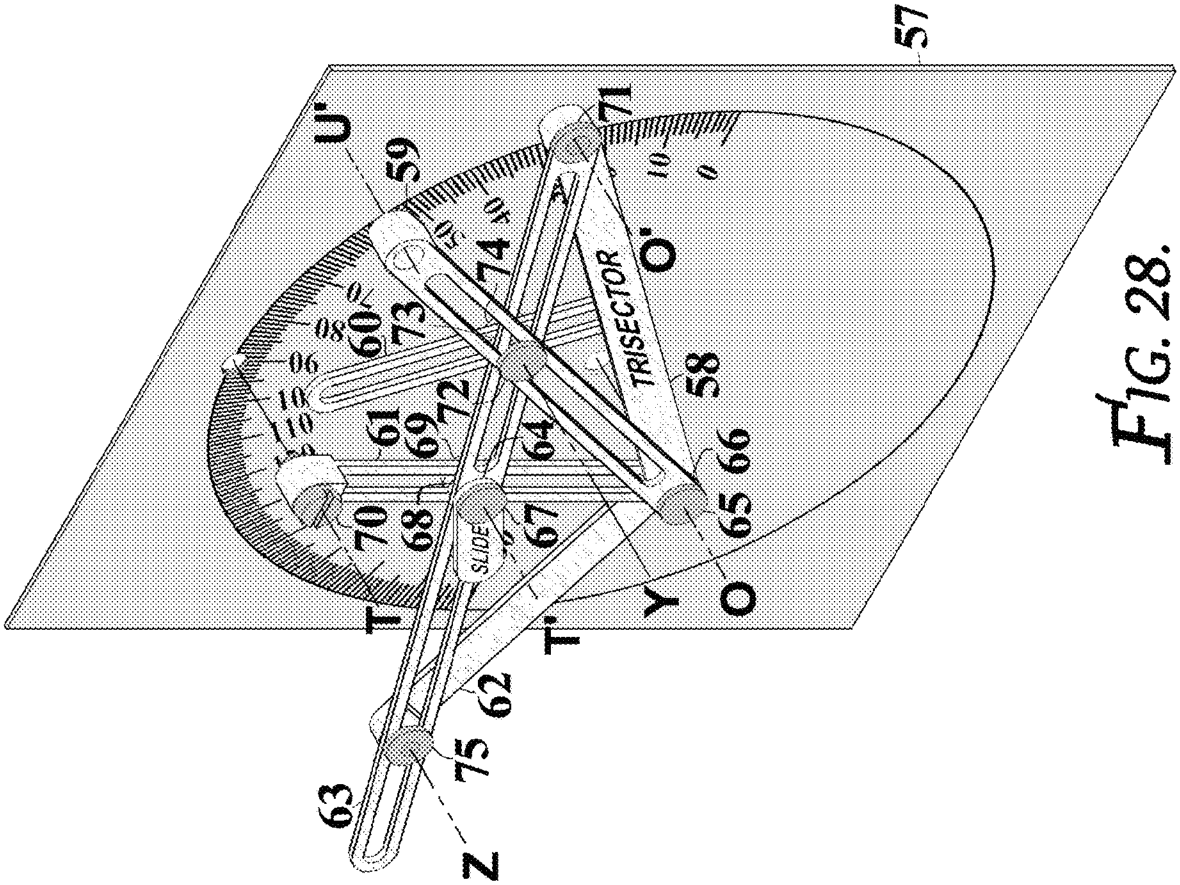
FIG. 28 is a rendering of such exploded view presented in FIG. 27 where various members of the slotted linkage arrangement of such car jack configuration instead are portrayed in their collapsed positions; that is, displayed as an assembled unit that becomes attached to such embodiment's underlying protractor strip by a dowel which passes through axis O and a removable screw which passes through axis T.

FIG. 28 shows the components of the slotted linkage arrangement, as presented in FIG. 27, but instead collapsed into their assembled positions, but not yet attached to protractor strip 57 via dowel at axis O 65 and shoulder screw 70.

Lastly, in order to enable such slotted linkage arrangement to furthermore function as a level, it very easily could be fitted with additional provisions which, depending upon the whims of any particular consumer, would become available as optional accoutrements consisting of slotted linkage 305, adapter 306, castellated nut 307 and added dowel 308, as posed in FIGS. 22, 23, and 25.

That explains why the overall envelopes of such components appear as phantom lines therein. The upper surface of slotted linkage 305, as shown to reside farthest away from such protractor strip 57 in FIG. 25, by remaining parallel to it at all times during device flexure, thereby functions as a level. In that only the reference number of adapter 306 is denoted in the plan view of FIG. 22, such diagram remains rather uncluttered.

Proposed leveling provisions of this nature might prove suitable for associated applications, as well, possibly becoming of value in novel transit designs, or in airplane attitude measurements.

In FIG. 25, notice that adapter 306, castellated nut 307 and an added dowel 308 serve to attach slotted linkage 305 to such slotted linkage arrangement, in a manner as described below:

adapter 306 would assume the overall shape of dowel at axis Z 75, except for the fact that it also would incorporate an additional shank which emanates from the opposite side of its head, as projected about its radial centerline; also having a hole bored through it that is coincidental with the hole already drilled through it. The grip of such additional shank would be slightly longer than the thickness of slotted linkage 305, whereby the remainder of such additional shank, after slightly necking down would be entirely threaded. After replacing dowel at axis Z 75 with adapter 306, its, unused shank simply would become inserted through the slot slotted linkage 305 and thereafter be used to secure by means of threading castellated nut 307 onto its extended threaded portion. Such design would assure that castellated nut 307 doesn't clamp down upon slotted linkage 305 and impede motion, but instead ride completely over its slot during device flexure because it cannot be tightened beyond where adapter 306 necks down; and dowel 308 could be fabricated in much the same manner as dowel at axis O 65, except that its shank could be a little longer, depending upon designer discretion, while furthermore featuring a hole drilled through it about its radial centerline. Such additional part would become passed through the vacant circular hole featured in slotted linkage 305, and then become inserted into the vacant hole previously bored through given acute angle slotted linkage 59 about axis U'. In such manner added dowel 308 easily could be removed in the event that it became necessary to thereafter trisect an obtuse angle.

During flexure, slotted linkage 305 thereby would remain parallel to the x-axis at all times, as depicted in the plan view FIG. 22; hence, serving as a leveling device.

As represented in FIGS. 22, 23, 26 and 28, the slotted linkage arrangement of the fourth embodiment of such newly proposed articulating invention bears the following deficiencies:

- slotted linkages deflect to a greater degree than solid linkages of comparable dimensions, thereby resulting in poorer trisection accuracy. In order to compensate, they could be made a little bit wider. However, such design modification would cause a greater blockage of the readings imprinted upon such underlying protractor strip 57. Thereby, their sight holes would need to be enlarged also so that such readings could be differentiated more accurately;
- slots remove linkage space which otherwise could be used for nameplates. Hence the slot cut through given acute angle slotted linkage 59, once filled in, otherwise could have expressed that its longitudinal centerline with respect to the x-axis demarcates a designated acute angle that is intended to be trisected. Whereby, solid given obtuse angle solid linkage 62 then could have been labeled as a given obtuse angle in order to differentiate it exclusively for designated obtuse angle settings;
- slide linkage 64 must be located above transverse slotted linkage 63 in order to make its name visible, thereby resulting in an awkward layer arrangement since it otherwise could have been located to fill the void which spacer at axis T' 68 now occupies; and
- shoulder screw 70 requires unthreading and threading each and every time the device becomes specifically arranged so that it can trisect angles of obtuse designated magnitudes instead of angles of acute designated magnitudes.

Such deficiencies have been rectified by a more sophisticated slider arrangement, as described below.

The slider arrangement is a design variation of the fourth embodiment of such newly proposed invention that elaborates upon trisection capabilities of such slotted linkage arrangement by means of miniaturizing it, designing it to be easily transportable, featuring operating instructions, and adding scales to its x- and y-axes which are to appear as ruled divisions in order to precisely measure lengths associated with trisected angles whose trigonometric properties are of cubic irrational values that otherwise only could be approximated when performing geometric construction upon a given length of unity.

Such capability applies to exact lengths whose ratios with respect to a unit length are of cubic irrational value, or even transcendental value; thereby establishing an entirely new gateway which overcomes the dilemma that normally is experienced when unsuccessfully attempting to trisect an angle solely via straightedge and compass whose trigonometric properties are either of rational or quadratic value, but whose trisector instead exhibits cubic irrational trigonometric properties!

Such slider arrangement, as represented in FIGS. 29, 30, 31, 32, 33, 34, 35, 36, 37, 38, 39, 40 and 41 is comprised of the following components:

- protractor/instructions piece of paper 76;
- trisector linkage 77;
- bisector linkage 78;
- given acute angle linkage 79;
- control linkage 80;
- given obtuse angle linkage 81;
- transverse linkage 82;
- adjustment linkage 83;
- adjustment linkage pad 84;
- standoff 85;
- standoff 86;
- standoff 87;
- standoff 88;
- rivet 89;
- washer 90;
- washer 91;
- slider 92;
- shim 93;
- shim 94
- rivet 95;
- washer 96;
- slider 97;
- rivet 98;
- washer 99;
- rivet 100;
- slider 101;
- shim 102;
- slider 103;
- slider 104
- rivet 105;
- washer 106;
- rivet 107;
- pin 108;
- clutch 109;
- washer 110;
- shim 111;
- rivet 112;
- rivet center pin 113;
- toploader 114;
- preliminary assembly 115;
- linkage assembly 116;
- intermediate assembly 117;
- easel 118; and
- easel 119.

Figure 29:
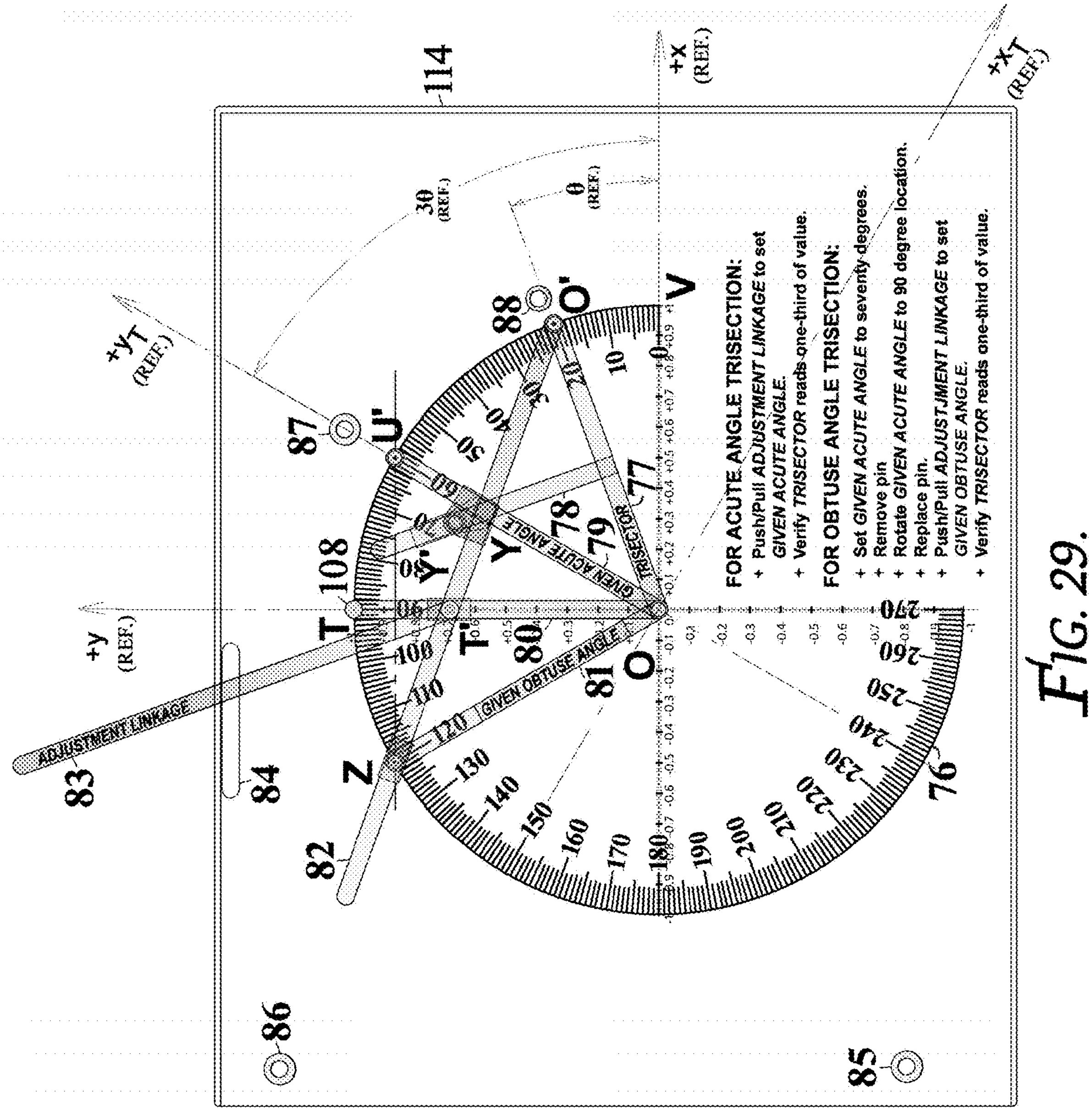
FIG. 29 is a plan view of the slider arrangement the fourth embodiment, or car jack configuration of such newly proposed invention.

Such slider arrangement, as represented in FIG. 29, includes a combination of thinner solid linkages and low profile rivets for purposes of replacing larger slotted linkages and bulkier dowels, as previously expressed in FIG. 22. Also, pin 108 replaces a clumsier shoulder screw 70 which formerly was applied to secure such slotted linkage arrangement.

Only solid linkages are permitted throughout such slider arrangement. Without featuring slots, solid linkages not only are stronger, but their fabrication becomes easier because it excludes detailed stamping operations which otherwise would be required; therefore, being more cost effective in the long run.

Such improved device also features sliders which surround and support respective linkages; thereby permitting their unobstructed movement within them, while still effectively constraining them as necessary.

Figure 30:
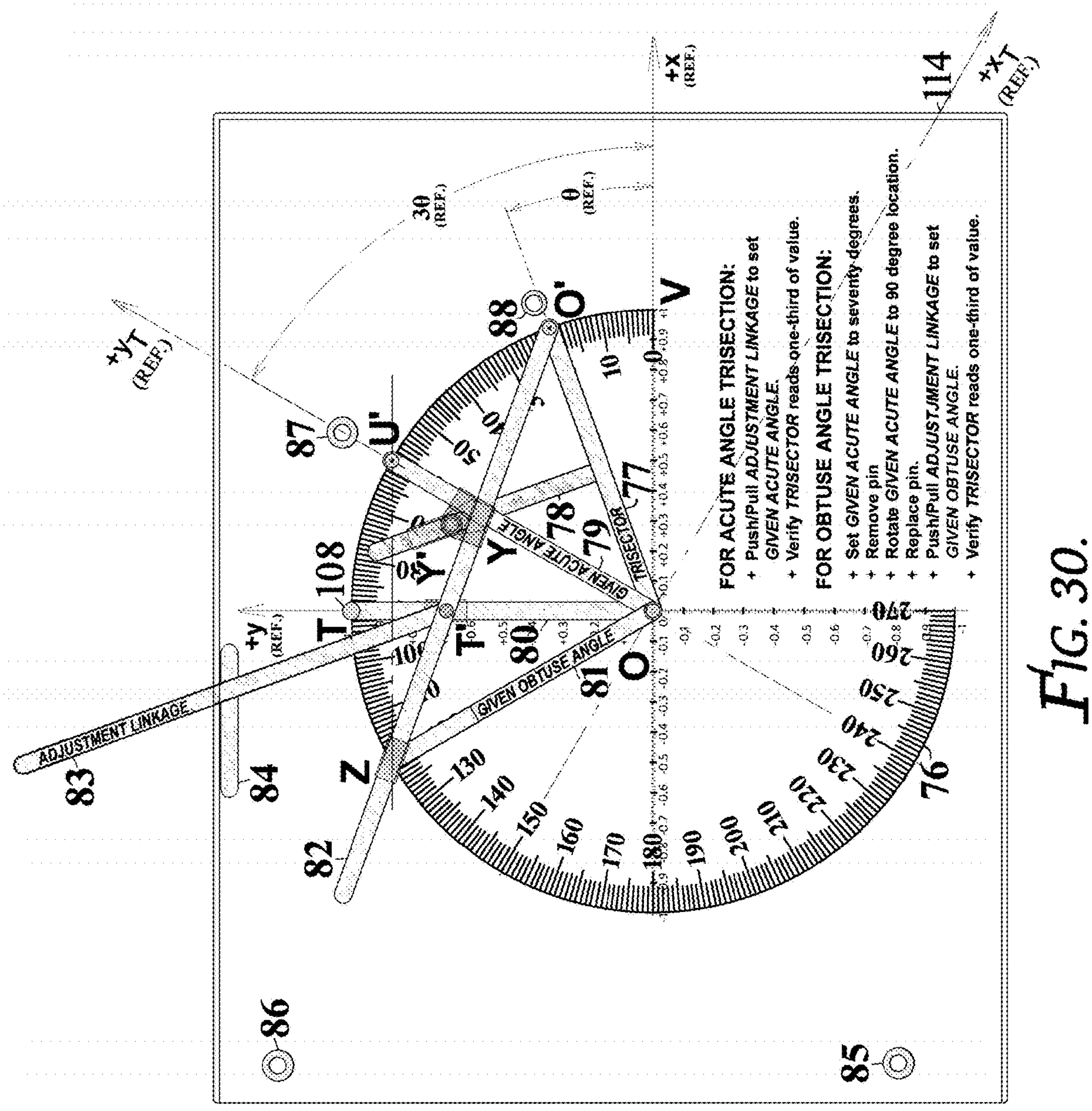
FIG. 30 is a representation of FIG. 29 showing certain transparent linkage portions as having been replaced by solid constructions for the express purpose of better illustrating which linkages reside at higher elevations than others.

The opaque linkages depictions, as posed in FIG. 30, give a clear indication of the stacking arrangements about various axes.

For example, upon examining FIG. 29, notice that:

- the stacking arrangement of transverse linkage 82 with respect to adjustment linkage 83 at axis T' cannot be clearly distinguished, but in FIG. 30, transverse linkage 82 is shown to be reside closer to the viewer than does adjustment linkage 83; and
- the short straight line appearing just after the GIVEN OBTUSE ANGLE inscription placed along the upper face of given obtuse angle linkage 81 in FIG. 29 designates where such member becomes doubled in thickness on its underside and, therefore, becomes obscured when instead viewing FIG. 30 by the solid structure which now resides above it.

In such FIG. 45 Invention Trisection Process Chart, note further that such slider arrangement adheres to the very same operating procedure as previously elicited with respect such slotted linkage arrangement, excepting that:

in order to specifically arrange such device, as depicted in FIGS. 29 and 30, to trisect angles of obtuse designated magnitudes from any acute angle of 3θ designated magnitude which might become properly set into it by means of manipulating adjustment linkage 83 from outside of toploader 114 until such time that the longitudinal centerline of given acute angle linkage 79 aligns upon a particular reading which would appear at axis U', adjustment linkage 83 is to be maneuvered, thereby rotating given acute angle linkage 79 to a seventy degree reading. Next, pin 108, as shown to be positioned at axis T therein, is to be disengaged from clutch 109, which retains it from underneath toploader 114. This enables acute angle linkage 79 to thereby become rotated to s ninety degree reading, as indicated in FIG. 31, by means of again tugging upon adjustment linkage 83; whereupon such pin 108 thereafter can be reinserted, but this time through axis U' so that it finally can be restored back into clutch 109; and in order to thereafter properly set such device, adjustment linkage 83, as represented in FIG. 31, then is manipulated again until such time that the longitudinal centerline of given obtuse angle linkage 81 aligns upon any particularly sought after obtuse angle reading of 270–6θ magnitude, as would appear at axis Z.

The operating instructions which are posted upon such protractor/instructions piece of paper 76 duly reflect these differences. Naturally another set of operating instructions could have been incorporated onto protractor strip 57, as posed in FIG. 22, as well; but were omitted from it in order to emphasize just how such fourth embodiment might vary in its overall design.

What remains fundamental, however, is that acute angle trisection and obtuse angle trisection operating instructions are posted separately upon such protractor/instructions piece of paper 76, as posed in FIG. 29, because the process performing obtuse angle trisections requires that such devices initially be specifically arranged to a completely different orientation pattern than when performing acute angle trisections. Hence, either of such FIGS. 29 and 30, denotes a position of such slider arrangement once it has been specifically arranged to trisect some acute angle; whereas FIG. 31 denotes the overall configuration of such slider arrangement only after it becomes specifically arranged to trisect some obtuse angle.

Whereas such slotted linkage arrangement, as posed in FIG. 22, controls the repositioning of intermediate axes T' and Y by the strategic placement of dowels which communicate with a variety of slotted and solid linkages, such slider arrangement, as represented in FIG. 29, instead controls the repositioning of such intermediate axes by its strategic application of low profile rivets and interconnecting sliders which come into contact with only solid linkages.

Whereas a miniaturized slider arrangement exhibits much finer features than those afforded by its slotted linkage arrangement counterpart, in order to suitably depict the proper proportions between rivet head thicknesses and their respective shank lengths, the scale of its front and side views would have to be so enormous, as not to fit upon a single drawing page. Were such views thereby to be represented upon multiple pages instead, the very purpose of showing entire linkage spans as placements upon a single plan view naturally would become defeated.

Figure 31:
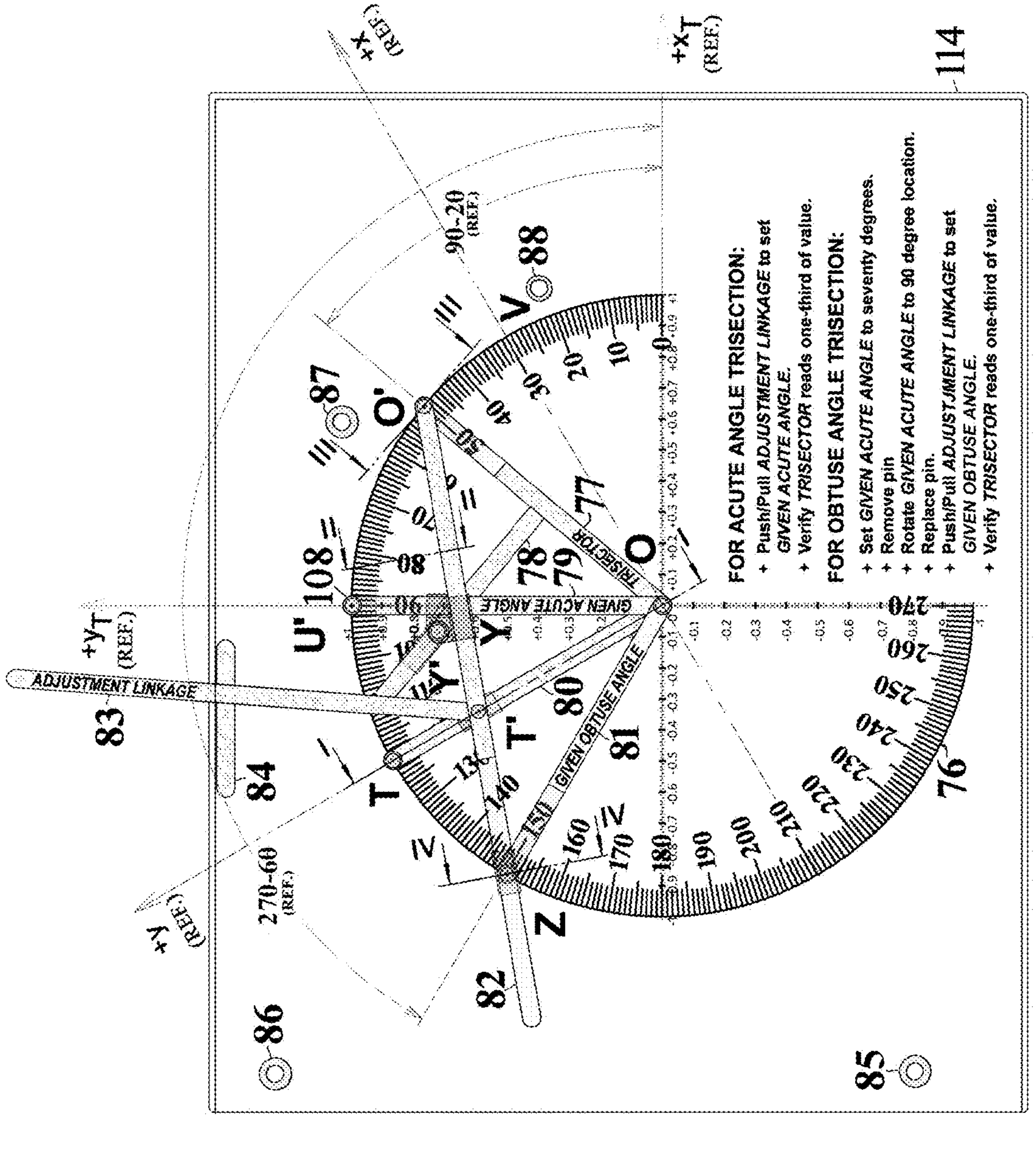
FIG. 31 is another rendering of the plan view of such slider arrangement, as posed in FIG. 30, except that its upper members, along with noted +x, +y, $+x_T$, $+y_T$ axes are shown to be rotated about its lower underlying protractor/instructions piece of paper, as well as the toploader which envelopes it, a magnitude of 90−3θ in the counterclockwise direction about axis O.

Hence, rather than provide massive plan views of such slider arrangement, being much larger than those now represented in FIGS. 29, 30 and 31, for the express purpose of supporting proportionate front and/or side views, detail sections instead are afforded, as posed in FIGS. 32, 33, 34, and 35, which very easily instead can be compared accurately with respect to these drawings for purposes of understanding the relative degree of space savings promoted by such miniaturization.

Such drawings differentiate shims from washers, whereby the latter exhibit heights which are either equal to or multiples of a standard overall linkage thickness. For example, washer 91, as posed in FIG. 32, stands one linkage thickness high, but washer 96 stands three linkage thicknesses high.

Figure 32:
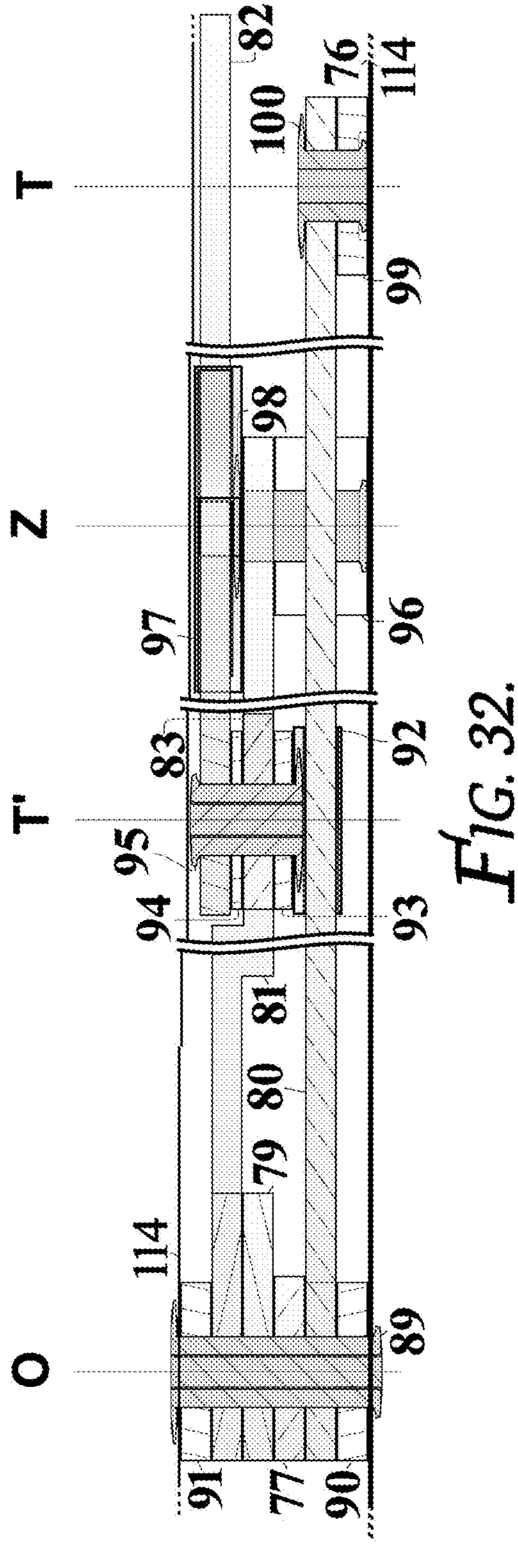
FIG. 32 is an enlarged view of the section on line I-I of FIG. 31, rotated 120 degrees in the clockwise direction.
Figure 33:
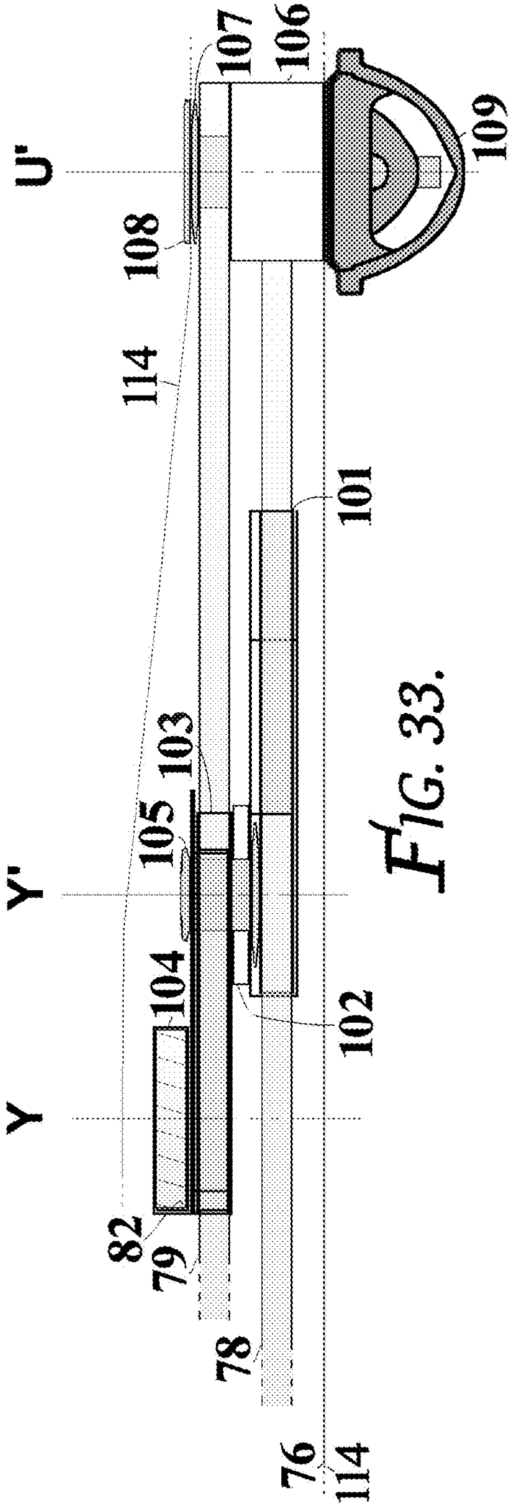
FIG. 33 is an enlarged view of the section on line II-II of FIG. 31, rotated 100 degrees in the clockwise direction.

Whereas levels are not specified in the third derivative Euclidean formulation, as posed in FIG. 21, which both fourth embodiment design arrangements are premised upon, design latitude is afforded which enables linkages of such slider arrangement to be located between levels, as well as entirely inside of them. As such, instead of providing a stacking chart, a collation of the components which each rivet secures is stipulated below:

with particular respect to FIG. 32:

about axis O, rivet 89 is inserted through the upper portion of toploader 114, then through washer 91, given obtuse angle linkage 81, given acute angle linkage 79, trisector linkage 77, control linkage 80, washer 90, protractor/instructions piece of paper 76, and the lower portion of toploader 114;

about axis T', rivet 95 is inserted upside down through, from bottom to top, a hole made in the upper portion of slider 92, shim 93 given obtuse angle linkage 81, shim 94, and transverse linkage 82. As shown, slider 92 completely surrounds control linkage 80 below rivet 95, thereby maintaining an alignment of its longitudinal centerline with axis T' at all times. A better understanding of the very manner in which slider 92 is depicted in FIG. 32 can be gained upon examining FIG. 36, whereupon it shall be disclosed in greater detail below just how sliders become wrapped about themselves during device assembly operations. By such measure, it then will become quite apparent that such FIG. 32 representation evidences that after the shank of rivet 95 becomes inserted through a small hole cut midway about the periphery of slider 92, one of its sides, extending away from such hole, is wound entirely about the perimeter of control linkage 80, while its remaining side is shown to be wrapped about just two of the four outer surfaces which constitute its overall periphery. This explains why a double depth of such slider is exhibited about its bottom face whereby such surfaces, in direct contact with each other then become glued together. As such, a portion of slider 92 intercedes, or separates the head of rivet 95 from the upper surface of control linkage 80, thereby reducing friction between such two components during device flexure. The two sides of slider 92 do not appear in FIG. 32 because section 13D—13D, as taken in FIG. 31, only captures one of its sides; that being its rear face, or that which is furthest away from the viewer in this particular case, since such sectioning is viewed along the longitudinal centerline of control linkage 80. However, such rear face remains completely hidden behind the solid section of control linkage 80 which resides in front of it, so it is not shown either. Whereas rivet 95 passes through the circular hole cutout made in transverse linkage 82 its span extending from axis T' to axis O' is maintained equal to that of the span of trisector linkage 77 which extends from axis O to axis O', as evidenced in FIG. 31. As mentioned earlier, such design constraint also applies to the slotted linkage arrangement, thereby explaining why a circular hole was made through transverse slotted linkage 63, serving to separate its two distinct slot cutouts, as depicted in FIG. 27. FIG. 32 indicates that given obtuse angle linkage 81 steps up to a higher level, thereby rising above given acute angle linkage 79 at axis O. Such change in elevation is denoted in FIGS. 29, 30, and 31 by a straight line which appears just before the GIVEN OBTUSE ANGLE marking imprinted upon given obtuse angle linkage 81;

about axis Z, rivet 98 in inserted through the lower portion of slider 97, then through given obtuse angle linkage 81 and lastly through washer 96. Such washer is chamfered at its lower end so that the lower portion of rivet 98 sits inside of it after pull-up operations and, after becoming proper filed, provides a smooth surface which effortlessly slides upon the protractor/instructions piece of paper 76 during device flexure. Above such rivet 98, transverse linkage 82 is surrounded by slider 97, thereby maintaining an alignment of its longitudinal centerline with axis Z at all times. Again, such slider 97 is shown to wind around the head of rivet 98 in order to avoid rubbing against transverse linkage 82 during device flexure; and about axis T, rivet 100 attaches control linkage 80 to washer 99, also chamfered for the same reasons expressed above.

with particular respect to FIG. 33:

about axis Y', rivet 105 also is shown to be inserted upside down through, from bottom to top, the upper portion of slider 101, then through shim 102 which is partially hidden by given acute angle linkage 79 which passes in front of it, and lastly through the tailing ends of slider 103, and slider 104 whose surfaces thereby come into direct contact with each other about axis Y'. As indicated therein, such two latter mentioned sliders are wound completely around transverse linkage 79 and given acute angle linkage 82, respectively, at axis Y. Such design serves, not only to constrain such linkages in their proper positions away from such axis Y, as posed in FIGS. 29, 30, and 31, but also to reduce friction between them during flexure, thereby extending device life; and about axis U', rivet 107 is shown to secure given acute angle linkage 79 to washer 106. Again, the lower portion of washer 106 is chamfered for the same reasons given above. Such chamfer is not shown in FIG. 33 simply because washer 106 is not sectioned. Lastly, pin 108 is shown to be inserted through the upper portion of toploader 114, where it next goes through the hole vertically centered in such rivet 107, then through the protractor/instructions piece of paper 76, and lastly through the lower portion of toploader 114, thereby becoming secured into position by clutch 109.

Figures 34, 35, 36, 37, 38:
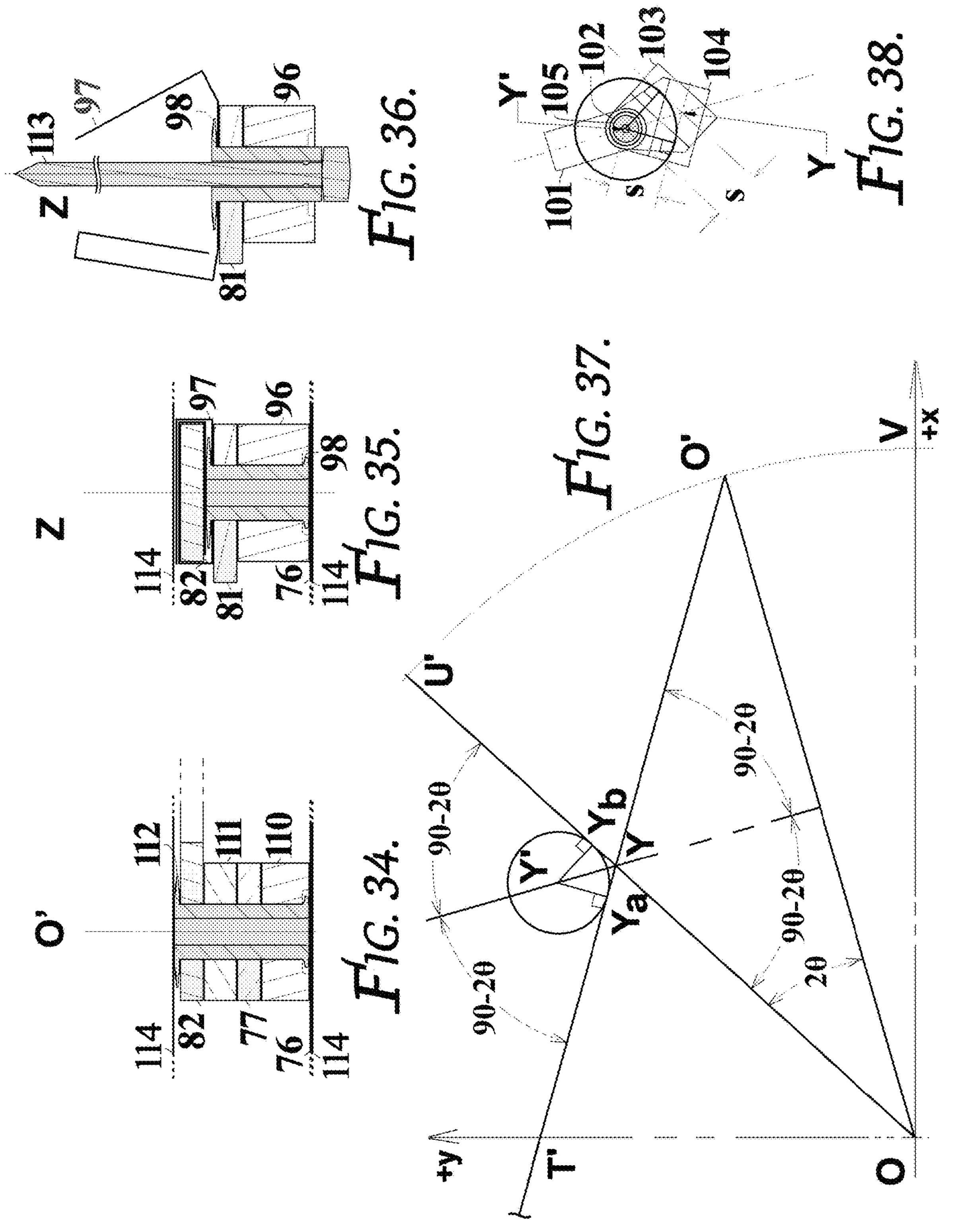
FIG. 34 is an enlarged view of the section on line III-III of FIG. 31, rotated 140 degrees in the clockwise direction.
FIG. 35 is an enlarged view of the section on line IV-IV of FIG. 31, rotated 100 degrees in the clockwise direction.
FIG. 36 is a rendition of FIG. 35, but instead perceived just before its rivet pin becomes pulled up and thereafter ejected during device assembly.
FIG. 37 is diagram which indicates where axis Y' is positioned related to axis Y in FIGS. 29, 30, and 31.
FIG. 38 is a detail of a portion of FIG. 37 wherein two sliders furthermore are shown to be superimposed such that their outside envelopes remain parallel during articulation to their longitudinal centerlines; as being those which also apply to linkages which such sliders respectively surround in FIGS. 29, 30, and 31, whose longitudinal centerlines therein are represented by straight line segments OU' and O'T; thereby demonstrating that the two longitudinal centerlines of such linkages and surrounding sliders always remain tangent to the circumference of a circle whose radius is designated to be of specific length "s" and whose center point aligns upon axis Y'.

With particular regard to FIG. 34, rivet 112 is shown to be inserted about axis O' through transverse linkage 82, shim 111, then through trisector linkage 77, and eventually through washer 110. Such washer also is chamfered to enable rivet 112 to become recessed within it, and, after completing such fabrication, thereafter becoming capable of sliding smoothly along the protractor/instructions piece of paper 76 without tearing it during device flexure.

A now fully sectioned FIG. 35 thereby becomes shown solely for the mere convenience of comparing it with respect to FIG. 36 since its details previously were disseminated in FIG. 32.

As such, FIG. 36 is another view of FIG. 35, except for the fact that it is perceived just before rivet center pin 113 of rivet 98 becomes pulled up, then removed, and thereafter discarded.

Therein, notice that slider 97 already has been bent to fit snugly about transverse linkage 82, as the later is depicted only in FIG. 35. It is displayed in its unfolded position in order to expose the head of rivet 98 so that it may be placed into direct contact with the bottom of a rivet gun (not shown).

The purpose of such rivet gun is to bear upon such rivet center pin 113 in order to pull it upwards with respect to such rivet head. Such pull up operation is described as follows:

rivet center pin 113 becomes pulled up, being careful to leave sufficient play within it to permit the captive portion of slider 97 to freely rotate about it in uninhibited fashion, while nevertheless applying enough force upon sandwiched slider 97, given obtuse angle linkage 81 and washer 96 in order to clamp them firmly together. If slider 97 were to become over-tightened during such pull up operations by mistake, thereby no longer being free to rotate about rivet center pin 113 in an uninhibited manner, most times such problem can be remedied simply by exerting a torque which can overcome the contact resistance afforded between the tiny amount of slider 97 surface area which bears upon the head of rivet 98. During such process, rivet 98 would become loosened a miniscule amount, whereas a small amount of surface area also could be shaved away from slider 97; thereby promoting relative rotation in a completely unobstructed manner. Such pull up force serves to bend the lower portion of the rim of rivet 98 outwards, thereby occupying part of the chamfer, or recess previously machined into the lower portion of washer 96, as thereafter is depicted in a reshaped form in FIG. 35;

rivet center pin 113 then becomes extracted by means of displacing it downward;

the lower stock of rivet 98 then becomes filed down and sanded smooth enough to where it no longer extends beyond the lower surface of washer 96;

the left portion of slider 97 is rotated in a clockwise direction until it sits directly over the head of rivet 98, whereby a small amount of glue then carefully is administered to its top and outer right side;

once in place, the right portion of such slider 97 then becomes rotated in a counterclockwise direction until it comes into direct contact with two of the surfaces of such left portion, thereby enabling such slider 97 to be glued together;

lastly, transverse linkage 82 becomes inserted through slider 97 and translated within it in order to remove any remaining resistance; thereby enabling its uninhibited movement inside of it; and with such pull up procedure now completed, such interim arrangement, as expressed in FIG. 36, thereby reverts to it final configuration, as expressed in FIG. 35.

Notice that such process enables a portion of slider 97 to reside in between the head of rivet 98 and the lower surface of transverse linkage 82; thereby affording a smooth area for transverse linkage 82 to glide over without being eroded by the slightly projecting head of rivet 98.

Such gluing operation is typical for all sliders, whereby:

FIG. 32 gives a full view, not a section, of slider 97 whose transparent portion appearing to the right of rivet 98 remains in front of transverse linkage 82; whereby its tailing side resides behind such linkage, as shown to the left of rivet 98. Such two slider 97 side portions are shown to be of a darker texture when compared to an area which resides nearer to axis Z where transverse linkage 82 passes directly through one of its open ends. At such location, the lighter texture signifies that transverse linkage 82 can be viewed directly without having to peer through either of the sides of slider 97;

FIG. 32 also provides a sectional view of slider 92 shown to surround the head of the inverted rivet 95 about axis T'. Such slider also is glued around its rear portion and underside;

FIG. 33 gives a full view of slider 101 shown to surround bisector linkage 78, as well as the head of the inverted rivet 105 about axis Y'. Such slider is glued around its rear portion and underside;

FIG. 33 gives a full view of slider 103 shown to surround the given acute angle linkage 79 about axis Y. Such slider is glued around its top portion and rear side; and FIG. 33 gives a full view of slider 104 shown to surround the transverse linkage 82 about axis Y. Such slider is glued around its left portion and underside.

As shown in FIGS. 29, 30, and 31, and validated in FIGS. 32, 33, 34, 35, and 36, rivets which have had their pins permanently removed are located about the periphery of the protractor circle which is imprinted upon the protractor/instructions piece of paper 76. Such rivet pin extractions afford an uninterrupted view from above in order to permit all protractor readings to be accurately verified. Accordingly, rivet 112 about axis O', rivet 107 about axis U', rivet 100 about axis T, and rivet 98 about axis Z all are devoid of center pins which previously enabled their pull up into respective prescribed positions. As such, the inner diameter of the pulled up portion of inverted rivet 95 residing about intermediate axis T', along with that of inverted rivet 105 residing about intermediate axis Y', and that of rivet 89 residing about axis O all exhibit remaining portions of their pins which haven't been clipped off. Hence, it becomes impossible to see through them.

Such above cited illustrations depict rivets to be made out of a solid material such as aluminum. However, they just as easily could have been transparent plastic extrusions. By displaying them as solid objects, an ideal contrast is afforded with respect to any transparent linkages and sliders represented.

A suitable material for such slider arrangement linkages is a clear polycarbonate because it is durable, as well as inexpensive in small amounts.

Shims and washers also appear as solid objects.

Any obstruction to viewing, as normally posed by solid rivets is greatly mitigated because:

they exhibit a very small surface area; and their pin holes provide a point of reference by exposing relevant locations upon the protractor circle imprinted on such protractor/instructions piece of paper 76.

Pin 108 also is made of a solid material so that it is not easily lost upon removal from the toploader during its disengagement from clutch 109.

FIG. 37 depicts a portion of such third derivative Euclidean formulation, as posed in FIG. 21, where isosceles triangle YOO' is represented. As such, its included angle YOO' and angle YO'O exhibit magnitudes algebraically expressed as 2θ each, even as given angle VOO' in such FIG. 21 becomes varied in size.

By geometrically constructing an altitude from vertex Y to base OO' of isosceles triangle YOO', as illustrated in FIG. 37, two right triangles that are congruent to each other thereby become formed. Such is the case because they must be similar to each other based upon the fact that they each exhibit corresponding angles amounting to ninety degrees apiece, as well as two other corresponding angles amounting to an equal size of 2θ; whereby their corresponding hypotenuses, as represented by straight line segments OY and O'Y are known to be of the same length.

Accordingly, the magnitude of each angle of such congruent right triangle residing at vertex Y must be complementary to such 2θ value, thereby amounting to an algebraically expressed value of 90−2θ.

From these two angles, two more distinct vertical angles thereby become distinguished about point Y, also being of magnitude 90−2θ as further indicated in FIG. 37.

Next, point Y' becomes selected along such extended geometrically constructed altitude such that it is positioned a suitable distance away from point Y; realizing that both point Y and point Y' now must reside upon the perpendicular bisector of straight line OO'.

Straight line $Y'Y_a$ thereafter is geometrically constructed perpendicular to straight line O'T', and straight line $Y'Y_b$ then becomes drawn perpendicular to straight line OU'.

Since right triangle $YY'Y_a$ and right triangle $YY'Y_b$ each exhibit respective angles of magnitude ninety degrees, and of size 90−2θ, they must be similar to one another.

Moreover, since such right triangles each contain side of YY' in common, they also must be congruent to one another by the geometric proof of having corresponding angle-side-angle (ASA) components of equal magnitude; whereby side $Y'Y_a$ of one congruent triangle must be equal in length to corresponding side $Y'Y_b$ of the other. As illustrated in FIG. 37, these two corresponding sides constitute radii of a circle whose center point resides at such suitably selected point Y' and whose circumference becomes tangent at point $Y_a$ with straight line O'T', and also becomes tangent at point $Y_b$ with straight line OU'.

Thereafter, such radii become algebraically designated to be of length 's' in FIG. 38, a drawing which instead reflects a corresponding portion of such slider arrangement, as posed in FIG. 29.

Recognizing that such three straight lines which pass through point Y, as posed in FIG. 37, respectively distinguish the fundamental architecture of bisector linkage 78, acute angle linkage 79, and transverse linkage 82 belonging to such slider arrangement, as depicted in FIG. 29, such straight lines thereby furthermore describe the pathways of their associated longitudinal centerlines.

FIG. 38 relates how the longitudinal centerlines of such bisector linkage 78, acute angle linkage 79, and transverse linkage 82 become controlled by sliders which they respectively pass through in order to maintain their trajectories along the pathways specified in FIG. 37.

Such control becomes regulated as follows:

the longitudinal centerline of slider 101 is shown to align with such perpendicular bisector, as drawn in FIG. 37, thereby maintaining bisector linkage 78, as posed in FIG. 29, along such pathway;

the longitudinal centerline of slider 103 is shown to align with straight line OU', as posed in FIG. 37, thereby maintaining acute angle linkage 79, as posed in FIG. 29, along such course. Such control is maintained throughout device articulation because one of such points residing along the longitudinal centerline of slider 103, as posed in FIG. 38, is designed so it rotates circumferentially about axis Y' a fixed distance 's' away from it at all times; thereby conforming to the locus of points which the point of tangency $Y_b$ describes about point Y' in FIG. 37; and the longitudinal centerline of slider 104 is shown to align with straight line O'T', as posed in FIG. 37, thereby maintaining transverse linkage 82, as posed in FIG. 29, along such pathway. Such control is maintained throughout device articulation because one of such points residing along the longitudinal centerline of slider 104, as posed in FIG. 38, is designed so it rotates circumferentially about axis Y' a fixed distance 's' away from it at all times; thereby conforming to the locus of points which the point of tangency $Y_a$ describes about point Y' in FIG. 37.

Figure 39:
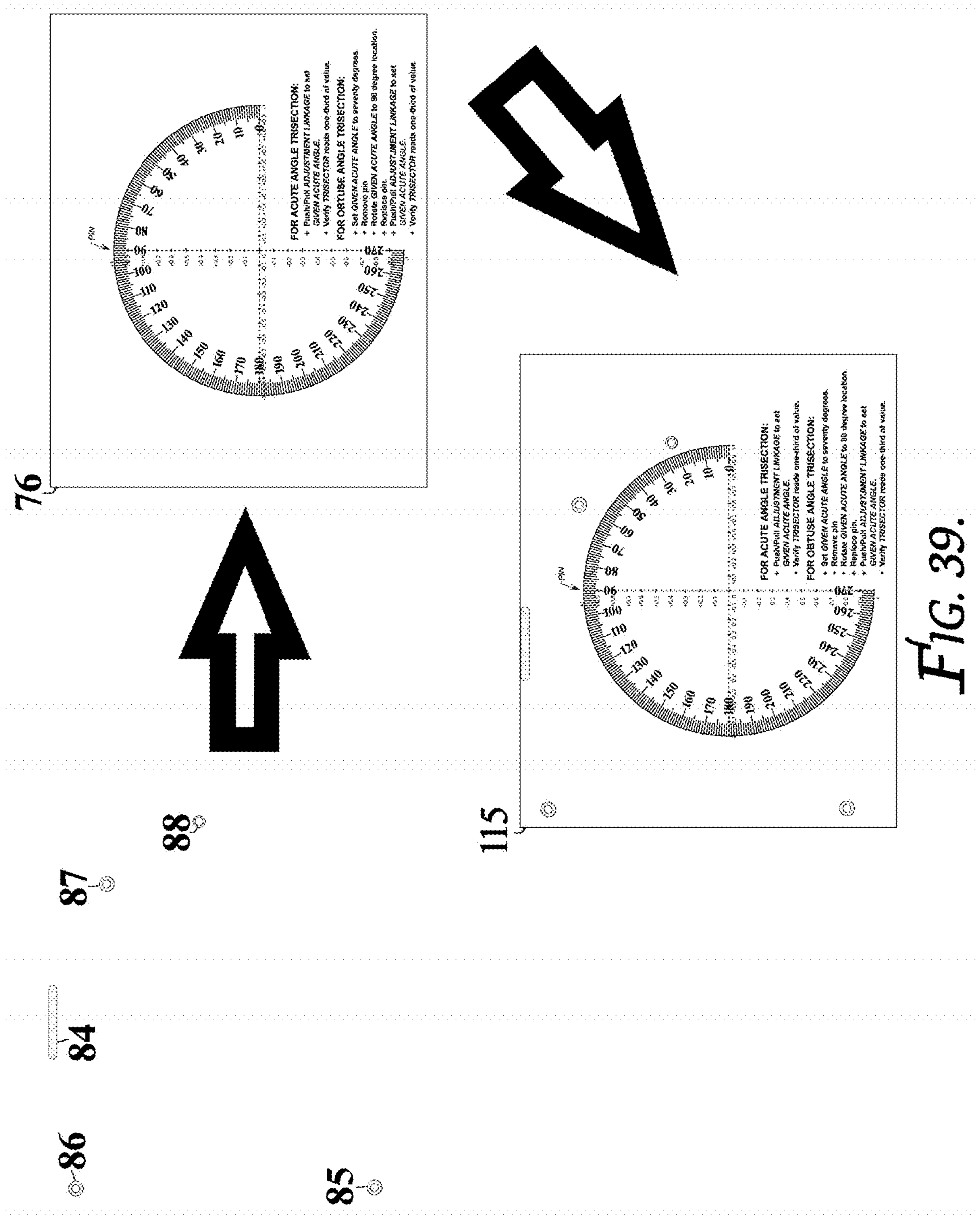
FIG. 39 is a plan view of an adjustment linkage pad and various standoffs which are shown to be glued onto a piece of paper which has a protractor, horizontal and vertical scales, and operating instructions imprinted upon its upper face for purposes of forming a preliminary assembly of the slider arrangement of such car jack configuration.

FIG. 39 depicts adjustment linkage pad 84, standoff 85, standoff 86, standoff 87, and standoff 88 being glued onto the protractor/instructions piece of paper 76, as depicted to the right of them; thereby establishing preliminary assembly 115 of such slider arrangement of the car jack configuration.

Figure 40:
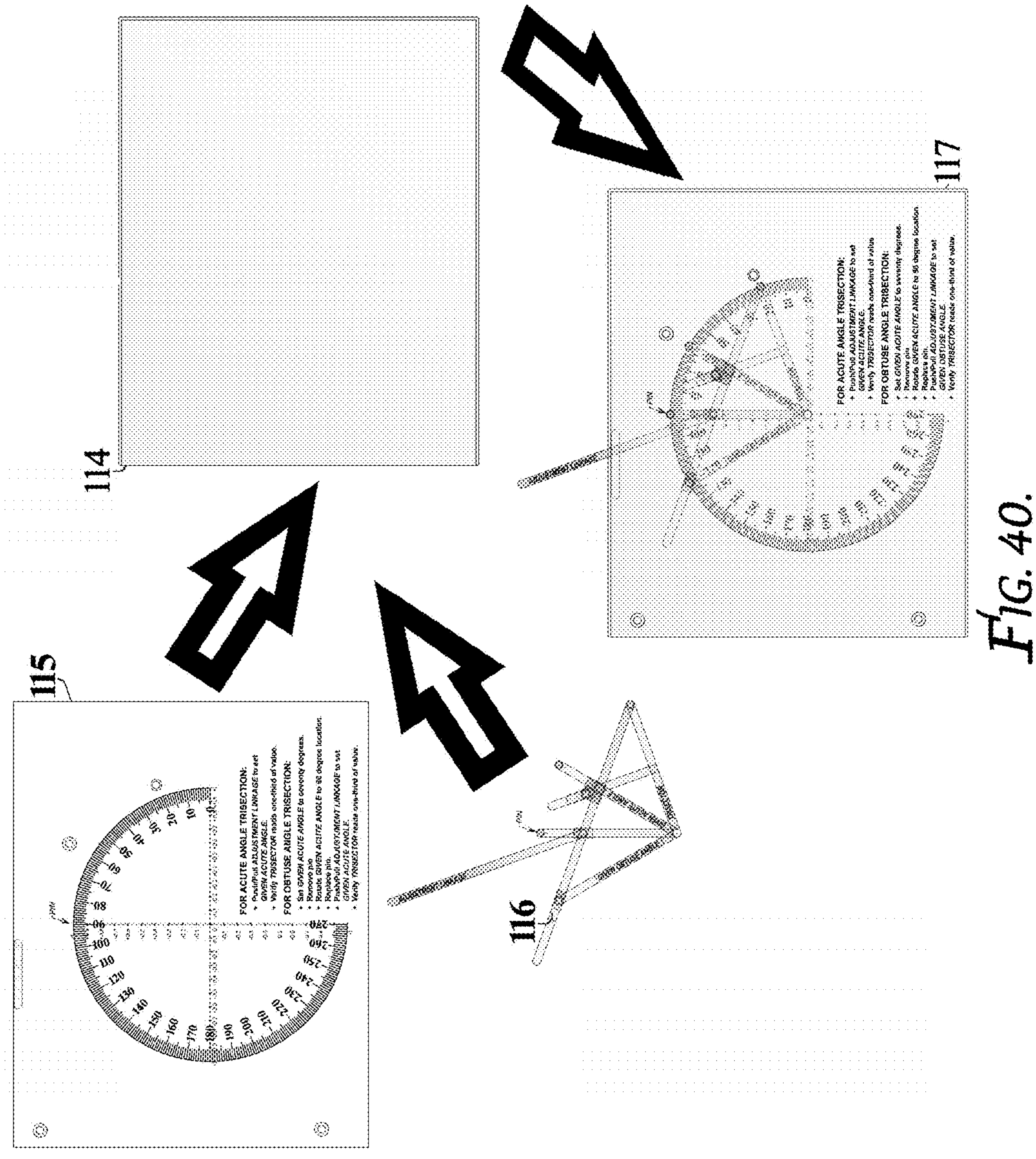
FIG. 40 is a plan view showing such preliminary assembly, as represented in FIG. 39, being inserted into a toploader whereupon a linkage assembly thereafter is slid into position between such preliminary assembly and upper sleeve of such toploader in order to form an intermediate assembly of the slider arrangement of the fourth embodiment of such newly proposed invention.

FIG. 40 presents preliminary assembly 115, as represented in FIG. 39, being inserted into toploader 114; whereupon linkage assembly 116, built up of all other slider arrangement components, as previously described, with the exception of those included in such preliminary assembly 115, along with rivet 89, pin 108, clutch 109, easel 118 and easel 119, thereafter is slid into position within such toploader 114 so that it becomes situated above such preliminary assembly 115 and below the upper sleeve of toploader 114 in order to form intermediate assembly 117 of the slider arrangement of the car jack configuration of such newly proposed invention.

Figure 41:
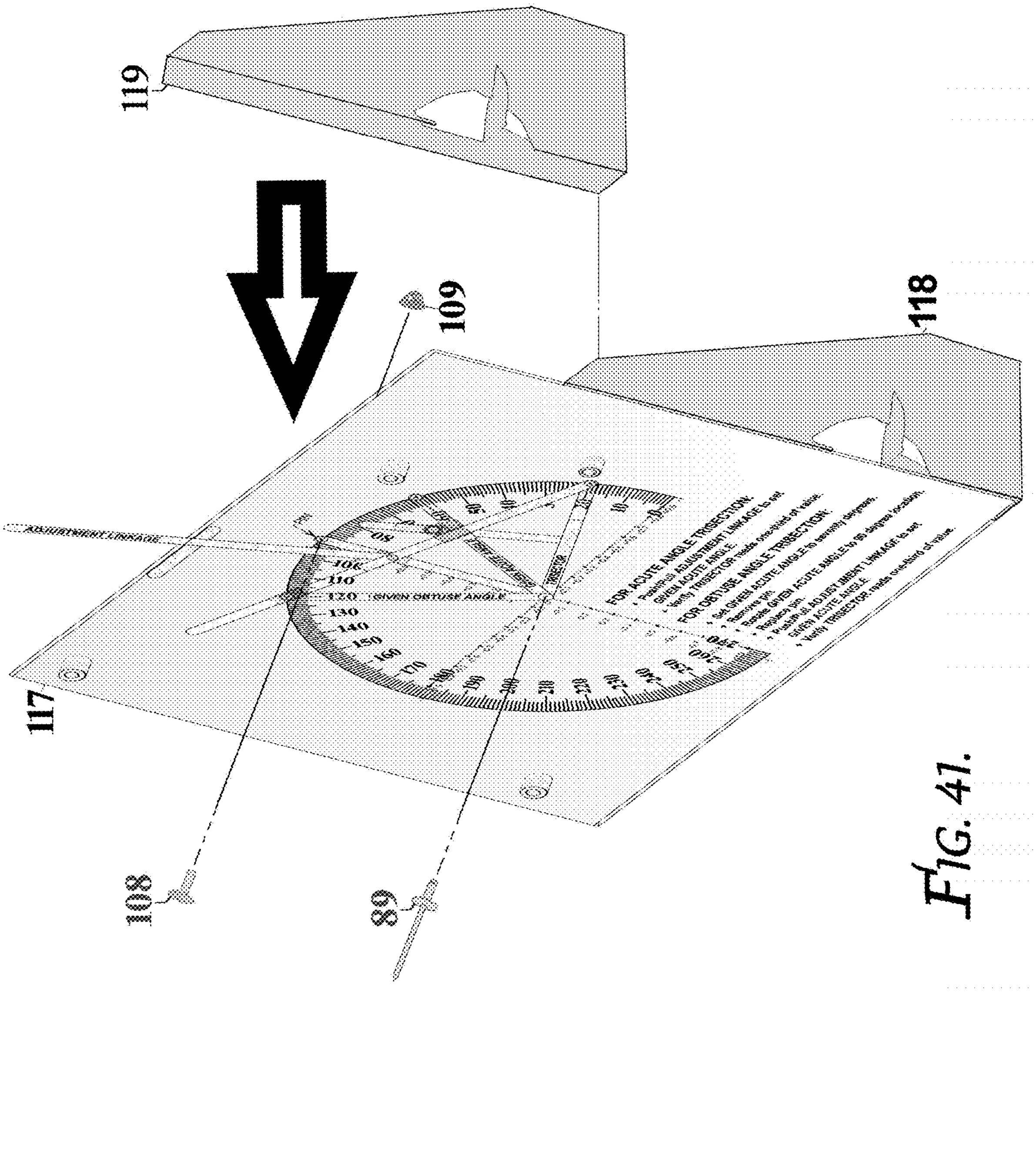
FIG. 41 is a perspective drawing of such intermediate assembly erected in an upright position and supported by to two easels which become bonded onto the rear face of such toploader. Therein, a rivet is shown which clamps the entire assembly into final position, along with a pin which after insertion becomes held captive by a clutch; thereby specifically arranging, as well as joining the entire unit in order to form the final assembly of the slider arrangement of the car jack configuration of such newly proposed invention.

FIG. 41 displays intermediate assembly 117 being stood in an upright position, whereby easel 118 and easel 119 then are shown to be bonded onto each of its rear, lower side portions.

Rivet 89 next is installed into the center portion of intermediate assembly 117, through its axis O, for purposes of pulling it up in order to firmly secure preliminary assembly 115 and linkage assembly 116 within toploader 114.

Adjustment linkage 83 becomes maneuvered so that axis T of intermediate assembly 117 thereafter aligns upon the ninety degree mark inscribed upon protractor/instructions piece of paper 76.

Removable pin 108 then is installed through toploader 114 about axis T, then through the vacant hole afforded by rivet 100, thereby specifically arranging such device so that it can trisect angles of acute designated magnitude, then through the underside of toploader 114, whereby it finally can be secured by clutch 109, as indicated in FIG. 41, for purposes of temporarily holding it captive; thereby completing final assembly of such slider arrangement.

The above described procedure enables the slider arrangement to be assembled within the confined space afforded by toploader 114, even after acknowledging that its overall height necks down about its sides. Hence, such process abets development of totally transportable, miniaturized trisection device.

Next, an explanation is to be furnished pursuant to such FIG. 45 Invention Trisection Process Chart that accounts for just how such slider arrangement is to be specifically arranged and thereafter properly set in order to trisect acute angles; broken down as follows:

such device is to be specifically arranged by means of aligning axis T of control linkage 80 so that the hole in rivet 100 held captive by it becomes situated directly the ninety degree marking of protractor/instructions piece of paper 76, thereby enabling pin 108 to be inserted completely through the upper sleeve of toploader 114, then completely through the hole in rivet 100, and then through the lower sleeve of toploader 114 so that it can be secured to clutch 109, as indicated in FIGS. 29 and 30; and such device thereafter is to be properly set by means of manipulating adjustment linkage 83 from outside of toploader 114, as depicted in FIG. 29, until either:

the particular reading upon protractor/instructions piece of paper 76 which axis U' just so happens to coincide with indicates the designated magnitude of an angle that actually is intended to be trisected; or the angle that actually is intended to be trisected instead becomes automatically portrayed about axis O, as subtended between the +x-axis and the longitudinal centerline of given acute angle linkage 79.

In such above described scenario, trisection thereby mechanically becomes achieved because as adjustment linkage 83 becomes manipulated from outside of toploader 114, as depicted in FIG. 29:

it causes trisector linkage 77 to rotate about axis O such that the magnitude of any angle which might extend from the +x-axis to its longitudinal centerline furthermore could be algebraically expressed by the Greek letter $\theta$, thereby signifying that such angle might assume a virtually infinite number of discrete values;

during such process, the longitudinal centerlines of trisector linkage 77, transverse linkage 82 between axis O' and axis T', and control linkage 80 between axis T' and axis O always would describe the three sides of an isosceles triangle whose two included angles of equal size each would amount to a magnitude of $90-\theta$, such that its remaining angle thereby would be of $2\theta$ size; and the longitudinal centerlines of trisector linkage 77, transverse linkage 82 between axis O' and axis Y, and given acute angle linkage 79 between axis Y and axis O furthermore always would describe the three sides of yet another isosceles triangle whose two included angles of equal size each, by being algebraically expressed to be of $2\theta$ size, would amount to twice the magnitude of any angle which simultaneously could be swept out about axis O between such +x-axis and the longitudinal centerline of trisector linkage 77.

Whereas the magnitude of virtually any angle which could be swept out about axis O in this prescribed manner, as extending from the +x-axis to the longitudinal centerline of given acute angle linkage 79 furthermore would have to amount to the sum of the magnitudes of the angles simultaneously extending from such +x-axis to the longitudinal centerline of trisector linkage 77, and then from the longitudinal centerline of trisector linkage 77 to that of given acute angle linkage 79, it would have to be of a size algebraically calculated to amount to as $\theta+2\theta=3\theta$; meaning that for any reading which appears at axis U', a corresponding reading which appears at axis O' would have to amount to one-third of its size, thereby representing its trisector.

It thereby can be concluded that slider arrangement of the car jack configuration of such newly proposed invention, as duly depicted in plan view in FIG. 29, could be used to trisect virtually any angle of acute designated magnitude which it properly could be properly set to, in full accordance with the provisions set forth in such FIG. 45 Invention Trisection Process Chart, merely by means of manipulating adjustment linkage 83 from outside of toploader 114 until such time that a protractor/instructions piece of paper 76 reading at axis U' amounts to the designated magnitude of an angle that is intended to be trisected.

Substantiating such capability would consist merely of demonstrating that virtually any static image which could be regenerated by means of properly setting such slider arrangement would automatically portray an overall shape that furthermore fully could be described by a geometric construction pattern in which the magnitude of its rendered angle amounts to exactly three times the size of its given angle.

In much the same manner as described previously, substantiating such capability could be very much simplified for the particular case posed in FIG. 46, wherein the overall configuration of straight lines OU', OO' and OV as they actually do appear in the depicted representative geometric construction pattern of the third derivative Euclidean formulation, as posed in FIG. 21 furthermore respectively can be shown to overlay directly upon the longitudinal centerline of given acute angle linkage 79, the longitudinal centerline of trisector linkage 77, and the zero degree reading on protractor/instructions piece of paper 76, as they are configured with respect to one another in FIG. 29; thereby substantiating that upon properly setting such slider arrangement to a designated magnitude of 60°, as duly specified in FIG. 46, and furthermore indicated as the very reading which appears at axis U' in FIG. 29, trisector linkage 77 would be rotated about axis O to a position, as duly specified in FIG. 46, and furthermore indicated as being the very 20° reading which appears at axis O' in FIG. 29, that would automatically portray a motion related solution for the problem of the trisection of an angle.

Next, an explanation is to be furnished pursuant to such FIG. 45 Invention Trisection Process Chart that accounts for just how such slider arrangement is to be specifically arranged and thereafter properly set in order to trisect obtuse angles; broken down as follows:

- such device is to be specifically arranged by means of:
  - removing pin 108, as depicted in FIG. 29, by means of disengaging it from clutch 109, and then pulling it clearly out of the hole of rivet 100, as held captive in control linkage 80 which surrounds axis T;
  - rotating slider arrangement components depicted in FIG. 29 about axis O in a counterclockwise direction with respect to its toploader 114 and protractor/instructions piece of paper 76, as held captive inside of it, until such time that the rivet 107 held captive within given acute angle linkage 79 at axis U' becomes aligned directly over the ninety degree marking of its protractor/instructions piece of paper 76, whereby such counterclockwise rotation algebraically would be expressed as amounting to a total of $90-3\theta$;
  - reinserting pin 108 completely through the upper sleeve of toploader 114, then completely through the hole in rivet 107, and then through the lower sleeve of toploader 114 so that it can be reinserted back into clutch 109; whereby according to FIG. 31, such above described activity would place axis U' directly atop the ninety degree marking of such protractor/instructions piece of paper 76; being a position that formally was occupied by an extremity of control linkage 80 that resides about axis T, as indicated in FIG. 29;
- such device thereafter is to be properly set by means of manipulating adjustment linkage 83 from outside of toploader 114 as depicted in FIG. 31, until either:
  - the particular reading upon protractor/instructions piece of paper 76 which axis Z just so happens to coincide with indicates the designated magnitude of an angle that actually is intended to be trisected; or
  - the angle that actually is intended to be trisected instead becomes automatically portrayed about axis O, as subtended between the +x-axis and the longitudinal centerline of given obtuse angle linkage 81.

In such above described scenario, trisection thereby mechanically becomes achieved because as adjustment linkage 83 becomes manipulated from outside of toploader 114, as depicted in FIG. 31:

- it causes trisector linkage 77 to rotate about axis O such that the magnitude of any angle which might extend from the +x-axis to its longitudinal centerline furthermore could be algebraically expressed by the Greek letter θ, thereby signifying that such angle might assume a virtually infinite number of discrete values, whereas any angle which instead might extend from the $+x_T$-axis to its longitudinal centerline furthermore could be algebraically calculated to amount to $\theta+(90-3\theta)=90-2\theta$;
- during such process, the longitudinal centerlines of trisector linkage 77, transverse linkage 82 between axis O' and axis T', and control linkage 80 between axis T' and axis O always would describe the three sides of an isosceles triangle whose two included angles of equal size each would amount to a magnitude of $90-\theta$, such that its remaining angle thereby would be of $2\theta$ size; and
- the longitudinal centerlines of trisector linkage 77, transverse linkage 82 between axis O' and axis Z, and given obtuse angle linkage 81 furthermore always would describe the three sides of yet another isosceles triangle whose two included angles of equal size each, by being algebraically expressed to be of $2\theta$ size, would amount to twice the magnitude of any angle which simultaneously could be swept out about axis O between such +x-axis and the longitudinal centerline of trisector linkage 77.

Whereas the magnitude of virtually any angle which could be swept out about axis O in this prescribed manner, as extending from the $+x_T$-axis to the longitudinal centerline of given obtuse angle linkage 81 furthermore would have to amount to the sum of the magnitudes of the angles simultaneously extending from such $+x_T$-axis to the longitudinal centerline of trisector linkage 77, and then from the longitudinal centerline of trisector linkage 77 to that of given obtuse angle linkage 81, it would have to be of a size of $(90-2\theta)+(180-4\theta)=270-6\theta$; meaning that for any reading which appears at axis Z, a corresponding reading which appears at axis O' would have to amount to just one-third of its size, thereby representing its trisector.

It thereby can be concluded that the slider arrangement of the car jack configuration of such newly proposed invention, as duly depicted in plan view in FIG. 31, could be used to trisect virtually any angle of obtuse designated magnitude which it properly could be properly set to, in full accordance with the provisions set forth in such FIG. 45 Invention Trisection Process Chart, merely by means of manipulating adjustment linkage 83 from outside of toploader 114 until such time that a protractor/instructions piece of paper 76 reading at axis Z amounts to the designated magnitude of an angle that is intended to be trisected.

Substantiating such capability would consist merely of demonstrating that virtually any static image which could be regenerated by means of properly setting such slotted linkage arrangement would automatically portray an overall shape that furthermore fully could be described by a geometric construction pattern in which the magnitude of its rendered angle amounts to exactly three times the size of its given angle.

In much the same manner as described previously, substantiating such capability could be very much simplified for the particular case posed in FIG. 46, wherein the overall configuration of straight lines OZ, OO' and the $+x_T$-axis, as they actually do appear in the representative geometric construction pattern of the third derivative Euclidean formulation, as posed in FIG. 21, after each becomes rotated a magnitude of 90−3θ in the counterclockwise direction, furthermore respectively can be shown to overlay directly upon the longitudinal centerline of given obtuse angle linkage 81, the longitudinal centerline of trisector linkage 77, and the zero degree reading on protractor/instructions piece of paper 76, as they are configured with respect to one another in FIG. 31; thereby substantiating that upon properly setting such slider arrangement to a designated magnitude of 150°, as duly specified in FIG. 46, and furthermore indicated as the very reading which appears at axis Z in FIG. 31, trisector linkage 77 thereby would be rotated about axis O to a position, as duly specified in FIG. 46, and furthermore indicated as being the very 50° reading which appears at axis O' in FIG. 31, that would automatically portray a motion related solution for the problem of the trisection of an angle.

Wherein FIG. 31 indicates that such 150° reading at axis Z furthermore can be algebraically expressed as being of 270−6θ magnitude, such notation also appears at the bottom of the second column of such FIG. 46 Motion Related Solutions for the Problem of the Trisection of an Angle Chart. As indicated therein, such value could be calculated by means of viewing the representative geometric construction which appears upon in its corresponding FIG. 21 third derivative Euclidean formulation and recognizing that such angle furthermore can be represented by the 90° angle formed between its $x_T$-axis and $y_T$-axis when added to angle U'OZ; totaling 90°+2(90−3θ)=270−6θ. In such substantiation, it is important to consider three important facts, as outlined below:

- whereas a third derivative Euclidean formulation, as posed in FIG. 21, theoretically consists of an infinite number of geometric construction patterns which can be generated by means of applying the very same sequence of Euclidean operations to a given angle VOO' whose magnitude becomes increased by an infinitesimal amount within each successive drawing, a needed twenty degree given angle, being one that otherwise most certainly could not be geometrically constructed from a given length of unity, instead could become produced by sheer coincidence when its turn in line for being geometrically constructed arises during such process;
- practically speaking, the overriding concern that it would take forever to complete such undertaking could become rectified merely by means of commencing such development from a given angle of 18°, being that which can be geometrically constructed by bisecting the bisector of a 72° central angle that belongs to a pentagon which could be inscribed in a circle, solely by conventional Euclidean means, and thereby letting such infinitesimal increases of a given angle be limited only to what the human eye can discern, as addressed in greater detail later herein; and
- thereafter observing that radius OU' of rendered angle VOU', amounting to a 60° magnitude which can be verified solely by conventional Euclidean means, as then would become depicted within the representative geometric construction pattern of such third derivative Euclidean formulation, as actually is depicted in FIG. 21, thereby would intersect radius O'T' precisely at the location where it also intersects the bisector of radius OO'.

Now that new definitions have been provided, a resulting comprehensive methodology, as presented in FIG. 2 has been suitably described, and the designs of all four embodiments which constitute such newly proposed articulating invention have been fully specified, it is due time to account for exactly how a trisecting emulation mechanism operates.

Figure 53:
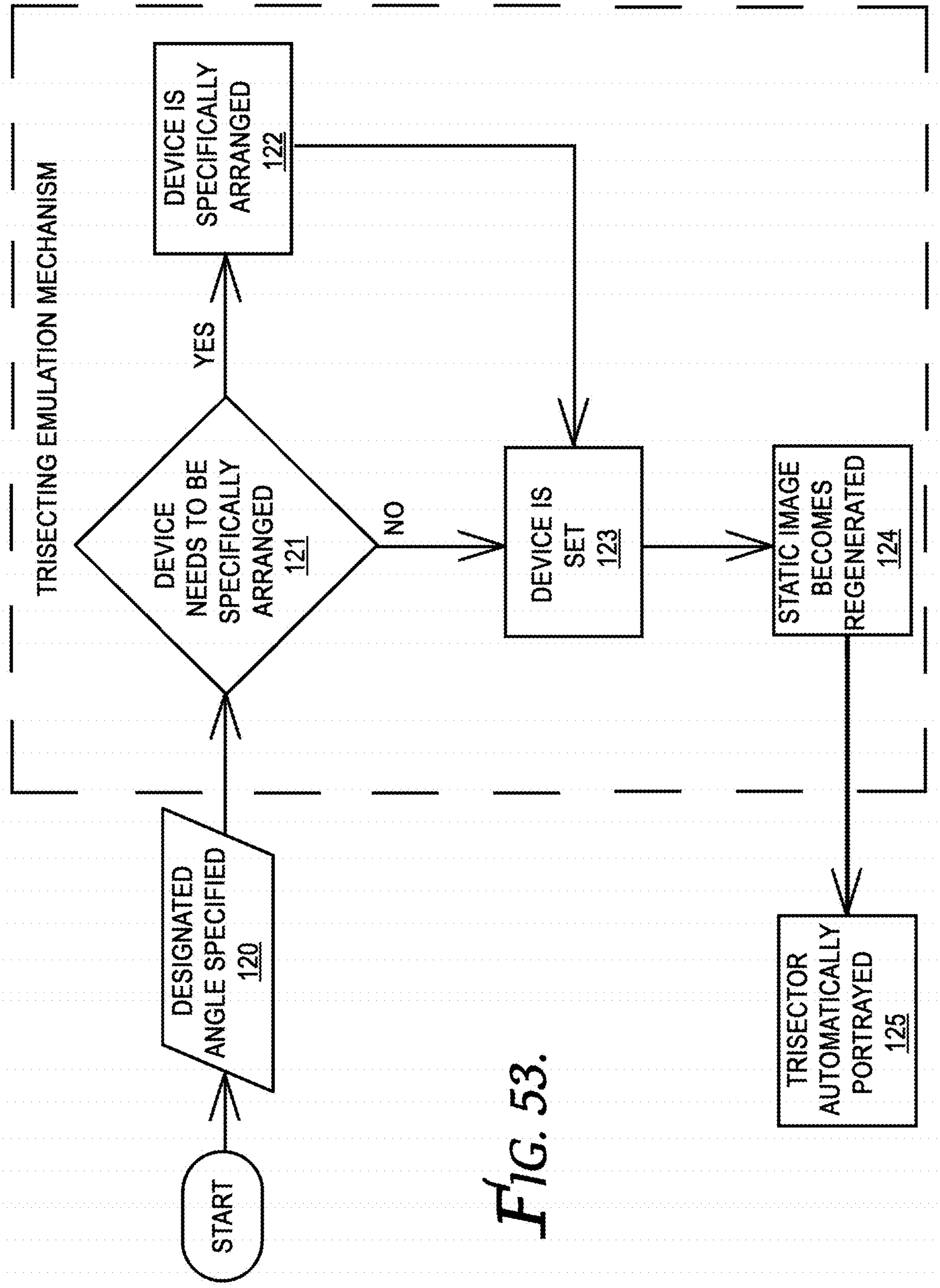
FIG. 53 is Trisecting Emulation Mechanism Flowchart that describes how a trisection emulation invention performs once a designated magnitude becomes specified.

FIG. 53 has been prepared just for this purpose. Such flowchart commences by means of supplying details to an input box, as entitled DESIGNATED ANGLE SPECIFIED 120 therein. Such specific activity consists merely of selecting the designated magnitude of an angle that is intended to become trisected.

The decision box entitled DEVICE NEEDS TO BE SPECIFICALLY ARRANGED 121 is where it is to be determined which particular embodiment is to be utilized to perform such anticipated trisection; whereby:

- if either such first, second, or fourth embodiment were to be chosen, then the YES route would apply, thereby leading to a process box entitled DEVICE IS SPECIFICALLY ARRANGED 122 which is where such device is to be specifically arranged in accordance with applicable provisions, as specified in such FIG. 45 Invention Trisection Process Chart; or
- if such third embodiment were to be chosen, then the NO route would apply, thereby leading to a process box entitled, DEVICE IS SET 123 which is where such third, or any of such now specifically arranged basic, modified, or car jack configurations is to be properly set in accordance with other applicable provisions, as specified in such FIG. 45 Invention Trisection Process Chart.

At this stage in the flowchart, such chosen device now should be properly set to a magnitude which matches the designated magnitude which first was specified.

The next process box entitled, STATIC IMAGE BECOMES REGENERATED 124 refers to the fact that by having properly set such device, a specific static image became regenerated, a particular portion of which assumed the overall outline of an actual trisector for such device setting; thereby automatically portraying a motion related solution for the problem of the trisection of an angle.

Activities which appear inside of the large square shaped dotted line are those which are to be performed exclusively by any trisecting emulation mechanism which might be placed into use, thereby being considered as properties that are intrinsic to it.

Outside of such trisecting emulation mechanism dotted box, the process box entitled, TRISECTOR AUTOMATICALLY PORTRAYED 125 is where such motion related solution for the trisection of an angle thereafter can be witnessed.

Although all embodiment designs of such newly proposed invention are quite similar in the respect that they share common fan portion linkage designs, as specified in such FIG. 47 CATEGORY I Sub-classification B Conforming Aspects Chart, nevertheless each is quite unique in its own right, as becomes evident when referring to such FIG. 45 Invention Trisection Process Chart, an accounting of which is presented below:

- such first embodiment needs to be specifically arranged each and every time before it can be properly set;
- such second embodiment, while also needing to be specifically arranged each and every time before it can be properly set, furthermore features device modifications that enable two motion related solutions for the trisection of an angle to be automatically portrayed simultaneously, one which applies to an acute angle setting and another which instead pertains to an obtuse angle whose designated magnitude amounts to its supplemental value;
- such third embodiment does not need to be specifically arranged in order to perform trisection since its uniquely designed control mechanism is regulated by a fundamental architecture which always assumes the shape of a rhombus, no matter what angle such device might become set to; and
- such fourth embodiment needs to be specifically arranged each and every time before it can be properly set, but only on particular occasions when attempts are made to trisect an angle of obtuse designated magnitude when such device is known to be specifically arranged to trisect only acute angles instead; or vice versa. Such is the case because after being specifically arranged, its control mechanism is uniquely designed to flex in a manner which is indicative of a car jack configuration, whereby the longitudinal centerline of one linkage always appears as a perpendicular bisector with respect to that of another; being a trait that is not present in such other three embodiments.

In connection with such input box entitled MATHEMATICS DEMARCATION 8, as posed in FIG. 2 herein, it previously was mentioned that a Euclidean formulation, each of whose constituent geometric construction patterns exhibits a rendered angle whose magnitude amounts to exactly three times the size of its given angle, is to become obtained by means of having the value of the sine of any of such rendered angles described by a length of 3 sin θ−4 $\sin^3$ θ; thereby conforming to a famous function expressed as 3 sin θ−4 $\sin^3$ θ=sin (3θ).

With regard to the very limited scope of trisection covered in this presentation, it should suffice to say that discussions below are to begin by significantly pointing out that the pretext of a Euclidean formulation just so happens to be conducive to physically describing various equations which have an infinite number of solutions!

Perhaps the most relevant of these, as specified below, assume the form of three very famous cubic expressions which address trisection by means of relating trigonometric properties of one angle of variable size to another whose magnitude always amounts to exactly three times its size:

$$\cos(3\theta) = 4\cos^3\theta - 3\cos\theta;$$

$$\sin(3\theta) = 3\sin\theta - 4\sin^3\theta;$$

-continued $$\tan(3\theta) = \frac{3\tan\theta - \tan^3\theta}{1 - 3\tan^2\theta}.$$

Whenever the magnitude of an angle that is algebraically denoted to be of size 3θ becomes supplied as a given quantity in any of such three cubic expressions, then such algebraic relationship truly would typify trisection!

This is because, a corresponding magnitude of θ, being an exact trisector of such given 3θ value, then could be computed simply by means of dividing such given value by a factor of three; thereby enabling a determination of the constituent trigonometric properties, as specified above.

For example, for the particular condition when it is given that:

$$3\theta = 75^\circ$$
$$\theta = 75^\circ/3$$
$$= 25^\circ$$

$$\cos\theta = 0.906307787$$
$$3\cos\theta = 2.718923361$$
$$4\cos^3\theta = 2.977742406;$$

$$\cos(3\theta) = 4\cos^3\theta - 3\cos\theta$$
$$= 2.977742406 - 2.718923361$$
$$= 0.258819095;$$

and

As a check, 3θ=75° ✓

Conversely, if an infinite number of magnitudes of θ were to become supplied as given values instead, each of such three algebraic relationships thereby could be suitably represented by means of developing a newly established Euclidean formulation that fully could distinguish it!

This is because all three of such above cited cubic expressions are continuous and their respective right-hand terms furthermore are geometrically constructible.

Figure 54:
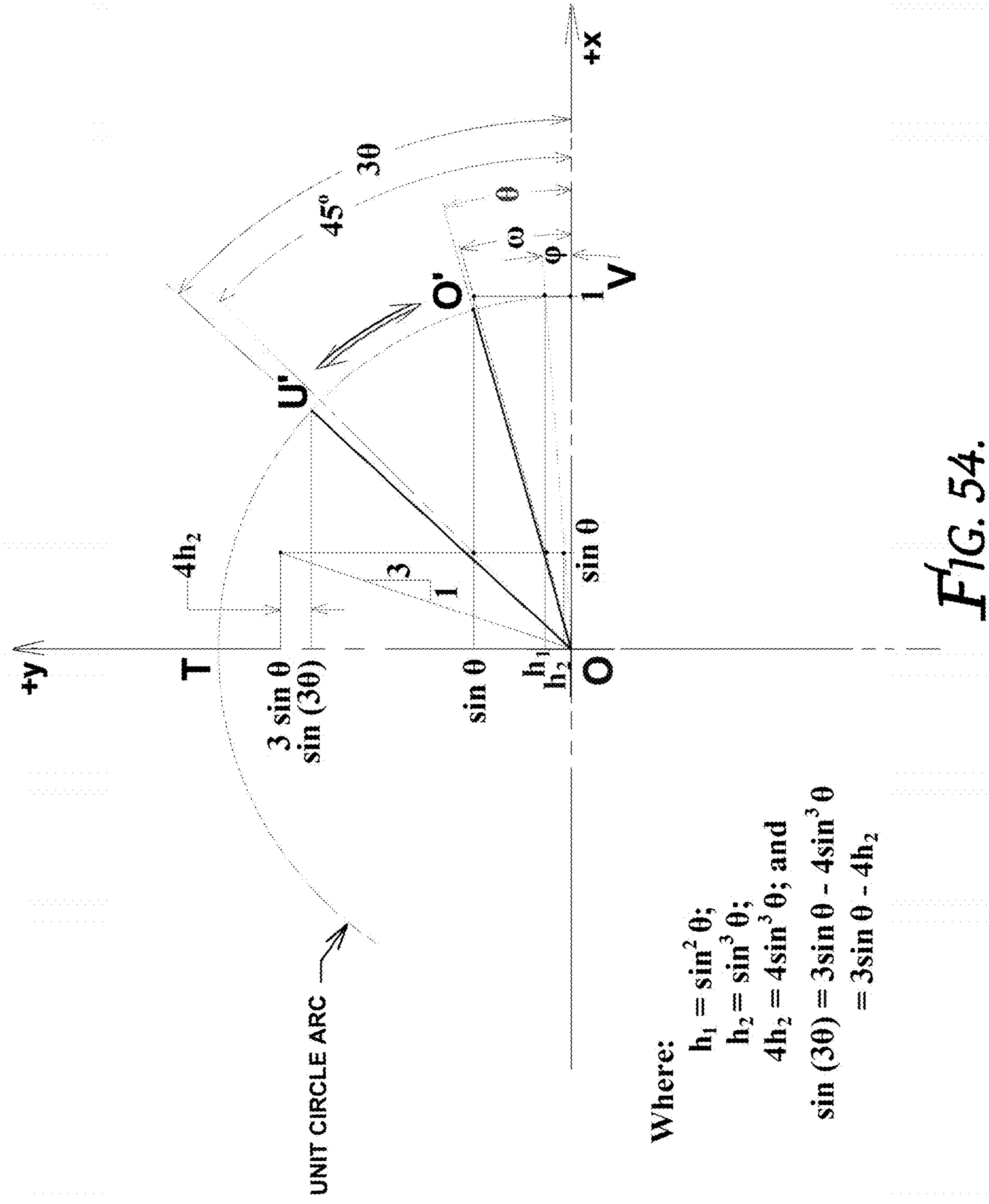
FIG. 54 is a Euclidean formulation that is representative of the famous algebraic cubic function $4 \sin^3 \theta - 3 \sin \theta = \sin (3\theta)$, wherein for any magnitude which given angle VOO' might arbitrarily assume. respective lengths, algebraically expressed as $4 \sin^3 \theta$ and $3 \sin \theta$, could be drawn solely by conventional Euclidean means, such that the difference noted between them would equal a length that thereby could be algebraically expressed as $\sin (3\theta)$; in effect, enabling angle VOU' to be geometrically constructed from such determination with its magnitude amounting to exactly three times the size of such given angle.

To aptly demonstrate this, a Euclidean formulation, as posed in FIG. 54, has been developed to suitably represent such famous cubic relationship sin (3θ)=3 sin θ−4 $\sin^3$ θ; wherein any geometric construction pattern belonging to thereby would exhibit a discrete value of sin (3θ) for each and every selected real sin θ value existing within the range of −1 to +1.

The governing sequence of Euclidean operations for such new Euclidean formulation is specified as follows:

- given angle VOO' is geometrically constructed of an arbitrarily selected magnitude that algebraically is denoted as θ such that its side OO' exhibits the same length as its side OV;
- side OV is designated to be the x-axis;
- a y-axis is drawn, hereinafter represented as a straight line which passes through vertex O of given angle VOO' and lies perpendicular to such x-axis;
- a UNIT CIRCLE ARC becomes geometrically constructed, hereinafter to be represented as a portion of the circumference of a circle drawn about center point O whose radius is set equal in length to OV, thereby enabling it to pass through points V and O', both of which previously have been designated as respective termination points of angle VOO';

point T thereafter becomes designated as the intersection between such UNIT CIRCLE ARC and such geometrically constructed y-axis;

a straight line which passes through point O is drawn at forty-five degree angle counterclockwise to such x-axis;

another straight line which passes through point O is drawn making a three-to-one slope with the +x-axis;

a horizontal straight line is drawn which passes through point O' and thereby lies parallel to the x-axis;

the juncture between such horizontal straight line and the y-axis becomes designated as "sin θ", thereby denoting its vertical distance above such x-axis;

a vertical straight line is drawn so that it remains parallel to the y-axis while passing through the intersection made between such forty-five degree straight line and such horizontal straight line;

the horizontal distance such vertical straight line resides to the right of such y-axis also thereby is to be designated as "sin θ" along such x-axis;

a second vertical straight line is drawn which passes through coordinate point V, thereby being tangent to such previously drawn UNIT CIRCLE ARC;

a slanted straight line is drawn which originates at point O and passes through the intersection point made between such second vertical straight line and such horizontal straight line;

the angle which such slanted straight line makes with the x-axis becomes designated as "ω", not to be confused with angle VOO' amounting to a slightly larger magnitude of θ;

a second horizontal straight line is draw which passes through the intersection point made between such slanted straight line and such vertical straight line;

the juncture of such second horizontal straight line with the y-axis becomes designated as "$h_1$", thereby denoting its unknown vertical distance above point O;

a second slanted straight line is drawn which extends from point O to the intersection point made by such second horizontal straight line with such second vertical straight line;

the angle which such second slanted straight line makes with the x-axis thereafter becomes designated as "φ";

a third horizontal straight line is drawn so that it passes through the intersection point made between such second slanted straight line and such vertical straight line;

the juncture of such third horizontal straight line with the y-axis becomes designated as "$h_2$", thereby denoting its unknown vertical distance above point O;

a fourth horizontal straight line is drawn so that it passes through the intersection point made between such straight line which exhibits a 3:1 slope with respect to the x-axis and such vertical straight line;

the juncture which such fourth horizontal straight line makes with the y-axis becomes denoted as "3 sin θ", thereby distinguishing its vertical distance above point O;

a fifth horizontal straight line is drawn at a distance directly below such fourth horizontal straight line which measures four times the height which such third horizontal straight line resides above such x-axis, algebraically denoted therein as "$4h_2$";

the juncture which is made between such fifth horizontal straight line and the y-axis becomes designated as "sin (3θ)", thereby denoting its vertical distance above point O; and the intersection point of such fifth horizontal straight line with such UNIT CIRCLE ARC becomes designated as point U'.

The proof for such FIG. 54 Euclidean formulation is provided below:

$$\tan\omega = h_1/\sin\theta = \sin\theta/1$$

$$h_1 = \sin^2\theta;$$

$$\tan\varphi = h_2/\sin\theta = h_1/1 = \sin^2\theta/1$$

$$h_2 = \sin^3\theta$$

$$4h_2 = 4\sin^3\theta;$$

$$\sin(3\theta) = 3\sin\theta - 4\sin^3\theta = 3\sin\theta - 4h_2;$$

and since point U' lies upon such UNIT CIRCLE ARC and exhibits a sin (3θ) ordinate value, radius OU' must reside at an angle of 3θ with respect to the x-axis.

Accordingly, FIG. 54 distinguishes an entire family of geometric construction patterns, all generated from the very same sequence of Euclidean operations as stipulated above; with the only exception being that the respective magnitudes of given angle VOO' becomes slightly altered each time a new geometric construction pattern becomes drawn.

Based upon a reasoning that such famous cubic relationship sin (3θ)=3 sin θ−4 $\sin^3$ θ actually can be fully distinguished by an entire family of geometric construction patterns which together comprise such newly proposed Euclidean formulation, as posed in FIG. 54, it theoretically might become possible to devise yet another rather crude, or cumbersome, trisecting emulation mechanism which, due to a considerable increase in its number of overall working parts, obviously would be considered to lie far beyond the very scope of this presentation. In order to become feasible, however, a newly fashioned device of such type would have to be designed so that when it becomes articulated by means of rotating its axis U' circumferentially about axis O in accordance with such double arrow notation as expressed in FIG. 54, such motion additionally could be replicated by means of animating the conglomeration of geometric construction patterns which belong to such Euclidean formulation in successive order.

In conclusion, any algebraic determination that can be made by means of relating like trigonometric properties that exist between one value and another that amounts to exactly three times its magnitude, as specified in such three cited famous cubic expressions, furthermore can be fully described by a geometric construction pattern which belongs to one of three Euclidean formulations which could be developed to characterize them.

For example, if a particular value of 1.119769515 radians were to be accorded to θ, then an algebraic determination could be made, as follows of 3θ, which furthermore fully could be described by a singular geometric pattern which belongs to such newly proposed Euclidean formulation, as posed in FIG. 54:

$$\theta = 1.119769515 \text{ radians}$$

$$\sin\theta = 0.9; \text{ and}$$

-continued $$\begin{aligned}\sin(3\theta) &= 3\sin\theta - 4\sin^3\theta\\ &= 3(0.9) - 4(0.9)^3\\ &= 2.7 - 4(0.729)\\ &= 2.7 - 2.916\\ &= -0.216;\\ 3\theta &= \pi + 0.217715891\\ &= 3.359308545\\ &= 3(1.119769515).\end{aligned}$$

Such above furnished overall detailed accounting explains exactly why all three of such previously cited famous cubic expressions remain incredibly important!

More particularly, this is because each of such three expressions can be considered to be a distinctive format type, in itself, one that furthermore can be broken down into an infinite number of unique relationships that have three cubic roots each.

Such scenario is far different than what transpires with respect to discontinuous functions, as are about to be discussed in detail next.

Also in connection with such input box entitled MATHEMATICS DEMARCATION 8, as posed in FIG. 2, it previously was mentioned that a graph is to become developed that distinguishes between the continuity of such well known cubic function 4 $\cos^3\theta-3\cos\theta=\cos(3\theta)$ and the discontinuity that very clearly accompanies the function $(4\cos^3\theta-6)/(20\cos\theta)=\cos(3\theta)$.

Figure 55:
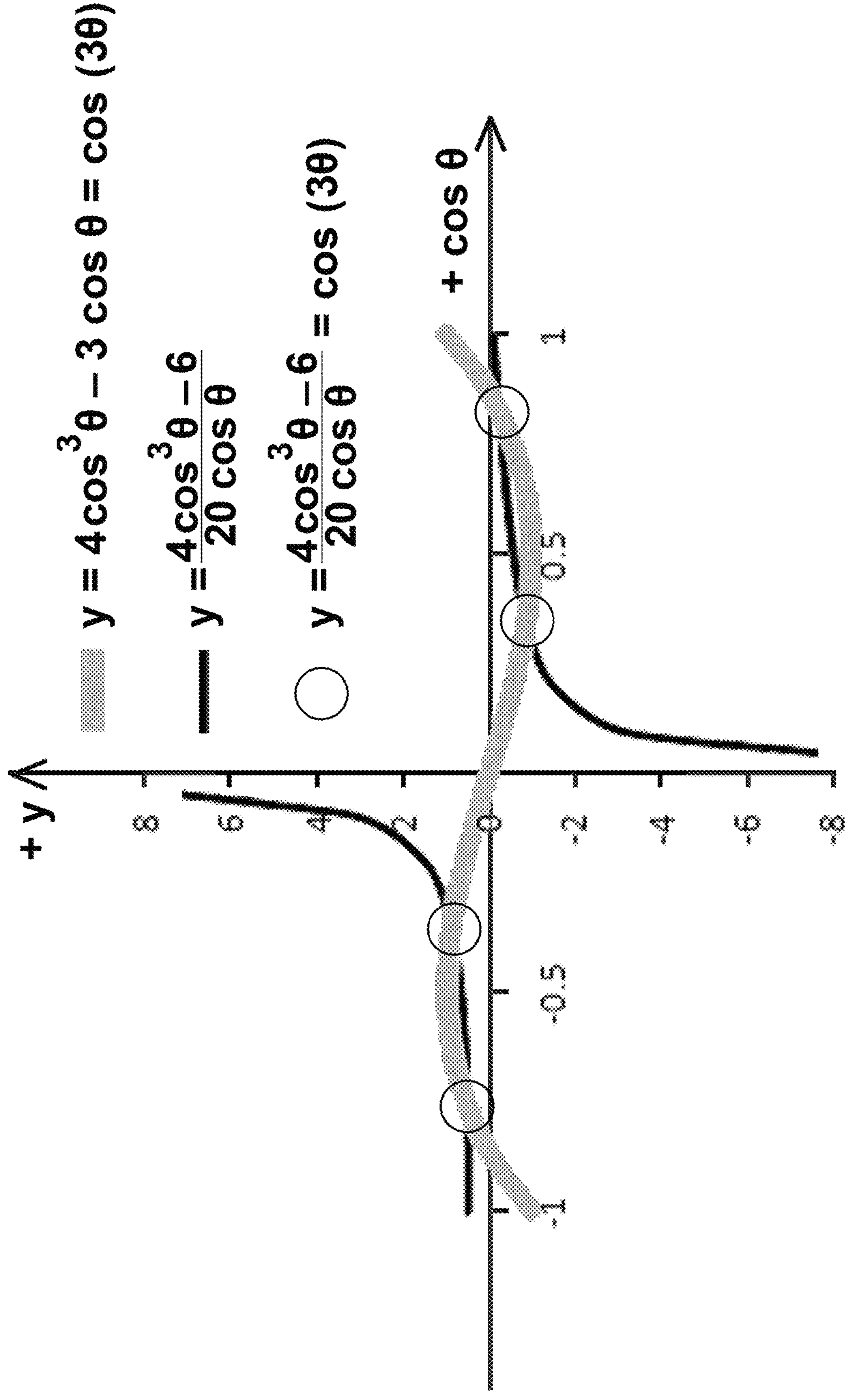
FIG. 55 is a graph of three algebraic functions; wherein the function denoted by the top legend remains continuous within the range $-1 \leq \cos \theta \leq +1$, the function denoted by the middle legend remains continuous for all real values of $\cos \theta$ except when it is equal to zero, and the function denoted by the bottom legend is entirely discontinuous in that it consists of only four discrete points, as noted within the large circles displayed therein; whereby any continuous portions of such curves furthermore could be described by a virtual unlimited number of geometric construction patterns that belong to a particular Euclidean formulation that could be developed in much the same way as that which is represented in FIG. 54.

FIG. 55 is intended to make clear such distinction.

Its top legend identifies the path charted by a curve for such first famous cubic function, algebraically expressed as $y=4\cos^3\theta-3\cos\theta=\cos(3\theta)$ wherein:

abscissa values in x signify cos θ magnitudes; and ordinate values in y signify cos (3θ) magnitudes.

Such well known curve is shown to be continuous within the specific range of $-1\le x\le +1$, thereby accounting for all real number values of cos θ.

The second legend therein identifies the particular function $y=(4\cos^3\theta-6)/(20\cos\theta)$ wherein abscissa values in x again signify cos θ magnitudes. Such curve also is shown to be continuous in the same range, except for the fact that it is discontinuous at x=0. Notice that as the value of x, or cos θ, nears zero from a negative perspective, the corresponding value of y approaches positive infinity, and as it nears zero from the positive side, the corresponding value of y approaches negative infinity; thereby maintaining a one-to-one relationship between x and y values all along its overall path.

Where the curves identified by such first and second legends intersect, they can be equated due to the fact that they exhibit both x values of equal magnitude, as well as y values of equal size. Algebraically this can be expressed by the equation $y=(4\cos^3\theta-6)/(20\cos\theta)=\cos(3\theta)$, as typified by the third legend, as displayed in FIG. 55.

Hence, such intersection points, shown to be positioned at the centers of such four large circles drawn therein, locate positions where $(4\cos^3\theta-6)/(20\cos\theta)=\cos(3\theta)$.

By then substituting $4\cos^3\theta-3\cos\theta$ for cos (3θ), as shown below, the following fourth order equation can be obtained, along with a determination of the four associated roots for cos θ and other relevant quantitative details:

$$4\cos^3\theta - 3\cos\theta = \frac{4\cos^3\theta - 6}{20\cos\theta};$$

and via cross multiplication, $$(4\cos^3\theta - 3\cos\theta)(20\cos\theta) = 4\cos^3\theta - 6;$$

$$80\cos^4\theta - 60\cos^2\theta = 4\cos^3\theta - 6;$$

$$80\cos^4\theta - 4\cos^3\theta - 60\cos^2\theta + 6 = 0;\text{ and}$$

$$\cos^4\theta - \frac{1}{20}\cos^3\theta - \frac{3}{4}\cos^2\theta + \frac{3}{40} = 0.$$

Values of the roots of such quartic equation are provided in FIG. 56. The first column therein, as headed by the term VALUE, contains various entries of algebraic significance. For each of such five listed entries, corresponding values are cited each of the four the roots $\theta_1$, $\theta_2$, $\theta_3$, and $\theta_4$ which appear as headings in the following four columns. Notice that for each of such particular values of θ, as specified in the second line item therein, a respective value of cos (3θ) appears in the fifth line item therein which is equal to the value of $(4\cos^3\theta-6)/(20\cos\theta)$, as it appears in the sixth line item therein.

In conclusion, the $\cos(3\theta)=(4\cos^3\theta-6)/(20\cos\theta)$ quartic function clearly qualifies as being discontinuous because it consists of only four distinct points, as are identified by circles appearing in such of FIG. 55.

With particular regard to the two continuous curve representations drawn in FIG. 55, a Euclidean formulation could be generated, whereby each of the singular geometric construction patterns which belong to it can be algebraically determined; three examples of which are presented directly below:

at $x = \cos\theta = 1$;

$$\begin{aligned}y &= (4\cos^3\theta - 6)/(20\cos\theta)\\ &= [4(1) - 6]/[20(1)]\\ &= (4 - 6)/20\\ &= -2/20\\ &= -1/10;\end{aligned}$$

at $x = \cos\theta = 1/2$;

$$\begin{aligned}y &= (4\cos^3\theta - 6)/(20\cos\theta)\\ &= [(4)(1/2)^3 - 6)]/[(20x(1/2)]\\ &= [(4)(1/8) - 6)]/10\\ &= (1/2 - 6)]/10\\ &= -5.5)]/10\\ &= -0.55;\end{aligned}$$

at $x = \cos\theta = -1/2$; and $$\begin{aligned}y &= (4\cos^3\theta - 6)/(20\cos\theta)\\ &= [(4)(-1/2)^3 - 6)]/[(20x(-1/2)]\\ &= [(4)(-1/8) - 6)]/-10\\ &= (-1/2 - 6)]/-10\\ &= -(6.5)]/-10\\ &= 0.65.\end{aligned}$$

Naturally any geometric construction pattern which possibly could be drawn which belongs to such Euclidean formulation would identify just a single point which lies upon the two curve portions represented by the second legend in FIG. 55.

Above, the length $(\frac{1}{2})^3$ would be geometrically constructed in much the same fashion as was the $\sin^3 \theta$ in FIG. 54. The development of such envisioned Euclidean formulation would encompass first generating a length which is equal to $(\frac{1}{2})^2$, solely by conventional Euclidean means; produced in similar manner to length $h_1$, as it appears therein. From such length, another length representative of the algebraic expression $(\frac{1}{2})^3$ would become drawn, similar to $h_2$, as it appears therein.

From the above calculations, it should become rather clear that an entire family of geometric construction patterns could be drawn for the function $y=(4 \cos^3 \theta-6)/(20 \cos \theta)$. The corresponding sequence of Euclidean operations needed to conduct such activity could be obtained merely by administering the formula represented on the right hand side of the equation given above, thereby represented as $(4 \cos^3 \theta-6)/(20 \cos \theta)$; whereby only the value of $\cos \theta$ would be altered in during such development.

Each respective length of the ordinate value y then could be drawn by way of the proportion $y/1=(4 \cos^3 \theta-6)/(20 \cos \theta)$, thereby producing such length 'y' by means of applying only a straightedge and compass.

As such, the function $y=(4 \cos^3 \theta-6)/(20 \cos \theta)$ could be fully described by yet another entirely separate Euclidean formulation. Even though each of such generated geometric construction patterns belonging to such Euclidean formulation most certainly would not relate trigonometric values of angles to those of angles which amount to exactly one-third their respective size, it nevertheless would be possible to design an entirely new invention whose distinctive flexure, maybe even being a harmonic motion, could be replicated by means of animating the entire family of geometric construction patterns which belong to such newly devised Euclidean formulation in successive order.

Obviously, such types of involvements inevitably should serve as building blocks for mathematics!

More specifically stated, a novel assortment of sundry mechanical devices that exhibit capabilities well beyond those of trisecting emulation mechanisms whose fundamental architectures during flexure regenerate static images that automatically portray overall geometries that furthermore can be fully described by Euclidean formulations additionally can be quantified algebraically!

In this vein, prior claims made in connection with such FIG. 48 Mathematics Demarcation Chart, now are to be somewhat bolstered by theorizing that the very formats expressed by algebraic equations give clear indication of the types of geometric construction practices they support.

Such explanation begins with what clearly is known concerning any linear function of the form $y=mx+b$.

Its geometric construction counterpart consists merely of locating a second point which lies a magnitude that algebraically is denoted as 'b' either directly above or below a first point, depending upon the sign placed in front of such coefficient. For example, in the equation $y=6x-3$, such second point would be situated exactly three units of measurement below such first point. In order to complete such singular geometric construction pattern, a straight line next would need to be drawn which passes through such second described point and furthermore exhibits a slope, 'm', whose rise and run values could be depicted as the sides of a right triangle, the ratios of whose mutual lengths amount to such magnitudes.

Second order functions of a singular variable cannot be fully described by a geometric construction process, thereby necessitating instead that they be fully charted by means of plotting a y value that appears upon a Cartesian coordinate system that becomes algebraically determined for each x value belonging to such function.

However, conventional Euclidean practice can be of assistance in determining the roots of quadratic functions. For example, consider an entire set of parabolic functions whose overall format type thereby could be expressed as $ax^2+bx+c=y$.

For any specific values which its coefficients might be respectively assigned, a singular algebraic function belonging to such format type would become specified. Its roots would indicate where such singular curve crosses the x-axis; but only could when the variable 'y' within such function amounts to zero; hence becoming representative of a quadratic equation which instead would belong to another simplified format type, algebraically expressed as $ax^2+bx+c=0$ which would typify a subset of such parabolic function format type.

By means of referring back to the previous discussion regarding such input box entitled MATHEMATICS DEMARCATION 8, as posed in FIG. 2, note that it was mentioned that a geometric construction pattern that is representative of the famous Quadratic Formula $z_R=(-b\pm\sqrt{b^2-4ac})/2a$ would be created to resolve the parabolic equation of $-0.2x^2+0.4x+0.75=0$ belonging to such $ax^2+bx+c=0$ format type.

Herein, FIG. 29 represents such very solution.

The very sequence of Euclidean operations from which such singular geometric construction pattern is derived is provided directly below:

- a square each whose sides is of unit length is drawn;
- a right triangle is inscribed within it such that:
  - its first side begins at one of the corners of such square, extends a length of 0.75, or ¾ of a unit from it, and becomes drawn so that it aligns upon a side of such square, thereafter becoming algebraically denoted as being of length 'c' therein;
  - its second side, drawn at a right angle away from the endpoint of such first side, is to be of unit length also such that its endpoint resides somewhere along the opposite side of such previously drawn square; and
  - its hypotenuse then is to become drawn;
- a straight line of length of 0.8 units which extends from a point which resides somewhere upon the first side of such previously drawn right triangle that is parallel to its second side, and terminates somewhere along its hypotenuse is to be drawn as follows:
  - a straight line reference becomes drawn that lies parallel the first side of such previously drawn right triangle and resides 0.8 units in length above it;
  - from the intersection point of such straight line reference and the hypotenuse of such previously drawn right triangle, another straight line is drawn that is perpendicular to such straight line reference;
  - such 0.8 units in length which spans the distance between the first side of such previously drawn right triangle and such straight line reference is to be algebraically denoted as '−4a' therein; and
  - the span of the first side of such previously drawn right triangle which extends from its beginning point to where it intersects such straight line which was drawn to be of 0.8 units in length thereby can be algebraically denoted to be of a length '−4ac' due to the fact that it represents a corresponding side belonging to another right triangle which is similar such previously drawn right triangle, thereby meeting the proportion c/1=−4ac/−4a;

a semicircle is drawn whose diameter aligns upon the side of such square that the first side of such previously drawn right triangle also aligns with whose circumferential portion lies outside of such square;

such 0.8 unit straight line next is to be extended below the side of such square until it meets such previously drawn circumferential portion, from which two more straight lines are to be drawn, each terminating at a lower corner of such square, thereby describing a second right triangle whose hypotenuse then can be denoted as $\sqrt{-4ac}$, since is squared value is equal to the area of the rectangle inscribed in such square whose sides are of unit and −4ac respective lengths by virtue of the Pythagorean Theorem;

the remaining side of such newly drawn right triangle, as appearing within such previously drawn semicircle, becomes extended a distance that amounts to 0.4 units in length such that the circumference of a whole circle can be drawn about its new endpoint, being of a radius that thereby can be algebraically denoted to be of length 'b' therein;

a straight line then is drawn which extends from the beginning of the first side of such previously drawn right triangle that terminates at the center point of such whole circle, thereby being algebraically denoted to be of length $\sqrt{b^2-4ac}$ as determined by Pythagorean Theorem, once realizing that it represents the hypotenuse of yet another right triangle whose respective sides are of lengths b and $\sqrt{-4ac}$;

such newly drawn straight line then becomes extended until it reaches the far circumference of such circle, thereby to become algebraically denoted to be of overall length $b+\sqrt{b^2-4ac}$;

its span extending from the beginning of the first side of such previously drawn right triangle to the near circumference of such circle thereby becomes algebraically denoted to be of length $-b+\sqrt{b^2-4ac}$;

another straight line then is drawn which passes through the corner of such previously drawn square upon which the vertex of such previously drawn right triangle was geometrically constructed, and its first side began, which furthermore lies perpendicular to the diameter of such newly drawn circle which is shown, being a total length of unity such that 0.4 units of such overall length resides to right side of such diameter, thereby becoming algebraically denoted to be of length −2a;

with respect to such last drawn straight line:

- a straight line is drawn perpendicular to its left termination point; and
- two more straight lines are drawn emanating from its rightmost termination point, each of which passes through respective locations where the diameter drawn for such circle intersects its circumference;

the longer cutoff made upon such lastly drawn perpendicular straight line thereby is algebraically denoted to be of length $x_1$, signifying an overall length whose magnitude is equal to the value of the first root of such given quadratic function $-0.2x^2+0.4x+0.75=y$, as determined by the respective sides of two right triangles that establish the proportion $x_1/1=(b+\sqrt{b^2-4ac})/-2a$, therefore amounting to $x_1=(-b-\sqrt{b^2-4ac})/2a$; and the shorter cutoff made upon such lastly drawn perpendicular straight line thereby is algebraically denoted to be of length $-x_2$, signifying an overall length whose magnitude is equal to the negative value of the second root of such given quadratic, as determined by the respective sides of two right triangles that establish the resulting proportion $-x_2/1=(-b+\sqrt{b^2-4ac})/-2a$, thus amounting to $x_2=(-b+\sqrt{b^2-4ac})/2a$.

Likewise, a cubic functions of a single variable also cannot be fully described by a single geometric construction pattern, but instead requires an entire Euclidean formulation to describe what otherwise would need to become fully plotted by means of algebraically determining a value of y for each x value belonging to such function; as is the case for the either of the continuous cubic curves which are charted in FIG. 55.

Notice that when interpreting such continuous cubic function $y=(4\cos^3\theta-6)/(20\cos\theta)$:

- when reading from right to left, it indicates an entire family of unique geometric construction patterns, each of which can be generated by means of applying the very same sequence of Euclidean operations, whereby only the magnitude of its given value, cos θ, becomes slightly altered; but
- when otherwise going from left to right, it becomes indicative of a certain motion which could be imparted by some mechanical device whose fundamental architecture during flexure can be replicated by means of animating a Euclidean formulation which could fully describe its constituent overall shapes. That is to say, a geometric forming process which should be incorporated into the fold of mathematics can characterize trisection for virtually any of the equations contained within the three very famous cubic curves expressed above!

As such, a sequel, or follow-on development, being one that presently is considered to be well beyond the very limited scope postulated herein, might entail placing parameters of time within continuous algebraic cubic functions, thereby opening up an entirely new gateway for mathematical investigation; principally because motion cannot transpire without it.

It is in this area of discussion that perhaps the greatest confusion abounds concerning trisection!

In order to suitably avoid its pitfalls, it becomes necessary to pose one last riddle which finally should fully expose any disturbing myths that yet might be perpetuated by such great trisection mystery.

The last riddle is: Can the classical problem of the trisection of an angle actually be solved after gaining an understanding of the role which algebraic expressions play in the determination of the magnitude of a trisector for an angle of virtually any designated magnitude?

Again, such answer, most emphatically, turns out to be a resounding no!

Such above proposed determination can be substantiated by examining the proceedings associated with a cubic equation containing a single variable which becomes resolved by means of simultaneously reducing it with respect to another cubic equation of a single variable which harbors a common root, whereby such algebraic process enables vital information to be converted into second order form.

Naturally, such algebraic approach cannot solve the classical problem of the trisection of an angle!

However, it can serve to justify that there is a certain order within mathematics that most certainly should be exposed for the benefit of mankind!

As a relevant example of this, one of the three famous cubic functions cited above is to undergo such simultaneous reduction process, wherein ζ is to denote the particular value of the tangent of a designated magnitude of an angle, 3θ, that is about to be trisected; thereby becoming algebraically expressed as tan (3θ). Since such famous cubic equations can track trigonometric relationships which exist between various given angles and those amounting to exactly three times their respective sizes, such previously mentioned common root, denoted as $z_R$, is to represent corresponding values of tan θ, thereby enabling the following algebraic cubic equation expressions to be reformatted as follows:

$$\text{whereas, } \tan(3\theta)=(3\tan\theta-\tan^3\theta)/(1-3\tan^2\theta);$$

$$\text{then, } \zeta=(3z_R-z_R^3)/(1-3z_R^2)$$

$$\zeta(1-3z_R^2)=3z_R-z_R^3$$

$$z_R^3=3z_R-\zeta(1-3z_R^2).$$

In order to perform such simultaneous reduction, a generalized cubic equation format type of the form $z^3+\beta z^2+\gamma z+\delta=0$ now is to become introduced, as well.

In order to determine what common root values any of such equations which belong to such generalized cubic equation format type share in common, in such above equation:

$$z^3+\beta z^2+\gamma z+\delta=0;$$

$$z_R^3+\beta z_R^2+\gamma z_R+\delta=0;\text{ and}$$

$$z_R=-(\beta z_R+\gamma z_R+\delta).$$

Such format type is to be referred to as the generalized cubic equation because its accounts for virtually every possible equation that a cubic equation of a single variable could possibly assume!

Since such famous tangent cubic function can be arranged as $z_R^3-3\zeta z_R^2-3z_R+\zeta=0$, it must be a subset of such generalized cubic equation for the specific case when coefficient $\beta=-3\zeta$; $\gamma=-3$, and $\delta=\zeta$.

As, I'm sure the reader by now must have guessed, the significance of such association is that both equation formats thereby must bear a common root!

Moreover, the term format, as addressed above, applies to a whole family of equations that exhibit identical algebraic structures, but differ only in respect to the particular values of the algebraic coefficients they exhibit!

Such mathematical phenomenon occurs because the uncommon roots of each particular equation belonging to such generalized cubic equation format, when arranged in certain combinations with common roots, $z_R$, which they share with respective equations that belong to such famous tangent cubic equation format, actually determine such other coefficient values, as will be more extensively explained below.

By equating $z_R^3$ terms, the following quadratic equation relationships can be obtained by means of removing mutual cubic parameters:

$$3z_R-\zeta\,(1-3z_R^2)=-(\beta z_R^2+\gamma z_R+\delta)=z_R^3$$

$$(3\zeta+\beta)\,z_R^2+(3+\gamma)z_R+(\delta-\zeta)=0$$

$$a\,z_R^2+b\,z_R+c=0;\text{ and}$$

$$(3\zeta+\beta)\,z_R^2+(3+\gamma)z_R+(\delta-\zeta)=0$$

$$z_R^2+\frac{3+\gamma}{3\zeta+\beta}\,z_R+\frac{\delta-\zeta}{3\zeta+\beta}=0$$

$$z_R^2+b'\,z_R+c'=0.$$

Such last alteration, amounting to the division of each contained coefficient by a factor of 'a', gives an indication of how to further manipulate algebraic equation results in order to realize their geometric solutions in a more efficient manner, leading to an abbreviated Quadratic Formula of the form $z_R=(-b+\sqrt{b^2-4ac})/2a=[-b'+\sqrt{b'^2-4(1)(c')}]/2(1)=(1/2)(-b'\pm\sqrt{b'^2-4c'})$.

Obviously, such abbreviated Quadratic Formula then applies only to quadratic equations of a singular variable whose squared term coefficients are equal to unity!

In order to simultaneously reduce two cubic equations in a single variable which share a common root, their remaining root values must be different.

To demonstrate how this works, a generalized cubic equation is to be determined whose uncommon roots, for the sake of simplicity exhibit values of $z_S=3$ and $z_T=4$.

For the example which is about to be presented below, a common root value of $z_R=\sqrt{5}$ is to be assigned because it is of quadratic irrational magnitude, and thereby can be geometrically constructed directly from a given length of unity, thereby representing the length of the hypotenuse of a right triangle whose sides are of lengths 1 and 2, respectively.

As such, the magnitude of ζ could be determined merely by means of computing the overall value associated with $(3z_R-z_R^3)/(1-3z_R^2)=(3\sqrt{5}-5\sqrt{5})/(1-3\times5)=\sqrt{5}/7$.

Notice that such calculation furthermore must be of quadratic irrational magnitude, thereby enabling such length to be represented as the very starting point within an upcoming geometric construction process.

Accordingly, such famous cubic relationship in a single variable $z_R^3-3\zeta z_R^2-3z_R+\zeta=0$ would assume the particular form $z_R^3-3(\sqrt{5}/7)\,z_R^2-3z_R+\sqrt{5}/7=0$.

As for such generalized cubic equation, since it can be stated that:

$$z-z_R=0;$$

$$z-z_S=0;\text{ and}$$

$$z-z_T=0.$$

By thereafter multiplying such three equations together, the following algebraic expression could become obtained:

$$(z-z_R)(z-z_S)(z-z_T)=0;\text{ or}$$

$$z^3-(z_R+z_S+z_T)z^2+(z_Rz_S+z_Rz_T+z_Sz_T)z-z_Rz_Sz_T=0;\text{ and}$$

$$z^3+\beta z^2+\gamma z+\delta=0.$$

By equating coefficients of like terms, the following three relationships can be determined:

$$\begin{aligned}\beta&=-(z_R+z_S+z_T)\\&=-(\sqrt{5}+3+4)\\&=-(\sqrt{5}+7);\end{aligned}$$

-continued $$\begin{aligned}\gamma &= z_R z_S + z_R z_T + z_S z_T\\ &= \left(\sqrt{5}\right)(3+4)+3(4)\\ &= 7\sqrt{5}+12; \text{ and}\end{aligned}$$

$$\begin{aligned}\delta &= -z_R z_S z_T.\\ &= -\left(\sqrt{5}\right)(3(4))\\ &= -12\sqrt{5}.\end{aligned}$$

Such generalized cubic equation format would be $z^3-(\sqrt{5}+7)z^2+(7\sqrt{5}+12)z-12\sqrt{5}$ 0.

Accordingly:

$$\begin{aligned}b' &= \frac{3+\gamma}{3\zeta+\beta}\\ &= \frac{3+\left(12+7\sqrt{5}\right)}{3\left(\sqrt{5}/7\right)-\left(\sqrt{5}+7\right)}\\ &= \frac{15+7\sqrt{5}}{-\left(4\sqrt{5}/7+7\right)}\\ &= -\left(\frac{105+49\sqrt{5}}{4\sqrt{5}+49}\right);\end{aligned}$$

$$\begin{aligned}b'^2 &= \frac{105^2+210(49)\sqrt{5}+49^2(5)}{16(5)+8(49)\sqrt{5}+49^2}\\ &= \frac{23{,}030+10{,}290\sqrt{5}}{2{,}481+392\sqrt{5}};\end{aligned}$$

$$\begin{aligned}c' &= \frac{\delta-\zeta}{3\zeta+\beta}\\ &= \frac{-12\sqrt{5}-\sqrt{5}/7}{3\left(\sqrt{5}/7\right)-\left(\sqrt{5}+7\right)}\\ &= \frac{85\sqrt{5}}{4\sqrt{5}+49};\end{aligned}$$

$$\begin{aligned}-4c' &= -\left(\frac{340\sqrt{5}}{49+4\sqrt{5}}\right)\left(\frac{49+4\sqrt{5}}{49+4\sqrt{5}}\right)\\ &= -\left(\frac{6800+16{,}600\sqrt{5}}{2{,}481+392\sqrt{5}}\right);\end{aligned}$$

$$\begin{aligned}b^2-4c' &= \frac{\left(23{,}030+10{,}290\sqrt{5}\right)-\left(6800+16{,}660\sqrt{5}\right)}{\left(49+4\sqrt{5}\right)^2}\\ &= \frac{16{,}320-6{,}370\sqrt{5}}{\left(49+4\sqrt{5}\right)^2};\end{aligned}$$

$$\pm\sqrt{b^2-4c'} = \frac{\pm\sqrt{16{,}320-6{,}370\sqrt{5}}}{49+4\sqrt{5}}; \text{ and}$$

-continued $$\begin{aligned}z_R &= \frac{-b'\pm\sqrt{b'^2-4c'}}{2}\\ &= \frac{105+49\sqrt{5}\pm\sqrt{16{,}230-6{,}370\sqrt{5}}}{98+8\sqrt{5}}\\ &= \frac{105+49\sqrt{5}\pm\sqrt{\left(-65+49\left(\sqrt{5}\right)\right)^2}}{98+8\sqrt{5}}\\ &= \frac{105+49\sqrt{5}\mp\left(65-49\sqrt{5}\right)}{98+8\sqrt{5}}\\ &= \frac{40+98\sqrt{5}}{98+8\sqrt{5}};\ \frac{170}{98+8\sqrt{5}}\\ &= \left(\frac{\sqrt{5}}{\sqrt{5}}\right)\left[\frac{8\left(\sqrt{5}\right)^2+98\sqrt{5}}{98+8\sqrt{5}}\right];\ \frac{170}{98+8\sqrt{5}}\\ &= \frac{\sqrt{5}\left(8\sqrt{5}\right)+98)}{98+8\sqrt{5}};\ \frac{170}{98+8\sqrt{5}}\\ &= \sqrt{5};\ \frac{170}{98+8\sqrt{5}}.\end{aligned}$$

Naturally, the last of such three famous continuous cubic equations, as stipulated above, alternatively could have been resolved algebraically without having to resort to such cumbersome simultaneous reduction process.

This could be achieved simply by realizing that once a value of ζ becomes designated, an angle of 3θ magnitude that it is representative of very easily could be determined trigonometrically; whereby, a value for $z_R$ which corresponds to its trisector, computed as being one-third of such value, and thereby algebraically expressed merely as θ, thereafter also could be trigonometrically determined.

Unfortunately, the pitfall that accompanies such shortened algebraic process is that such common root, $z_R$, does not become identified solely by conventional Euclidean means!

Figure 57:
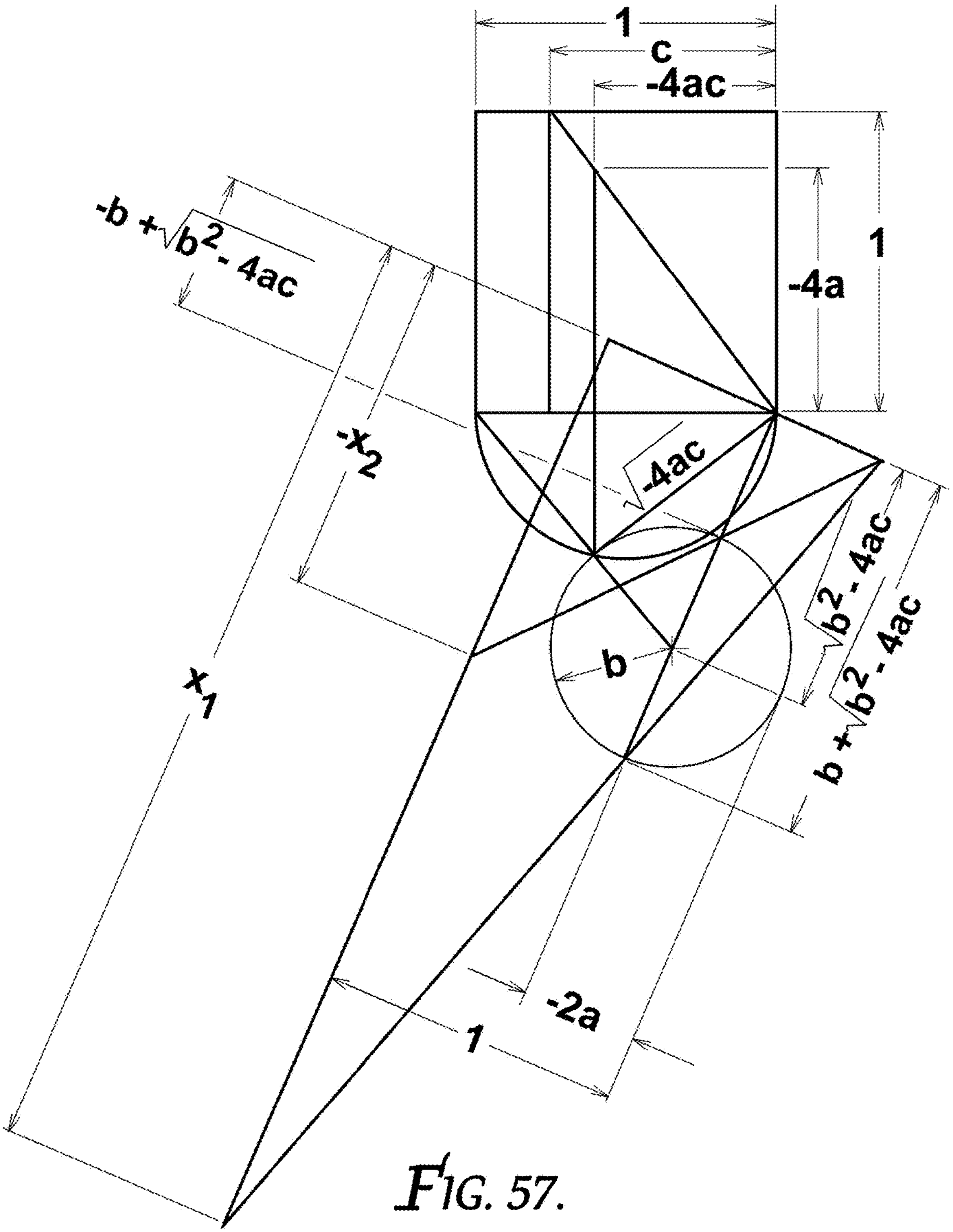
FIG. 57 is a geometric construction pattern showing the process for geometrically solving parabolic equations of the form $ax^2+bx+c=0$; merely by means of applying such famous Quadratic Formula $x=(-b\pm\sqrt{b^2-4ac})/2a$ solely by conventional Euclidean means for the specific case when the coefficients a=−2, b=0.4, and c=0.75.

The method to do so would be to draw straight lines whose lengths are of magnitudes which are equal to the value of roots belonging to such abbreviated Quadratic Formula $z_R=(½)(-b'\pm\sqrt{b'^2-4c'})$, much in the same manner as was employed earlier when quadratic roots first were determined by means of geometric construction in FIG. 57.

Figure 58:
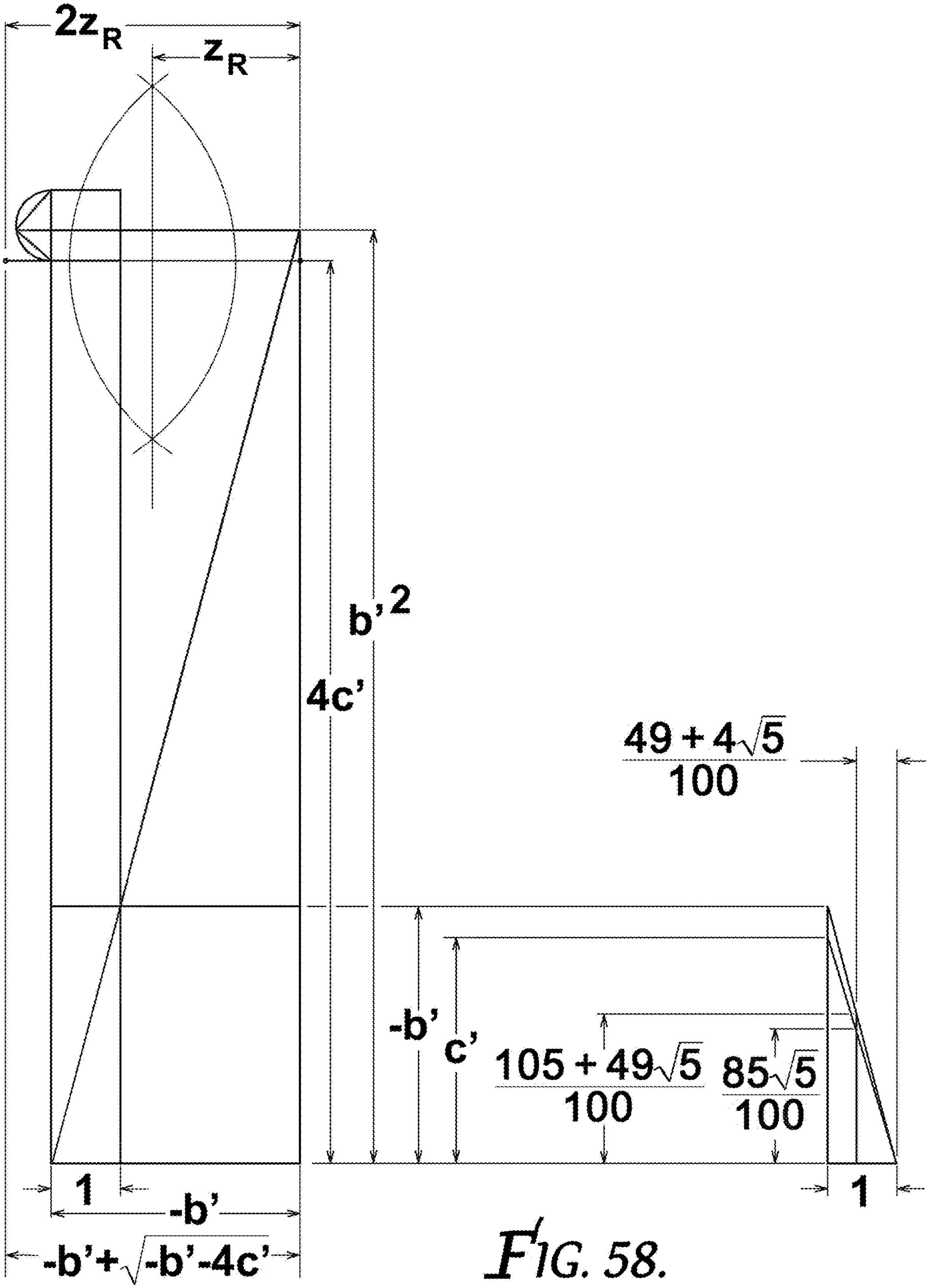

For such algebraic determination, as made above, the magnitude of a trisector for an angle whose tangent is of a designated magnitude $\sqrt{5}/7$ could be geometrically constructed by means of applying the following sequence of Euclidean operations; thereby rendering a particular pattern, as is depicted in FIG. 58:

two right triangles are drawn in the lower right corner which share a common side of length $(49+4\sqrt{5})/100$, and whose other mutual sides are of respective lengths:

$(105+4\sqrt{5})/100$; and $85\sqrt{5}/100$;

such common side is extended to a unit length;

a perpendicular straight line is drawn above the newly formed endpoint of such extension;

the hypotenuses appearing in such two previously drawn right triangles are extended until they intersect such newly drawn perpendicular straight line, thereby depicting two more similar right triangles;

whereby, the lengths of the unknown sides of such two newly drawn right triangles can be determined by virtue of the proportions established between the known lengths of corresponding sides of their respective similar right triangles and their common side of unit length, thereby enabling designations of −b' length and c' to be notated upon such drawing to reflect the following determinations:

$$b' = -\left(\frac{105+49\sqrt{5}}{4\sqrt{5}+49}\right)$$

$$-b' = \left(\frac{105+49\sqrt{5}}{4\sqrt{5}+49}\right)\left(\frac{1/100}{1/100}\right)$$

$$\frac{-b'}{1} = \frac{(105+49\sqrt{5})/100}{(49+4\sqrt{5})/100}; \text{ and}$$

$$c' = \frac{85\sqrt{5}}{4\sqrt{5}+49}\left(\frac{1/100}{1/100}\right)$$

$$\frac{c'}{1} = \frac{(85\sqrt{5})/100}{(49+4\sqrt{5})/100};$$

next, a square whose sides are of length −b' is to be drawn, as indicated in the lower left-hand corner of FIG. 58;

a rectangle then becomes drawn whose base of unit length is to align along the lower side of such square and whose left lower corner is to share the very position which the left hand lower corner of such square occupies;

a straight line then is to become drawn which extends from such newly identified common corner, passes through an intersection point which is made between the upper side of such previously drawn square and the right side of such newly drawn rectangle, and thereafter continues as a large diagonal until it intersects with the right side of such previously drawn square;

the distance between such newly determined intersection point above the lower side of such square of base dimension −b' is to become denoted as $b'^2$, as determined by the proportion established between the corresponding sides of two new similar right triangles whose respective hypotenuses align upon such just drawn long diagonal, whereby such proportion becomes calculated as $b'^2/-b'=-b'/1$;

a horizontal line next is set off a distance of $b'^2$ above the based of such previously drawn square;

another horizontal line of is set off a distance of 4c' above the based of such previously drawn square;

the intervening length existing between them, amounting to a magnitude of $b'^{2-}-4c'$, must constitute the entire area of the small rectangle they furthermore describe, as bounded by the two opposite side of such previously drawn rectangle whose base is equal to a length of unity;

a second square of unit base dimension then becomes described such that its lower portion aligns directly upon such previously described rectangle of area equal to $b'^{2-}-4c'$;

a semicircle thereby can be drawn to the right of such square whose diameter aligns upon its left side;

straight lines thereafter are drawn from the respective ends of such semicircle diameter to the point residing upon its circumference which intersects the horizontal straight line which resides at a distance of $b'^2$ above the base of such previously drawn square whose respective sides each are 'b' in length;

by virtue of the Pythagorean Theorem, such lower straight line, as drawn from the lower extremity of the diameter of such semicircle and extending to a point lying upon its circumference, must amount to a length which is equal to the square root of the $b'^2-4c'$ area of such previously described rectangle;

such length thereafter is reproduced as an extension to the horizontal straight line previously drawn which resides a distance of 4c' above the base of the previously drawn square whose sides each equal −b' in length;

such new straight line extension is notated as being of overall length $2z_R=-b'+\sqrt{b'^2-4c'}$, as is indicated both at the very the top and very bottom of such drawing; and such overall length thereafter becomes bisected in order to distinguish and thereby designate a length $z_R$ which amounts to one-half such magnitude.

Obviously, such geometric construction approach cannot pose a solution for the classical problem of the trisection of an angle; simply because the generalized cubic equation format that contributes to its very determination, specifically being $z^3-(\sqrt{5}+7)z^2+(7\sqrt{5}+12)z-12\sqrt{5}=0$, could not be derived without a prior awareness of the very solution itself.

A second less complicated example demonstrating that it is possible to apply algebraic information in order to create a geometric solution for the problem of the trisection of an angle pertains to a generalized cubic equation whose coefficients β and γ are set to zero, and whose coefficient δ amounts to a value of +1, thereby establishing the specific cubic equation $z_R^3+1=0$.

From such information, the following details can be gleaned:

$$\begin{aligned} z_R^3+1 &= 0 \\ z_R^3 &= -1 \\ z_R &= \sqrt[3]{-1} \\ &= -1 \\ \tan\theta &= -1 \\ \theta &= \text{arc tan }(-1) \\ &= 135°; \end{aligned}$$

$$\begin{aligned} 3\theta &= 3(\theta) \\ &= 3(135°) \\ &= 405°; \text{ and as a check} \end{aligned}$$

$$\begin{aligned} \zeta &= (3z_R - z_R^3)/(1-3z_R^2) \\ &= (-3+1)/(1-3) \\ &= -2/-2 \end{aligned}$$

$$\begin{aligned} \tan(3\theta) &= +1 \\ 3\theta &= \text{arc tan }(+1) \\ &= (360+45)° \\ &= 405°. \end{aligned}$$

Such algebraic determination, as made above, thereby enables the trisection of an angle to be geometrically constructed as follows:

from a designated value of ζ=tan (3θ)=+1, an angle designated as 3θ which amounts to exactly 45° in magnitude first becomes geometrically constructed with respect to the +x-axis; and from an algebraically determined common root value of $z_R=-1$, a trisecting angle designated as θ which amounts to exactly 135° in magnitude thereafter becomes geometrically constructed with respect to the +x-axis.

Needless to say, such geometric construction, as posed above, although representing geometric solution for the problem of the trisection of an angle, nevertheless does not pose a solution for the classical problem of the trisection of an angle. This is because a value for such common root $z_R$ cannot be ascertained solely by means of a geometric construction which proceeds exclusively from a given value of $\zeta=\tan(3\theta)=+1$.

Although a straight line of slope $z_R=-1$ could be geometrically constructed rather easily from another line of given slope $\zeta=+1$, such geometric construction pattern represents just one out of an infinite number of straight line possibilities which otherwise could be distinguished geometrically from a given value of $\zeta=+1$.

Hence, the sequence of Euclidean operations which governs such trisection can be completed with certainty only by incorporating such algebraic determination that $z_R=+1$, or else simply by algebraically dividing such geometrically constructed 405° angle by a factor of three.

In either case, since both of such algebraic results are tied only to such 135° trisector of slope $z_R=-1$, the only way to determine such information solely via straightedge and compass from a geometrically constructed 45° angle would be to distinguish them from the results of a Euclidean trisection which has not yet been performed.

Such process entails knowledge of the results of a geometric construction before it actually becomes conducted, thereby violating the rules of conventional Euclidean practice which require that geometric construction can proceed only from a given set of previously defined geometric data.

In order to further emphasize just how the use of aforehand knowledge inadvertently creeps into conventional Euclidean practice, thereby grossly violating its very rules, a last rather telling example is afforded below whereby given angle NMP, as depicted in FIG. 1B, is to be of the very size which actually appears in such figure; thereby very closely amounting to twenty degrees. As such:

- angle QPS, being geometrically constructed to three times that size, must be exactly sixty degrees. It becomes very easy to draw such rendered angle because the internal angle of a geometrically constructed equilateral triangle is that same size;
- the next step is to determine whether or not Euclidean operations can be launched exclusively from such designated angle QPS in order to locate the correct positions of points M and N; and
- as it turns out, intersection points M and N cannot be distinguished solely via straightedge and compass solely from such rendered angle QPS. That is to say, there is absolutely no geometric construction that can be performed with respect to such sixty degree angle QPS which can locate points M and N, short of having aforehand awareness of their respective locations.

Such above analysis reveals that with respect to the particular geometry represented in such famous FIG. 1B Archimedes Euclidean formulation, when commencing only from angle QPS of designated sixty degree magnitude, points M and N truly qualify as overlapment points.

Were this above assertion not to be true, it would be tantamount to trisecting such sixty degree angle QPS solely by means of applying a straightedge and compass to it; thereby solving the classical problem of the trisection of an angle without having any other predisposed knowledge and, in so doing, accomplishing a feat that is entirely impossible!

With regard to a prior discussion concerning the input box entitled PROBABILISTIC PROOF OF MATHEMATIC LIMITATION 10, it was mentioned that trisection can be achieved by means of performing a multitude of consecutive angular bisections, all geometrically constructed upon just a single piece of paper.

Such approach generates a geometric construction pattern that is indicative of a geometric progression whose:

- constant multiplier, "m", is set equal to −½; and
- first term, "f", is algebraically denoted as 3θ.

Moreover, the overall sum, "s", of such geometric progression consisting of an "n" number of terms can be represented by the common knowledge formula:

$$\begin{aligned} s &= f(m^n-1)/(m-1) \\ &= 3\theta\,(-1/2^n-1)/(-1/2-1) \\ &= -2\theta(-1/2^n-1); \end{aligned}$$

whereby

- for an infinite number of terms, such equation thereby reduces to, $$\begin{aligned} s &= -2\theta(-1/2^\infty-1) \\ &= -2\theta(0-1) \\ &= 2\theta. \end{aligned}$$

Such result indicates that after conducting an infinite number of successive bisection operations, it becomes possible to geometrically construct an angle that amounts to exactly ⅔ the size of an angle of designated 3θ magnitude, whereby their difference then must distinguish its trisector.

Below, a method is furnished which describes how to geometrically construct the first five terms appearing in such governing geometric progression; and in so doing thereby assuming the form 3θ−3θ/2+3θ/4−3θ/8+3θ/16=33θ/16.

In such development, the value of the first term, algebraically denoted as 3θ, can be set equal to virtually any designated magnitude that is intended to be trisected. By inspection, it furthermore becomes apparent that the numerical value of each succeeding term is equal to one-half the magnitude of its predecessor. As such, values for such diminishing magnitudes can be geometrically constructed merely by means of bisecting each of such preceding angles.

Lastly, wherein positive values could applied in a counterclockwise direction, negative magnitudes would appear in a completely opposite, or clockwise direction, with respect to them.

The specific details which pertain to a FIG. 59 drawing of this nature are itemized as follows:

- an angle of magnitude 3θ is drawn such that its vertex aligns upon the origin of an orthogonal coordinate system with its clockwise side residing along its +x-axis;
- such given angle, being of magnitude 3θ, becomes bisected, whereby such bisector resides at an angle relative to such +x-axis that amounts to ½ (3θ)=3θ/2;
- the upper portion of such bisected angle, amounting to a size of 3θ/2, then itself becomes bisected, whereby a determination made as to the location of such second bisector would place it at an angle of $3\theta/2+3\theta/4=9\theta/4$ with respect to the +x-axis;

the angle formed between such first bisector and second bisector next becomes bisected, whereby a determination made as to the location of such third bisector would place it at an angle of $9\theta/4-3\theta/8=15\theta/8$ with respect to the +x-axis; and the angle formed between such second bisector and third bisector then itself becomes bisected, whereby a determination made as to the location of such fourth bisector would place it at an angle of $15\theta/8+3\theta/16=33\theta/16$ with respect to the +x-axis.

Quite obviously, it remains possible to continue such activity until such time that the naked eye no longer could detect a bisector for an arc that invariably becomes smaller and smaller with each subsequent bisection operation.

In this regard, the resolution of the naked eye is considered to be limited to about one minute of arc, thereby amounting to $1/60^{th}$ of a degree, whose decimal equivalent is 0.01667°.

Once the human eye no longer can detect gradations resulting from such bisectors process, they could be located erroneously or even superimposed upon prior work.

Since the use of a microscope might increase such perception capabilities, it might enable a few additional bisections to become accurately determined. However, being that an infinite number of bisections are needed in order to generate a precise trisector in this manner, such enhancement only would serve to slightly improve upon the overall approximation of any trisector which becomes produced.

The Successive Bisection Convergence Chart, as presented in FIG. 60, describes the results produced by such geometric progression as the number of terms is shown to increase in its first column, as headed by the term n.

The second column therein is devoted to calculations which apply to such geometric progression, based upon the number of terms it contains. In each line item, the last value provided indicates the overall size of the angle which would become geometrically constructed by means of conducting such successive bisection process.

Notice that FIG. 60 is discontinued at a value of n=22. This is because, at this point in such overall geometric construction process, an accuracy of six decimal places, amounting to $(2.000000)\theta$ would become realized.

Since the only time that a bisection operation is not conducted is when n=1, each successive line item within such FIG. 60 chart depicts a geometric construction pattern that could be generated by means of performing a total of n−1 bisection operations.

Hence, an accuracy of one-millionth could be obtained by means of conducting twenty-one successive bisections.

The analysis presented below discloses that for a 20° trisector, such above summarized process of successive angular bisections would have to be disbanded during the twelfth bisection operation due to the naked eye no longer being able to discern the exact placement of its bisector.

As such, the number of terms this condition would apply to, as indicated in such FIG. 60 chart, would be when n=13.

From such FIG. 60 chart, the separation needed to be distinguished when performing such twelfth bisection is calculated to be $$\begin{aligned} 2.000244\theta - 1.999512\theta &= 0.000732\theta \\ &= 0.000732(20°) \\ &= 0.01464°. \end{aligned}$$

Therefore, since such 0.01464° needed separation clearly is smaller than the 0.01667° which the naked eye is capable of perceiving; it means that such twelfth bisector could be located erroneously.

When referring to FIG. 59, notice that an angle of size $3\theta$ whose vertex is placed at the origin of a Cartesian Coordinate System such that its clockwise side aligns upon its +x-axis is indicative of such geometric progression for the particular condition when n=1.

Additionally, four subsequent bisections are depicted, each of which is considered to have been performed solely by conventional Euclidean means.

The purpose of the shading therein is to suitably distinguish between each of such bisection activities as follows:

such angle of magnitude $+3\theta$ is bisected in order to distinguish two separate arcs, each being of $3\theta/2$ size;

with the upper portion of such bisected angle, amounting to a size of $3\theta/2$, then itself becoming bisected, the determination made as to the location of such second bisector would place it at an angle of $3\theta/4$ counterclockwise of such first bisector position;

with the angle formed between such first bisector and second bisector, amounting to a size of $3\theta/4$, then itself becoming bisected, the determination made as to the location of such third bisector would place it at an angle of $3\theta/8$ clockwise of such second bisector position, ad denoted by the minus sign notation; and with the angle formed between such second bisector and third bisector, amounting to a size of $3\theta/8$, then itself becoming bisected, the determination made as to the location of such fourth bisector would place it at an angle of $3\theta/16$ counterclockwise of such third bisector position.

As to the role which cube roots could play in a geometric solution of the problem of the trisection of an angle, below it is shown how to determine the length of a straight line, half which amounts to its cube root value, whereby it could be algebraically stated that:

$\sqrt[3]{l}=l/2$; such that by cubing both sides;

$l=l^3/8$ $8l=l^3$ $4(2)=l^2$ $2\sqrt{2}=l$ $\sqrt{2}=l/2$; and relevant information then is to be introduced in the form of an angle whose complement furthermore turns out to be its trisector, algebraically determined as follows:

$$\begin{aligned} \theta &= 90° - 3\theta \\ 3\theta + \theta &= 90° \\ 4\theta &= 90° \\ \theta &= 22.5° \\ 2\theta &= 45° \\ 3\theta &= 67.5°; \end{aligned}$$

-continued $$\sin(3\theta) = 3\sin\theta - 4\sin^3\theta$$

$$\cos(90 - 3\theta) = \sin\theta\,(3 - 4\sin^2\theta)$$

$$\begin{aligned}\cos\theta &= \sin\theta\,[(2)(1 - 2\sin^2\theta) + 1]\\ &= \sin\theta\,[2\cos(2\theta) + 1]\\ &= \sin\theta\,(2\cos 45^\circ + 1)\\ &= \sin\theta\left[(2)\left(\frac{\sqrt{2}}{2}\right) + 1\right]\\ &= \sin\theta\left(\sqrt{2} + 1\right)\end{aligned}$$

$$\frac{1}{\sqrt{2}+1} = \tan\theta$$

$$\frac{1}{\sqrt{2}+1}\left(\frac{\sqrt{2}-1}{\sqrt{2}-1}\right) = \tan\theta$$

$$\frac{\sqrt{2}-1}{2-1} = \tan\theta$$

$$\sqrt{2} - 1 = \tan\theta$$

$$\sqrt{2} - 1 = \frac{1}{\tan(3\theta)}$$

$$\begin{aligned}\tan(3\theta) &= \frac{1}{\sqrt{2}-1}\left(\frac{\sqrt{2}+1}{\sqrt{2}+1}\right)\\ &= \frac{\sqrt{2}+1}{2-1}\\ &= \sqrt{2} + 1;\end{aligned}$$

it therefore becomes possible to geometrically construct a right triangle whose sides amount to respective lengths of 1 and $1+\sqrt{2}$ such that its tangent, $\zeta$, amounts to a value of $1+\sqrt{2}$;

whereby such $\sqrt{2}$ length is drawn as the hypotenuse of a 45° right triangle, and such $1+\sqrt{2}$ thereby represents the addition of its side added to such hypotenuse length; and such hypotenuse of length $\sqrt{2}$ after becoming doubled and thereby amounting to $2\sqrt{2}$, being its cubed value, thereafter can be bisected in order to arrive at its cube root.

The algebraic cubic equation which correlates to this geometric construction process assumes the form of $z_R^3+3z_R^2+3z_R+(3-2\zeta)=0$; as determined below:

$$\tan(3\theta)=\sqrt{2}+1=\zeta$$

$$\sqrt{2}=\zeta-1;\text{ and}$$

$$\tan\theta=z_R=\sqrt{2}-1$$

$$z_R+1=\sqrt{2}$$

$$(z_R+1)^3=(\sqrt{2})^3$$

$$(z_R+1)^3=2\sqrt{2}$$

$$(z_R+1)^3=2(\zeta-1)$$

$$(z_R^3+3z_R^2+3z_R+1)-2(\zeta-1)=0$$

$$z_R^3+3z_R^2+3z_R+(3-2\zeta)=0.$$

To finalize a discussion raised earlier, FIG. 61 relates one complex number to another which serves both as its trisector, as well its cube root.

To elaborate upon this, complex numbers typically are represented geometrically as straight lines which appear upon an xy plane known as the complex plane.

Each straight line featured therein commences from the origin of a rectilinear coordinate system, and contains an arrow at its termination point to express direction.

The convention used to specify a complex number is first to indicate its real numerical magnitude, followed by its imaginary component. Such imaginary aspect is represented by an Arabic letter, i, used to denote an imaginary term $\sqrt{-1}$, followed by its magnitude.

As such, the coordinate values of complex number termination points designate their respective imaginary and real number magnitudes; thereby fully describing them.

In FIG. 61, such two complex numbers are shown to be expressed as cos (3θ)+i sin (3θ), and cos θ+i sin θ.

Conversely, since the ratio between the magnitudes of the real and imaginary portions of such first complex number is (sin 3θ)/(cos 3θ)=tan 3θ, the straight line which represents it, by exhibiting such slope, thereby must pass through the origin while forming an angle of 3θ with such x-axis.

Likewise, the straight line which represents such second complex number, by exhibiting a slope of tan θ, thereby must pass through the origin while instead forming an angle of θ with respect to the x-axis and, in so doing, trisecting such angle of 3θ magnitude.

The fact that the complex number cos θ±i sin θ also turns out to be the cube root of the first complex number cos (3θ)+i sin (3θ) furthermore is to be verified algebraically by applying the binomial expansion $(A+B)^3=A^3+3A^2B+3AB^2+B^3$ for the express condition when the A=cos θ, and B=i sin θ as follows:

$$A^3 + 3A^2 + 3AB^2 + B^3 = \cos^3\theta + 3(\cos^2\theta)(i\sin\theta) - 3(\cos\theta)(\sin^2\theta) + (i\sin\theta)^3$$

$$(A+B)^3 = \cos^3\theta + 3(1-\sin^2\theta)(i\sin\theta) - 3(\cos\theta)(1-\cos^2\theta) - i\sin^3\theta$$

$$(\cos\theta + i\sin\theta)^3 = \cos(3\theta) + i\sin(3\theta)$$

$$\cos\theta \pm i\sin\theta = \sqrt[3]{\cos(3\theta) \pm i\sin(3\theta)}.$$

FIG. 62 depicts a car lift whose stand 126 and stand 127 feature geometries that are identical to that which is represented by the slotted linkage arrangement of such fourth embodiment, as posed in FIG. 22, excepting that they are more robust; whereby linkage bolt hole patterns generally span about seven feet in length. Such design affords about five feet of overhead clearance when it is raised to a forty-five degree angle. This is typified by a very stable structure which is centered about a large 45° right triangular shaped section that in turn is bisected by a center strut which thereby divides it into two similar smaller symmetrical, but opposing, right triangular shaped geometries.

Therein, ramp 128 and ramp 129 are included for purposes of driving a four wheel motor vehicle onto near side skirt 130 and far side skirt 131 simultaneously. Notice that the stationary front ends prevent such motor vehicle from being driven too far and thereby falling off, while the webs of their channeled cross-sections prevent such motor vehicle from tipping off either side.

Near pin 132 and far pin 133 thereafter are inserted to secure such motor vehicle in place before lifting operations commence. As indicated, such mechanisms are no different than the designs which support toilet tissue in a bathroom.

As indicated in FIG. 62, the basic difference in such two stands is that:

- attachment strut 134 is connected at its far end by a dowel which is inserted from the other side of its base, whereby the white dot etched upon it faces in the opposite direction;
- attachment strut 135 is connected at its far end by a retainer that is identical to retainer 138, but also is secured from its other side; and
- attachment strut 136 is connected at its far end by a dowel which is inserted from its other side.

The single hydraulic actuator 137 which powers such device by varying the distance between attachment strut 135 and attachment strut 136 is controlled by wall remote 139 as a safety provision, whereby there is no chance of being caught underneath such mechanism while it becomes activated; thereby preventing possible injury.

Such simple actuation approach precludes having to provide two separate power supply sources which otherwise would have to be regulated with respect to each other at all times, thereby necessitating additional equipment.

The twofold advantage of such design is that it remains level at any set height, while the load which it supports always is maintained so that its center of gravity aligns very close to such center strut location, thereby permitting it to remain balanced during lifting operations.

To afford an example of such advantage, consider a forklift which supports a particular load upon a pallet. Were the distance between its prongs to become reduced for any reason, such as to clear an obstacle that they might encounter during lifting operations, the center of gravity of such load might shift to another location where it might become subject to tipping.

However, with regard to the design of the device proposed in FIG. 62, this could never happen; thereby maintaining the load in a balanced position at all times. Such advantage could be put to further use in ground support equipment at airports.

Lastly, one final justification is about to be put forth, essentially claiming that only an availability of overlapment points can fully account for why the classical problem of the trisection of an angle cannot be solved!

Public sentiment on this topic, as highly influenced by the earlier discoveries of Wantzel and Galois dating all the back to the mid 1800's, instead generally leans to attributing an inability to geometrically construct cube roots as being the principal cause which prevents trisection.

Moreover, at the very heart of this matter lies a fundamental issue of constructability.

To openly dispute such issue, upon drawing an angle of arbitrarily selected magnitude, there is a good chance that its trigonometric properties will turn out to be cubic irrational. This is because a far greater number of angles exist which exhibit cubic irrational trigonometric properties than do other angles whose trigonometric properties are of rational and quadratic irrational value.

From such initial angle, an entire geometric construction pattern could be generated which belongs to the Euclidean formulation, as posed in FIG. 54. Therein, such singular drawing would depict just how a given angle VOO' actually relates to rendered angle VOU', amounting to exactly three times its size, by virtue of specific trigonometric properties which are inherent to each of such angles, as characterized by the famous cubic equation $\sin(3\theta)=3\sin\theta-4\sin^3\theta$.

The basic problem with such scenario is that such drawing, although fully constructible by a process of sheer random selection, never could be repeated; thereby becoming relegated to approximation when attempting to reproduce it.

More particularly stated, although the likelihood of drawing an angle which exhibits cubic irrational trigonometric properties is quite high, as due to a substantial availability of them, the probability of geometrically constructing a specific angle, even one which might feature a particular transcendental trigonometric property such a pi for example, nevertheless approaches zero; being entirely consistent with the previously stipulated premise that absolutely no cubic irrational length can be geometrically constructed, but only approximated, from a given unit length.

To further emphasize this outstanding difficulty, consider the largely unknown fact that even the rarified transcendental number, π, can be approximated by means of geometric construction well beyond what the naked eye could detect.

To demonstrate this, a rational number very easily can be described by the ratio of two cubic irrational numbers by an algebraic manipulation such as:

$$\frac{13}{9}=\frac{13}{9}\left(\frac{\tan 20^\circ}{\tan 20^\circ}\right);\text{ whereby}$$

$$\frac{13}{9}=\frac{13}{9}\frac{\tan 20^\circ}{\tan 20^\circ}$$

$$=\frac{4.7316130455\ldots}{3.2757321084\ldots}$$

Similarly, the actual transcendental value of π can be multiplied to the sin 80° in order to produce another transcendental length as follows:

$$\pi\sin 80^\circ=3.093864802\ldots;\text{ and}$$

$$\pi(0.9848077530\ldots)=4(0.77346620052\ldots).$$

Moreover, all of the stated values in such above equation, except for π, furthermore very closely could be approximated as actual rational numbers, down to a significance of at least ten decimal places; being well beyond the accuracy of what the naked eye could detect.

Such estimated result is furnished directly below, whereby all constructible rational numbers thereby could be algebraically expressed as follows:

$$\pi\left(\frac{984{,}807{,}753}{1{,}000{,}000{,}000}\right)=4\left(\frac{77{,}346{,}620{,}052}{100{,}000{,}000{,}000}\right)$$

$$\pi\left(\frac{984{,}807{,}753}{1{,}000{,}000{,}000}\right)=4\left(\frac{19{,}336{,}655{,}013}{25{,}000{,}000{,}000}\right)$$

$$\pi(L)=4(T);\text{ or}$$

$$\pi L=4T.$$

Notice that such above described rational lengths 4, T, and L now can be geometrically constructed from an arbitrarily applied, or given length of unity.

In the above example, there is little need to attempt to reduce the rational length T any further than is indicated. This is because it is necessary only to know that a rational length of T=19,336,655,013/25,000,000,000 could be made use of to geometrically construct another length that very closely approximates the actual value of pi.

From such equation πL=4T, as determined above, the proportion $$\frac{\pi}{T}=\frac{4}{L}$$

readily could be established; whereby a very close estimation of the length pi thereby could be identified from the geometric construction of two similar right triangles whose sides respectively consist of drawn rational lengths 4, T, and L. Understandably, the level of accuracy attributed would amount to only three, or perhaps four at the very most, significant digits.

To conclude, since transcendental lengths describe decimal sequences which are considered to continue on indefinitely, they cannot be exactly geometrically constructed from any long-hand division computation that is indicative of a pair of rational numbers whose quotients begin to repeat themselves.

In the past, such difficulty merely was bypassed by means of considering only geometric construction patterns which could be redrawn.

Such process simply entails selecting a given angle whose trigonometric properties are either rational or quadratic irrational. For example, upon considering a given angle VOO' whose sine is equal to ⅓, the following algebraic relationship could be obtained:

$$\sin\theta = 1/3$$

$$\theta = 19.47122063°;\text{ and}$$

$$\begin{aligned}\sin(3\theta) &= 3\sin\theta - 4\sin^3\theta\\ &= 3(1/3)-4(1/3)^3\\ &= 23/37\\ 3\theta &= 58.4136619°\\ &= 3(19.47122063°).\end{aligned}$$

Obviously the sin (3θ) also must be a rational value because it amounts to the sum of three times such selected rational value of ⅓ plus four times the value of its cube; meaning that all coefficients within such resulting equation $23/27=3\sin\theta-4\sin^3\theta$ very handily would consist of only rational numbers!

Accordingly, an associated geometric solution for the problem of the trisection of an angle very easily could be drawn merely geometrically constructing an angle whose sine equals ⅓.

Notice, however, that such particular drawing would remain entirely irreversible, despite being characterized by that very geometric construction pattern, as just described, belonging to the Euclidean formulation, as posed in FIG. 54; thereby specifically depicting a given angle VOO' which would exhibit a sine value of exactly ⅓. In other words, the claim that the classical problem of the trisection of an angle cannot be solved becomes further bolstered, even for an angle whose sine value amounts to 23/27; as predicated upon the fact that an availability of overlapment points must remain at work which prevents such drawing from fully being backtracked upon. Naturally, in such specific case, relevant data, as previously stipulating that the sine of the trisector for such angle would amount to exactly ⅓, only would qualify as extraneous information, whereby its use would violate the very Euclidean requirements which just so happen to be levied upon such problem.

Next, the issue of attempting to extract cube roots is to be addressed. In order to do this, consider that some Euclidean formulation someday might become devised, each of whose constituent geometric construction patterns would be fully reversible, as well as exhibit a rendered length that amounts to the cube of its given length. In so doing, it naturally would follow that for each of such singular drawings, a cube root of such rendered length value thereby could be geometrically constructed without having to introduce any additional relevant information.

Now, if a Euclidean formulation of such nature truly could be devised, an overriding question then would be whether such capability could in some way overcome the irreversible nature of any geometric construction pattern in which the magnitude of a rendered angle amounts to exactly three times the size of its given angle. For instance, could such magical Euclidean cube root capability enable angle VOU', as appearing upon the irreversible representative geometric construction pattern for such Euclidean formulation, as posed in FIG. 54, to be fully backtracked upon all the way to given angle VOO' in order to solve the classical problem of the trisection of an angle?

Naturally, an activity of this nature would be severely limited in that some far-fetched reversible Euclidean cube root capability only could be applied to any known aspect of such rendered angle VOU'. Such is the case because when attempting to solve the classical problem of the trisection of an angle, other lengths in FIG. 54, such as $\sin^3\theta$, still would remain unknown. Since it is impossible to take the cube root of an unknown value, such very difficulty would thwart any attempts to fully backtrack from rendered angle VOU' all the way back to given angle VOO'.

Accordingly, it is conjectured that some as yet undeveloped Euclidean capability to extract cube roots would have little to no impact whatsoever upon enabling the classical problem of the trisection of an angle to become solved; as based upon the fact that such hypothetical cube root development couldn't possibly offset the irreversibility of such FIG. 54 representative geometric construction pattern. Once recognizing that it otherwise must be an availability of overlapment points which actually prevents a backtracking activity of this nature from being accomplished, it becomes rather obvious that an introduction of any professed Euclidean cube root capability couldn't possibly rectify a plaguing Euclidean irreversibility limitation which instead actually prevents the classical problem of the trisection of an angle from actually being solved!

In closing, it is important to note that vital input leading to the very discovery of significant findings, as presented herein, never even would have been obtained had it not been for one strange incident which occurred in 1962. It was then, that my high school geometry teacher informed me that it was impossible to perform trisection solely by conventional Euclidean means. Her disclosure moved me greatly. I become intrigued; thereby fueled with a relentless curiosity to ascertain secrets needed to unlock a trisection mystery that had managed to baffle mathematicians for millennia!

Naturally, during such prolonged fifty-five year investigation, certain critical aspects pertaining to trisection became evident well ahead of others. For example, I realized that a general perception of geometry dating back all the way to the time of Archimedes perhaps might be better served by means of now considering a much needed extension to it; one that would transcend beyond the confines of conventional Euclidean practice, and amplify even upon Webster's own definition of such word; whereby from an availability of straight lines, intersection points, circles, triangles, rectangles and parallelograms, leading to an overall profusion of spheres, prisms and even pyramids, eventually would emerge the far greater understanding that any visualization which could be mathematically interpreted diagrammatically should be considered to be of a geometric nature!

Such enhanced perception would apply to real world events wherein certain articulating mechanisms, even those capable of performing trisection, would be credited for accomplishing specific geometric feats that otherwise could not be matched solely by conventional Euclidean means. Certain famous convolutions then would comprise known geometric shapes, such as the Conchoid of Nicomedes, the Trisectrix of Maclaurin, the catenary or hyperbolic cosine, the elliptical cone, the parabola, the Folium of Decartes, the Limacon of Pascal, the Spiral of Archimedes, the hyperbolic paraboloid, as well as logarithmic and even exponential curves; as previously were considered to be taboo within an otherwise limited realm of conventional Euclidean practice.

Revolutionary material, as presented herein, consists largely of a wealth of information that can be traced directly to a newly established methodology that, in turn, is predicated upon a proposed extension to conventional Euclidean practice. In order to succeed at developing such rather unconventional output, it became essential to take good notes over extended periods of time. Moreover, copyrights conveniently served to document dates pertaining to significant discoveries.

Many concepts, as expressed herein, stem from a far broader pretext which previously was referred to as equation sub-element theory Upon reading my unfinished treatise entitled, *The Principles of Equation Sub-element Theory*; United States Copyright Number TXu 1-960-826 granted in April of 2015, it would become apparent that such purported new field of mathematics unfortunately only is in its embryonic stage of development. By no means should it be considered to be complete! In fact, such document already was amended under United States Copyright Number TXu 1-976-071 during August of 2015, and presently is undergoing yet another revision in order to keep abreast with recent findings, some of which are to be disseminated to the public for the very first time herein. Such copyright process permits premature theories to become documented, and thereafter revised without difficulty in order to suitably become refined into viable output.

Any prior art issue which might arise concerning the concurrent preparation of two documents which might contain somewhat similar, or even closely related information could be reconciled by means of controlling which becomes published and/or disseminated first.

In this regard, such above described copyrighted material should pose no problem because it never before was published, nor even disseminated to the general public in any manner whatsoever. Hence, there is no compelling reason to suspect that information contained therein might qualify as prior art material. Such position is predicated upon one basic understanding; being, that because the exclusive right granted by such copyrights to reproduce and/or distribute never before was exercised, it becomes impossible for anyone to be aware of the very nature of such material.

Conversely, if the argument that such copyrighted material actually should qualify as prior art otherwise were to persist in some thoroughly unabated manner, it then would require a review by some expert who, by gaining access in some surreptitious manner to undisclosed information, thereby independently only would collaborate that such unfinished copyrighted information is seriously flawed. For example, such hypothetical review would reveal that the term transcendental was used inappropriately throughout such copyright and amendment thereto. Today such mistake can be easily explained by mentioning that a thorough understanding of Al-Mahani's work was gained only after such copyrighted information first became amended. Therefore, the correct replacement term, being cubic irrational, couldn't possibly have appeared in earlier forms of such copyrights. Moreover, had such copyrighted information been released to the public, well before it completion, then inaccurate information stating that only transcendental values, as consisting of a limited subset of all cubic irrational numbers, could be automatically portrayed by means of performing trisection; thereby contradicting correct details as presented herein.

Regarding the 2½ year interim which elapsed between the granting of such two 2015 copyrights and the present day completion of this disclosure, such period of time is indicative of an expected turnaround needed to effectively update information that well should be construed to include complex revolutionary material, thereby exceeding that of evolutionary projects by some considerable degree; whereby more leniency should be extended for their proper update.

By means of documenting what might appear to be similar theory concurrently in dual records, a process of leap frog would unfold, whereby what might have seemed to be credible information appearing in a copyrighted document, when worked upon earlier, soon would become outdated by a subsequent accounting, such as this one; thereby necessitating yet another revision of such copyrighted document to be completed before its release in order to remain totally consistent with refinements now incorporated herein.

Accordingly, by means of publishing the contents of this disclosure well ahead of any portion of such, as yet undisclosed 500+ page copyrighted treatise, this document shall be the first to become disseminated anywhere on earth. Lastly, whereas such copyrights, as identified directly above, evidently do not appear to qualify as prior art, it thereby should not be necessary to furnish a copy of them along with the submittal of this patent disclosure.

What is claimed is:

1. An angle trisector which is comprised of:

a compass assembly further comprising a positioning linkage (200), a reference linkage (201), and adjustment linkage (202), respectively connected by a main dowel (203), an intermediate dowel (204) and a shoulder screw (205), wherein the compass assembly could be rotated relative to the shorter member of an inverted L-shaped rigid right angled positioning linkage that is of equal span in order to form, and thereafter suitably maintain by being secured in some fashion, an acute angle, as extending from the longitudinal centerline of the reference linkage to the longitudinal centerline of the shorter member of the inverted L-shaped rigid right angled positioning linkage about an axis where the longitudinal centerlines of the reference linkage and the shorter member meet, wherein the vertex of the inverted L-shaped rigid right angled positioning linkage is located on the axis, and where the reference linkage is hinged to it so as to be situated within the ninety degree arc which is defined by the inverted L-shaped rigid right angled positioning linkage;

a counterbalance compass assembly further comprising an opposing positioning linkage (210), an opposing reference linkage (211), an opposing adjustment linkage 212, a slide mechanism (216), respectively connected by an opposing main dowel (213), an opposing intermediate dowel (214) and an opposing shoulder screw (215), wherein the counterbalance assembly is subtended between the longitudinal centerlines of the opposing reference linkage and the opposing positioning linkage; whose rotational axes coincide with the vertex at the intersection of the longitudinal centerlines of the opposing reference linkage and the opposing positioning linkage; wherein the opposing reference and positioning linkages are of equal length to the spans of the reference linkage and shorter member of the inverted L-shaped rigid right angled positioning linkage; and an interconnecting linkage (230) which is hinged along its longitudinal centerline about respective endpoints of its span to the vertex of the inverted L-shaped rigid right angled positioning linkage on one side, and to the vertex of such counterbalance compass assembly on the other; whose span is of equal length to the span of the shorter member of the inverted L-shaped rigid right angled positioning linkage and span of the reference linkage, as well as to the span of the opposing reference linkage and span of the opposing positioning linkage.

2. The angle trisector described in claim 1, the reference linkage extended beyond that of the vertex of the positioning linkage, such that the length of its overall span becomes doubled, and its interconnecting linkage is an equilateral template whose fundamental architecture assumes the shape of an equilateral triangle, wherein each of three portions exhibits respective overall envelope dimensions that are identical in size to those exhibited by the interconnecting linkage.

3. An angle trisector which is comprised of:

a rhombus-shaped mechanism which bears the overall geometry of a rhombus whose four sides all have been widened, consisting of:

a left linkage (41);

a right linkage (42);

a lower linkage (43);

an upper linkage (45); and four interconnecting pivot pins (49), (50), (52), (56) located at ends of the linkages as hinges, such that each of the linkages is free to rotate with respect to its two adjacent linkages about the pivot pins;

a middle linkage (44) which is of the same overall span as any of the four linkages;

two additional interconnecting pivot pins (51), (55) which pass through the longitudinal centerline of the middle linkage very close to each of its ends, such that the distance between their radial centerlines amounts to the length of its overall span; whereby one of the additional interconnecting pivot pins furthermore passes through a slot made in the left linkage, with the other interconnecting pivot pins passing through a slot cut into the right linkage;

a protractor board (40) which features a protractor upon its face which includes angular readings appearing about a circle whose:

radius equals the span of any of the linkages the rhombus-shaped mechanism;

origin becomes secured in some manner to one of the four interconnecting pins contained in such rhombus shaped mechanism, so as to be situated directly underneath it; and ninety degree reading becomes secured directly underneath an adjacent one of the four interconnecting pivot pins, whereby yet another interconnecting pin then would reside atop the circle between its zero to ninety degree readings; and supporting members to maintain an accurate parallelism between the longitudinal centerline of the middle linkage with that of the lower linkage when it becomes translated within slots cut through its left linkage and right linkage; with such added components comprising:

a cross linkage (46);

a stabilizer linkage (47);

a slide (48);

a cross dowel (53); and a retaining ring (54).

4. An angle trisector whose carjack configuration closely resembles the ratcheting portion of linkages which are fitted together in order to form an inverted T-shaped rigid framework in which the longitudinal centerline of the first linkage perpendicularly bisects the longitudinal centerline of the second linkage, the latter of which then would be considered to be its base;

two additional side members, each of which is hinged about one of its span terminations of the side members, as located along the longitudinal centerline of the two additional side members, to a span termination of the second linkage, as located along the longitudinal centerline of the second linkage, so that their respective longitudinal centerlines are free to converge somewhere along the longitudinal centerline of the first linkage during conditions in which the angle subtended between the longitudinal centerline of one of the additional side members and that of the second linkage becomes varied in size from zero degrees to some acute angle design limit which becomes dictated by the shortest span of the two additional side members;

a slotted linkage arrangement, as well as a miniaturized slider arrangement; wherein the slotted linkage arrangement is comprised of:

a trisector solid linkage (58) which serves the function of such aforementioned base;

a bisector slotted linkage (60) that is rigidly attached to the trisector solid linkage in a manner in which the longitudinal centerline of the bisector slotted linkage perpendicularly bisects that of the trisector solid linkage;

a given acute angle slotted linkage (59) of the same span as that of the trisector solid linkage (which would serve as one of such side members);

a transverse slotted linkage (63) of sizably longer span than that of the trisector solid linkage which contains a hole bored about its longitudinal centerline such that its radial centerline is set a distance away from that of one its overall span terminations which is equal to the span of the trisector solid linkage (which would serve as the other of the side members);

a control slotted linkage (61) of the same span as the trisector solid linkage;

a given obtuse angle solid linkage (62) of the same span as the trisector solid linkage;

a slide linkage (64) of sizably shorter span;

a protractor strip (57) that features angular readings appearing about a circle whose radius is of a length which is equal to the span of the trisector solid linkage;

a first dowel whose radial centerline is to be centered at either span termination of the given acute angle slotted linkage which, after becoming inserted through it, furthermore is to pass through a spacer, a span termination of the trisector solid linkage, a span termination of the control slotted linkage, a span termination of the given obtuse angle solid linkage, and then through the origin of the protractor strip, without extending beyond it, the that it can become permanently secured to it in some fashion in order to effectively hinge together those aforementioned components which become sandwiched in between the head of the first dowel and the protractor strip;

a second dowel whose radial centerline is to be centered at the span termination of the transverse slotted linkage which resides away from the radial centerline of the hole already bored through it a distance which is equal to the span of the trisector solid linkage which, after becoming inserted through it, furthermore is to pass through the remaining span termination of the trisector solid linkage, without extending beyond it, the that it can become permanently secured to it;

a third dowel which is to be inserted into the slot cut through the given acute angle slotted linkage, then into the slot cut through the transverse slotted linkage which resides in between the hole bored through it and its span termination which resides away from the radial centerline of the hole a distance which is equal to the span of the trisector solid linkage, whereby the slotted portion is not to encroach upon any hole which might become bored through the transverse slotted linkage, thereafter to be passed through a spacer, and finally through the slot afforded in the bisector slotted linkage where it thereafter can be permanently secured to a retaining ring which lies underneath them all;

a fourth dowel whose radial centerline is to be centered at the span termination of the slide linkage, which, after becoming inserted through it, furthermore is to pass through the hole bored through the transverse slotted linkage, then through a spacer, and finally through the slot cut into the control slotted linkage in order that it lastly can be permanently secured to a retaining ring which resides underneath them;

a fifth dowel which is to be inserted into the remaining slot cut through the transverse slotted linkage, then through the remaining span termination of the given obtuse angle solid linkage such that it finally can be permanently secured to it; and a shoulder screw (70) which can be inserted either: through the unused span termination of the control slotted linkage, and then screwed into a threaded hole located at the ninety degree reading of the protractor strip, or through the unused span termination of the given acute angle slotted linkage, and then screwed into a threaded hole located at the ninety degree reading of the protractor strip; and slider arrangement is comprised of:

a trisector linkage (77) with the term TRISECTOR imprinted upon it;

a bisector linkage (78) that is rigidly attached to it in a manner so that its longitudinal centerline perpendicularly bisects that of the and trisector linkage;

a given acute angle linkage with the term GIVEN ACUTE ANGLE imprinted upon it that is of the same span as the trisector linkage;

a transverse linkage (82) of sizably longer span than that of the trisector linkage which contains a hole bored about its longitudinal centerline such that its radial centerline is set a distance away from that of one of its overall span terminations which is equal to the span of the trisector linkage;

a control linkage (80) of the same span as the trisector linkage;

a given obtuse angle linkage (81) with the term GIVEN OBTUSE ANGLE imprinted upon it that is of the same span as the trisector linkage;

an adjustment linkage (83) with the term ADJUSTMENT LINKAGE imprinted upon it;

a protractor/instructions piece of paper (76) that features angular readings appearing about a circle whose radius is of a length which is equal to the span of the trisector linkage;

a toploader (114) which such device can be transported within, but operated from outside of;

a pair of easels (118, 119) which could be glued to the back of a toploader in order to vertically mount it for easy viewing;

standoffs which provide the necessary clearances to enable the device to articulate as needed within the confines of the toploader;

a first rivet whose radial centerline is to pass through one of two sleeves of the toploader, a washer, the span termination of its given obtuse angle linkage which appears after the term GIVEN OBTUSE ANGLE which is imprinted upon it;

the span termination of the given acute angle linkage which precedes the term GIVEN ACUTE ANGLE which is imprinted upon it, the span termination of its trisector linkage which precedes the term TRISECTOR imprinted upon it, one of the span terminations of its control linkage, through another washer, through its protractor/instructions piece of paper, and then through the remaining sleeve of the toploader, whereby the first rivet, after being pulled up, would thereby sandwich components housed at such location in between the two sleeves of the toploader, but allows for their free rotation relative to one another;

a second rivet whose radial centerline first is to pass through the span termination of the transverse linkage which resides away from the radial centerline of the hole bored through it a distance which is equal to the span of the trisector linkage, and then through a shim, next through the unused, or remaining span termination of the trisector linkage, thereby appearing after the term TRISECTOR imprinted upon it, and finally through a washer which it becomes pulled up inside of in order secure the components and also enable the transverse linkage to rotate freely with respect to the trisector linkage, each of which come into contact with opposing faces of the shim;

a third rivet which first is passed through an overlapping portion of a slider in order to sandwich its head in between the overlapping portion and another portion of the slider which was wrapped around the bisector linkage, then through a shim, then through another overlapping portion of a slider which was wrapped around the given acute angle linkage, and lastly though yet another overlapping portion of a slider which was wrapped around a portion of the transverse linkage at some location in between its hole and span termination which resides a distance away from the radial centerline of the hole which is equal to the span of the trisector linkage, thereby becoming pulled up in a direction which is opposite to the manner in the previously described rivets were pulled up, and causing the longitudinal centerlines of the transverse linkage and given acute angle linkage to always converge somewhere along the longitudinal centerline of the bisector linkage whenever the device becomes articulated;

a fourth rivet which first is passed through an overlapping portion of a slider in order to sandwich its head in between the overlapping portion and another portion of the slider which was wrapped around the control linkage, then through a shim, then through a span termination of the adjustment linkage, as located along its longitudinal centerline, then through another shim, and lastly through the hole bored through the transverse linkage, thereby becoming pulled up in the same direction as the fourth rivet which was described directly above;

a fifth rivet which first is passed through an overlapping portion of a slider in order to sandwich its head in between the overlapping portion and another portion of the slider which was wrapped around the transverse linkage, then though the unused, or remaining span termination of the given obtuse angle linkage, thereby preceding the term GIVEN OBTUSE ANGLE imprinted upon it, and lastly through a washer where it then becomes pulled up;

a sixth rivet which is passed through the control linkage, situated so that its radial centerline aligns upon the unused, or remaining span termination of the control linkage, along its longitudinal centerline, which furthermore had its rivet center pin removed after pull-up operations, thereby leaving a small hole which can be seen to pass entirely through the sixth rivet;

a seventh rivet which is passed through the given acute angle linkage, situated so that its radial centerline aligns upon the unused, or remaining span termination of the given acute angle linkage, along its longitudinal centerline, hence being located at a position which appears after the term GIVEN ACUTE ANGLE which is imprinted upon it, which furthermore had its rivet center pin removed after pull-up operations, thereby leaving a small hole which can be seen to pass entirely through the rivet; and a pin (108) which can be inserted through one sleeve of the toploader where it aligns with the ninety degree reading of a protractor/instructions piece of paper that was inserted into it, and then is passed through either: the hole of the rivet that is retained by the control linkage, then through the ninety degree reading of the inserted protractor/instructions piece of paper, then out the other sleeve of the toploader where it becomes housed by a clutch which surrounds its sharp end, or the hole of the rivet that is retained by the given acute angle linkage, then through the ninety degree reading of the inserted protractor/instructions piece of paper, then out the other sleeve of the toploader where it becomes housed by a clutch which surrounds its sharp end.

* * * * *